US012793543B2

(12) United States Patent
Mintz

(10) Patent No.: US 12,793,543 B2
(45) Date of Patent: Nov. 10, 2026

(54) SYSTEM AND METHOD TO OPTIMIZE CITYWIDE TRAFFIC FLOW BY PRIVACY PRESERVING SCALABLE PREDICTIVE CITYWIDE TRAFFIC LOAD-BALANCING SUPPORTING, AND BEING SUPPORTED BY, OPTIMAL ZONE TO ZONE DEMAND-CONTROL PLANNING AND PREDICTIVE PARKING MANAGEMENT

(71) Applicant: Yosef Mintz, Jerusalem (IL)

(72) Inventor: Yosef Mintz, Jerusalem (IL)

(73) Assignee: Yosef Mintz, Jerusalem (IL)

( * ) Notice: Subject to any disclaimer, the term of this patent is extended or adjusted under 35 U.S.C. 154(b) by 60 days.

(21) Appl. No.: 19/067,934

(22) Filed: Mar. 2, 2025

(65) Prior Publication Data

US 2025/0299566 A1 Sep. 25, 2025

Related U.S. Application Data

(63) Continuation of application No. 17/642,243, filed as application No. PCT/IB2020/058507 on Sep. 14, 2020, now abandoned.

(Continued)

(51) Int. Cl.

*G08G 1/01* (2006.01)
*G06Q 30/02* (2023.01)

(Continued)

(52) U.S. Cl.

CPC ....... *G08G 1/0145* (2013.01); *G06Q 30/0224* (2013.01); *G07B 15/063* (2013.01);

(Continued)

(58) Field of Classification Search

CPC ........... G08G 1/0145; G08G 1/096816; G08G 1/0116; G08G 1/017; G06Q 30/0224;

(Continued)

(56) References Cited

U.S. PATENT DOCUMENTS 11,049,391 B2 6/2021 Mintz
12,122,352 B2 * 10/2024 Wrobel .................. B60L 53/00

(Continued)

FOREIGN PATENT DOCUMENTS

EP 2515284 10/2012
EP 3764334 1/2021

(Continued)

OTHER PUBLICATIONS

International Search Report and the Written Opinion for International Application No. PCT/IB2017/050007, mailed on May 7, 2017, 12 pages.

(Continued)

*Primary Examiner* — Rodney A Butler
(74) *Attorney, Agent, or Firm* — Shichrur & Co.

(57) ABSTRACT

Some demonstrative embodiments include an apparatus, system and/or method, which may be related, for example, to a system and/or a method, which may be configured, for example, to optimize citywide traffic flow, for example, by privacy preserving scalable predictive citywide traffic load-balancing supporting, and/or being supported by, optimal zone to zone demand-control planning and/or predictive parking management.

20 Claims, 26 Drawing Sheets

Related U.S. Application Data

(60) Provisional application No. 62/985,409, filed on Mar. 5, 2020, provisional application No. 62/975,296, filed on Feb. 12, 2020, provisional application No. 62/899,290, filed on Sep. 12, 2019.

(51) Int. Cl.

| | |
|---|---|
| ***G06Q 30/0207*** | (2023.01) |
| ***G07B 15/06*** | (2011.01) |
| ***G08G 1/09*** | (2006.01) |
| ***G08G 1/0968*** | (2006.01) |
| *G01C 21/34* | (2006.01) |
| *H04W 4/40* | (2018.01) |

(52) U.S. Cl.

CPC ... *G08G 1/096816* (2013.01); *G01C 21/3461* (2013.01); *G06Q 2240/00* (2013.01); *H04W 4/40* (2018.02)

(58) Field of Classification Search

CPC .. G06Q 2240/00; G07B 15/063; G07B 15/06; G01C 21/3461; G01C 21/3446; H04W 4/40; H04W 4/029; H04W 12/06; H04W 12/02

See application file for complete search history.

(56) References Cited

U.S. PATENT DOCUMENTS

| | | | |
|---|---|---|---|
| 2009/0024458 | A1 | 1/2009 | Palmer |
| 2009/0259528 | A1 | 10/2009 | Ebersberger et al. |
| 2009/0319163 | A1 | 12/2009 | Sutter et al. |
| 2011/0131238 | A1 | 6/2011 | Peeters et al. |
| 2012/0226434 | A1 | 9/2012 | Chiu |
| 2014/0095272 | A1 | 4/2014 | Zafiroglu et al. |
| 2014/0229249 | A1 | 8/2014 | Chiu |
| 2014/0229255 | A1 | 8/2014 | Scofield et al. |
| 2014/0278029 | A1 | 9/2014 | Tonguz et al. |
| 2018/0173895 | A1 | 6/2018 | Max et al. |
| 2019/0012909 | A1 | 1/2019 | Mintz |
| 2019/0272389 | A1 | 9/2019 | Viente et al. |
| 2022/0319312 | A1 | 10/2022 | Mintz |

FOREIGN PATENT DOCUMENTS

| | | |
|---|---|---|
| WO | 03042950 | 5/2003 |
| WO | 2017/115342 | 7/2017 |
| WO | 2018/142194 | 8/2018 |

OTHER PUBLICATIONS

International Preliminary Report on Patentability for International Application No. PCT/IB2017/050007, mailed on Jul. 12, 2018, 8 pages.

International Search Report and the Written Opinion for International Application No. PCT/IB2017/053995, mailed on Nov. 6, 2017, 14 pages.

International Preliminary Report on Patentability for International Application No. PCT/IB2017/053995, mailed on Aug. 15, 2019, 9 pages.

European Search Report for European Patent Application No. 17733935.5, mailed on Aug. 16, 2019, 11 pages.

Office Action for Israeli Patent Application No. 260358, mailed on Feb. 19, 2020, 3 pages.

Office Action for U.S. Appl. No. 16/067,684, mailed on Mar. 27, 2020, 23 pages.

Office Action for U.S. Appl. No. 16/067,684, mailed on Oct. 28, 2020, 20 pages.

Notice of Allowance for U.S. Appl. No. 16/067,684, mailed on Feb. 24, 2021, 5 pages.

Office Action for European Patent Application No. 17733935.5, mailed on Dec. 16, 2021, 4 pages.

Office Action for Israeli Patent Application No. 260358, mailed on Apr. 29, 2021, 2 pages.

Office Action for U.S. Appl. No. 16/482,797, mailed on May 5, 2022, 7 pages.

Office Action for Israeli Patent Application No. 268399, mailed on Dec. 29, 2020, 3 pages.

International Search Report and the Written Opinion for International Application No. PCT/IB2020/058507, mailed on Nov. 29, 2020, 9 pages.

International Preliminary Report on Patentability for International Application No. PCT/IB2020/058507, mailed on Mar. 24, 2022, 7 pages.

Office Action for U.S. Appl. No. 17/642,243, mailed on Mar. 5, 2024, 19 pages.

Office Action for U.S. Appl. No. 17/642,243, mailed on Dec. 3, 2024, 36 pages.

* cited by examiner

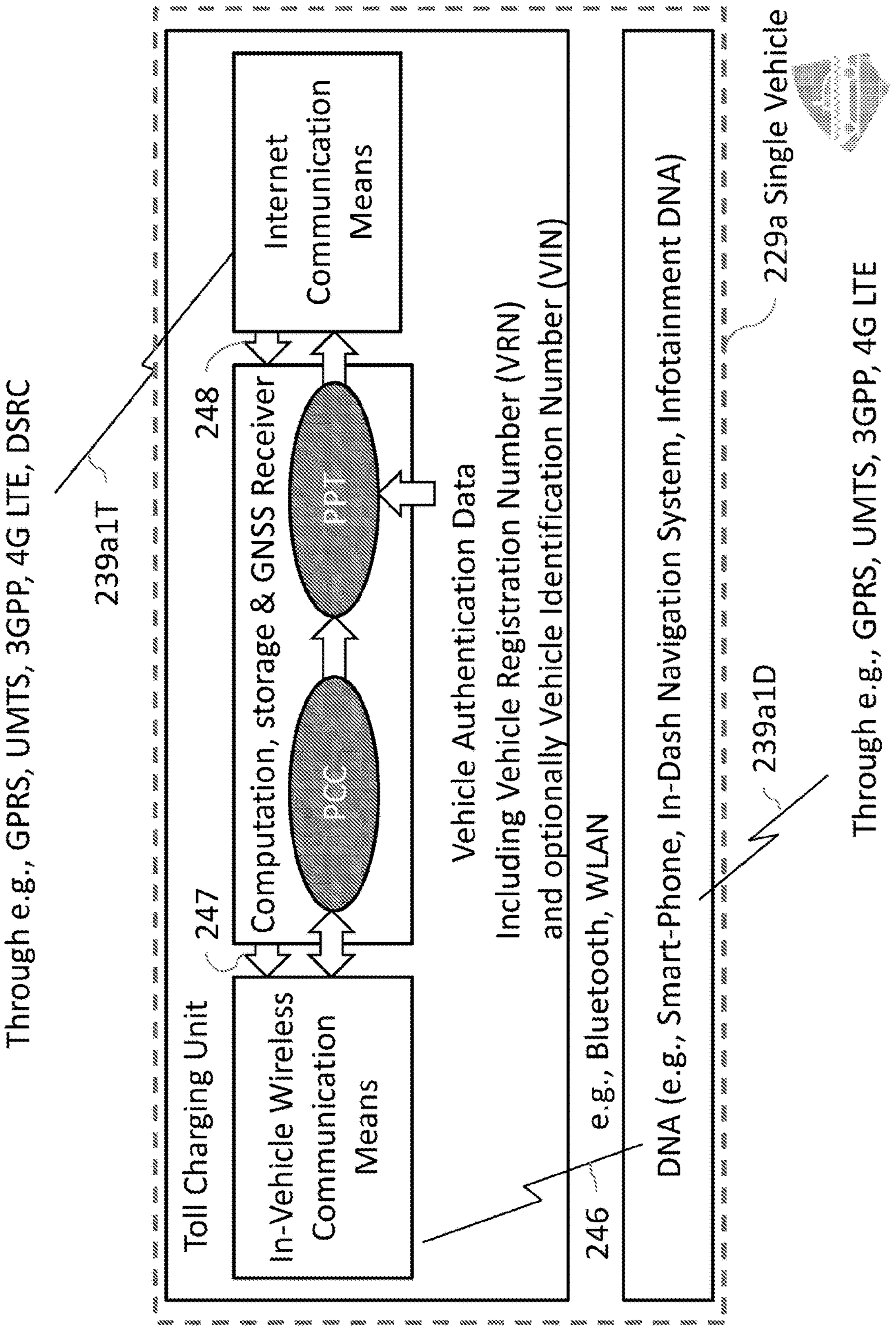
Fig.1i1

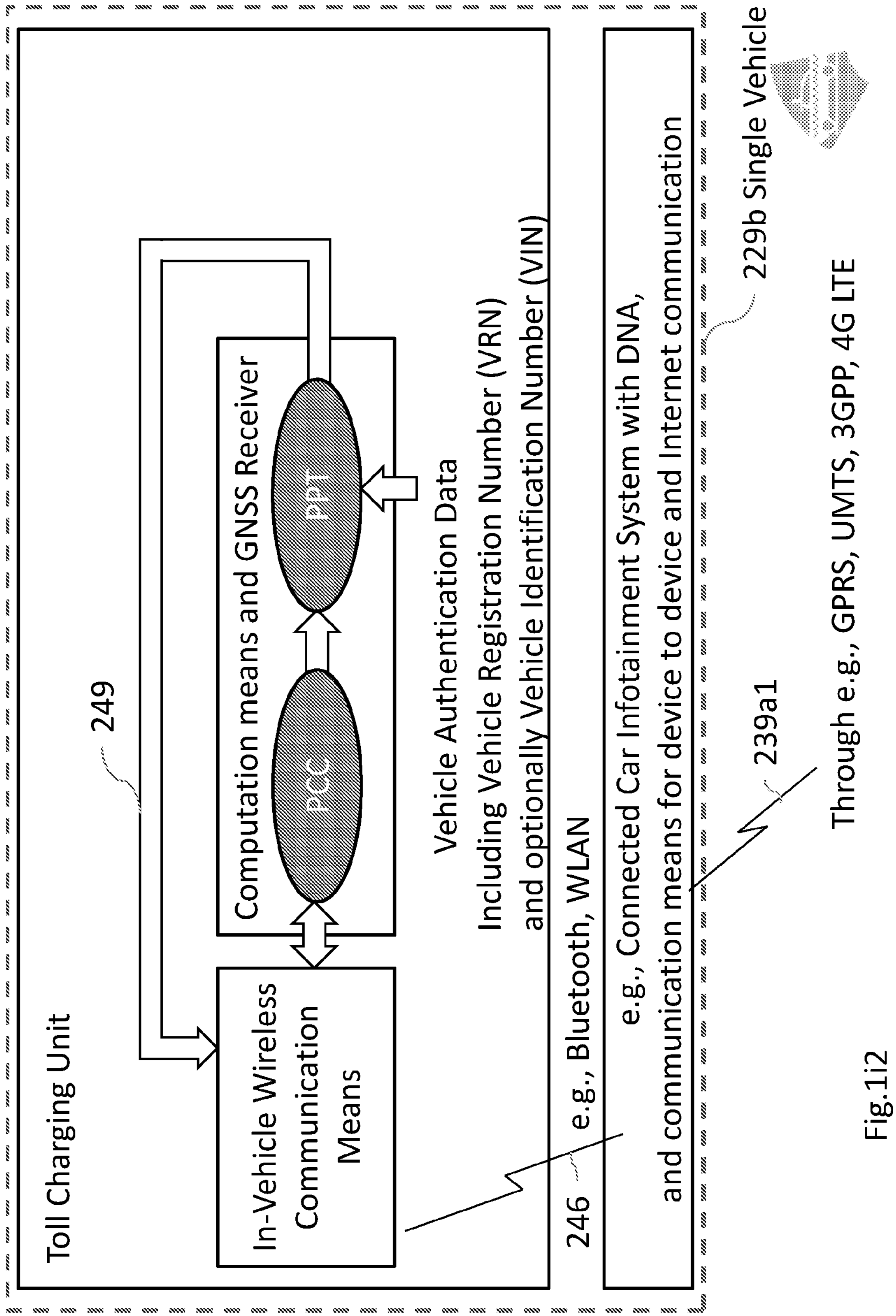
Fig.1i2

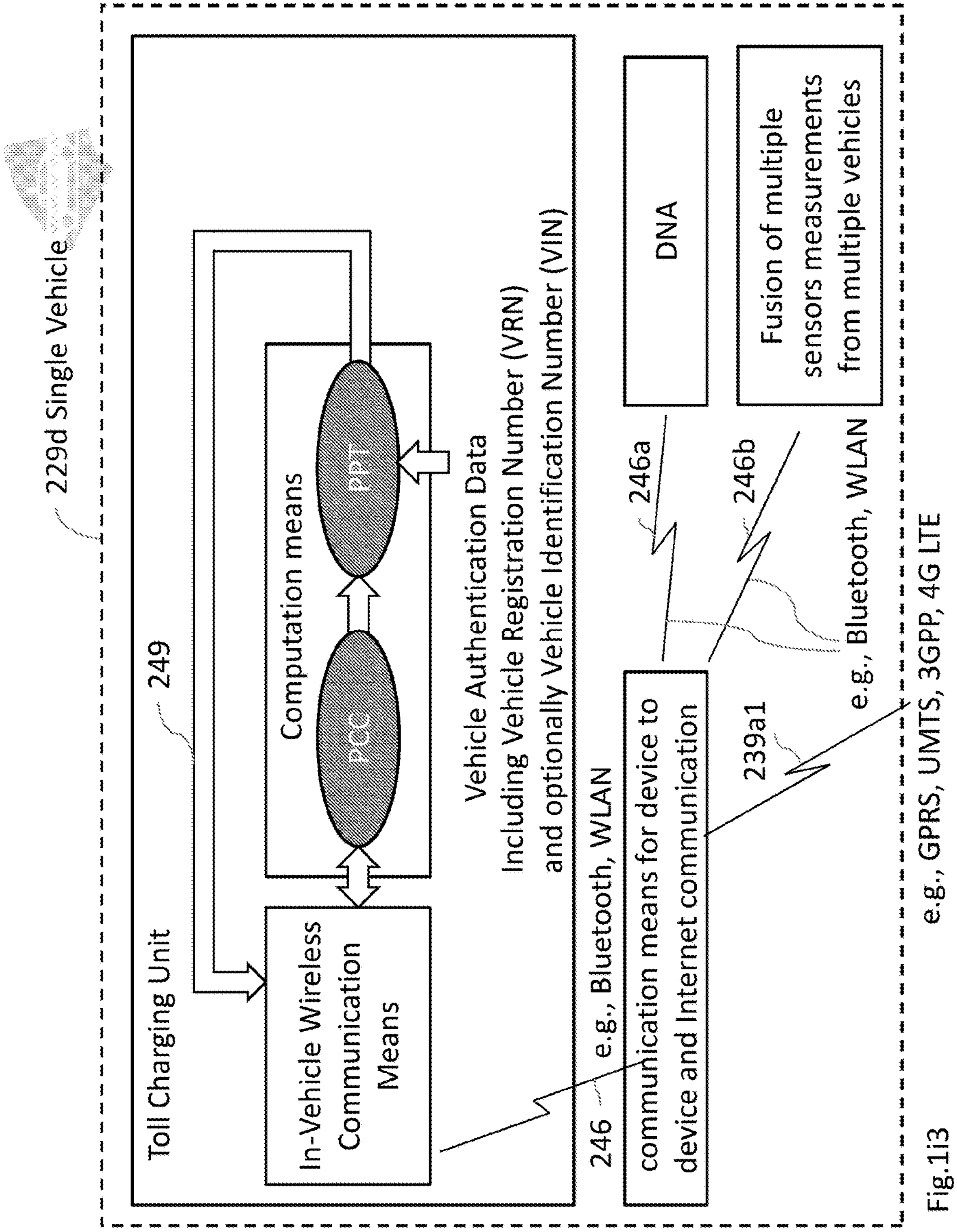
Fig.1i3

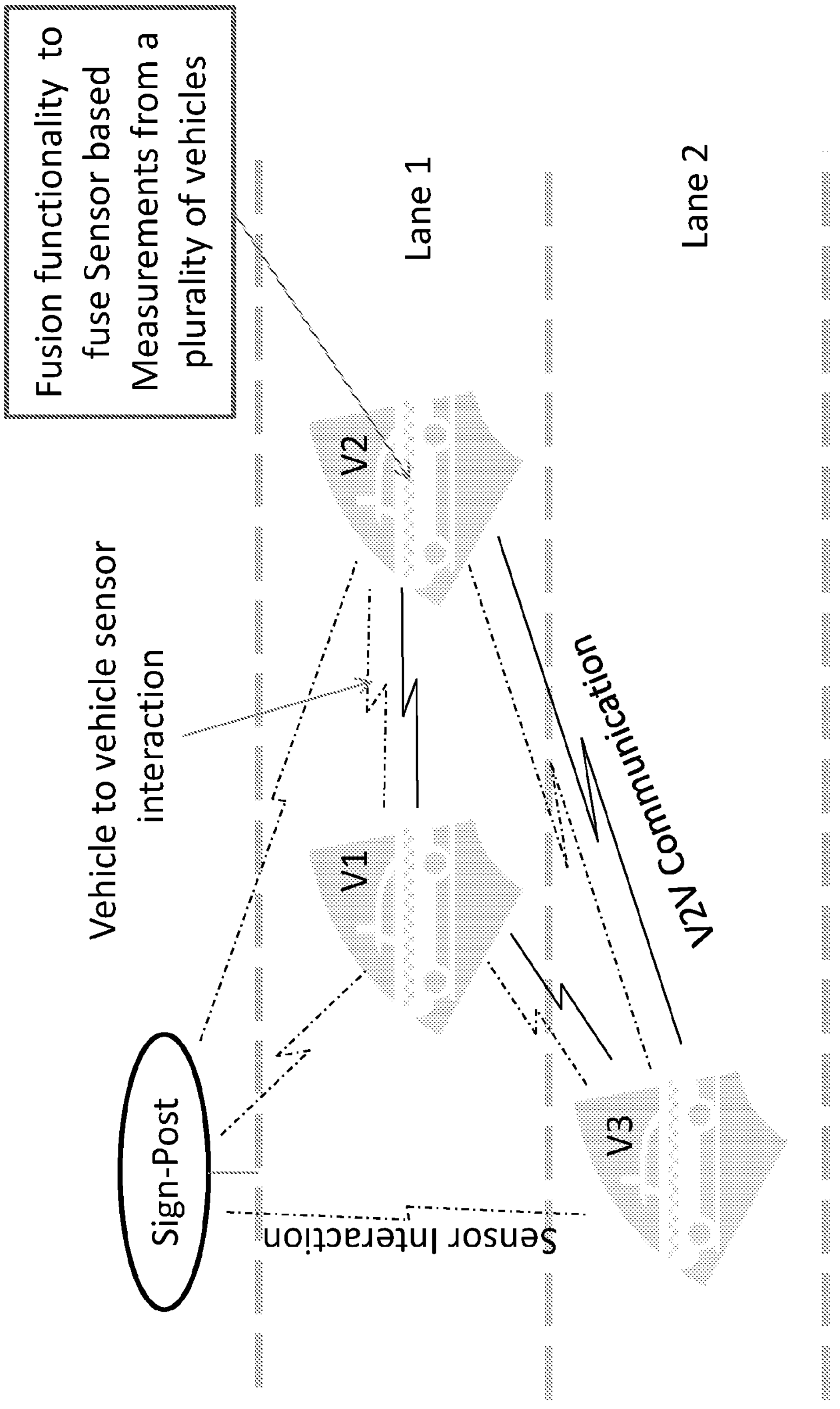
Fig.1i3a

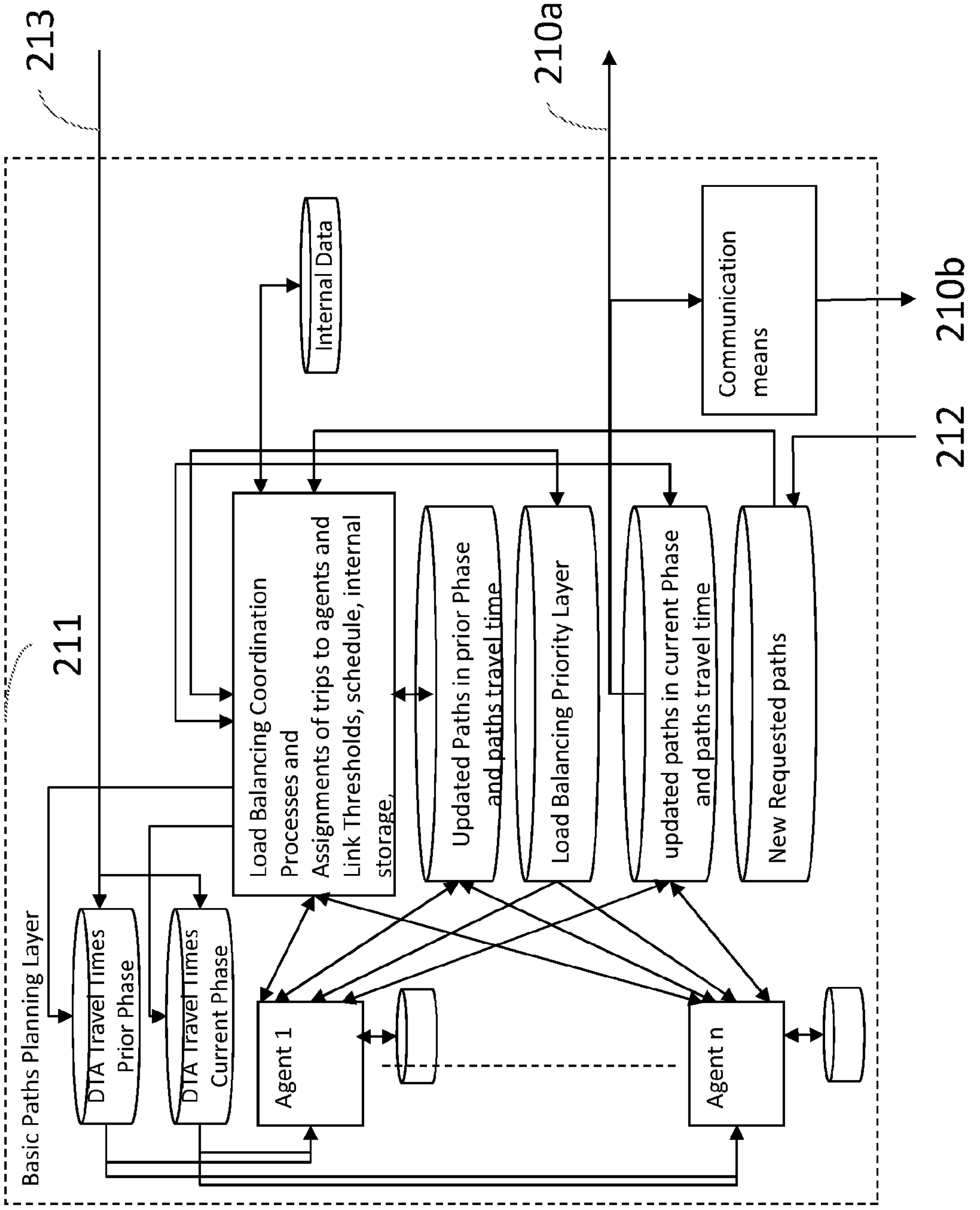
Fig.1j1

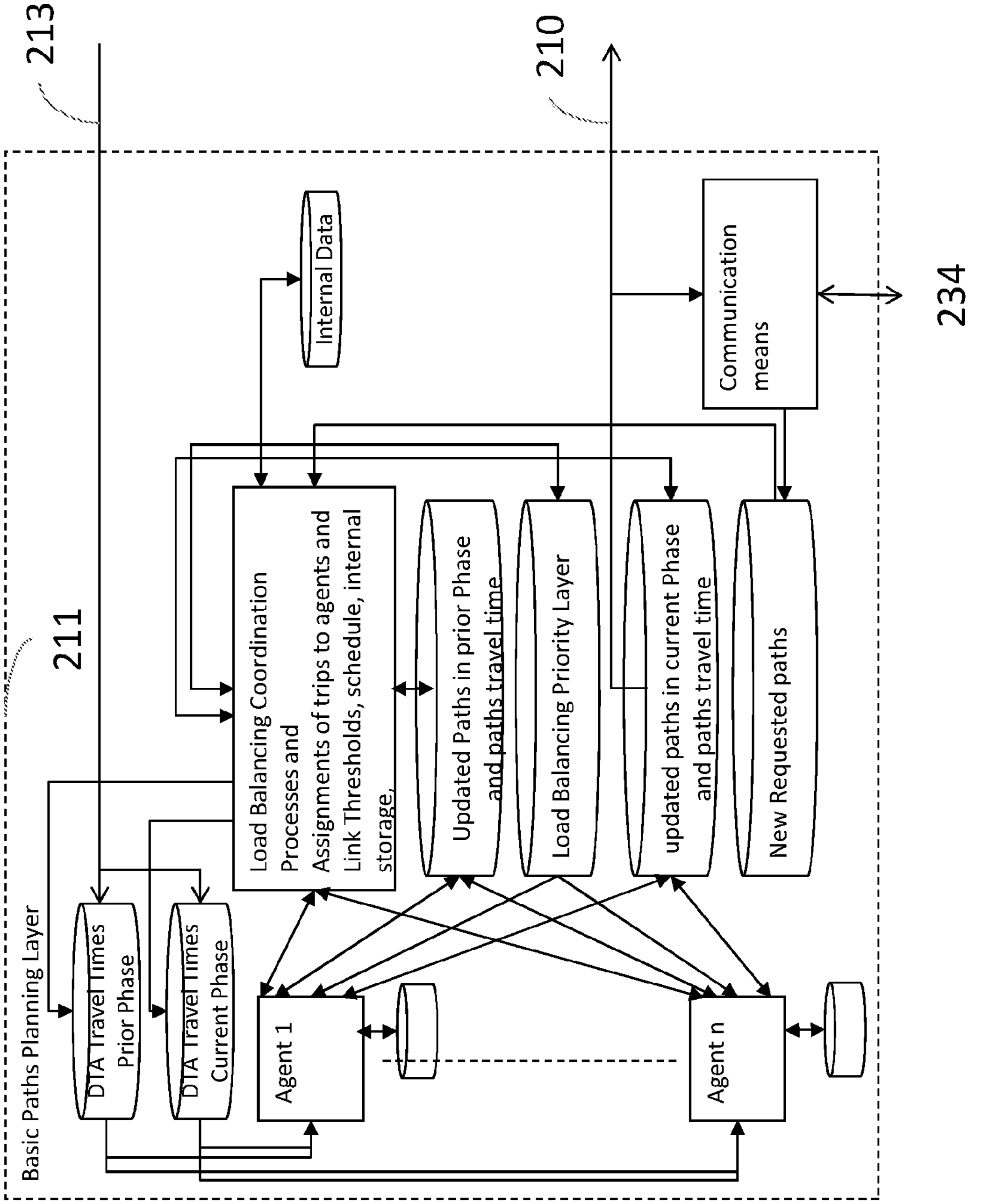
Fig.1j2

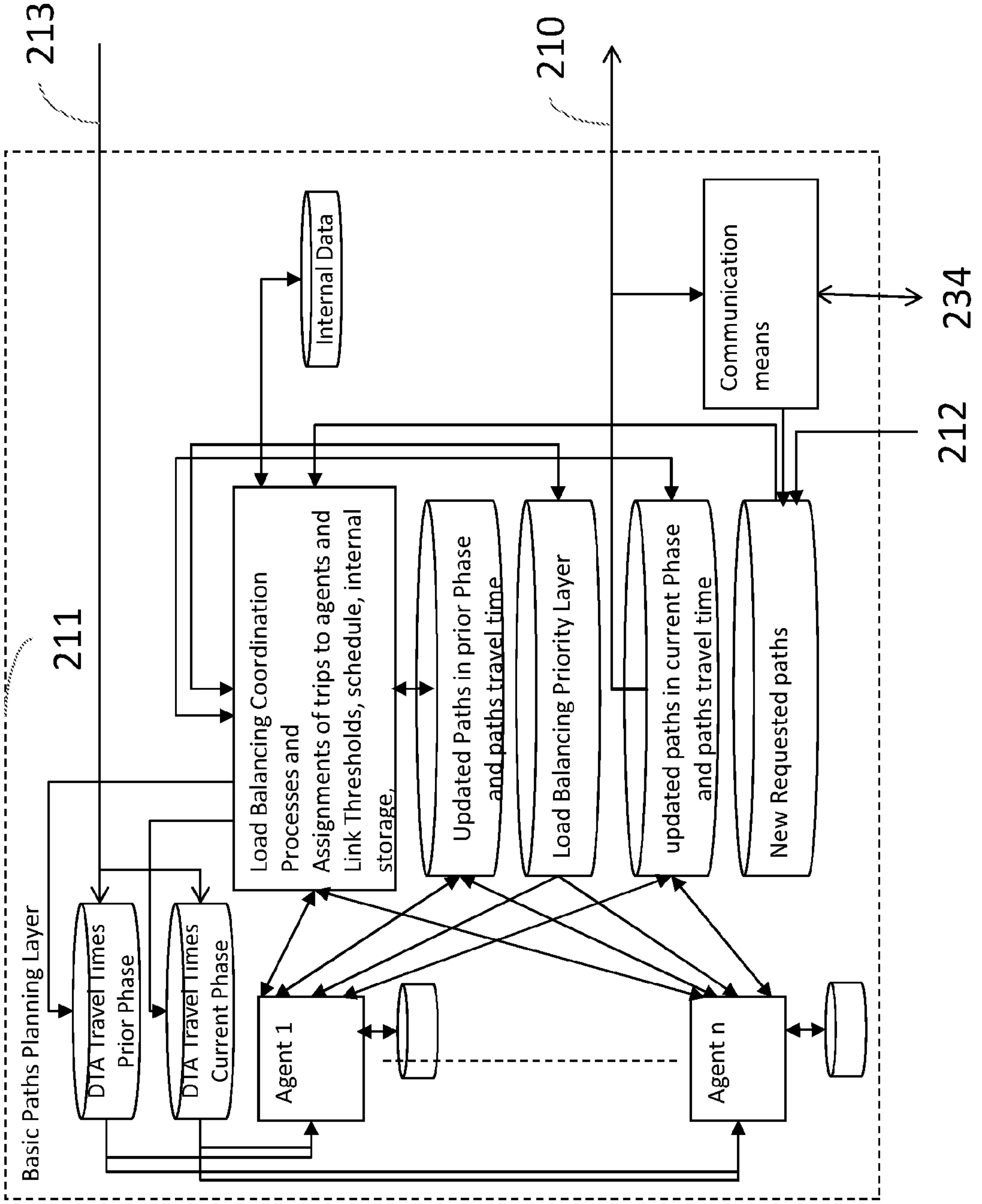
Fig.1j3

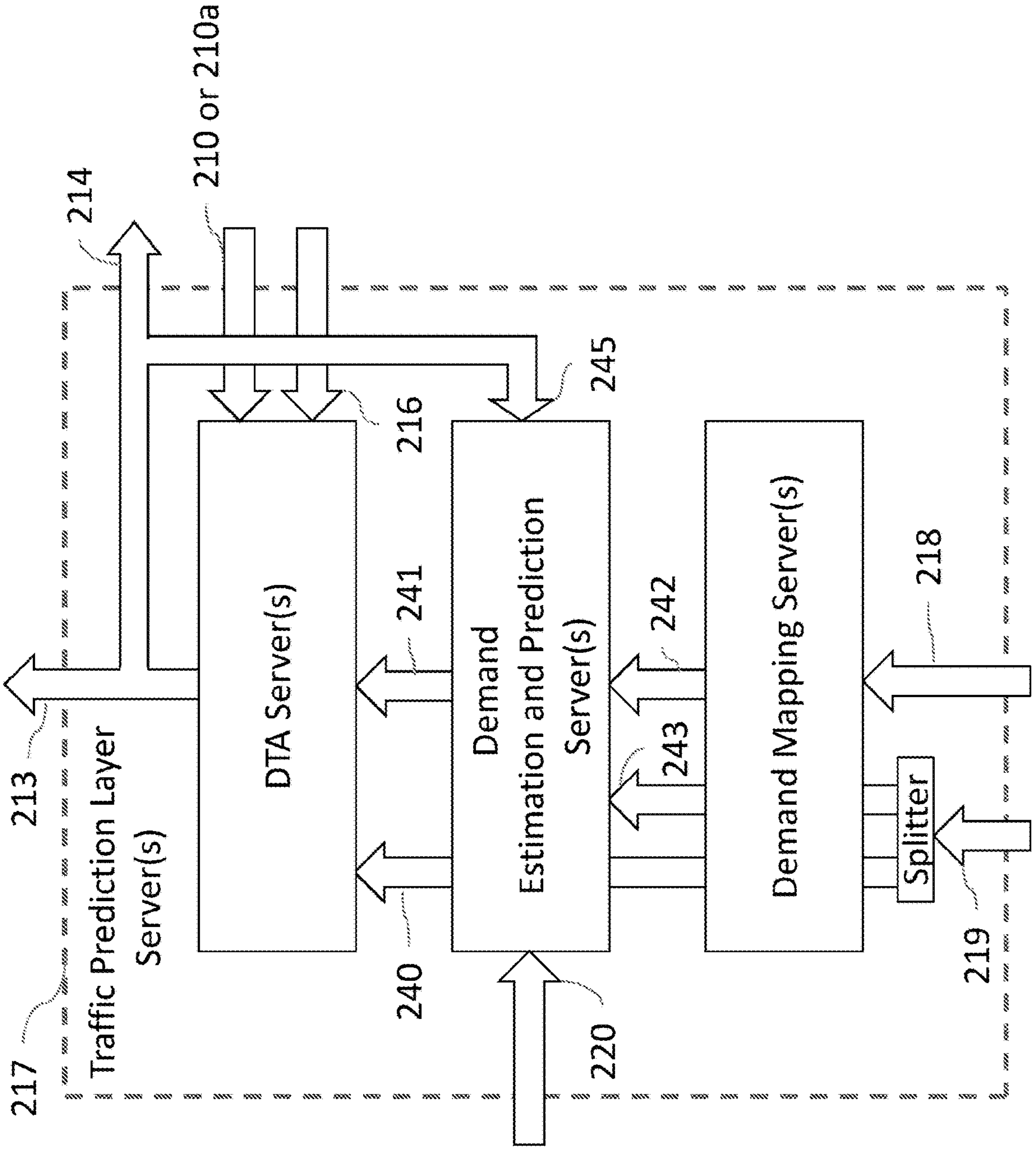
Fig.1j4

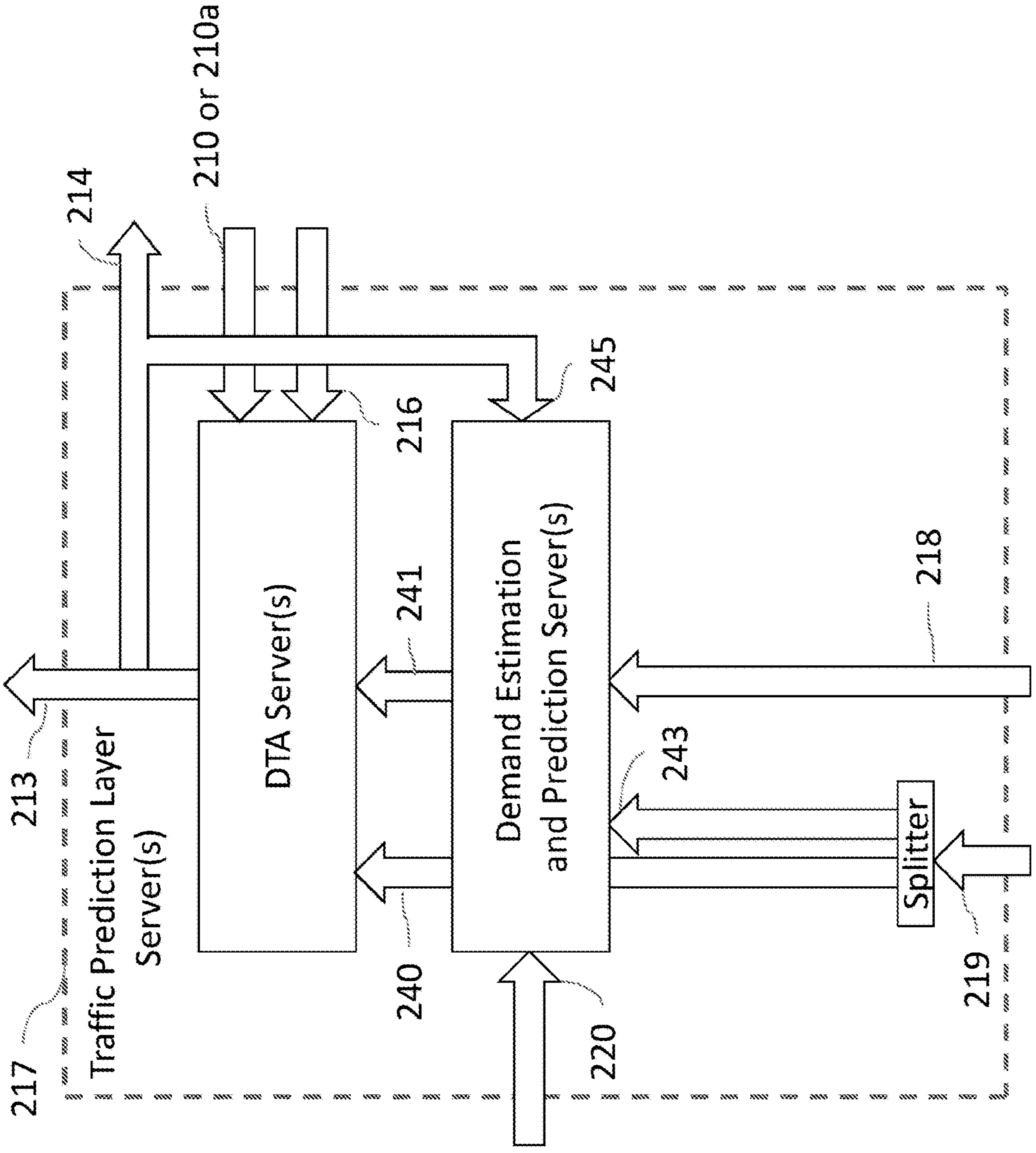
Fig.1j5

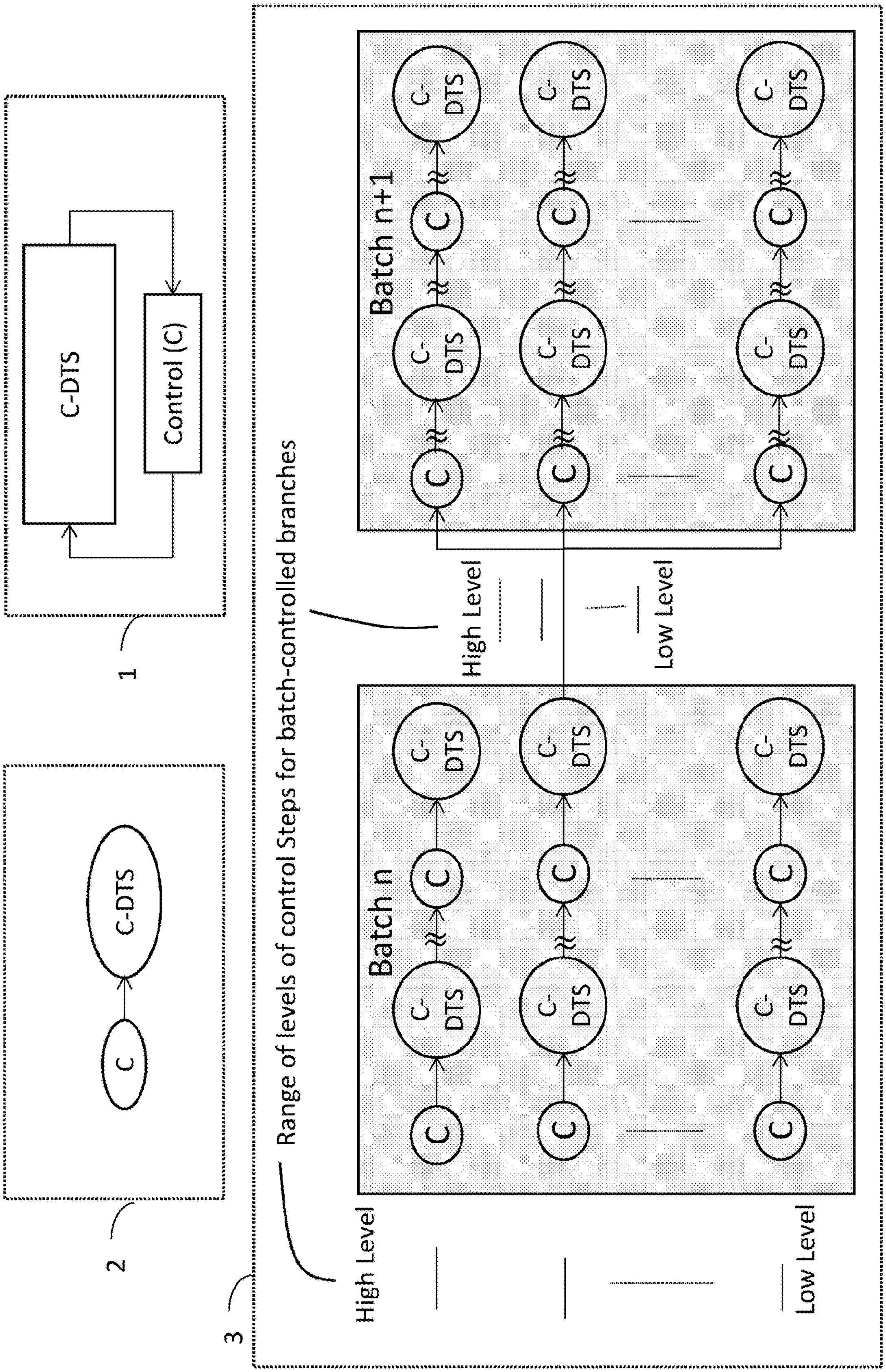
Fig 3.1

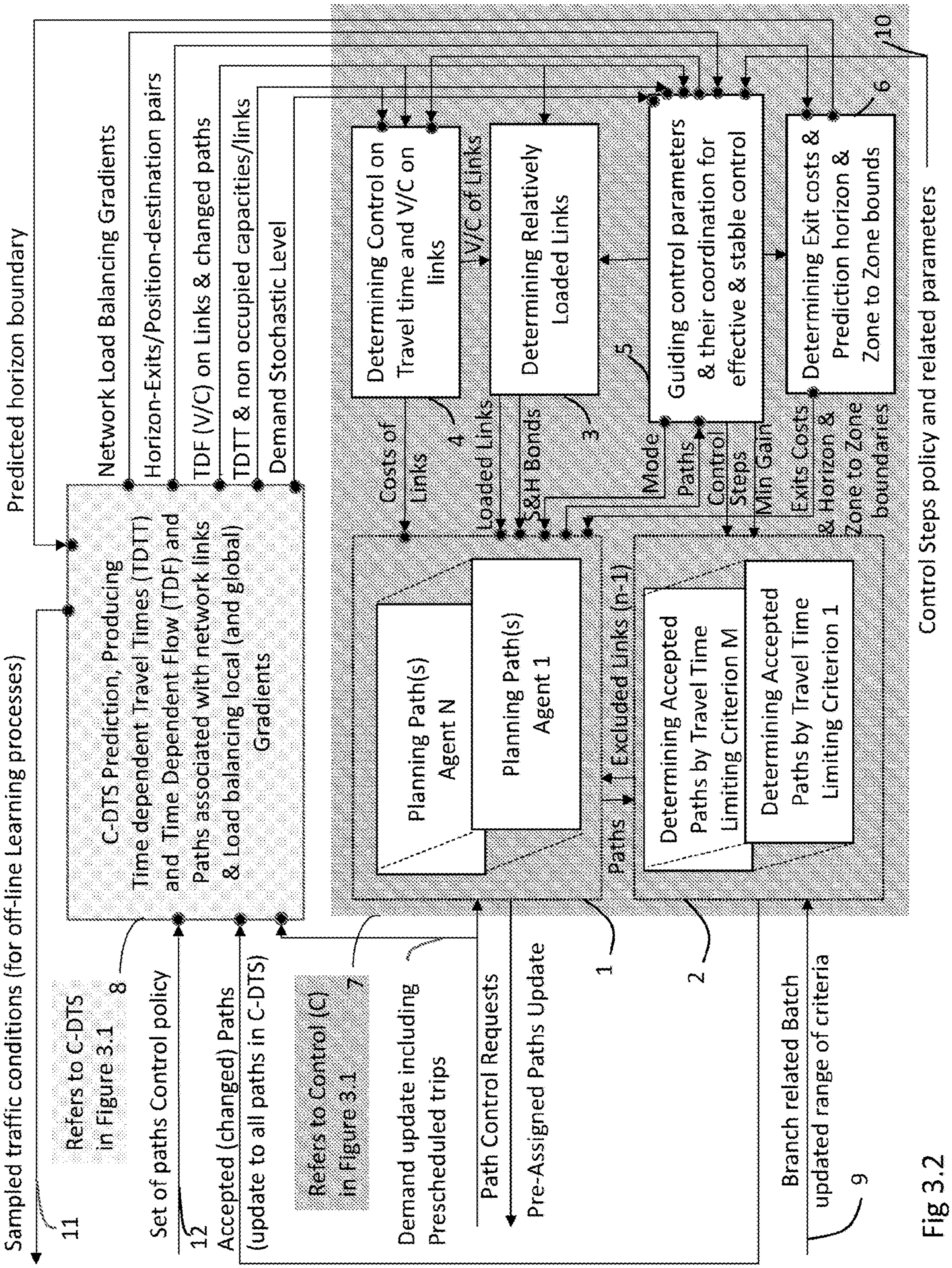
Fig 3.2

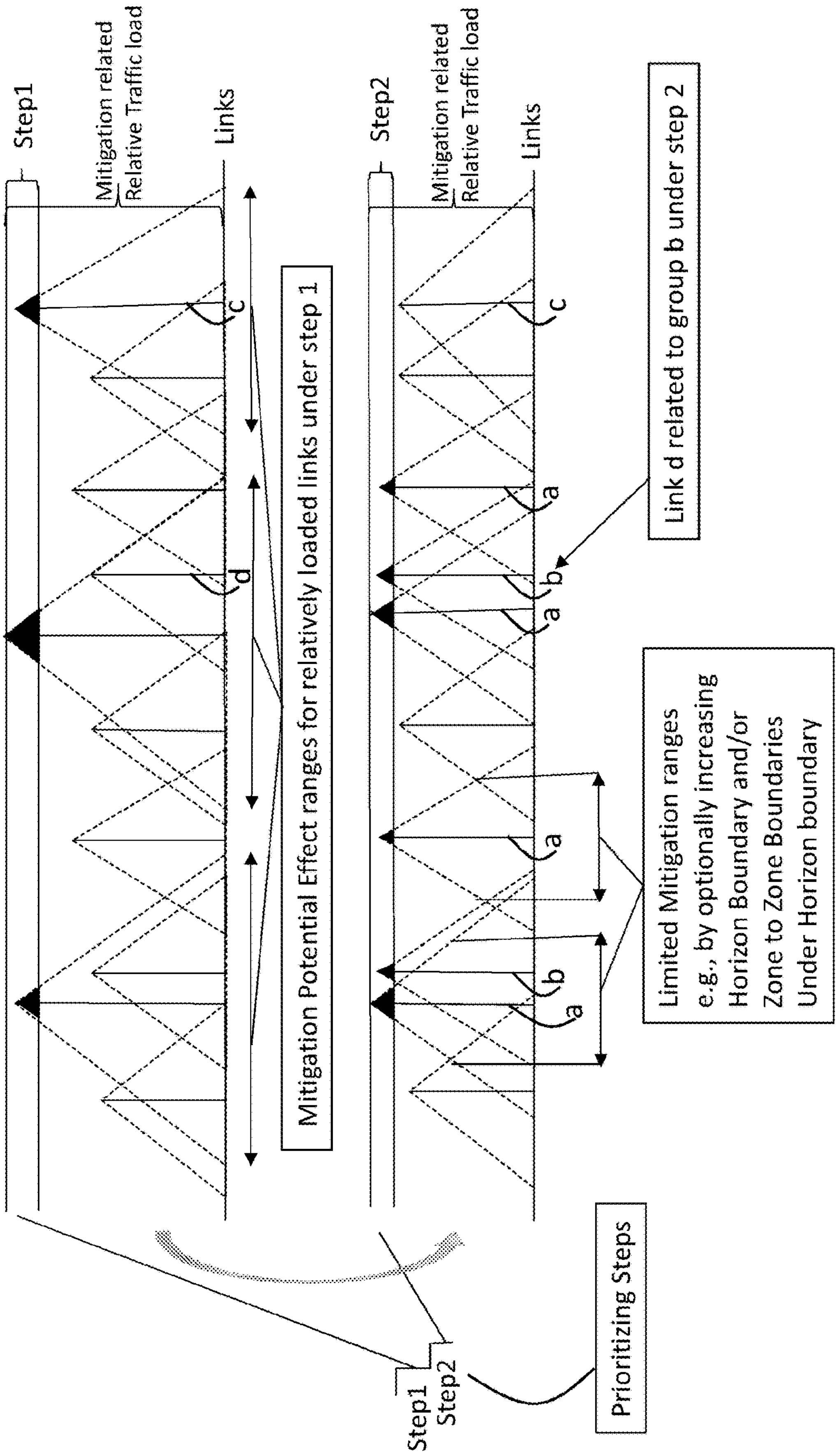
Fig 3.3

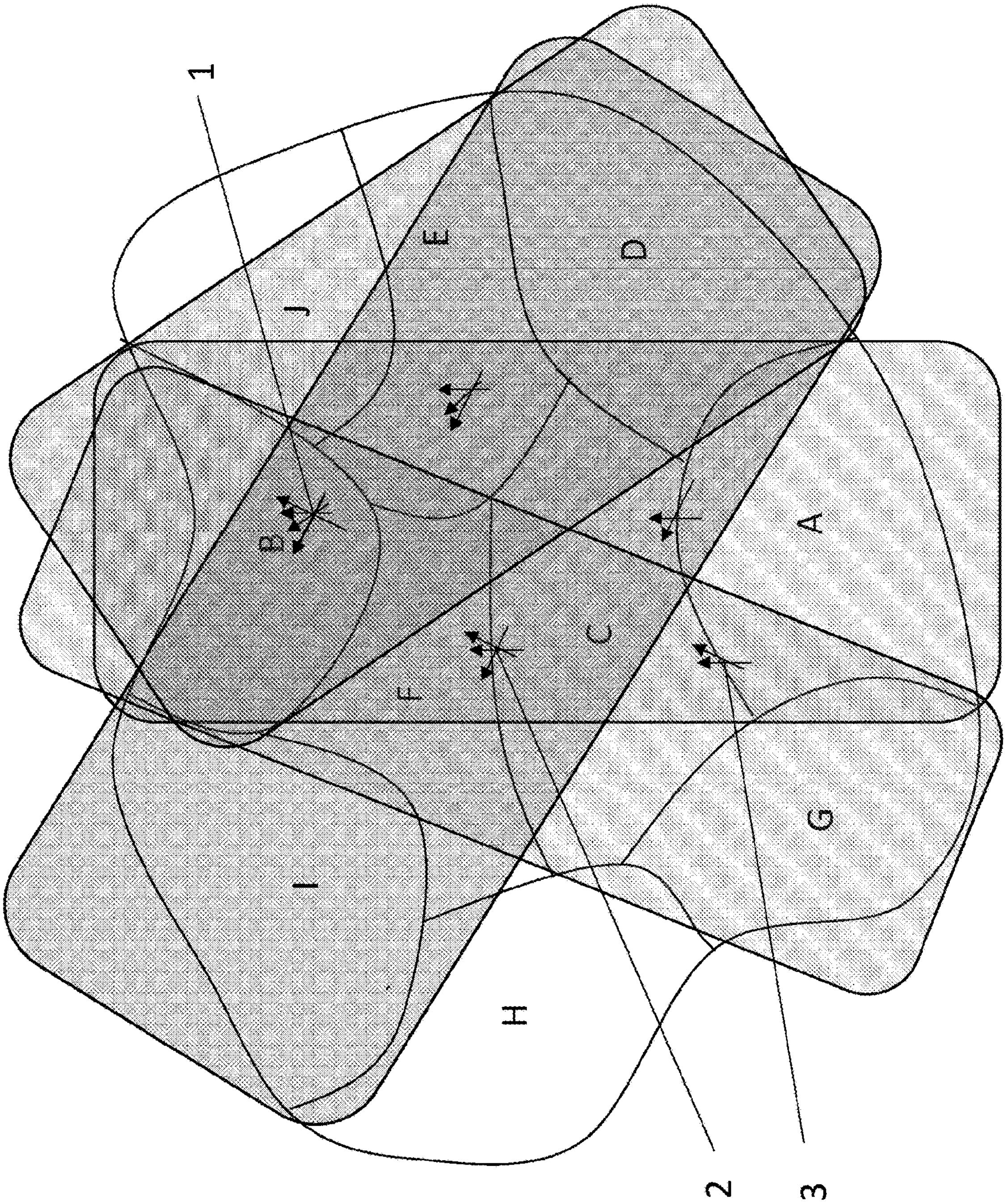
Fig 3.4a

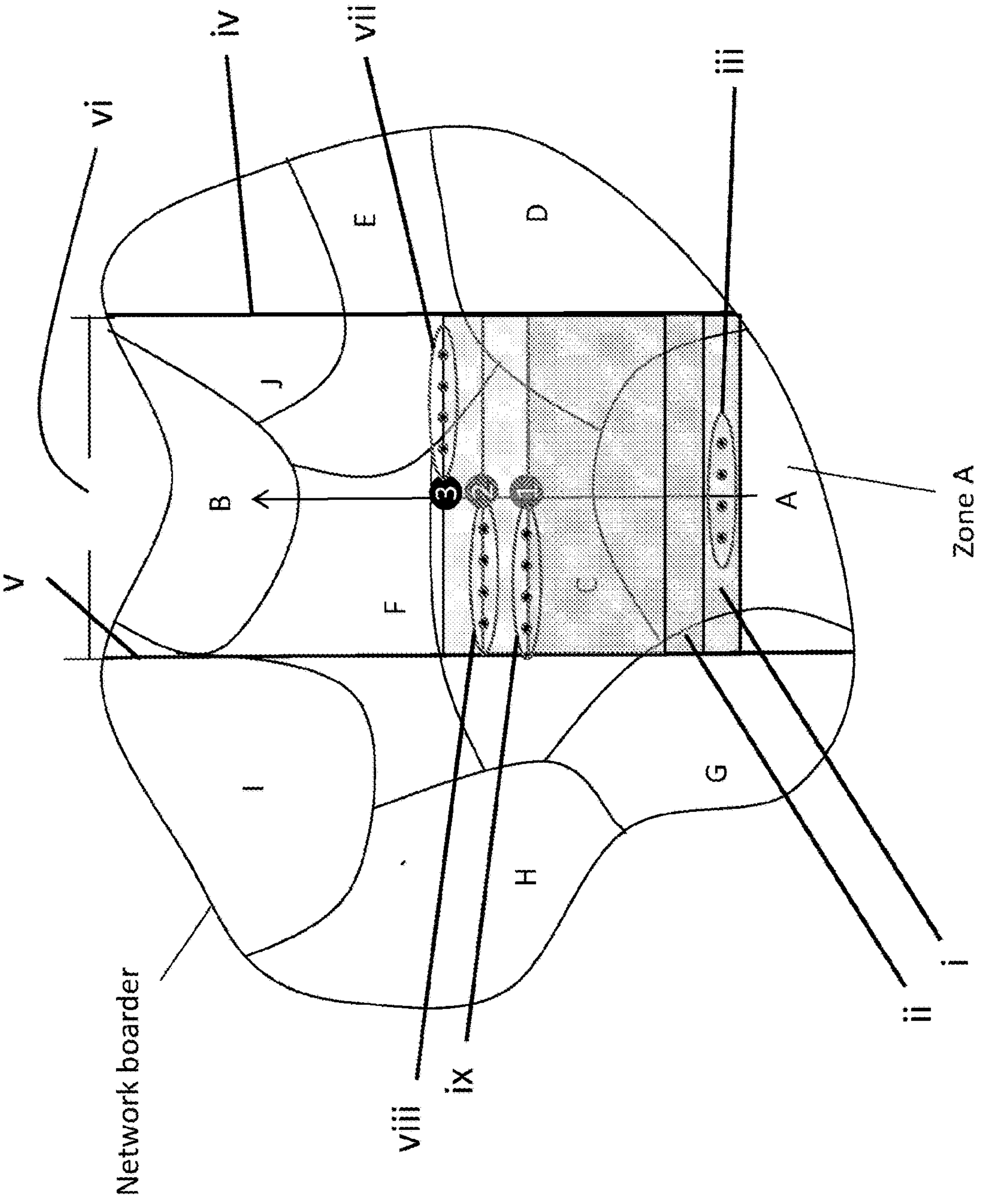
Fig 3.4b

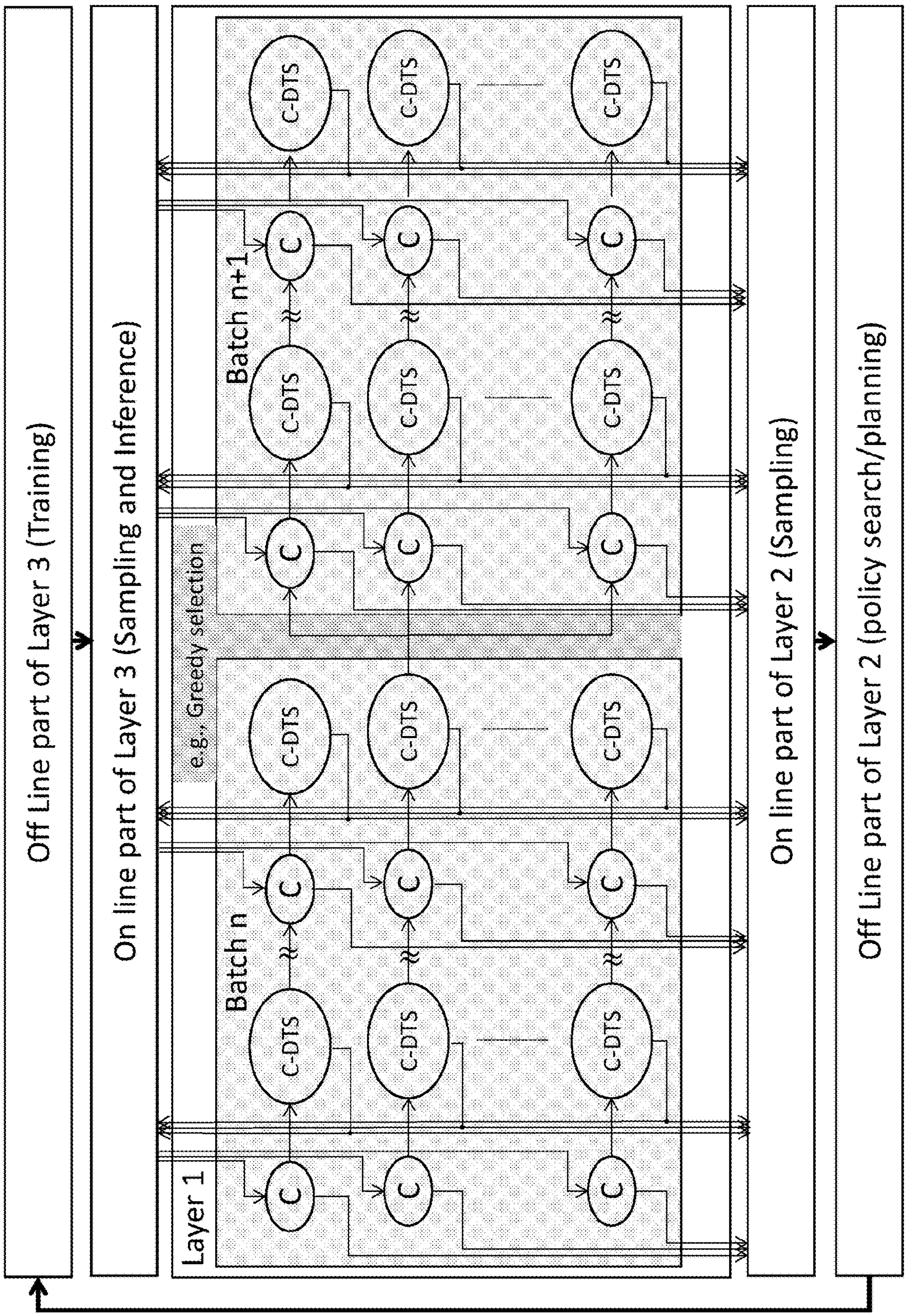
Fig 3.5a

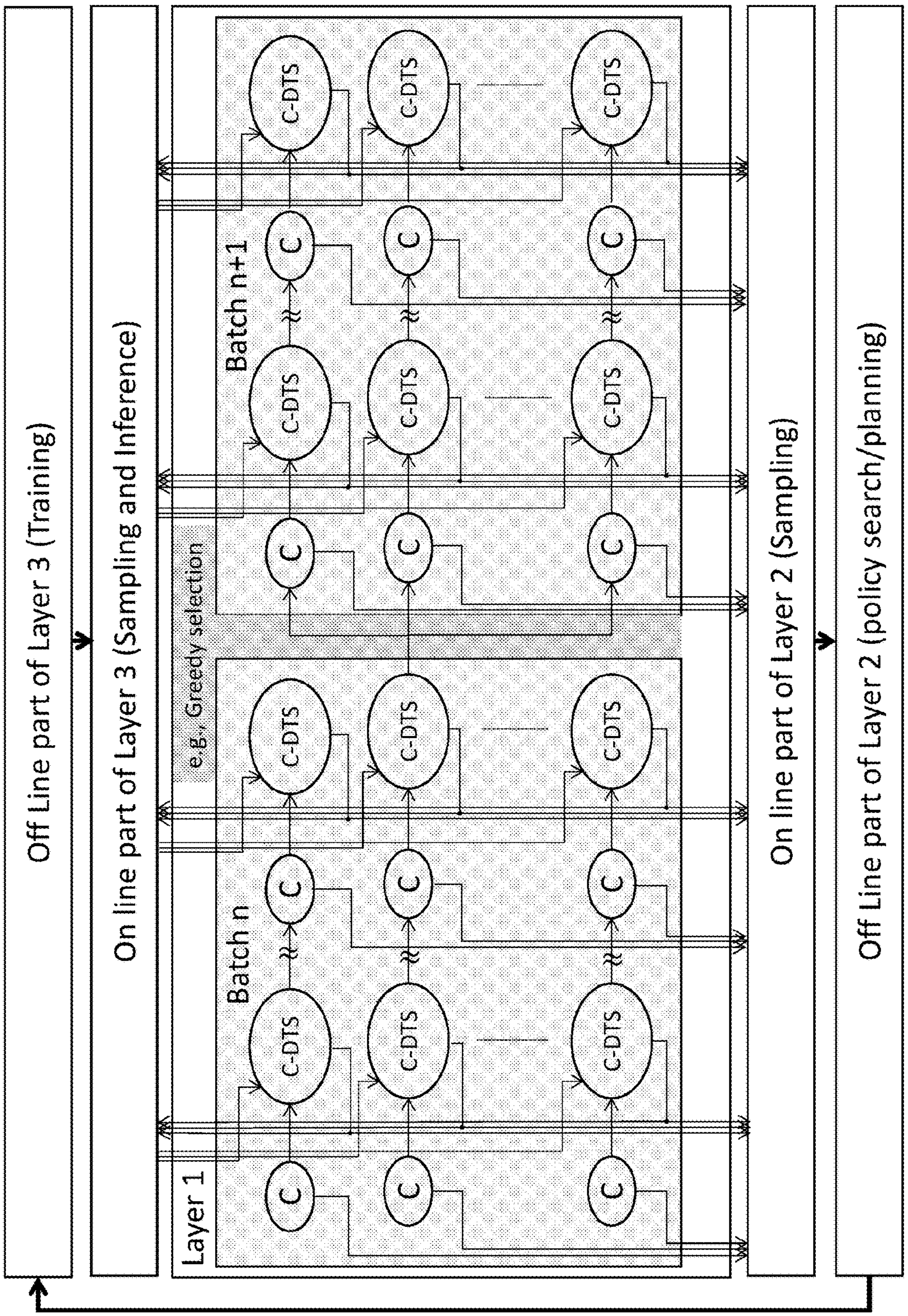
Fig 3.5b

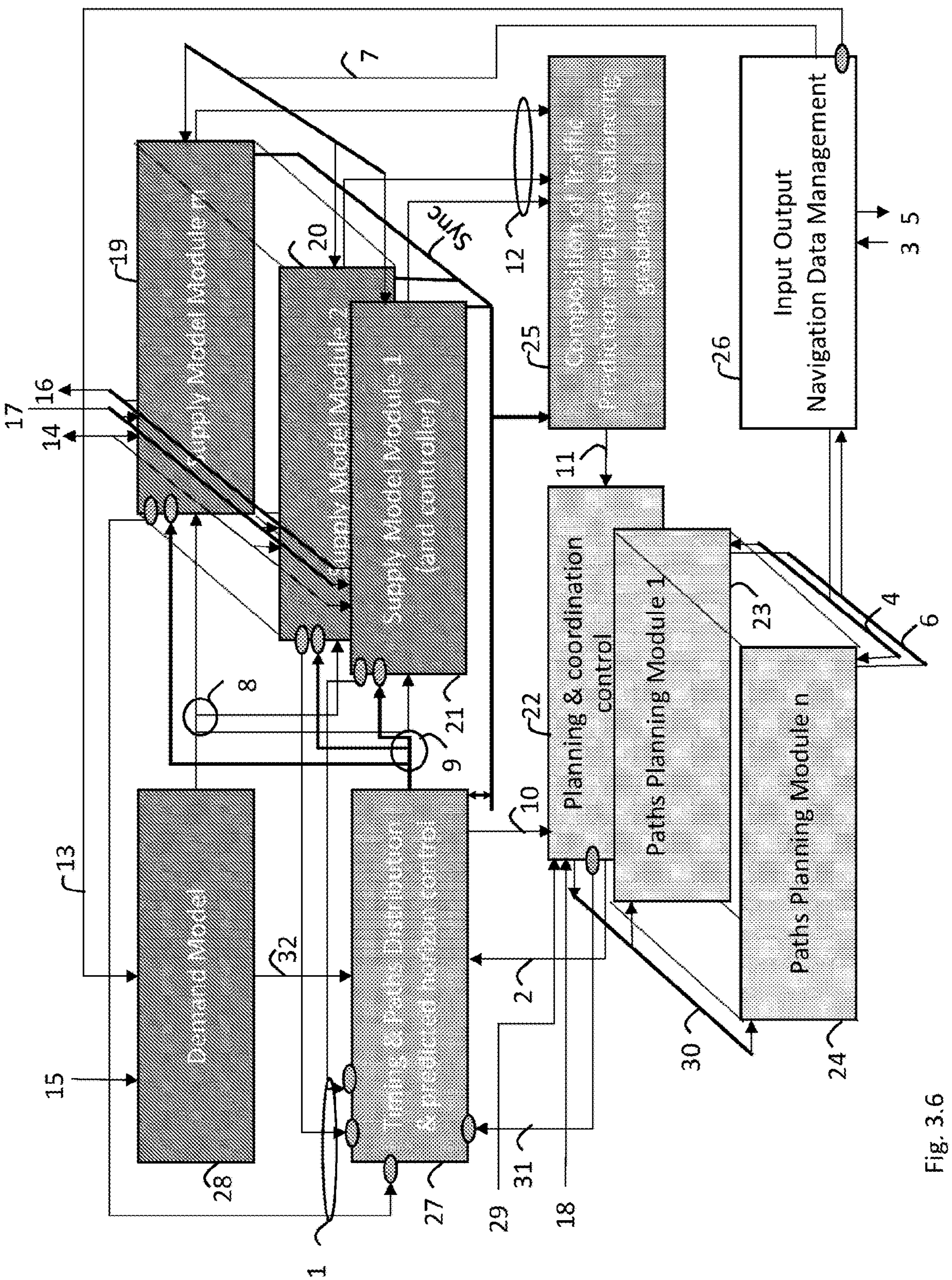
Fig. 3.6

SYSTEM AND METHOD TO OPTIMIZE CITYWIDE TRAFFIC FLOW BY PRIVACY PRESERVING SCALABLE PREDICTIVE CITYWIDE TRAFFIC LOAD-BALANCING SUPPORTING, AND BEING SUPPORTED BY, OPTIMAL ZONE TO ZONE DEMAND-CONTROL PLANNING AND PREDICTIVE PARKING MANAGEMENT

TECHNICAL FIELD

GNSS tolling based incentivized predictively controlled coordinating navigation enabling to apply citywide traffic load balancing, by multiagent predictive control approach supported by deep learning methods, which further enables zone to zone demand control optimization to maximize traffic flow on citywide road networks, as well as supporting and being supported by predictive management of parking places to prevent traffic interference generated by search for empty parking places.

BACKGROUND

Current trend towards smart traffic for smart cities considers solutions mainly based on very slow evolving Intelligent Transportations Systems (ITS) which has roots in the early nineties, and which proposes costly solutions for city wide coverage while lacking the most critical part which is an ability to apply proactive distribution of traffic on complex urban networks associated with effective demand and predictive parking control.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1*a* schematically illustrates top level system data flow to apply predictive traffic load balancing control according to some embodiments.

FIG. 1*i*1 schematically illustrates vehicular apparatus and methods to apply according to some embodiments interaction of a vehicle with a predictive traffic load balancing control system.

FIG. 1*i*2 illustrates schematically a toll charging unit and its interaction with in-vehicle Driving Navigation Aids (DNA) and a predictive traffic load balancing control system.

FIG. 1*i*3, illustrates schematically expanded configuration of vehicular apparatus described with FIG. 1*i*2, enabling to support privileges to cooperative safe driving.

FIG. 1*i*3*a* illustrates schematically the sensing, communication and fusion functionalities involved with cooperative mapping of relative distances between a vehicle and other vehicles.

FIG. 1*j*1 up to FIG. 1*j*3 illustrate schematically embodiments for the coordination of path controlled trips preferably applied with a basic paths planning layer.

FIG. 1*j*4 and FIG. 1*j*5 illustrate schematically basic traffic prediction layer with respect to different embodiments in which some of them apply mapping of demand of trips as described in FIG. 1*j*4.

FIG. 2 is a schematic illustration of a product of manufacture, in accordance with some demonstrative embodiments.

FIG. 3.1 schematically illustrates planning and coordination platform in relation to multiple branched model predictive control.

FIG. 3.2 schematically illustrates core planning and coordination process elements associated with an iteration of a branch of said multiple branched model predictive control.

FIG. 3.3 schematically illustrates a boundaries (steps) and effects associated with simplified example of hierarchical planning and coordination process.

FIGS. 3.4*a* and 3.4*b* schematically illustrate simplified example of using zone to zone and predicted horizon boundaries applied by planning and coordination processes, enabling to cope with planning and coordination processes for large citywide road networks.

FIGS. 3.5*a* and 3.5*b* schematically illustrate multi-layer planning and coordination processes associated with learning processes, enabling to facilitate recovery from non-marginal traffic irregularities.

FIG. 3.6 schematically illustrates a core module to apply iterations planning and coordination processes under a branch of a multi-branch planning and coordination processes, enabling to apply scalable modular solution for large citywide road networks.

DETAILED DESCRIPTION

Figure 1A:
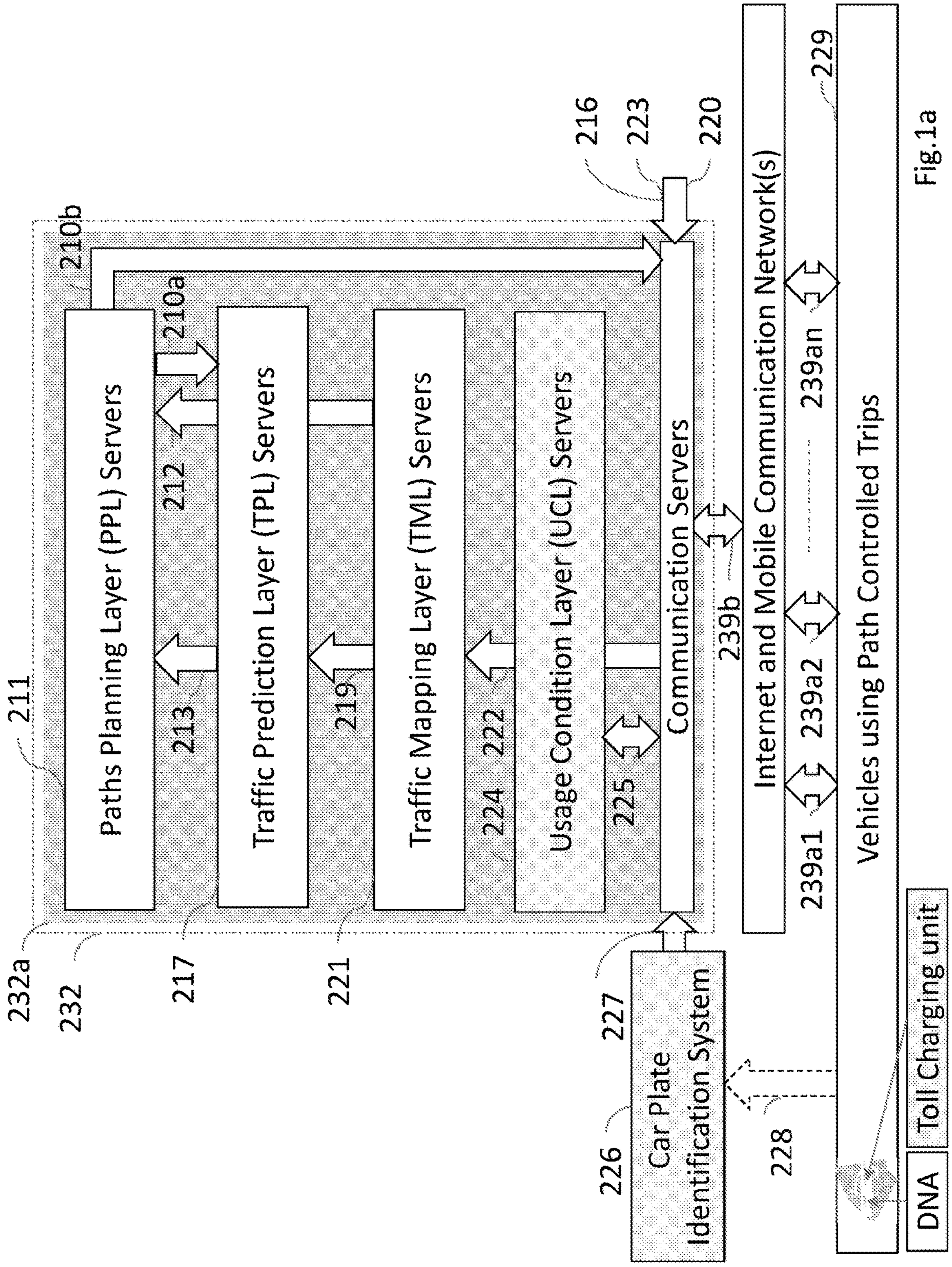
FIGS. 1*a* up to 1*e* schematically illustrate examples of possible implementation alternatives for system configurations and functionalities according to some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments described herein may be implemented by apparatuses, systems and/or methods applying an innovative non-discriminating and anonymous car related navigation driven traffic model predictive control, producing predictive load-balancing on road networks which dynamically assigns sets of routes to car related navigation aids and/or which navigation aids may refer to in dash navigation or to smart phone navigation application.

Some embodiments described herein may be implemented to enable, for example, to improve or to substitute commercial navigation service solutions, applying under such upgrade or substitution a new highly efficient proactive traffic control for city size or metropolitan size traffic.

Some embodiments described herein may refers to innovative solutions provided to issues such as, for example, but not limited to, encouragement of usage of controlled trips on road networks by robust privacy preserving free of charge or privileged GNSS tolling which hides trip details from a toll charging center (privacy preservation at a level which disables any potential big brother syndrome) and which further enables to optimize network traffic load balancing by demand control, robust real time calibration of DTA for city wide controllable traffic-predictions associated with predictive load balancing control, regional evacuation/dilution of traffic under emergency situations, support to cooperative multi-destination trips, static and dynamic differentiation between part of networks which may and which may not be used to balance city wide traffic.

Some embodiments described herein may be implemented, for example, to contribute to robust and less costly cooperative safe driving on road networks, which are expected to be a major issue with autonomous vehicles, as well as contributing to preparation of conditions to prevent, in due course, from non-coordinated mass usage of navigation dependent autonomous vehicles to become counterproductive to both the overall traffic and the users of autonomous vehicles.

The following introduces issues associated with the motivation behind the development of a new concept that has a potential to drastically improve citywide traffic at a level that may be considered as a new model to be associated with multimodal transportation planning and which model refers to incentivized Predictively Controlled Cooperative Navigation (PCCN). In this respect, said motivation is associated with increasing difficulties to cope with the demand to apply citywide effective transportation solutions which difficulties poses a major increasing issue worldwide. One of the major issues in this respect is lack of flexibility to improve and increase citywide road networks in progressively increasing dense cities.

Common solutions consider public transportation improvement with the expectation that some part of the public will give-up on usage of private cars which provides the most convenient transportation means. A further less common solution is to apply non popular demand control that dilutes network traffic by road pricing.

Relatively newer and yet not accepted alternatives consider more advanced control solutions for higher utilization and generation of freedom degrees on networks. Such alternatives are considered to be applied by Intelligent Transportation Systems (ITS) concepts which recently tend to consider Cooperative ITS (C-ITS) approach. Such concepts enter into a new related category of smart traffic for smart cities.

Traditionally, ITS solutions are promoted by the public sector and are associated with standardization for DSRC. ITS has its roots in the early nineties, and since has shown very poor results and in general the progress in this field is quite disappointing. At early stages of ITS the main focus was on resolving communication issues by DSRC, while the cellular networks were at their early stage.

In the mid of the first decade of the current millennium the technology of cellular networks became quite advanced enough, and later on cheap enough, for making DSRC based solution redundant. At that time, connected commercial navigation has started to emerge enabling to provide a platform to control regional traffic distribution.

The major leap towards the ability to materialize widely accepted commercial solutions was a result of the relatively new availability of low-cost mobile Internet through cellular networks and smart-phones, a decade ago, associated with recent ability to provide free of charge navigation to the public based on incomes from advertisement.

However, such commercial solutions are not expected to be able to provide an answer to the main goal which is high utilization of available road networks for which effective and robust predictive control is required with the distribution of trips on citywide networks. In this respect the issue with commercial navigation solutions is lack of applicable predictive control which is associated inter-alia with: a) lack of a concept to motivate high committed usage of controlled car navigation in the traffic to generate prime conditions for effective control, which commercial operation can't justify economically and which the private sector has no further real reason to promote without committed participation of the public sector, and b) lack of a concept and methods to apply predictively robust dynamic coordination of trips on a citywide road network which should further enable to apply fair and predictive assignment of sets of routes, dynamically, and which issue may become applicably relevant in case that a solution would primarily be found to motivate high usage of predictively controlled navigation (as further elaborated substantial full usage may provide conditions to apply effective controllable traffic distribution by effective citywide predictively controlled navigation).

Lack to cope with the above-mentioned issues, whether it is a private or public oriented solution, makes real progress towards materialization of smart traffic for smart cities to be nonrealistic.

In this respect it should be clarified that no real intermediate option exists to apply reliably effective solution since otherwise a major part of the traffic should be modeled by stochastic and relatively simplified sub-models, and which a solution to such an issue is not a matter of further research but an issue of a need to introduce a new concept as it is elaborated with some embodiments.

Benefits from a system and concept that may cope with the above-mentioned issues, although are expected to be high, are not unambiguous and depend on concrete control on the interrelation between time related demand of trips and the supply potential of a citywide network, wherein the way to evaluate concrete potential benefits is by computer simulation for a concrete city.

In this respect, under a solution that is solely based on predictive coordination of trips for a citywide network, it may be expected that the potential to obtain high economic benefits is clear even for a congested (but not fully congested) networks under which coordination of trips may highly utilize predicted freedom degrees on the network and be able to generate such degrees of freedom.

In this respect, a combined control on citywide demand and predictive distribution of trips the capacity and the topology of a citywide network may exhaustively be exploited and may further guarantee the highest economic benefits. Such benefits may include but not be limited to a) value of travel time savings determined recognized by transportation economics, b) reduction in polluting emissions and c) reduction in risk associated with exposure to potential incidents.

Some indicative potential benefits from a simplified closed loop predictive control had been attained for western Tokyo traffic (typical traffic in the nineties of the previous millennium), by applying reactive predictive control (as further elaborated reactive predictive control is applicable only with off-line dynamic traffic simulation). According to such simulations, is can be shown that even for a relatively small citywide network a non-proactively coordinated control, which had used controllable dynamic traffic simulator model, there is a high potential to improve traffic by predictively controlled navigation. In this respect, said reactive predictive control simulation for western Tokyo, applied for ten percent of the traffic, had shown that travel time saving that could be gained by each controlled trip is equivalent to virtual dilution of more than one trip time from the network at average.

Although said reactive predictive control is not an applicable solution for on line control, as further elaborated, it may provide preliminary indication about potential benefits.

Some idea about the reason for the non-applicability of said reactive model predictive control may be provided by mentioning the prime feasibility issue which is a need to use model based predictions which in practice lack the ability to apply robust traffic predictions by a stochastic and simplified route-choice model, associated with dynamic traffic simulators, due to lack of ability to apply acceptable calibration of a stochastic, non-linear and time varying models of dynamic traffic simulators at a city wide level traffic—while most or even major part of the traffic is modeled.

Implementation issues associated with applying model predictive controlled cooperative navigation, on the one hand, and awareness of high expected potential benefits on the other hand, raised the motivation to develop an applicable new concept enabling either to improve or to substitute commercial navigation solutions to obtain new highly efficient predictive (proactively) controlled point to point traffic distribution at a city or metropolitan size networks level which exceeds expectations from C-ITS.

In this respect, some major issues associated with applying such control should be resolved with a new concept that may claim to be able to cope efficiently and acceptably with large scale system aimed at applying predictive controlled cooperative navigation.

Such a system should inter-alia to be able to cope with: lack of efficient non-discriminating concept and technology to coordinate mass usage of controlled trips on a city wide network, lack of a low cost and efficient concept to encourage mass usage of controlled trips on networks, lack of robust real time calibration of dynamic traffic simulator to support city wide controlled traffic predictions including adaptation to traffic irregularities, lack of robust control and regional evacuation of traffic under emergency situations, lack of complementary solution to multi-destination cooperative trips, lack of complementary solution enabling static and dynamic differentiation between part of networks which may and which may not be used to balance city wide traffic, lack of robust and efficient incident control, lack of robust privacy preservation disabling even a potential big brother syndrome to be considered as an option, lack of complementary optimal dynamic control on demand, lack of means to prepare conditions, in due course, to prevent from non-coordinated mass usage of navigation dependent autonomous vehicles to become counterproductive to both the overall traffic and the users of autonomous vehicles, lack of a concept to shorten the time towards robust and relatively low cost implementation of cooperative safe driving, lack of concept to apply scalable algorithm and computation platform that facilitates implementation of predictively-controlled cooperative-navigation up to large cities, lack of concept to apply effectively demand and predictively-controlled cooperative-navigation, lack of ability to effectively apply predictively-controlled cooperative-navigation based on combined model predictive control with deep learning methods, lack of ability to determine effective multi-agent control policies for on-line control and for off-line learning, lack of ability to predictively reduce traffic interferences generated by nonproductive search for empty parking places, lack of ability to apply verifiable appeal for charged toll under full privacy preserving incentivized navigation, lack of ability to prevent malicious attacks on anonymous service and in general lack of applicable concept to integrate commercial navigation with currently considered advanced demand control.

In this respect, embodiments described hereinafter may be configured to provide feasible solution to apply one or more or to all elements of above-mentioned issues and provide additional features and/or benefits and/or alternatives and/or improvements to systems and methods which may exist or will be existing in the future.

The described embodiments introduce methods, apparatus and systems that may enable high utilization of road networks, using control on paths of trips with the aim to resolve above mentioned issues and some other issues mentioned further along with the described embodiments. (hereinafter the term network refers to a road network if not mentioned otherwise. Moreover herein after and above, the term path refers to a route on a road network and both terms, path and route, may be used interchangeably).

According to some embodiments, control on paths, which may refer to predictively-controlled cooperative-navigation, may be applied as an independent service or as an upgrade to available centralized navigation system service that calculates routes for driving navigation aids according to requests that are fed to driving navigation aids and transmits routes assigned to driving navigation aids. Hereinafter, and above, a driving navigation aid may refer to a means of driving navigation, enabling to guide either a driver or an autonomous vehicle, according to updated path, wherein, a driving navigation aid may refer to the term DNA as an abbreviation.

A DNA may be a satellite-based driving navigation aid used to guide drivers, in which the position of the vehicle along a trip is determined indirectly for, or directly by, received signals from a GNSS associated preferably with map matching, and/or according to sensor(s) associated with an autonomous vehicle enabling vehicle-localization on a high-resolution map.

In case of driving navigation aids, which are not supported by centralized route calculation, there would be preferably a need to upgrade such driving navigation aids to transmit guidance request to a centralized system and to receive respectively guiding routes in order to apply said control on paths of trips. A centralized approach may enable a highly demanding control to substantially coordinate paths on the network, whereas calculation of paths by driving navigation aids prohibits high frequency control cycles to coordinate paths. In this respect, long time duration of a control cycle may reduce the efficiency of the control on trip paths and may even make the control non-applicable.

The methods, apparatus and/or systems that enable to apply said control approach on paths for trips (predictively-controlled cooperative-navigation) should preferably use model predictive control approach, supported preferably by learning processes, while targeting mainly urban areas in which there are multiple alternatives to distribute controlled trips on a road network according to demand of controlled trips.

The potential improvement in traffic flow, which can be obtained from such an approach, depends not just on the efficiency of the method applying the control on trip paths but also on the size and the topology of the networks with further relation to zone to zone trip demand, which determine the potential degrees of freedom on the network to apply predictive control on paths of controlled trips (path controlled trips).

Apparatus and method to apply predictive control, which may predictively coordinate paths on the network, should preferably use model predictive control requiring simulation of traffic models to enable controllable traffic predictions. In this respect, prediction based on traffic simulation includes in addition to traffic models related effects also further effect of controlled set of planned paths that are fed to the simulation and performed in a prior control cycle (which may refer hereinafter also to a control phase or to a re-planning phase or to an iteration of further describes coordination control processes) that may be associated with a sub-cycle (which may refer hereinafter also to a sub-phase of a re-planning phase), wherein, according to some embodiments, a cycle may comprise a plurality of said iterations that are further described while assignment of alternative paths is applied at the end of a cycle time that may include a plurality of iterations, and wherein said simulation provides feedback to refine a set of planned paths (re-planning) by a subsequent re-planning phase (referring to an iteration coordination control processes or also to a control cycle while according to some embodiments a cycle comprises a single iteration of coordination control processes).

Refinements to planned paths based on simulated feedback is crucial to enable planning under non-linear reaction of traffic development to a change in distribution of paths by a re-planning phase (said control cycle or said iteration) since under nonlinear conditions the result from planning can't be fully anticipate. Although this is a simplified description for explaining the need for model predictive control to predictively control trip paths, it yet highlights some of the issues.

With model predictive control approach, simulated traffic flow predictions are based on realistic models, including but not limited to statistical, physical and behavioral models, as well as not limited to traditional control such as traffic lights control plans which are considered with a controllable traffic prediction platform to enable predictive control which should dynamically coordinate paths associated with trips. The result of the coordination is aimed at enabling to reduce imbalance in traffic flow on the network, and which coordination is preferably applied through controlled DNAs used either by drivers or by autonomous vehicles.

In this respect, the method, the functionality of apparatus and the system, which apply predictive control on paths of controlled trips, is associated with closed loop planning of paths which is based on feedback from controllable traffic simulation model predictions in a finite time horizon (which should be supporter with methods to bridge the gap between the limited horizon and final destinations of controlled trips as further described). Applicable implementation should preferably apply a system which is divided into layers which as elaborated with further embodiments. A system that applies such control may refer hereinafter to a path control system applying predictive path control (predictively-controlled cooperative-navigation) to path-controlled trips.

The term path-control refers to predictive path control in terms of model predictive control which is applied by a path control system, and which system is preferably aimed at coordinating path controlled trips on the network in order to generate and maintain predictively traffic load balancing on a network under objective constraints (e.g., road network, traffic conditions, behavior of drivers and traffic lights/signals) and subjective constraints (e.g., fairness in assignment of routes to trips). The term preferably was used with respect to coordination of path-controlled trips, by path control, due to a need to distinguish between conditions on the network which require special coordination processes, in addition to feedback about potentially developing effects of planned paths on the network, and conditions for which special control might be redundant.

According to some embodiments, the term path control may refer to proactive control that predictively coordinates path-controlled trips, under proactive coordination of path-controlled trips, or to reactive control of path controlled trips that applies no proactive coordination to controlled trips.

Dynamic assignment of paths for a path-controlled trip, under coordinating path control, reflects from a point of view of a controlled trip the effect of ongoing control which tends to coordinate controlled trips on the network according to current traffic and controlled traffic predictions (comprising simulation of predictive demand associated with controlled trips).

As further described with methods used to apply path control, robustness of feedback from controlled prediction performed by traffic models—which robustness increases with the increase of the percentage of path controlled trips in the traffic (due to reduced dependence on route choice model)—leads to an approach that should apply said path control under incentives provided for usage of path-controlled trips (for obedience to its path updates).

Coordination of path-controlled trips may be considered to some extent as cooperative coordination and further in this respect to cooperative path control or to coordinating path control. The term—cooperative—may refer in this respect to participation of a trip in an operation applying path control and which cooperation means obedience of drivers or autonomous vehicles to path updated associated with path-controlled trips applied through driving navigation aids. In case of autonomous vehicles—cooperative path control—may further apply safer cooperative path-controlled trips as further described. In this respect, the term robust cooperative path-controlled trips may be expanded to include inter-alia activation of cooperative safe driving by, for example, acceptably safe driving by autonomous vehicles.

According to some embodiments, a cooperative operation may in general refer to an operation enabling high utilization of citywide network capacity and topology that may contribute to safe driving on a network, and which cooperative operation is preferably supported by providing incentives to encourage participation in the cooperative operation. Incentives may be applied economically under regulation enabling to encourage efficient and safe driving while preserving the possibility of non-cooperative driving to still be allowable for some price. With such approach, the effectiveness of the traffic distribution and safety driving may be achievable under regulation wherein free of charge toll or toll discount may be provided as a privilege by authorities to encourage usage of cooperative operation, such as coordinating path control service.

The operator can be a commercial entity, that may offer the service based on measurable economic benefit which is locally recognized official "value of travel time saving" (VTTS) and which benefits based on VTTS can be evaluated by computer simulation that may determine the benefit according to the difference between simulation of aggregated trip times on the network before and after activation of path control service (predictively-controlled cooperative-navigation service).

Introduction to the System Apparatus and Methods

According to some embodiments, a path control system may be applied for example by the following described breakdown of a path control system into system layers.

A system layer which may generate conditions to apply highly efficient path control is the usage condition layer, which prepares conditions for high usage of driving navigation aids (obedience to path updates) on a network, and which may enable high utilization of freedom degrees on the network by applying predictive control for coordination of paths associated with controlled trips.

Such usage condition layer, according to some embodiments, applies incentives to usage of coordinating navigation aids supporting path-controlled trips, under coordinating path control to drivers and/or to navigation dependent autonomously driven vehicles (predictively-controlled cooperative-navigation).

With such a layer, conditions are prepared for robust traffic model-based predictions, and further for highly efficient coordinating path control, applying model predictive control that uses traffic model based controllable predictions. In this respect, high usage of navigation aids (means) on the network, supported by path control applying predictive coordination of path-controlled trips, may enable

- making redundant the need for route choice model that otherwise is required with controllable simulated predictions and further the need to apply estimation-based calibration for demand (associated with high dimension state estimation under non-linear traffic development model)
- enabling to apply substantial full predictive control on network trips, i.e., coordinating path control based on non-stochastic prediction applied by traffic simulation model.

The effect of high usage conditions, generated by the usage condition layer, has a major positive effect on all layers that may preferably support highly efficient and robust path-controlled trips as highlighted hereinafter.

Another system layer, which is the traffic mapping layer, is the first layer which utilizes the benefit of high usage of path-controlled trips generated by the usage condition layer, enabling the traffic mapping layer to receive position related data generated, preferably anonymously, by high usage of navigation aids.

With such data, high quality traffic information (e.g., flow related) at high coverage can be constructed by the traffic mapping layer according to dynamic positions of vehicles. In this respect, as further elaborated, high quality of traffic information is valuable to perform estimation-based demand calibration (and further route choice and link related calibration) to dynamin traffic simulator that applies controllable traffic predictions. However, under high incentives to use controlled trips (as described further with usage condition layer), wherein it is expected that all or almost all trips on the network will use controlled trips, there would not be a need for estimation-based on-line calibration to estimate demand and a route choice incomplete model associated with a dynamic traffic simulator, which inherently may not be neither effective nor acceptable to apply predictively-controlled cooperative-navigation (PCCN).

In this respect, high utilization of a road network and acceptable PCCN are complementary requirements to attain effective PCCN which its applicability is dependent not just on construction of highly accurate traffic information (which may at most enable limited level of calibration) but further on an ability to construct the distribution of trips on the network and the ability to control most of the trips. As further elaborated, this requires to update a control center with position updates and with trip destinations which may be applicable, under appealing incentives to use (obey to) predictive coordinating path, which may further enable to update a centralized PCCN control system with position and destination pairs and which accordingly the PCCN control system updates the dynamic traffic simulator, which applies traffic predictions, with the distribution of trips on the simulated network and may use further the destinations of trips to coordinate the development of trips and hence control the traffic development.

In a less preferred approach (which is inapplicable for a citywide network), traffic information, constructed by the traffic mapping layer, may according to some embodiments calibrate by estimation based methods dynamic traffic simulator models (links, route choice and current demand) to apply controllable traffic predictions by the traffic prediction system layer supporting a paths planning system layer which produces by default sets of paths that tend to be converged to coordinated paths under coordinating path control (PCCN) supported by high usage of path controlled trips generated for example by the further descried usage condition layer.

Introductory description of functionality of proposed layers, which may construct a path control system, without elaborating at this preliminary description methods, system, apparatus and detailed aspects associated with each of the layers, is provided with the following sections.

Clarification: Elaboration of processes, which may serve each of the proposed layers, are described further with embodiments of the present invention and are left free to be considered for association with such layers or be in interaction with such layers according to concrete design of a system.

Usage condition layer may refer to a system, methods and apparatus which enable to encourage usage of path-controlled trips, and possibly further usage of vehicle related functionalities which enable safe driving.

The prime objective of the usage condition layer is to generate massive usage of path controlled trips on a road network in order to make Controllable Dynamic Traffic Simulator (C-DTS) based traffic prediction to become independent of (or at least have low dependence on) route choice model, and further to save a need to apply high dimension demand and supply model parameters state estimation (under time-varying nonlinear and stochastic observation model) to on-line calibrate a C-DTS.

In this respect mapping dynamically the distribution and the demand of the trips directly (according to position updates from controlled trips to a known destination) rather through the support of state estimation (requiring calibration of simulated background non-controlled trips according to traffic information), under effective encouragement of usage of controlled trips, may enable to establish a reliable base for applying model predictive control based PCCN aimed at enabling substantial full control on citywide traffic load balancing.

According to some embodiments, the usage-condition-layer applies said encouragement by providing incentives to controlled trips while entitling such trips with privileged network usage (free of charge toll or toll discount). With such approach a toll charging center applies privileged tolling supported by interaction with:

a) in-vehicles toll charging units (a unit associated with a vehicle) to handle privileged tolling provided as incentives for obedience to path updates associated with path-controlled trips, and preferably
b) a car plate identification system, using for example Automatic Number Plate Recognition (ANRP), enabling to interrogate and accordingly discover vehicles which are not equipped with said toll charging unit and are not entitled to privileges.

Privileged tolling incentive has the advantage over other incentives in this respect as such incentive enables PCCN load balancing to cope further with demand control and as a result to maximize network traffic flow under adequate demand control. Moreover, such an approach facilitates the need to apply economically affordable incentives while pure positive incentives are not affordable to assure substantial full usage of PCCN (enabling the traffic load balancing to be virtually independent of a route choice model or at least marginally effected by the lack of it or marginally effected by on-line calibration to minority of background traffic).

However, said economically affordable privileged tolling, which may effectively encourage massive usage of PCCN affordably while further discouraging non usage of PCCN (virtually eliminating the negative effect on traffic prediction caused by inherent biased, stochastic and incomplete route choice model, or at least making such effect to be marginal), introduces a need to at least enable potential privacy preservation of trip details in order to guarantee wide acceptance of path controlled trips under non-draconic regulation associated with big brother syndrome.

In this respect, increase in co-usage of path-controlled trips may increase applicable reliability and productivity of citywide traffic load balancing applied by coordinating path-controlled trips, wherein substantial full usage may provide most effective conditions to apply reliable and productive load balancing that has a major influence on economic benefits (value of travel time savings—VTTS).

However, privacy preservation of trip details under incentivized PCCN introduces a conflict associated with a need to track the obedience of incentivized path-controlled trip to path updates while the trip should not be disclosed to the incentivizing entity. In this respect, monetary transactions associated with incentives is traditionally considered to be associated with central tracking of position of trips enabling to verify the entitlement for incentive by the provider of the incentive. Such traditional approach may not enable wide acceptance of PCCN usage and hence might not enable to apply effective citywide load balancing.

Nevertheless, the usage of free of charge toll or discounted tolling, an incentive, may facilitate the issue. In this respect, PCCN should be considered as a means to generate economic value of value of travel time saving and in this respect privacy preservation under non traditional verification of entitlement for incentive might be acceptable, i.e., applying on demand or occasional verification to the process associated with performed provision of incentives that is under the control of the vehicle.

As further described with different embodiments, different levels of privacy preservation and verification of entitled provision for privileged tolling may be applicable under said constraint that effective load balancing may not be achievable under privacy preservation of trip details which issue may be resolvable under nontraditional handling of privileged tolling.

In this respect, the non-traditional approach may be associated with different levels, wherein the lowest level of privacy preservation and verification is introduced first with some described embodiments.

In general, increase in the privacy preservation and verification of entitlement for privileged tolling to path-controlled trips has a positive effect on the potential acceptance of co-usage of PCCN enabling not just maximizing productivity of citywide traffic load balancing but further making it acceptable.

In this respect, the objective of privacy preservation is to eliminate inhabitations to use PCCN under centrally controlled incentivized anonymous navigation wherein the incentive, which cannot be handled anonymously, depends on the path performed by the controlled trip (i.e., while the incentive is proportional to obedience and to disobedience levels of the controlled trip to the navigation path updates) wherein the path should not be exposed. This dependence poses a conflict in the ability to apply coexisting anonymous and non-anonymous operations.

As mentioned above, the lowest level of privacy preservation is described first with some embodiment, and is associated with in-vehicle determination of privileged and non-privileged usage of path-controlled trips according to obedience and to disobedience to path updates while transmitting non anonymously the determined charged value (without trip details) to a charging center. In this respect, according to some embodiments, the transmission of charging related value is associated with a charged ID (e.g., car owner ID, or indirectly using car ID such as car registration ID, which can be associated with an account of a charged ID at the center) with no trip related details and preferably no trip time.

In this respect, according to some embodiments, a vehicular toll charging apparatus and processes applying such privacy preserving trip details, i.e., hiding trip details from a toll charging center, is performed by transmitting to a toll charging center in-vehicle calculated toll charge amounts affected by privilege criteria (free of charge toll or toll discount entitled for obedience to path that should be developed according to a path controlled trip) without exposing trip related details.

Hiding trip details from a toll charging center is not a substitution to applying secured transmission of trip details to a toll charging center. In this respect, non-hidden trip details from a charging center, and further investing in means to prevent access to such centralized stored data (which is susceptible to be suspicious by charged entities), may cause a non-trusted privacy preserving toll charging. In-vehicle tracking is a first step towards privacy preservation and transmission of charging amount (directly or as a code indirectly) is the second step wherein the burden associated with verification of entitlement to privileged tolling is the potential applicability of traffic load balancing based on wide usage of path-controlled trips.

The compensation for the burden of non-occasional usage of path controlled trips (due to non-privileged network usage), includes high travel time savings gained by the contribution of path controlled trips to traffic dilution (in case that the demand is not increased), as well as contribution to an ability to avoid, or at least to postpone, the need for applying traffic dilution by dilution of demand for trips using road tolling.

As further elaborated, such level of privacy may be more acceptable while the navigation that uses anonymous communication and the charging entity that uses non-anonymous communication with a vehicle apply the anonymous and non-anonymous communication by different communication mediums that may be associated with non-deterministic time relation between the time that the anonymous and the non-anonymous communication are used (e.g., using cellular mobile network with the navigation and short range communication with the charging process wherein the short range communication is less accessible than the cellular mobile network). A less trustable operation in this respect may be applicable if the navigation and the charging operations are associated with independent entities (e.g., the navigation is associated with a private entity and the charging entity is associated with an authority) wherein the entities exchange no data to associate ID with trip details.

Higher level of privacy preservation, described with further embodiments, should not have to be limited to said verification based just on in-vehicle data as well as not being limited to in-vehicle determination of tolling under said incentivized privacy preserving PCCN.

As mentioned before, said tolling privileges, enabled by the usage condition layer, may include privileges provided further to usage of in-vehicle elements which contribute to safe driving. In this respect, the objective to apply high usage of autonomous vehicles in order to improve safe driving within cities, may need inter-alia to reduce reaction of autonomous vehicles to human driving behaviors and in the future to eliminate such a need. Reduction or elimination of a need to react to different human behaviors by autonomous vehicles may enable more anticipated and therefore more controllable interaction among vehicles.

By encouraging usage of automated driving, enabled by autonomous vehicles, while using said privileges to encourage automated driving, the encouragement may contribute to more effective cooperative and as a result safer driving on road networks.

Further to the above-mentioned contribution of an active usage condition layer, crowd sourcing may be generated by usage condition layer, enabling to contribute to additional safe driving aspects which may refer to robustness of real time mapping of dynamic environment surrounding vehicles. In this respect crowd sourcing may enable autonomous vehicles to contribute to rapid mapping of changes in deployment of fixed object, such as a signpost and parking vehicles, as well as to rapid mapping of dynamic object such as vehicles and passengers.

In this respect, mapping of a signpost, for example by the support of a central mapping system, may take benefit of crowd sourcing due to an ability to use multiple measurements, generated by multiple vehicles, and to fuse such measurements preferably according to relative weights corresponding to ambiguities in the measurements performed by different sensors of different vehicles using for example weighted least squares.

Crowd sourcing may also be applied by encouraging usage of autonomous vehicles for more robust mapping of relative locations of vehicles surrounding the location of an autonomous vehicle, which mapping might be most valuable with autonomous driving of vehicles with respect to dynamic changes in the vicinity of a vehicle. In this respect, under conditions in which vehicle to vehicle data communication is applied, each vehicle may use its sensor related measurements to estimate relative distance of surrounding vehicles in addition to complementary measurements generated by neighbor vehicles, and accordingly to improve its measurements. The approach to improve accuracy may use fusion of multiple source measurements by a single vehicle to determine dynamically relative distance and locations according to relative weights corresponding to ambiguities in the measurements performed by different sources using for example weighted least squares.

Furthermore, a usage condition layer applied with tolling privilege criteria to encourage cooperative safe driving as described above, may also enable to contribute to lower classification levels than said level 4 or 5, by providing privileges to usage of Advanced Driver Assistance Systems (ADAS). Under usage of path-controlled trips expanded with usage of ADAS, efficient and more safe driving may be generated at the same time on the network.

According to some embodiments, conditional tolling functionalities may be applied by a dedicated vehicular toll charging unit, a toll charging center and respective fixed car plate identification infrastructure using Automatic Number Plate Recognition (ANRP), or alternatively for example, by upgrading apparatus and respective processes of an on-board unit of a GNSS tolling system (known also as GNSS toll pricing), as well as respective processes of a GNSS tolling center to apply said robust privacy preservation communication between the vehicular device and the tolling center. With respect to robustness, the upgrade may enable to manage road toll privileges that hide trip details from a toll-charging center.

GNSS tolling which may refer in general to in-vehicle tracking for road tolling is not conceptually limited to vehicle positioning by GNSS. In case of autonomous vehicles, positioning may possibly use in-vehicle sensor(s) based localization on maps, or use vehicle positioning by in-vehicle GNSS receiver which may be used to complement vehicle localization by initial coarse GNSS positioning of an autonomous vehicle.

Traffic mapping layer, may refer to a system, apparatus and methods which map dynamic traffic information, generated by remote data sources in order to support higher level layers applying path control (PCCN control).

According to some embodiments, the traffic mapping layer is associated with non-estimation-based on-line calibration of dynamic traffic simulator that applies controllable traffic predictions as feedback to planning and coordinating paths, wherein all or almost all the on-road traffic is served by PCCN which its usage is incentivized by an effective said usage condition layer.

In this respect, non-estimation based on-line calibration is associated with mapping the distribution of controlled trips on a simulated road map of a controllable dynamic traffic simulator (C-DTS) that applies model based traffic predictions for a model based predictive control applied with PCCN. Under such condition and approach, the current demand for controlled trips is also determined according to recent requests for controlled trips, enabling the need to save a need for high diminution demand estimation, based on e.g. state estimation according to traffic information and supply model of C-DTS, which its reliability is in applicable for city wide application such as PCCN that is acceptance may be applicable under high reliability of on-line calibrated C-DTS. In this respect, under said effective usage condition layer, the updates of the position of controlled trips may further enable link calibration wherein identifications slowdown and speedups may enable to adjust further local capacities on the simulated road network, e.g., identification of local obstacle on a lane may enable to change simulated capacity on a respective link (possibly breaking the simulated link to two or to three links).

According to some less preferred embodiments, wherein the usage condition layer is not sufficiently effective, the traffic mapping layer is associated further with mapping traffic for further support of estimation-based (preferably state estimation based) calibration of dynamic traffic simulator to apply controllable traffic predictions as feedback to planning and coordinating paths. As further referred in the description of the traffic prediction layer the mapping of traffic on links is considered as a pre-process to said further estimation based on-line calibration of a traffic prediction simulator (C-DTS).

The higher-level layers that the traffic mapping layer serves in this respect is the traffic prediction layer applying on-line calibration of C-DTS and further C-DTS traffic predictions which in turn serves the paths planning layer applying planning and assignment of path controlled trips.

According to different embodiments the reception of data and the mapping of traffic information on a simulated road map may be applied by a traffic mapping server, or be shared by the traffic mapping layer with relevant supported system layers and/or a system which is an external system to the path control system.

Under PCCN control, applied with said not sufficiently effective usage condition layer, the traffic mapping on links may further be based on data received mainly from path controlled vehicles comprising:

1. Mapping of dynamic positions of controlled trips according to updates transmitted by vehicles using path controlled trips, preferably periodically under relatively high usage of (obedience to) path controlled trips, wherein in-vehicle generated positions (e.g., by in-vehicle GNSS receiver and in-vehicle map matching) provide the source data for position updates, enabling the control center to further support traffic predictions, by e.g., traffic prediction layer, and in turn to plan paths for path controlled trips by the paths planning layer. The higher the share of known positions of vehicles on the network, the lower is the processing effort required to estimate unknown positions and the higher is the ability to guarantee more robust path planning according to more robust traffic mapping and traffic predictions. Dynamic traffic information related data, received centrally by updated positions, enable to map traffic on link and adjust the position of such vehicles on a simulated road network. Receiving position related data from vehicles should preferably be performed anonymously, wherein the term anonymous may refer to an ability to receive messages from vehicles using path controlled trips while avoiding a need to transmit their non anonymous identification and using instead a unique non identifying characteristic in order to further enable control on trips according to such non identifying characteristic.
2. Mapping dynamic positions of vehicles that use non-flexible routes, by transmitted position updates from in-vehicle positioning apparatus (e.g., using GNSS receiver and map matching) or from a center which tracks such vehicles (e.g., tracked buses). Such received distribution of positions, may preferably updated on a simulated road network map of a C-DTS that further applies traffic prediction accordingly under e.g., traffic prediction layer. Under high usage of path-controlled trips, preferably generated by effective usage condition layer, the non-flexible route related positions may enable to complement flexible (controlled) route related positions that adjust the traffic distribution on a simulated road network. Receiving position related data associated with vehicles using non flexible routes may be performed anonymously, preferably within the communication apparatus between a path control system and vehicles and/or between path control system and said centers that are tracking such vehicles. Vehicles having non-flexible routes may be distinguished by their position related trip schedule that may be used as a non-identifying characteristic of respective vehicles.
3. Mapping dynamic controlled trip destination updates, transmitted e.g., by vehicles with their requests for being controlled (as path controlled trips), enabling the paths planning layer to apply planning and coordination of paths (producing coordinated sets of paths for vehicles using path controlled trips). In addition to the objective to map origin to destination pairs of trip for current traffic mapping such pairs may be used in conjunction with historical position to destination pairs to map and predict zone to zone trip demands in order to apply traffic predictions by a traffic simulation platform to be used with demand model as part of traffic prediction applied e.g., by a traffic prediction layer. In case that prescheduled trips are also applied with a path control system, then prescheduled position to destination pairs of a trip are associated with prediction of zone-to-zone demand. According to some embodiments, demand related mapping may be applied by the traffic prediction layer.
4. Mapping events, which should preferably be used to improve zone to zone demand prediction model for further traffic predictions performed by traffic simulation used with the traffic prediction layer. Such events (e.g., destination time and place of a football game) may be transmitted to a path control system, for example by a server of an entity or an authority handling updates of such events, using server-to-server communication.
5. Mapping structure changes in a road network is transmitted for example using server to server communication in which the server which transmits updates is a server of an entity or an authority handling dynamic mapping of road networks. Such updates should preferably update changes including capacities of links on the road network used by the traffic prediction layer and by a paths planning layer.

6. Mapping changes in capacities on network roads, for example, road maintenance, obstacles such as interfering parking, etc., transmitted for example using server to server communication in which the server which transmits updates is a server of an entity or an authority handling such dynamic data. Changes in capacities may further or alternatively be discovered by mapping dynamic positions of tracked vehicles, using for example dynamic positions to the path control system, as mentioned in 1 and 2. If there are not sufficient vehicles to discover directly traffic irregularities to update capacities, then state estimation methods can be used, subject to sufficient knowledge about the input flow to a link.
7. Mapping changes in traffic control, for example, traffic light plans, sign posts, and variable signals. Such updates are transmitted to a path control system for example by a server of an entity or an authority handling such dynamic information and should preferably be used with the traffic prediction simulation platform associated with a traffic prediction layer.

According to some embodiments, updates about road maps and/or signposts and/or positions of vehicles and/or traffic related information, may be received from an external system such as a system which generates road maps for, and possibly by, autonomous vehicles and/or a system which tracks position of vehicles and/or a driving navigation system service (for example a commercial navigation service such as provided by a company such as Waze), and which driving navigation system and autonomous vehicles are preferably served directly or indirectly by a path control system.

Tracked positions associated with path controlled trips may either be received by a path control system with respect to the traffic mapping layer through a push process activated by vehicles, or if there is expectations for data communication overloads then a pull process can be activated, for example, by the path control system according to IP addresses which were activated by vehicles and identified by the relevant process in the path control system.

Initial position to destination pairs associated with request for a path controlled trips, as well as tracked positions during a trip, may be transmitted by vehicles or by a navigation service system.

Information received from an external system should preferably use server to server communication and may preferably use a push process.

Traffic prediction layer may refer to a system, apparatus and methods comprises two stages, a prime stage aimed at preparing (calibrating) a traffic simulation platform (C-DTS) for traffic prediction according to updates from vehicles and a subsequent traffic prediction stage, in which prediction the demand of trips (usually statistical prediction) provides new predicted entries into the network in addition to the simulated traffic on the network. In this respect past trip related demand is used to predict zone-to-zone demand of trips by, for example, time series analysis related methods and more advanced methods such as further described.

In this respect, model based traffic predictions enable to apply model predictive control which evaluates according to simulation of traffic prediction the effect of planned paths on a road network along a finite time horizon, in a rolling time horizon, and accordingly (according to feedback) corrections to the planned paths are made iteratively preferably before applying assignment of paths to vehicles.

Controllable predictions in this respect synthesize traffic development according to control inputs which in this respect are planned (calculated) paths enabling to evaluate the effect of path-controlled trips performed according to some embodiments by a paths planning layer as further described.

A C-DTS platform may preferably use a core platform of Dynamic Traffic Assignment (DTA) simulator, which models dynamic traffic. Typical DTA simulators are used in the field of transportation mainly for transportation planning, and are the closest means to enable to apply model predictive control for path-controlled trips. However, current DTA simulators are yet limited to cope primarily with typical traffic simulation and not with concrete real time traffic, despite of using on-line calibration to adjust the simulator to simulate the closest traffic to real time traffic according to real time traffic data. This limitation is a result of simplified models used with such simulators, satisfying to cope with typical stochastic behaviors of traffic for transportation planning, and therefore limits the ability to calibrate at very limited time resolution the traffic models for real time according to traffic information (which limited quality of traffic information makes the issue worse). In this respect, the issue increases with the increase in the size of the road network and with the increase in the dynamics of traffic on the network.

In order to overcome such real time related deficiencies is a need to encourage usage of path-controlled trips, for example, by the usage condition layer, which enables to reduce or even to eliminate the high dependency on stochastic behavior related models associated with a DTA simulator. With such approach, under acceptable privacy preservation and appealing incentives, position updates from all (or at least most) of the vehicles enable to adjust the positions and hence the distribution of trips (associated with their known destinations) on the network while saving the need to apply stochastic biased and noisy estimation of the distribution of trip through on-line calibration of the demand model and the route choice model associated with a DTA, which is inapplicable for citywide networks as further elaborated.

A further need in this respect would be to upgrade DTA simulators to be applied with predictive control to include, for example, cooperative safety behavior of autonomous vehicles, reaction to variable traffic signals, Intelligent Transportation Systems (ITS) infrastructure, Cooperative ITS (C-ITS) infrastructure, etc.

Typical DTA simulators are comprised of several models, which are grouped into two main models, namely a Demand Model and a Supply Model, wherein different DTA simulators have different accuracy levels of models, and which said models may include but not limited to functionalities with respect to:

A Demand Model which divides the network into zones among which predicted trip pairs are assigned according to zone to zone demand prediction method(s), wherein predictions are typically applied for different classes of vehicles. More advanced zone to zone demand prediction may include demand control related models, associated with road toll and with prescheduled controlled trips. Real time prediction to demand, under real time path control (by a PCCN control system) can use for example time series analysis. To overcome nonlinear effects in the demand prediction, e.g., due to entries to a controlled network through an external road, time series analysis may be supported by time related historical patterns to substantially linearize time series processed data targeting the differences between historical and current patterns.

A Supply Model which models network traffic flow development according to current and predicted demand and which may include basic sub-models comprising without being limited to road network characteristics, link level traffic model (e.g., lane change behavior, car following behavior), route choice model and traffic control plans (traffic lights and variable signals). Further models may refer to lane related link level model and interactions of vehicles on links as well as interaction in intersections. A more advanced DTA Supply Model, which may expand a traditional Supply Model, should preferably include in the future vehicle to vehicle communication effects considered to be applied with autonomous vehicles. A DTA that would be applicable for PCCN control system would preferably be associated with higher link level models and as further escribed may make the route choice model and estimation-based calibration of a DTA to be redundant. Such modifications to a DTA will refer to Controllable Dynamic Traffic Simulator (C-DTS) wherein the term controllable refers to an interface that enables a dynamic traffic simulator to get externally planned paths (rather than using a route choice model). In this respect, under effective usage condition layer, massive position updates of position of controlled trips, from vehicles, may enable to calibrate the C-DTS at high resolution providing more accurate traffic initial conditions to predict traffic by a C-DTS Supply Models. A future C-DTS would preferably comprise effects of vehicle to vehicle communication effects that would be associated with autonomous vehicles.

Under effective usage condition layer, a C-DTS may contribute to reliable traffic perdition and hence to model predictive control based a path control system (PCCN control system) that controls path controlled trips which actually apply predictive path control to predictively coordinate path controlled trips. The introduced term predictive path control is actually coordinating path control (mentioned above and hereinafter), and both terms, predictive path control and coordinating path control, may be used interchangeably whether autonomous vehicles or other path-controlled vehicles are referred to.

Since a traffic prediction, due to a need to apply iterative PCCN control, the simulation applied by a C-DTS should perform at a rate which is higher than real time, which, under citywide PCCN operation would require parallel computation (network decomposition) with the Supply Model as well as applying parallel computation with path planning agents, wherein each (software) agent may simulate one or more vehicles according to available computation power for acceptable traffic prediction performance.

Adjusting a dynamic traffic simulation platform to imitate in real time traffic by said prime stage (on-line calibration stage), without tracking positions of the vast majority or even most of the vehicles, is a complicated task for a city size road network as mentioned before and is further elaborated and which issue increases with the increase in the size of the city.

In this respect, under non effective usage condition layer an estimation based approach is required to calibrate a dynamic traffic simulator, wherein joint/dual estimation of demand and model parameters would be required by the prime stage (on line calibration under real time constraints). The issue with such approach is a need to cope with a high dimension problem under nonlinear stochastic and time varying Supply Model which is not applicable for citywide application even though very high-performance computing would be considered (suffers from high noise floor, bias and slow convergence rate).

However, according to described embodiments, under effective usage condition layer, high usage of path controlled trips may save the need for estimation based on-line calibration of a dynamic traffic simulator while using high quality position related data updates from vehicles enabling to apply dynamic mapping of the distribution of trips (tracked positions with respect to their destinations) as well as making the stochastic route choice redundant. Under such conditions, adjusting the traffic simulation platform by a said prime stage to simulate substantial real time traffic according to substantial real time demand is an issue that can be resolved by sufficient available communication and acceptable computation resources.

According to some embodiments, traffic and demand related data are mapped by the traffic mapping layer, as described above, and traffic prediction layer servers receive such data from the traffic mapping layer servers, either by server to server communication or through a common storage handled possibly by a common database server.

According to some other embodiments, the traffic prediction layer applies the demand related data mapping (position to destination pairs and respective zone to zone demand assignment) which may include receiving demand related data, originated by requests from vehicles to be served by path controlled trips, directly through communication means or indirectly through the traffic mapping layer which interacts with the vehicles.

In case of high usage of path-controlled trips, generated for example by effective usage condition layer, conditions to generate authentic (rather than estimated) current demand is enabled, using in vehicle data related to path controlled trips.

Demand along a past period of time, enabling to predict zone to zone demand, may be mapped according to positions and destination pairs originated with requests for path controlled trips and complemented by estimation of trips demand, while estimation of current non controlled trips related demand is applied by the prime stage, which under usage condition layer and path control becomes at worst case marginal and at the best case redundant and, in any case, robustness of the demand can be achieved at a level which is incomparably higher than the estimation approach which might be required under non effective usage condition layer.

Under effective usage condition layer, positions of vehicles using path controlled trips on the network are updated at a path control center which, as mentioned above, which drastically simplify the prime stage (on-line calibration of the simulation platform by said calibration and estimation stage). This is a result of an ability to substantially map dynamic distribution of real time positions (associated with known planned paths of the vehicles) in a dynamic traffic simulator (supply model and demand model). As mentioned with the traffic mapping layer description, with such approach there would still be a need to either calibrate link related capacities on the network by mapping on road obstacles according to dynamic position updates which may reflect slowdowns and speedups of vehicles in relation to local obstacles on roads.

Preferably position as well as respective destination related data are gathered by anonymous transmission of data from vehicles to a path control system in order to maintain privacy of the source of data in conjunction with anonymous assignment of path-controlled trips to vehicles.

Interaction of the traffic prediction layer server(s) with the traffic mapping layer server(s) and with the paths planning layer servers may be applied by server to server communication or through a common storage (database server(s) of for example client/server N-tier architecture).

According to some embodiments, such approach may enable the traffic layer to interact with external server(s) in substantially real time in order to receive traffic control related updates to be applied with a DTA supply model, for example, traffic lights control plan and changes in the deployment of traffic lights, signposts, and variable signals/signposts, and which such server may, for example, be updated by, or on behalf of, authorities.

According to some embodiments, an update about exceptional event (e.g., a football game), which may be added to traffic control related updates, may enable further to improve demand predictions, for example with the support of similar event related historical flow pattern(s), and be handled through a server through which the traffic prediction layer may receive such data.

Paths planning layer may refer to a system, apparatus and methods which apply planning of paths to produce path-controlled trips.

As mentioned above, path control may refer to coordinating and non coordinating path control, wherein non specified path controlled trips refers to coordinating path controlled trips if not specified otherwise, and wherein the coordination approach (planning od paths that proactively respond to C-DTS while applying coordination control) is a-priori the preferred approach to be applied.

Predictive path control which applies non coordinating path control (reactively respond to traffic C-DTS predictions) may be applicable for a very short prediction horizon and might have be considered for very small percentage of path controlled trips, however, applying small percentage of path controlled trips is inapplicable for real time citywide PCCN due to said inapplicability of on-line calibration associated with C-DTS.

The planning of paths for non-coordinating path control refers to planning of paths according to feedbacks from controlled traffic predictions which indicate on the potential effects of planned paths and accordingly planned paths may be corrected with the aim to improve travel times. The planning of paths is a simple reaction to time dependent travel time costs according to simulated feedback, performing travel time related shortest path. Implementation of non-coordinating path-controlled trips, as mentioned above, is applicably limited to a very short controlled horizon under traffic irregularities and to evaluate potential predictive freedom degrees on a network (under off-line C-DTS based reactive model predictive control.

Predictive path control which applies coordinating path control (applying proactive reaction to C-DTS predictions) which is aimed at putting no upper limit on the percentage of usage of path controlled trips on the network is inapplicable for less than very high percentage of usage of path controlled trips on the network. With such approach planning coordinating control paths for path controlled trips is applied under interaction between the paths planning layer and the traffic prediction layer, constructing planning and prediction phases wherein the planning phase comprises a control post process (per iteration) sub-phase and the prediction phase comprises a pre-process sub-phase of C-DTS on-line calibration (possibly per a plurality of iterations if the position updates are slower than an iteration).

In this respect, the planning and the control phase and the prediction phase construct control cycle (iteration). In this respect, traffic prediction phase, applied by the traffic prediction layer, and planning controlled paths phase, applied by the paths planning layer, construct a control cycle (iteration) in which traffic prediction uses a prior set of paths controlled by a prior control cycle as an input to the supply and demand models of a C-DTS platform which to evaluate the effect of the recently controlled planning of paths according to feedback and accordingly refine the controlled planning of paths.

Refinements are expected to be required with a nonlinear system in which the effect of calculation of a set of paths by a control cycle can't fully be anticipated due to path calculations which will be effected by a nonlinear system prediction (and controlled parallel changes to paths as further described). Therefore, according to some embodiments there would be a need to evaluate planning effect according to a controlled prediction and accordingly consider using further iterations to refine planned paths, to reduce traffic imbalances on the road network.

With such approach, high usage of coordinating path-controlled trips may enable to exploit the capacity of a network for given demand with the aim to apply the highest possible traffic flow under given demand for trips. As further elaborated the flow may be maximized under optimization of zone to zone demand to which the path control (PCCN control) becomes adaptive.

The benefit from high usage of path controlled trips under coordinating path control is expected to be high, since the traffic may become fully controllable and the simulated predictions may potentially be robust due to high knowledge about the initial conditions (calibration) to run traffic predictions by a C-DTS platform and further substantial full knowledge about used paths.

With such traffic coordination approach, there is a need to consider that a set of controlled paths should be planned on a fair basis, that is, to take into consideration that paths which may sacrifice time of a trip or part of a trip, for the benefit of improving average trip times on the network, may not be acceptable. That is, coordination of paths should preferably consider that from a point of view of drivers (and/or passengers) the a-priori interest should be not sacrificing their own interest for the interest of others while improving the performance of path control on the network—which leads to a need for predictively controlled traffic load balancing approach.

Traffic load balancing, applying predictive coordination of paths, should be sensitive further to fairness to privacy preservation of trips which invites a need for anonymous PCCN operation in order to further assure wide acceptance.

To summarize the above, the paths planning layer is the top layer of a path control system which preferably planes coordinated sets of paths in predicted horizon aimed at maintaining substantial fair coordination of paths under nonlinear time varying conditions, with a preferred objective to maximize traffic flow on a citywide road network.

According to some embodiments, said layers of a path control system (PCCN control system) are applied as applications servers of for example a modified client/server N-tier architecture to support real time related requirements associated with traffic control.

Commonly used communication apparatus and methods may serve interaction of layers with external servers and/or vehicles. For example, the usage condition layer may interact with vehicles and with car identification system (using for example Automatic Number Plate Recognition—ANRP) through web servers.

According to some embodiments, under real time constraints, layers of a path control system which may be applied, for example, as applications in a model such as an improved client/server N-tier architecture, to support real time requirements or another architecture, are not restricted to use traditional protocols of such architecture. In this respect, an improved client/server N-tier architecture should preferably apply efficient methods to handle under real time communication constraints, such as, for example, WebSocket or http/2 supported by WebSocket or at least by SSE, or UDP preferably supported by WebSocket or at least by SSE, or, according to tight real time constraints, using other methods enabling to make real time constrained communication more effective. Security aspects may further include known methods which for example upgrade of http/2 by TLS.

Communication mediums between vehicles and the traffic mapping layer may include but not be limited to, for example, cellular mobile communication networks.

According to some embodiments, the communication apparatus could serve any single layer of a path control system separately, that is, supporting directly either all the layers used by a path control system or part of them.

In this respect a paths planning layer for example may receive position to destination pairs, setup by drivers through a driving navigation aid, enabling accordingly planning paths for path-controlled trips and further transmit such paths to respective vehicles which are using path controlled trips. Similarly, the usage condition layer may interact with vehicles enabling to handle toll charging and privileged tolling.

With such architecture, or with another possible architecture, there is also a flexibility to expand the interaction of path control system layers with external systems and servers which may provide supporting data to the path control system.

According to some embodiments, an example that may present the described approach, whether by applying the above-described layers or just by applying said functionalities by another architecture and/or applying further functionalities described with further embodiments, may comprise:

1. A method and a system according to which conditions to improve traffic flow on a road network are encouraged by incentivizing directly or indirectly usage of vehicles having in-vehicle driving navigation aids which interact with drivers, or with driving control means of autonomous-vehicles, to guide trips of vehicles according to path-controlled trips. Such a method and system comprise:
   a) receiving by an in-vehicle driving navigation aid data for dynamic path assignments,
   b) tracking by in-vehicle apparatus the actual path of the trip,
   c) comparing by in-vehicle apparatus the tracked path with the path complying with the dynamic path assignments along a trip,
   d) determining by in-vehicle apparatus the privilege, entitling usage of the assigned path, according to predetermined criteria for the level of the match determined by the comparison,
   e) transmitting by in-vehicle apparatus privilege related transaction data which do not expose trip details,
   f) handling by a toll charging center privilege related transaction according to predetermined procedure
      wherein said privilege is possibly free of charge road toll and/or,
      wherein said privilege includes possibly discount in charged road toll,
      wherein an entitlement for privilege include a criterion according to which travel on certain predetermined links requires that a trip will be stopped for a minimum predetermined time.
2. A method and system according to which improved safe driving on a road network is encouraged by incentivizing usage of in-vehicle safety aids. Such method and system comprise:
   a) tracking by in-vehicle apparatus the actual use of a said safety aid along the trip,
      wherein safety aids are possibly cooperative safe driving aids enabling to improve a single in-vehicle measurement of a safety driving aid by in-vehicle fusion of the in-vehicle measurement with one or more respective external measurements performed by other one or more other vehicles and received by a vehicle fusion apparatus through vehicle to vehicle communication
   d) determining by in-vehicle apparatus privilege related data for usage of said safety aid according to predetermined criteria entitling privilege for the level usage,
      wherein said privilege possibly applies free of charge road toll and/or
      wherein said privilege possibly include discount in charged road toll and/or
      wherein privilege provision refers to usage of both safety driving aids and path controlled trips
   c) transmitting by in-vehicle apparatus privilege related transaction data which do not expose trip details.

At this point, before further description provides more details about further embodiments, it would be recommended to review by the reader the described drawings of the present invention.

The figures, described hereinafter, refer to apparatus methods and functionalities which cover some aspects of described embodiments and which intend to provide a skeleton that puts in context functionalities and interrelation among functionalities at a level which facilitates the understanding of textual description. Textual description may cover more functionalities and more aspects than the figures describe. In this respect the figures may not limit textual described functionalities.

In order to provide a consistent skeleton which simplifies interrelated connection among functionalities described in different figures, in some of the figures the same numbers were used for the same items.

FIG. 1*a* up to 1*e* schematically illustrate examples of possible implementation alternatives for system configurations and functionalities according to possible alternative embodiments. The figures provide a simplified description, in comparison to textual description of embodiments, with an objective that the textual description of the figures may be complemented by respective embodiments described in more details in the present invention.

Path control system related figures are illustrated at a level that leaves implementation-flexibility to combine the functionalities comprising the system according to implementation constraints. For example, coordination control processes which may coordinate tasks of the system are not part of the illustrated figures. In this respect, path control processes may coordinate tasks performed by different system layers and within system layers. This may for example include but not be limited to synchronization processes which inter-alia: a) coordinate distributed computation performed by path controlled trips associated agents, b) coordinate paths for path controlled trips according to traffic predictions with path planning performed by agents, c) coordinate traffic mapping with on-line calibration of a traffic simulation platform, d) coordinate input and output processes required with a need to enable control on path-controlled trips.

FIG. 1*a* schematically illustrates according to some embodiments a system and apparatus to apply path control system 232 which describes top level data flow among described functionalities such as path control layers and vehicular controlled platform 229. Rectangle 232*a* may refer to for example centralized implementation of path control system layers 211, 217, 221 and 224 using common communication servers.

The usage condition layer 224 communicates with toll charging units of vehicles comprising the vehicular controlled platform 229 through 225 and 239*b*, and with car plate identification system 226 (using Automatic Number Plate Recognition—ANRP) through 225.

According to the described embodiment each vehicle has a common transmitter for its DNA and toll charging unit. For example, vehicle 1 transmits accordingly data to the path control system layers through 230*a*1.

The traffic mapping layer 221 according to the described embodiments receives and maps all the dynamic data transmitted from driving navigation aids, and transmits the mapped data to the traffic prediction layer 217 and to the path planning layer 211.

The traffic prediction layer 217 feeds through 213 traffic prediction travel time costs on the road network links to the paths planning layer 211.

The paths planning layer calculates accordingly sets of coordinated paths which are fed back to the traffic prediction layer through 210*a* to apply further controlled traffic predictions, and which set of coordinated paths are transmitted as well to vehicles through 210*b* to update path-controlled trips in driving navigation aids.

Inputs of dynamic information related data from external systems may be fed to the path control system through logical links 216, 220 and 223, and which data may refer to data from external systems and servers described above, including but not limited to, for example; a) road network map updates through 223, b) exceptional demand related events updates and traffic flow related updates through 220, and c) traffic control related updates through 216.

Figure 1B:
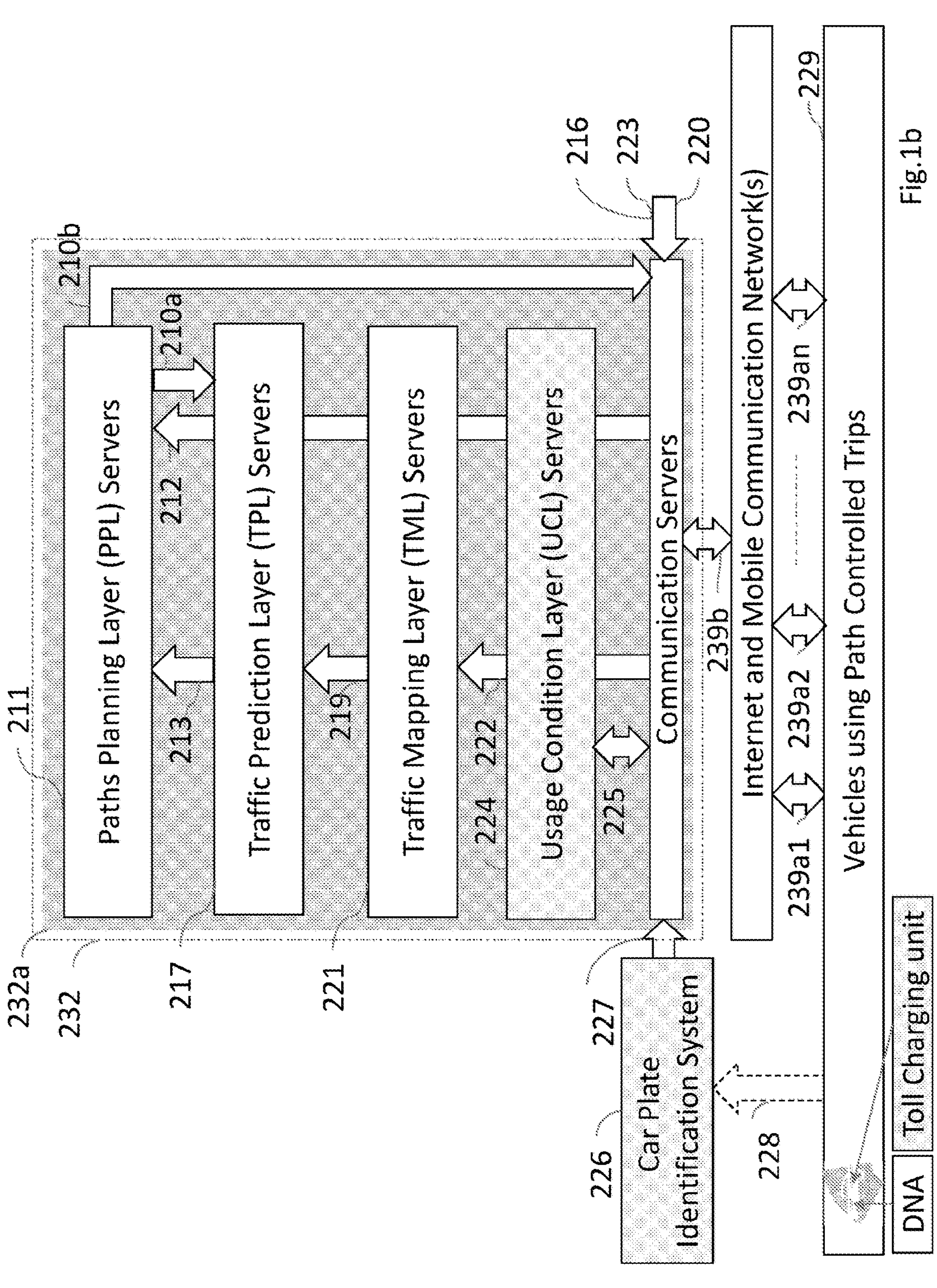
FIG. 1*b* schematically illustrates top level system data flow to apply predictive traffic load balancing control according to some embodiments, wherein FIG. 1*b* differs from FIG. 1*a*, for example, at least by enabling vehicles to communicate directly with the path planning layer.

FIG. 1*b* schematically illustrates according to some embodiments a system and apparatus to apply path control system 232 which describes top level data flow among described functionalities such as path control layers and vehicular controlled platform 229, wherein FIG. 1*b* differs from FIG. 1*a* by enabling vehicles to communicate directly with the path planning layer, for example, for requesting path controlled trips, and updating time related positions of path controlled trips.

Figure 1C:
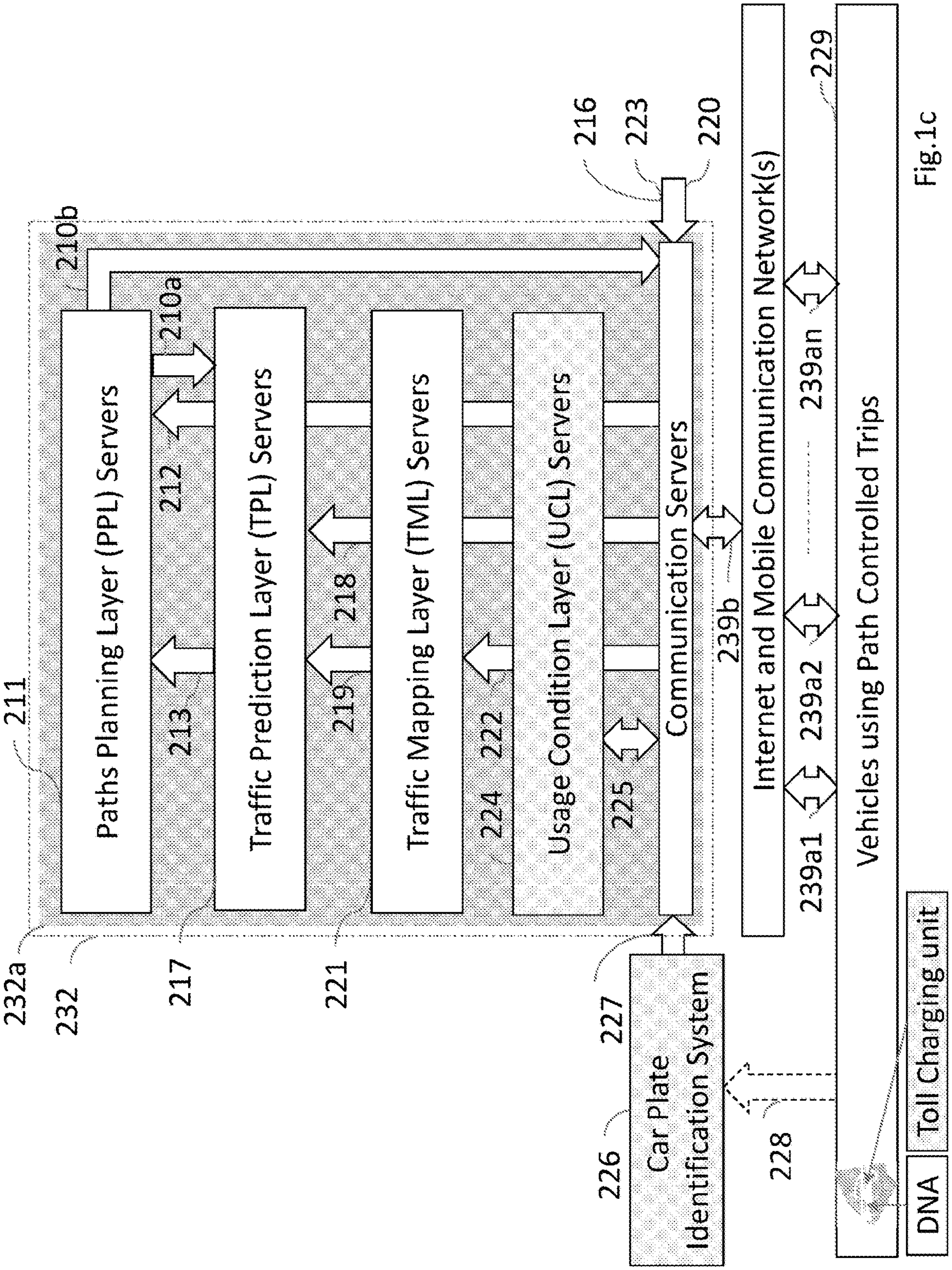
FIG. 1*c* schematically illustrates top level system data flow to apply predictive traffic load balancing control according to some embodiments.

FIG. 1*c* schematically illustrates according to some embodiments a system and apparatus to apply path control system 232 which describes top level data flow among described functionalities such as path control layers and vehicular controlled platform 229, wherein FIG. 1*c* differs from FIG. 1*b* by enabling vehicles to communicate directly with the traffic prediction layer, for example, in order to inform about time related positions of path controlled trips by a respective update.

Figure 1D:
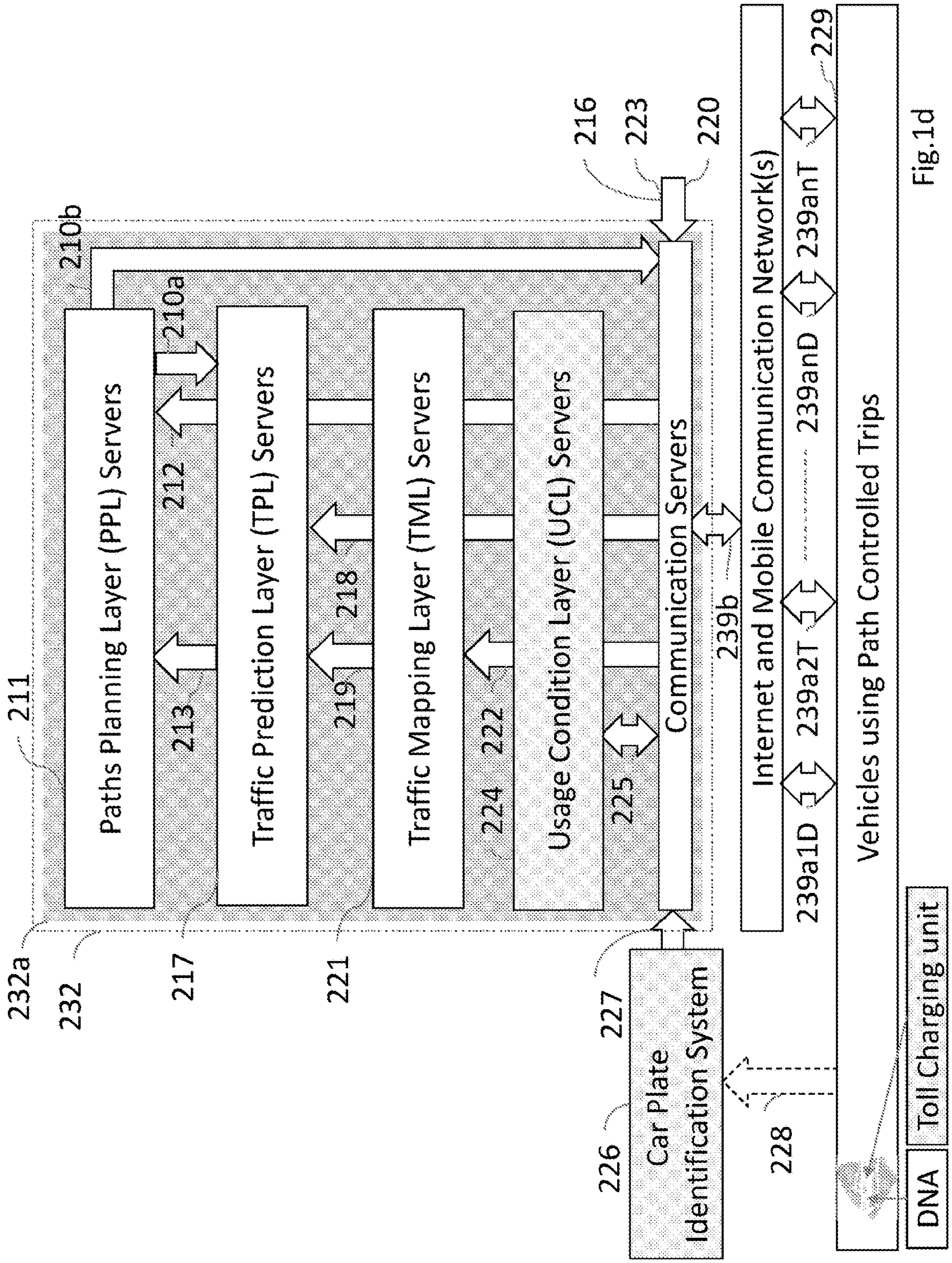
FIG. 1*d* schematically illustrates top level system data flow to apply predictive traffic load balancing control according to some embodiments, wherein FIG. 1*d* differs from FIG. 1*c*, for example, at least by enabling vehicles to communicate separately with the usage condition layer, using a dedicated transmitter for such purpose, for example, a toll charging unit radio transmitter.

FIG. 1*d* schematically illustrates according to some embodiments a system and apparatus to apply path control system 232 which describes top level data flow among described functionalities such as path control layers and vehicular controlled platform 229, wherein FIG. 1*d* differs from FIG. 1*c* by enabling vehicles to communicate separately with the usage condition layer, using a dedicated transmitter for such purpose, for example, a toll charging unit radio transmitter.

The advantage of such transmission is the ability to guarantee isolated and ongoing communication, even when a common radio communication in the vehicle is not active, to respectively block faked interventions and to enable ongoing monitoring of installed toll changing unit in the vehicle. In this respect vehicle 1 for example transmits through 239*a*1T data from the toll charging unit to the usage condition layer and through 239*a*1D data from the DNA to other layers of the path control system.

Figure 1E:
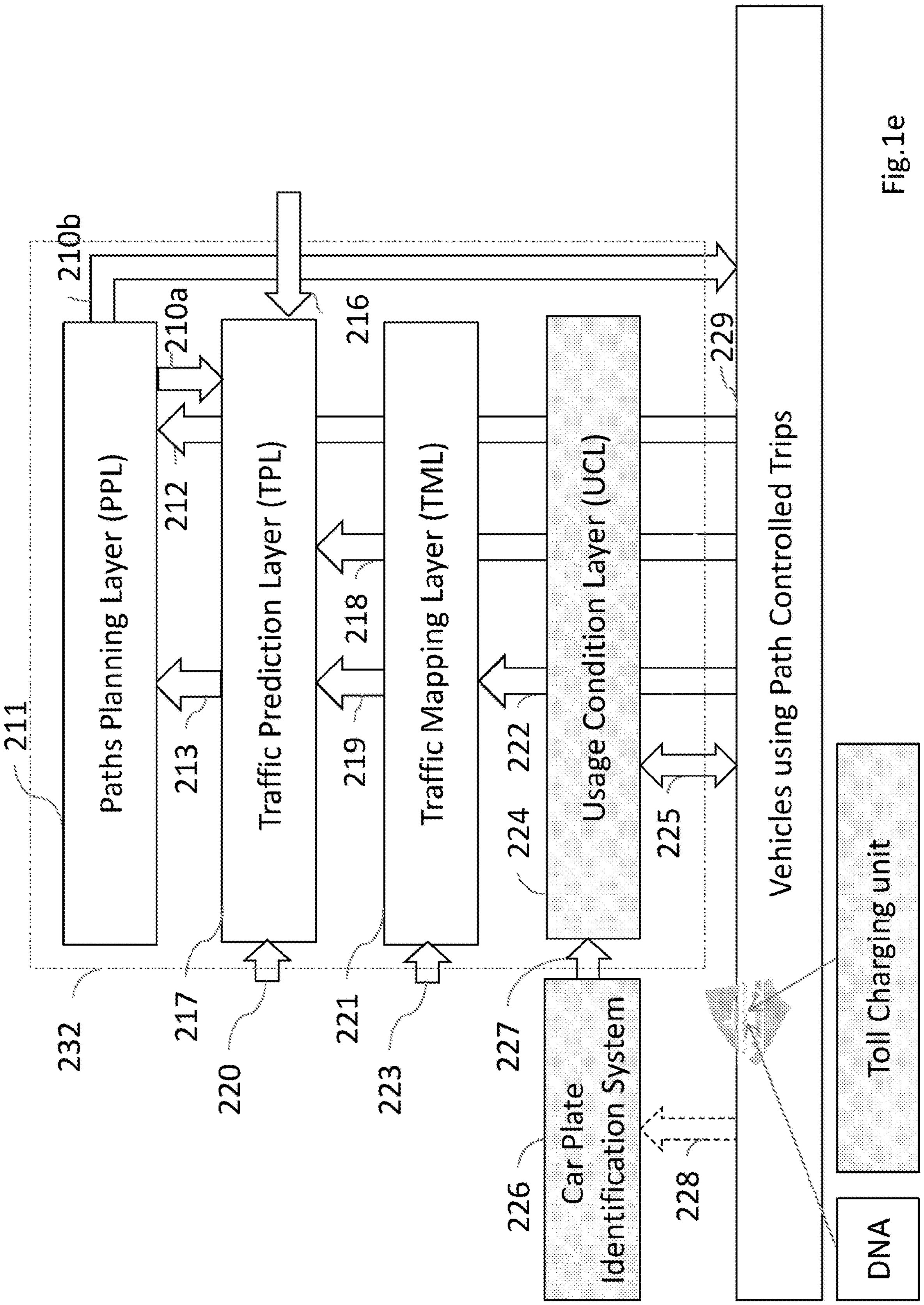
FIG. 1*e* schematically illustrates top level system data flow to apply predictive traffic load balancing control according to some embodiments, wherein FIG. 1*e* differs from FIG. 1*d* and/or FIG. 1*c*, for example, at least by ignoring the communication apparatus.

FIG. 1*e* differs from FIG. 1*d* and FIG. 1*c*, by ignoring the communication apparatus, enabling to concentrate on data flows in order to facilitate the description of further expansions using FIG. 1*e* as a reference.

Figure 1F:
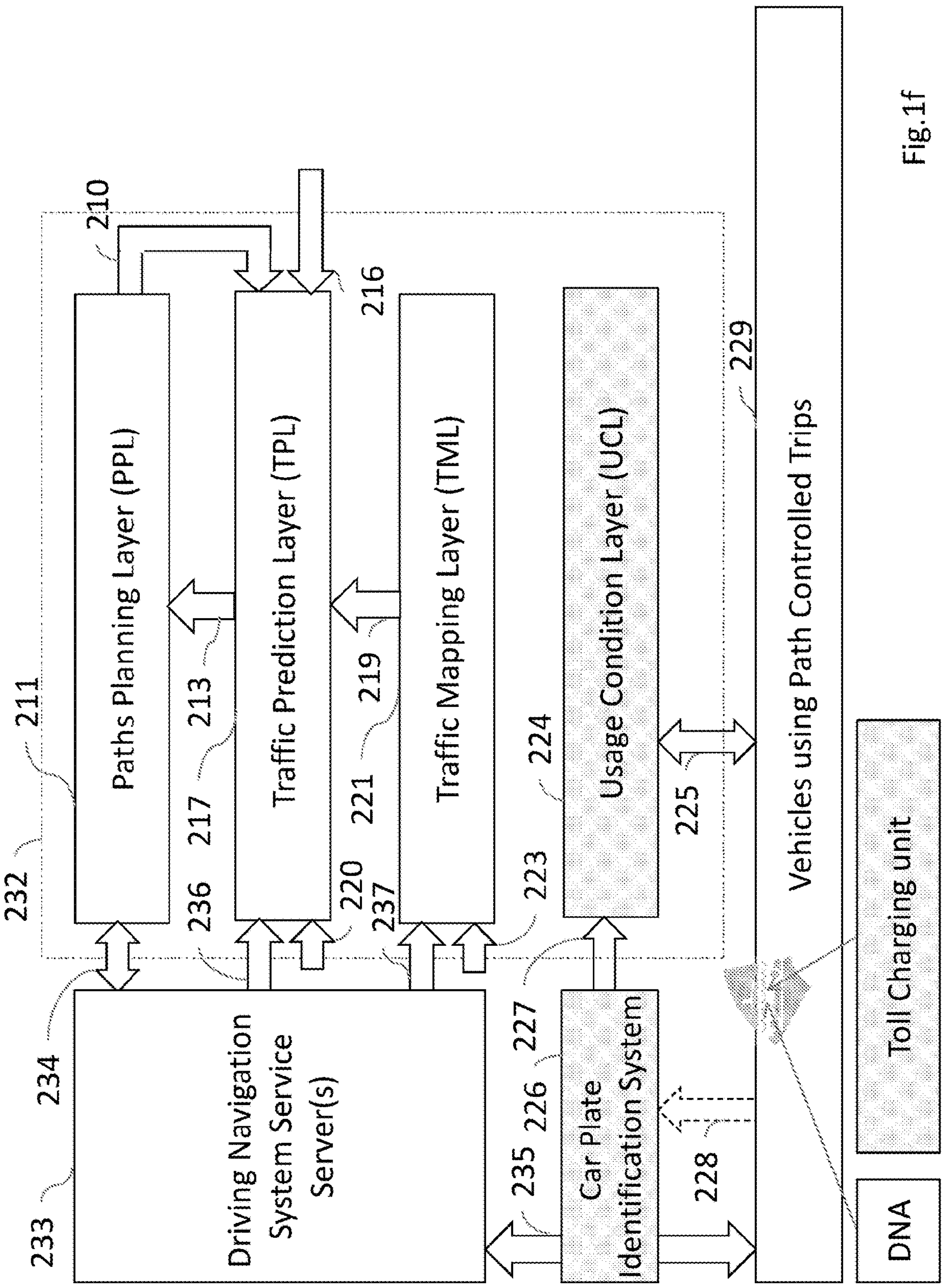
FIG. 1*f* expands according to some embodiments the system described by FIG. 1*e* with driving navigation aid which is served by a predictive traffic load balancing control system.

FIG. 1*f* expands according to some embodiments the system described by FIG. 1*e* with driving navigation aid which is served by a path control system. With such embodiments, requests for path-controlled trips are handled by the driving navigation system which communicates on one hand with driving navigation aids through 235 and with the path planning layer through 234 for updating vehicles with path controlled trips.

According to such embodiments further data which vehicles may originate to support path control, such as time related positions of path-controlled trips, may be received by the path control layers through 234, 236 and 237 through the driving navigation aid.

According to such embodiments, direct communication of vehicles with the traffic mapping layer, with the traffic prediction layer and with the paths planning layer might become redundant.

Figure 1G:
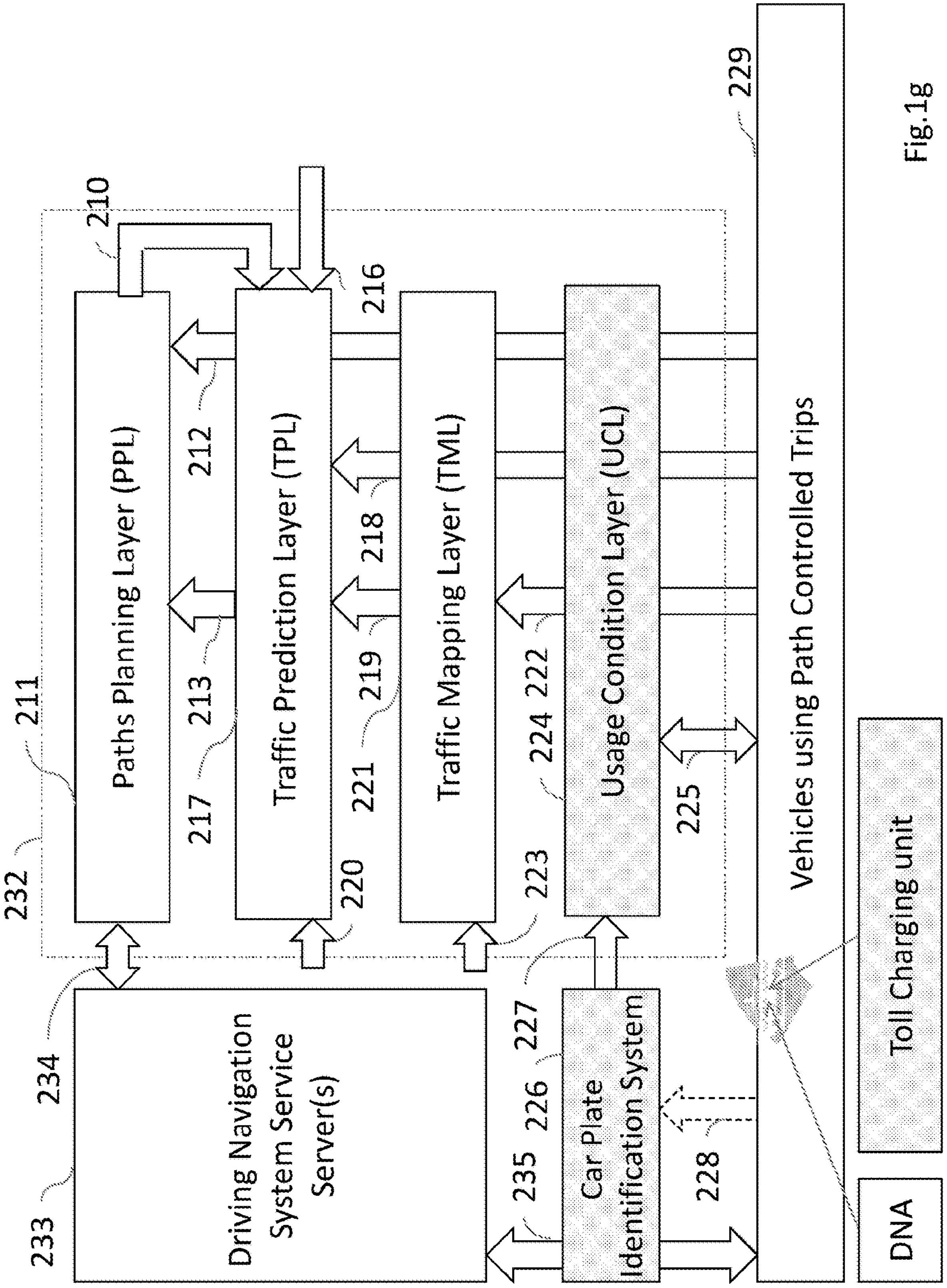
FIG. 1*g* schematically illustrates top level system data flow to apply predictive traffic load balancing control according to some embodiments, wherein FIG. 1*g* differs from FIG. 1*f*, for example, at least by enabling direct updates of time related positions associated with controlled trips (path controlled trips) to be transmitted from vehicles to one or more layers and which said updates serve according to some embodiments the need for such data to be used by the traffic prediction layer and by the paths planning layer for their ongoing operation.

FIG. 1*g* differs from FIG. 1*f* by enabling direct updates of time related positions associated with path controlled trips to be transmitted from vehicles to one or more layers of 232 and which said updates serve the need for such data to be used by the traffic prediction layer and by the paths planning layer for their ongoing operation, as described above.

According to such embodiments said updates enable further to confirm, for example, by 211 the usage of path-controlled trips according to path-controlled trips planned by 211 and transmitted to the DNA through 233. Confirmation according to such embodiments may be obtained by preventing vulnerability to undiscovered intervention of a driving navigation system 233 in the path control and/or in the updates. This can be performed according to some embodiments with minimal involvement of 233 by performing the updates by the toll charging unit which anyhow should receive the path associated with the assigned path-controlled trip to the vehicle in which the toll charging unit is installed in order to handle privileged tolling. Associating a position related update with the path of the controlled trip, enables to compare the transmitted path with path-controlled trip generated by 211 to validate matches and validate for example by 211 usage of path controlled trips according to assigned paths.

According to some embodiments, an alternative to said transmission and comparison of paths is to associate trip Identification (ID) number with each assigned path for path controlled trip, for example by 211, and further transmit the path associated with the trip ID to 233 through 234 in order to assign the path to a respective DNA through 235. The DNA uses the trip ID number with its updated paths of path controlled trips transmitted to the toll charging unit.

Anonymity of position related updates by a toll charging unit, associated either with path-controlled trip or with trip ID, can be maintained by transmitting non vehicle identification updates to the path control system 232. With such approach there is an ability to confirm usage of path-controlled trips assigned by 211, as a byproduct of the updates to the layers of 232. A confirmation process can be performed, for example by an extension to 232, preferably to 211 in 232. To assure anonymous transmission of said updates, although updates include no details to identify vehicles, there is still a need to assure that no claim can be raised about privacy preservation due to usage of the toll charging unit for tolling which requires vehicle identification.

Privacy preservation is a sensitive issue with respect to a claim about an ability by an entity or an authority to access to both vehicle identifying messages such as tolling related messages and anonymous type of messages such as position related updates which are transmitted from a common unit through for example mobile internet. In this respect, even though the different types of messages are transmitted to different layers, a common IP address may enable to associate vehicle ID with an anonymous transmission update. That is, association of vehicle ID with anonymous messages may further enable to associate details about path-controlled trips with the respective vehicle ID.

In order to avoid such claims while using the toll charging unit to transmit both types of messages, there would preferably be a need to use different IP addresses with vehicle identifying messages and with anonymous messages. The cheapest approach to apply different IP addresses is by establishing different Internet sessions for anonymous and for non anonymous messages, enabling for example to allocate by a service provider different IP addresses to different sessions. A less robust approach to apply anonymous updates to layers of 232 is by enabling the DNA to transmit directly said anonymous updates associated preferably with said trip IDs. With this approach, preferably under secured communication, the toll charging unit may not mandatorily be equipped with its own mobile internet communication apparatus, enabling tolling to be applied by a toll charging unit through other communication means. Such means may be used by a toll charging unit directly, for example, by using WiFi communication or provide indirect communication through a Smartphone or through a common in-vehicle mobile communication means which can use for example Bluetooth communication, preferably under secured communication which may prevent intervention of a third party in the communication of a toll charging unit with the usage condition layer.

A possibility to fake communication by a non-authorized toll charging unit may be avoided by two means. The first possibility refers to the assumption that the chain from production to installation of a vehicular toll charging unit is applied under license and under supervision, and therefore there is no reason that claims about privacy preserving faking product would arise.

The second more stronger additional possibility refers to an ability to validate authentic installation of a toll charging unit to confirm authentic communication by authorized installed toll charging unit. This may be enabled when the toll charging unit transmits a non anonymous position related message associated with vehicle registration number to the usage condition layer, for example, during a privileged tolling procedure. In this respect, a received message by the usage condition layer from a toll charging unit may initiate by the usage condition layer a search process for a match between the transmitted vehicle registration number from a toll charging unit and stored data associated with the vehicle registration number which was received from the car plate identification system (using Automatic Number Plate Recognition—ANRP) by the usage condition layer. According to a match the usage condition layer may further confirm through additional data associated with toll charging messages, such as time related position recorded by the toll charging unit when the vehicle was in the vicinity of a camera (used with Automatic Number Plate Recognition—ANRP) of a car plate identification system, that a vehicle plate identification received from the car plate identification system by the usage condition layer substantially matches the same time related position for the same registration number.

Locations of cameras may for example be updated in the toll charging unit through a process in which the toll charging unit receives such updated location, for example, from the usage condition layer.

According to some embodiments, a further approach enabling to validate authentic installation of a toll charging unit may use a communication signature recording process which the toll charging unit and the usage condition layer activate according to determined criteria as a result of a communication session. Such a recording process records characteristic(s) related to non anonymous communication between the toll charging unit and the usage condition layer which may further be compared to verify matches. Characteristics may include, for example, time of a communication session, type of communication session, and other data related to the communication sessions. Access to stored signatures of a toll charging unit, preferably stored in a non volatile memory, may be part of a regulatory process executed, for example, by entities authorized to make annual regulatory test for vehicles which provides a vehicle with regulatory approval car certificate. Under such test the entity may read by authorized equipment secured stored data from the toll charging unit including but not limited to said signatures. The signatures may further be compared with respective signatures stored by the usage condition layer for the same vehicle (e.g., according to the same registration number). Confirmation of a match according to a comparison may validate usage of authentic communication performed by toll charging unit installed in the vehicle.

Such apparatus and methods to validate authentic installation of a toll charging unit are not unique to the system illustrated in FIG. 1*g* and may be applied with relevant illustrated systems in other figures.

Figure 1H:
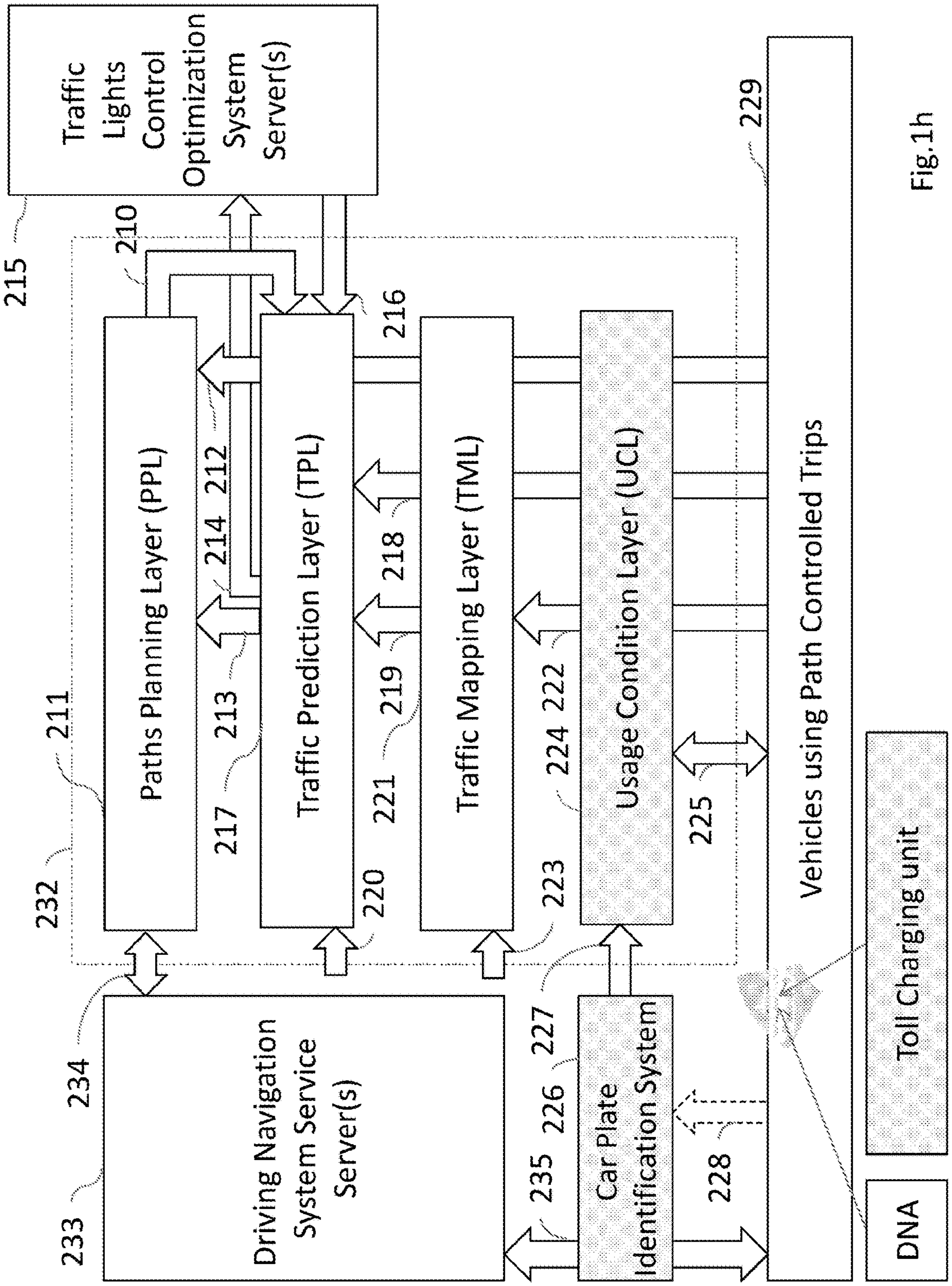
FIG. 1*h* schematically illustrates top level system data flow to apply predictive traffic load balancing control according to some embodiments, wherein FIG. 1*h* differs from FIG. 1*g*, for example, at least by enabling to feed traffic predictions from a path control system to a traffic light control optimization system enabling to improve according to some embodiments traffic lights control in forward time intervals covered by the predicted flows.

FIG. 1*h* differs from FIG. 1*g* by enabling to feed traffic predictions from a path control system to a traffic light control optimization system 215 through 214 enabling to improve traffic lights control in forward time intervals covered by the predicted flows. This further enables to get feedback from 215 through 216 for adapted traffic light plans according to the traffic predictions from 217 and improve accordingly the path control.

FIG. 1*i*1 schematically illustrates vehicular apparatus and methods to apply according to some embodiments interaction of a vehicle with a path control system. In this respect separate transmitters for a toll charging unit and for a DNA is suggested to be applied and which such approach may refer to the vehicular apparatus complying with FIG. 1*d* up to FIG. 1*h*.

The vehicular apparatus may serve three modes of operation: idle tracked mode, trip tracked mode, and tolling mode.

In the idle tracked mode continuous authentic installation of a toll charging unit in the vehicle is verified by, for example, sampling the toll charging unit by the usage condition layer through 239*a*1T to assure continuous authentic installation using vehicle authentication records which are stored under authorized installation of a toll charging unit and continuous time records applied with a toll charging unit at all modes of operations (including idle mode). This mode can be applied by an extension to the PPT processing which is further described.

Trip tracked mode operation should be activated while a car is traveling, using for example indication from a GNSS receiver installed in the in-vehicle toll charging unit. During a trip, the toll charging unit activates a Privilege Certification Control processes (PCC), which processes may include but not limited to, for example, tracking obedience to path controlled trip through 246 and certification of the level of obedience with respect to a level of entitlement to privileged road toll according to criteria stored preferably in the toll charging unit, and/or monitoring active contribution to usage of ADAS through for example 246, and/or monitoring active contribution to cooperative safety driving of autonomous vehicles by for example cooperative localization estimation, possibly through 246. Accordingly, the PCC may certify such conditions with respect to entitlement to privileged road toll.

Tolling mode may be activated by the toll charging unit according to arrival to destination of a path controlled trip or be activated by a toll charging layer based on stored tolling related data on the toll charging unit. During the tolling mode, trip details related Privacy Preservation Tolling (PPT) processes are activated by the toll charging unit, enabling hidden trip related tolling management, including for example privileges of free of charge toll and/or toll discount to be applied according to certification from PCC processes.

Criteria entitling for privileges may refer but not limited to usage of, for example, path-controlled trip and/or elements such as ADAS, and/or using autonomous vehicle enabling to contribute to cooperative safe driving. In case of autonomous vehicles, usage of automatic driving mode by the vehicle may enable to receive indication by the toll charging unit through for example 246, enabling the PCC processes to entitle the vehicle with privilege of, for example, free of charge toll or toll discount.

In case of ADAS usage, for example by any type of vehicle, such privilege may be activated through said indication received by the toll charging unit about usage of certified ADAS or by an integrated device which includes at least a toll charging unit and a certified ADAS. The trip tracked mode may be expanded to include, in addition to said tasks, confirmation of path controlled trip usage and/or other privilege entitling conditions during a trip, and which process may be initiated by a car plate identification system (using Automatic Number Plate Recognition—ANRP) as a result of inspection to enforce toll charge on non privileged entitled trips including usage of path controlled trips and/or other toll privileging conditions.

Conditions entitling vehicle trips with privileges other than usage of path controlled trips should preferably be tracked as well during the trip in order to enable to entitlement for full privileges. Enforcement of tolling on non privileged trips may include identification of a car plate which triggers a confirmation process to confirm usage of path-controlled trip by the identified vehicle, for example, by transmitting a message to the usage condition layer to verify and validate entitlement to privileges for the identified vehicle. In turn the usage condition layer transmits a message to the respective toll charging unit to validate entitlement for privilege with respect to the time of the identification. The transmission by the usage condition layer should preferably be performed under conditions in which an IP address is activated by the toll charging unit which differs from an IP address used with anonymous communication, which may serve path controlled trip related position transmission updates, in order to not identify the anonymous source while enabling vehicle identification such as registration number under privacy preservation of trip details. The toll charging unit may accordingly validate trip conditions entitling privileges, such as usage of path-controlled trip through the trip tracked mode related processes, and respond with a respective confirming message or a non-confirming message to the usage condition layer.

According to some embodiments, direct interaction between the car plate identification system and the toll charging unit may save intervention of the usage condition layer under conditions of confirmed usage of path-controlled trip by the vehicle.

Communication between a toll charging unit and the usage condition layer may preferably include secure communication between the toll charging unit and the usage condition layer in order to prevent intervention in the communication chain by a non-authorized process.

Figure 2:
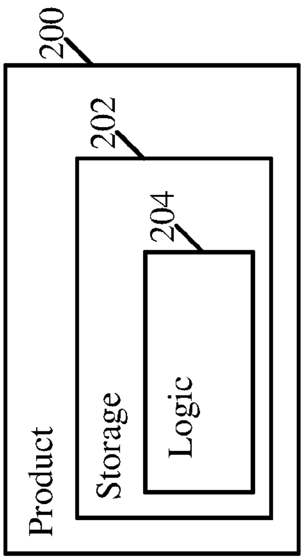

FIG. 1*i*2 illustrates schematically a toll charging unit and its interaction with in-vehicle DNA and a path control system, using according to some embodiments in-vehicle communication means including mobile Internet means, instead of using a dedicated communication means associated with the toll charging unit as illustrated by FIG. 1*i*1. Communication between a toll charging unit and the usage condition layer may preferably include secure communication between the toll charging unit and the usage condition layer in order to prevent intervention in the communication chain by a non authorized process. According some embodiments, the toll charging unit may use, preferably under secured communication, WiFi communication or a Smartphone, through for example Bluetooth, to communicate with the usage condition layer.

FIG. 1*i*3, illustrates schematically expanded configuration of vehicular apparatus described with FIG. 1*i*2, enabling to support privileges (e.g., network usage toll discount or free of charge toll) to cooperative safe driving. Indication about usage of functionality which activates cooperative safe driving mode is received for example by the toll charging unit from 246*b* through 246 using, for example, wireless local area network (WLAN).

Cooperative safety, which should preferably be applied with automated driving mode of an autonomous vehicle, may preferably use fusion of multiple sensors measurements from multiple vehicles.

According to some embodiments, implementation of free of charge toll or toll discount is used to provide privilege for usage of functionalities which apply cooperative safe driving by a vehicle. Such non full compulsory approach may preferably be applied to generate conditions for robust cooperative safety driving which is a major factor to guarantee safe automated driving by autonomous vehicles and safe driving by Cooperative Intelligent Transportation (C-ITS).

FIG. 1*i*3*a* illustrates schematically the sensing, communication and fusion functionalities involved with cooperative mapping of relative distances between a vehicle and other vehicles, and which mapping may be expanded to improve sensor based localization of a vehicle on high resolution in-vehicle map (used by autonomous vehicles) based also on vehicle to vehicle communication functionalities and functionalities to fuse a plurality of sensor measurements performed by each vehicle of a plurality of vehicles.

Mapping cooperatively interrelated distances among vehicles V1, V2 and V3, may use vehicle to vehicle transmission of in-vehicle sensing measurements through vehicle to vehicle (V2V) communication, wherein each of the vehicles may share with other vehicles measurements enabling by each of the vehicles to fuse similar measurements generated by other vehicles in order to improve by each vehicle its own measurement(s).

Fusion of multiple source measurements by a single vehicle enables to determine more robustly relative dynamic distance which may be applied according to relative weights corresponding to ambiguities in similar measurements performed by different sources using for example weighted least squares. An option to improve in-vehicle sensor based localization of a vehicle on an in-vehicle high resolution road map, by cooperative localization, may be enabled by for example sharing further a localization result performed by a vehicle according to a fixed object, such as a signpost, with other vehicles having used the same object for their localization, and to improve by each vehicle its own localization by fusion of multiple source measurements to determine location according to relative weights corresponding to ambiguities in the measurements using for example weighted least squares. This option may further be used to backup or to complement vehicle to vehicle dynamically estimated distances, according to dynamically estimated distances among vehicles, according to in-vehicle positioning of the vehicles performed to localize the vehicle on a high resolution road map. In this respect fusion of relative dynamically measured distances according to positioning of vehicles, using fixed object having known accurate position as a reference, with relative distances mapped according to relative mapping of dynamic objects, may contribute to the accuracy of both, the localization of the vehicle on a road map and the mapping of distances.

Fusion of multiple estimates by a single vehicle may be applied according to relative weights corresponding to ambiguities in similar estimates, performed by different sources, using for example weighted least squares.

FIG. 1*j*1 up to FIG. 1*j*3 illustrate schematically embodiments for the coordination of path controlled trips preferably applied with a basic paths planning layer, wherein inputs and outputs in the figures refer to different inputs and outputs in other figures describing different implementation alternatives to apply a path control system and which some of the alternatives are described by such figures.

FIG. 1*j*4 and FIG. 1*j*5 illustrate schematically basic traffic prediction layer with respect to different embodiments in which some of them apply mapping of demand of trips as described in FIG. 1*j*4. According to some embodiments, when there is lack of data about trip related tracked positions there is a need to estimate complementary data about the distribution of the vehicles on the network and to estimate demand according to traffic information received through 220, and through 219 through 243, enabling state estimation of demand (and indirectly distribution of vehicles on the network) according to state prediction (based on demand prediction) received from 245, under constraints of demand related data received from vehicles through 218 and further through 242 (according to FIG. 1*j*4) and distribution of position related trips through 219 and further through 240. Path controlled trips, planned according to prior control cycle is fed to the DTA through 210 or 210*a*. Constraints according to mapped demand performed by the traffic layer may according to FIG. 1*j*5 be received directly through 218 as illustrated in FIG. 1*j*5.

Further elaboration on vehicular apparatus, methods, and functionalities, and on apparatus, methods, and functionalities of the path control system, is provided with following description of embodiments of the invention.

Main abilities which require innovation to make such a multi-layer approach, including layers such as Usage condition layer, Traffic prediction layer, Paths planning layer and Traffic mapping layer, to be feasible and efficient are:

- With paths planning layer: convergence under iterative processes towards coordination of paths on the network, which tends to maximize flow on the network under constraints of real time and fairness in path assignments to path controlled trips,
- With traffic prediction layer and traffic mapping layer: accuracy of dynamic traffic mapping and prediction under constrains of real time calibration of a dynamic traffic simulation with sufficiently accurate models,
- With usage condition layer: privacy preservation of trip details under free of charge road toll or toll discounts privilege to facilitate encouragement of path controlled trips usage, and optimizing joint control on demand of trips and on coordination of paths, in order to maximize flow according, for example, economic benefits such as value of travel time saving.

According to some embodiments, the above-mentioned layers, that is, usage condition layer, traffic mapping layer, traffic prediction layer and paths planning layer, may be applied as complementary layers of a path control system (PCCN control system).

According to some other embodiments, each of the layers or functionalities descried with the layers may be applied independently, for example, to support other systems and/or to support a system which applies less functionalities or more functionalities in comparison to described layers or to apply functionalities described hereinafter and above by the present invention at any combination and at any level of complexity of implementation.

The benefit of using all the layers is expected to be highest, enabling robust and high performance of path controlled trips and further lower dependency of traffic predictions on non-deterministic behavior of drivers with respect to usage of route choice models.

According to some embodiments, applying the traffic prediction layer without using the paths planning layer, should preferably not be supported by the usage condition layer, since non controlled usage of traffic prediction may affect negatively local network flows due to high potential of conflicts among drivers that may attempt to take benefit of predicted freedom degrees on the network without coordinating path control. Therefore, without a paths planning layer applying coordination among path controlled trips, while using just on traffic predictions to support planning of paths, there should be a need to limit the level of usage of driving navigation aids usage to a level which may minimize the negative effects of non-coordinated trips on the network.

These examples provide some indication on flexibility in the implementation, while in general the above division of a path control system into layers were used for convenience, that is, processes related to any of the layers may be used independently or jointly with other described processes or layers according to implementation needs and constraints.

Therefore, division into system layers is not necessarily associated with further describes embodiments, and any association of processes with such further description is left open for implementation considerations. In this respect, embodiments described hereinafter may be associated with system layers described above or with any other system configuration.

Derailed Description of the System Apparatus and Methods

The following describes a method, apparatus and/or system which may enable high utilization of road networks (hereinafter and above the use of the term network without specific relation to a type of a network refers to a road network unless otherwise specified), using control on paths of trips with the aim to at least resolve above mentioned issues. According to some embodiments, control on paths may be implemented as an upgrade to available driving navigation aids and/or respective navigation control system used to guide drivers or autonomous driving of vehicles on roads.

A Driving-Navigation-Aid (DNA) may refer but not be limited to a dedicated driving navigation aid which assists drivers verbally and/or visually to reach destination according to a planned route to destination; or may refer to a driving navigation aid software application installed for example on a Smartphone, or may refer to a DNA functionality which is part of an autonomous driving vehicle system which assists autonomous driving to travel toward a destination.

A difference between a DNA used to assist a driver and a DNA used to assist an autonomous vehicle is that a DNA which is used to assist a driver may be based solely on GNSS positioning supported by map matching, whereas a DNA used with an autonomous vehicle may take benefit of vehicle localization on high resolution road maps and which its positioning is performed with the support of sensors such as Laser scanner(s) and/or Radar(s) and/or Camera(s). According to some embodiment, said control on path controlled trips may be provided as an upgrade to a system that provides driving navigation service, wherein paths for path controlled trips are provided to drivers or autonomous vehicles through DNA by a driving navigation service system platform, or by an upgrade to an OEM driving navigation service system platform which may apply a front end to guide drivers and autonomous vehicles to their respective destinations.

Examples of driving navigation service platforms in this respect may refer but not be limited to system platforms used for example by Google and Waze services, or to services provided, for example, by other operators, or to driving navigation system services that are serving, or might upgrade automakers' platform(s) to serve, DNAs.

In this respect an installed base of driving navigation service may, for example, provide a platform or a model for a platform to be upgraded by PCCN control platform to apply dynamic coordination for path controlled trips, enabling traffic distribution to apply predictive load balancing on the network, as well as may provide further a platform or a model for an additional upgrade which may enable to generate conditions for high usage of path controlled trips on the network.

Control on planning of paths for path controlled trips, refers to a process which is aimed at improving the traffic flow on the network, preferably aimed at leading to load balanced traffic on a road network, and which traffic improvement is aimed at exploiting predictive degrees of freedom on a road network according to predicted demand of trips and predicted traffic development, preferably to substantially maximize the traffic flow on the network.

Said control on paths may refer hereinafter to the term path control, and may be categorized as a model predictive control oriented system and method in which traffic prediction simulations synthesize, by the support of controllable dynamic traffic simulator (C-DTS), traffic development according to path controlled trips, and which path control preferably shapes the traffic toward load balance according to effects of controlled paths on traffic predictions; wherein a C-DTS enables prediction to be sensitive to non linear and time varying traffic flows on a network with traffic predictions.

According to some embodiments, path control of a path control system (PCCN control system) refers further to prime objective to apply coordination of path controlled trips, preferably performed by a method which assigns paths dynamically to trips according to controlled traffic predictions, and which paths that are assigned to trips are preferably aimed at converging gradually to substantial fair assignment of paths among trips, leading to substantial load balance on the network. In this respect, dynamic coordination of paths is required due to inability to fully predict traffic development on a network due to lack to fully predict the demand for trips and the objective and subjective behavior of driving. Further reasons for a need to apply dynamic control on paths comprise the need to apply limited controlled rolling horizon which to cope with a need to apply scalable PCCN operation up to large cities, which should be supported by off-line pre-prepared data as further described, and to cope with traffic and demand irregularities.

Under such conditions, maintenance of fairness in planning paths is a challenge which in practice may obtain under traffic and demand irregularities minimization of potential discrimination in assigned paths. The challenge is further associated with a need to apply, with non-discriminating planning and coordination of paths, simultaneous search for paths to exploit freedom degree(s) on the network, (which means applying simultaneous greedy search for paths to maintain some level of user optimal approach as further described in more details). At this point it may worth mentioning that simultaneous searches, although applied under iterative control that limits the effects of non-coordinated planning at each interatom, requires a plurality of iterations to apply coordination of paths.

According to some embodiments, with such approach the path control enables both convergence towards load balance and fairness in the assignment of paths. The approach may enable rapid convergence towards load balance which may be achieved by sufficient computation power to maintain control on high share of path-controlled trips in the traffic, while maintaining corrections to deviations from substantial load balance.

According to some embodiments, path control is implemented as an upgrade to a system platform which serves driving navigation aids, either as an external system which supports such a system platform to provide path-controlled trips, or as a path control functionality within a system platform which serves driving navigation aids.

According to some embodiments, a platform which serves DNAs provides a model for an upgrade wherein an upgrade is implemented on such a system model either internally or externally.

Since the functionality of path control can be provided as an internal upgrade to a system platform that might not be distinguishable from the functionality of an external system upgrade, the term path control which is used by some embodiments may refer to both implementation possibilities.

Predictively developed freedom degrees on the network, which are aimed at being exploited by path control (PCCN control) to improve traffic flow under predictive traffic load balancing, may refer to marginal developing capacities (non occupied capacities associated with development of imbalanced traffic) from which path control may take benefit, and which freedom degrees provide flexibility to dynamically assign paths for trips on the network according to current traffic.

Demand of trips may be characterized at a high resolution by trip pairs (positions to destinations) and/or at a limited resolution according to trip pairs among zones on the network; wherein aggregated trip pairs may relate to demand among zones with respect to preferably a wide sense stationary time interval.

Predicted demand may refer to zone to zone demand associated with predictive coordination of path controlled trips in a forward time interval, or to prescheduled path controlled trips having cocreate positions and destinations and/or to entries and/or exits related to links to/from a network.

The flexibility to distribute trips according to paths on the network refers to the flexibility to take benefit of different alternative paths to destinations and the flexibility to apply dynamic rerouting according to dynamically developing traffic. In this respect dynamic rerouting refers to paths assigned to path-controlled trips which under path control may dynamically be changed.

Said marginal capacity on a network, which determines freedom degrees on the network, refers to non-occupied capacities on network links while considering current and predicted controlled traffic.

Controlled traffic predictions refer in this respect to simulated traffic predictions, applied for example by a C-DTS, wherein a traffic simulator is fed by planned paths, for evaluation of potential effect on imbalanced traffic on the network (according to the gradient of aggregated travel times), and which evaluation may either lead to further planning of paths (corrections) and/or to assignment of paths to path controlled trips (according to the gradient).

Since traditional traffic control (e.g., traffic light control) on a road network, which is integrated in a traffic simulator, may be affected, inter-alia, by interferences caused by human behavior, the reliability of said controlled traffic predictions may be degraded due to such effects. Degradation may be further a result of non perfect network demand models, as well as non perfect dynamic supply models. Therefore, the ability to identify freedom degrees on the network and to fully exploit the freedom degrees is expected to be non perfect.

In this respect, high share of path controlled trips may provide a highly valuable solution not just due to the ability to apply more reliable predictive control but also due to the ability to get more traffic and demand related information from path controlled trips, which in turn enables to synthesize by a C-DTS, having non linear time varying flow models, higher quality of time dependent traffic flow to support predictive path control on network flow.

In order to improve or maximize traffic flow, by predictive path control, the goal should be to maximize usage of path-controlled trips which increases information about demand of trips and about traffic flow, enabling to apply a more robust control on path-controlled trips. In this respect the higher the quality and coverage of real time demand and traffic related data, the lower is the sensitivity of model-based demand estimation and C-DTS calibration to real time errors, and, as a result, the higher is the robustness of predictive path control.

A more robust predictive path control, which enables a more effective traffic load balance due to high usage of path controlled trips increases the available capacity on the network, due to reduction of travel times on the network as a result of the aim to maximize the potential contribution of dynamic rerouting to increase potential flow by predictive path control applying traffic load balancing.

A Dynamic Traffic (DTA) simulation platform which may enable controlled traffic predictions for a predictive path control (PCCN control) typically includes demand and supply traffic models.

Different types of DTA simulation platforms to be considered for applying C-DTS are available in the field of transportation and are commonly divided into three categories:

- microscopic DTA simulators, which provide the highest traffic simulation resolution and typically assist local traffic planning on a network, are the most computation consuming simulators that may be applicable to sensitive intersections in a citywide network,
- mesoscopic DTA simulators, which are considered as lower resolution simulators and are typically used with network level planning to evaluate typical flows, which are less computation consuming simulators and may be considered for a citywide network,
- intermediate DTA simulators, which apply resolution in between microscopic and mesoscopic DTA categories, may be considered for sensitive regions in a citywide road network.

Other simulation platforms, such as quasi-dynamic traffic simulators, are too simplified simulation platforms to be considered for C-DTS.

In general, the higher the accuracy of the supply model of a DTA, the higher is the quality that may be expected from traffic predictions. However, a major issue in this respect is the simulator run time associated with an iteration of path control (traffic load balancing) which puts a limit on the accuracy that can be implemented with a C-DTS.

A typical DTA simulator is comprised of several sub models and which sub models are associated with two main categories of DTA models, and which main categories are the Demand Model and the Supply Model mentioned above.

It should be clarified that typical DTA models are used mainly for traffic planning purposes, such as road network planning and traffic lights control planning, while some real time experiments use such DTAs for traffic predictions. Such DTAs may provide prime platforms for required expansions which may further support real-time controlled traffic predictions for predictive path control with advanced traffic supply and demand models. Advanced expansions may include but not limited to:

- a demand model expanded by demand control which may include sub models such as, for example, zone to zone road toll effects and/or effects of prescheduled trip requests/recommendations if, for example, prescheduled route recommendations/requests are allowed by a driving navigation service, and/or expansions related to methods, systems and apparatus described by the present invention;
- a supply model expanded by sub models such as for example autonomous vehicle related interaction with other vehicles including vehicle to vehicle communication effects on traffic development, enabling for example autonomous vehicles to be included in DTA based traffic predictions.

According to some embodiments, models of such advanced control systems may expand less advanced DTA simulation platforms used typically for planning purposes and/or for traffic predictions under conditions of less advanced traffic control.

As mentioned above, effective usage condition layer may enable to avoid a need to apply route choice model with C-DTS. A non-effective usage condition layer may not enable calibration of a C-DTS associated with a route choice mode. A non-fully effective usage condition layer may require some level of estimation based calibration to support model based traffic predictions wherein the estimation based calibration should preferably be applied using state estimation methods.

State estimation may serve advanced control applications and comprises variety of known methods to support model based predictions, such as Kaman Filter (KF) based methods to support non linear systems by for example Extended Kaman Filter (EKF) and Unscented Kaman Filter (UKF), as well as EnKF, just to mention some of them.

Such methods are aimed at enabling to track hidden demand variables and preferably calibrate varying parameters of the supply model of a C-DTS based on a DTA simulator associated with a route choice model. In terms of state estimation, the demand prediction is associated with the process model, the supply model is the measurement model, and the traffic information provides the field measurements wherein the state estimation estimated the demand state vector and preferably further calibrates the parameters of the supply model using joint/dual state estimation.

However, under limited traffic information, as well as under limited usage of path-controlled trips (i.e., dominance of the DTA stochastic route choice model and hidden demand variables), calibration of a DTA by state estimation becomes more than a major issue for citywide traffic.

In this respect, a need to cope with a high dimension problem of high dimension demand state vector, expanded by supply model parameters which require joint or dual state estimation, as well as the need to cope with nonlinear time varying and stochastic supply model, puts a serious barrier to apply state estimation which is required for predictive path control on city wide networks.

The issue starts with a need for huge computation power even for a quite limited prediction resolution with respect to the size of the demand state vector (time related entries associated with destinations of trips) which the nonlinear and stochastic nature of the supply converts the issue to a barrier while considering to take benefit of predictive path control for a city size network.

However, this is not the only issue. An irreducible problem in this respect, which computation resources may not resolve, is the conflict between a need to overcome the time varying nature of the developing traffic on the network, by short time intervals of state estimation, and a need to increase the time intervals in order to reduce the ambiguity in the estimation (coefficient variations) to which the high dimension non-linear and stochastic DTA nature is added. This prohibits implementation of high-quality predictive path control which is the only approach to exploit the potential of dynamic freedom degrees on a network in order to improve the traffic, or even prohibits justification of such approach in some cases. Therefore, even though estimation-based calibration might be considered to be used with non-fully effective said usage condition layer it would not be reliably applicable.

As further elaborated, with further embodiments, some innovative methods are suggested to reduce complexity and non-reliability issues associated with high dimension non-linear time varying state and parameter estimation which may enable to reduce issues associated with the TDA calibration at substantial real time and which such methods improve and generalize the solution in comparison to some limited concrete cases which exclude typical traffic in a city wide network.

Potential exploitation of freedom degrees on the network may only be obtained by high quality controllable traffic predictions, that is, enabling to control traffic distribution by predictive path control which exploits high time resolution in a relatively long time horizon according to the predictions (hereinafter and above the terms path control and predictive path control may be used interchangeably).

As described with some embodiments a major step towards a possibility to obtain such an objective is to motivate high usage of path-controlled trips and coordination of such trips. This may minimize or even eliminate the issue associated with calibration of a DTA and enable high or even full control on the traffic distribution as further elaborated.

Another major step towards efficient traffic predictions is to encourage prescheduled trips associated with encouraged usage of path-controlled trips which may reduce also ambiguities associated with statistical predictions of the demand and which along the range of a prediction time horizon may reduce the demand resolution (zone to zone demand of trips). With lack of sufficient prescheduled trips, the further the time interval in the horizon of the prediction the lower is the resolution (longer time intervals are required in further time intervals in order to maintain the same level of statistical errors).

Prescheduled trips may reduce, in this respect, errors associated with predictions of demand applied by statistical models, which for example may use time series analysis preferably supported, for example, by collecting time related historical patterns to linearize time series behavior and performing time series analysis for the differences between similar historical and current patterns (possibly including respective traffic patterns). As a result, the resolution of relatively long predictions may be increased and respectively the efficiency of the predictive control will increase or even become fully exploited.

Motivation to use prescheduled path-controlled trips may be applied based on differential privileges according to which higher privilege may be provided to prescheduled path controlled trip than a privilege provided to non-prescheduled path controlled trip.

The functionality of a service which applies prescheduled trips may be described from a point of view of a user software application installed on, for example, a Smartphone. Activation of such a software application, at a time or recurrently, should be associated with a certain vehicle, for example, according to its registration number. Such an application includes a functionality enabling to transmit a request for prescheduled path-controlled trip, according to a position to a destination, and to receive a response to the request. Preferably a response includes one or more recommendations for departure times, associated preferably with estimated travel time savings, of which one recommendation is selected and accordingly transmitted as a confirmed selection. According to options which may preferably be provided with the software application to determine the departure position, a departure position may be identified automatically or be specified by the user. For example, automatic identification may be applied according to the position of the Smartphone from which the request is transmitted, if applicable, or according to stored position of the vehicle on the Smartphone, if applicable, or according to stored position of the vehicle which is transmitted from a service center that tracks the vehicle position, if applicable. Specified departure position may further be an option according to which a street name and number of a building are fed to the software application by a user.

Generation of conditions for high usage of path controlled trips on a network may enable to increase the level of the control on the distribution of the traffic and hence the potential exploitation of the traffic demand to supply ratio on the network, which includes drastic reduction or even elimination of the high dimension nonlinear time varying and stochastic state estimation issues.

In this respect, generating motivation for high usage, while applying a method for coordination of paths by predictive path control enabling further fairness in path assignment under predictive path control, may encourage high usage of path-controlled trips. Under such conditions, the higher the share of path controlled trips, the less dependence on the stochastic part of the supply model is obtained as well as the lower could be the coefficient variations of the estimation (due to stochastic data and models) and the bias (due to nonlinear models) in zone to zone demand estimation (if estimation is still needed), and as a result high performance of predictive path control may be applied (with high usage of path controlled trips) or even the highest performance control (with full usage of path controlled trips) may be achieved.

According to some embodiments, increase in the share of path-controlled trips may be obtained by providing free of charge road toll or toll discount (hereinafter the term toll refers also to road toll) for path controlled trips in order to encourage usage of path controlled trips.

Implementation of such approach introduces an innovative strategy which has near term and long-term aspects that may enable to realize predictive traffic flow optimization on the network, with minimum or even with no potential objections from the public. Such approach start with enabling to apply robust privacy preserving free of charge or toll discount road-tolling, provided as privilege to encourage usage of path controlled trips by robust predictive path control, and further applying traffic flow optimization of on the network. Such approach may be expanded to apply authentic and anonymous requests for prescheduled trips which enable more accurate optimization of traffic flow on the network by longer controlled time horizons.

Privacy preserving toll charging is a key feature to avoid raised potential claim that trip details might be vulnerable to non-authorized access to trip details which might be a case with tracking trips by a toll charging center. In this respect, according to some embodiments, an innovative robust privacy preservation is introduced which enables to hide trip details from a toll charging center while enabling to apply toll charging according to obedience to path-controlled trips by a marginal upgrade to GNSS Tolling.

In this respect a GNSS tolling concept, which introduces a relatively low cost tolling platform may be upgraded by innovative robust privacy preserving tolling transactions for city wide coverage as described further with some embodiments. In this respect, under provision of free of charge toll privilege, there is no need for costly automatic car plate identification traps to be deployed since there is no real incentive to drivers to bypass free of charge tolling while being guided according to most efficient path-controlled trips.

The advantage of such approach has further aspects than just the low cost aspect, as the GNSS tolling vehicular functionality may provide a platform to support further robust predictive path control based on authentic vehicular related data which may be received by a path control system and which may include: real time updates of authentic anonymous predictive demand for trips (which complements anonymous provision of paths to path controlled trips according to anonymous requests by dynamically determined communication procedure with certified vehicular units), and real time updates of authentic anonymous progress of trips (based on anonymous provision of paths to path controlled trips according to anonymous requests by dynamically determined communication procedure with certified vehicular units).

A complementary innovative element, which may complement cooperative driving applied by privileged path controlled trips, is cooperative safe driving on road networks which its efficiency is dependent on massive usage of matured autonomous vehicles and which according some embodiments may be applied as an expansion to a privileged path control system and/or as independent privilege for cooperative safe driving.

In this respect, according to some embodiments, free of charge toll or toll discount are provided as privilege to encourage usage of autonomous vehicles which are equipped with apparatus enabling cooperative positioning of moving vehicles, wherein positions and preferably also short term predicted positions, which are determined by each vehicle, are exchanged among vehicles by vehicle to vehicle communication. In this respect high density of such vehicles may be generated on the network by said privileges to usage of automatic driving, enabling robust cooperative safe driving according to current and anticipated relative distances among vehicles which such vehicles may calculate according said current and anticipated changed positions.

The robustness of cooperative safe driving may further be improved by fusion of direct relative distance measurements between a vehicle and vehicles in its vicinity, applied by each vehicle of a plurality of autonomous vehicles, and disseminating by each vehicle to other vehicles (in its vicinity) the measurements through vehicle to vehicle communication. This enables fusion of complementary pairs of measurements by each vehicle in order to reduce potential error of a single measurement. Fusion in this respect may apply weighted least square based methods, preferably expanded to predictive fusion which determine dynamic relative distances among vehicles according to predictive positions which may be applies according to in-vehicle calibrated model-based motion simulator which may determine predicted weights.

Privileges to encourage cooperative safe driving are preferably combined with privileges to encourage usage of path-controlled trips, according to some embodiments, for example, by providing privilege which discriminates between contribution to safe driving and efficient driving. Since automatic driving of autonomous vehicles depends on a DNA it is natural to expect that free of charge road toll or toll discount may be applied at some stage to encourage usage of autonomous vehicles due to both safe and efficient usage of road network. Entitlement to privilege at such a stage requires indication about usage of apparatus which enables said cooperative safe driving which, for example, usage of automatic driving mode may provide.

Methods and apparatus to realize such a concept is described hereinafter by respective embodiments, while considering according to some embodiments identification of conditions which enable tolerated reaction of a tolling system (vehicular and central apparatus) to prove exceptional situations by providing for example privileges to trips under such situations. Exceptional situations may include, according to some embodiments, inability of an autonomous vehicle or a driver to be guided by path-controlled trips due to malfunction in the communication with in-vehicle apparatus or due to malfunction in in-vehicle apparatus which prevents usage of path controlled trips. In order to avoid a need to prove frequent inability of usage of path controlled trips, tolerated reaction may further include, according to some embodiments, provision of toll privileges to non-full usage of path control along a trip and/or to a number and/or to a percentage of trips and/or to a portion of trips which were not using or obeying to path control during a predetermined aggregated period of time such as for example during a certain period of time in a month or a week.

According to some embodiments, toll discount or free of charge toll are applied by using a toll charging unit installed in the car, or by emulated functionality supported partially or fully by one or more in-vehicle devices, and which unit, or functionality of the unit, has interaction with an in vehicle DNA and with a toll charging center, as well with means through which vehicle authentication can be determined by the installed unit. An independent vehicular toll charging unit is a dedicated in-vehicle (on board) toll unit, enabling according to some embodiments to guarantee secured toll charging independently of other in-vehicle devices, preferably by enabling in-vehicle toll charges or free of charge tolls to be managed without exposure of trip details to a toll charging center while reporting to a toll charging center about the sum of calculated toll or free of charge toll. With such approach the independence of toll charging unit of other in-vehicle devices prevents exposure of the toll charging unit data and processes from non-authorized access. In this respect, according to some embodiments, a toll charging unit or its functionality may preferably but not be limited to include:

- in-vehicle positioning means such as a GNSS receiver supported by map matching,
- communication apparatus and processes enabling to receive path related trips used with a DNA to guide a driver or an autonomous vehicle on a road network,
- processing and memory apparatus, as well as processes to manage in-vehicle said (secured) toll charges according to said guiding path received from a DNA and tracked positions of the vehicle according to in-vehicle positioning means, and according to pre-stored data and processes to calculate toll charges or to decide on free of charge toll,
- process enabling to report to a toll charging center about toll charges which include but not limited to vehicle authentication data which is securely stored on the toll charging unit memory preferably on nonvolatile memory and preferably stored by an authorized entity and by authorized apparatus and processes,
- communication apparatus and processes to interact with a toll charging center with respect to toll charging and/or free of charge toll preferably including a process enabling frequent monitoring of connectivity of the toll charging unit preferably with a toll charging center;
- apparatus and processes to support possible additional features related to a need to guarantee any further certified and secured toll related activity and installation of the toll charging unit in a vehicle.

An alternative implementation of a toll charging unit functionality, which potentially may have a lower level of potential acceptance for certification, can be based on a software and/or hardware add-on to one or more in-vehicle devices which provide a non independent toll charging unit with full functionality upgrade, preferably using one or more in-vehicle platforms (hereinafter device and vehicular platform may be used interchangeably) for example by communication of such non independent toll charging unit with complementary software and hardware of in-vehicle devices or by integration/emulation of a toll charging unit functionality with/by an in-vehicle device.

According to some embodiments, implementation of a toll charging unit, which is an independent unit, may include hardware and software means that a non independent unit may be equipped with access to one or more of them. Such in-vehicle means, preferably associated with an independent unit, or complementary means to which a dependent unit may have access, may include but not be limited to:

- Positioning means including but not limited to: GNSS based positioning using a positioning means such as a GPS receiver and/or Galileo receiver and/or GLONASS receiver and/or BeiDou receiver and/or Compass navigation system receiver and/or differential GPS receiver and/or GNSS receiver supported by data from an augmentation system such as EGNOS and/or a positioning means such as differential GPS RTK and/or GNSS receiver supported by map matching, or a positioning means such as localization means on roads used to see beyond sensing with high definition/resolution road and/or lane maps wherein localization means may include sensors such as Laser scanner(s) (LIDAR) and/or radar(s) and/or camera(s) supported by computer vision estimation methods to determine the location of a vehicle on road maps typically on high resolution maps serving autonomous vehicles.
- Computation means including CPU, memory and non-volatile memory,
- In-vehicle (on-board) communication means to communicate with a DNA application, which may require wired or wireless communication and which in case of wireless communication may enable, for example, communication with a DNA application installed on a smart phone and/or with an in-dash DNA or with a DNA integrated in an in-car entertainment system (also known as in-vehicle infotainment system); and which wireless communication may be implemented through for example Bluetooth communication and/or Wi-Fi and/or through for example in car communication means enabling to communicate with in-vehicle devices using communication means such as available with connected cars which further enable to utilize by a toll charging unit in-vehicle available resources and data required with a toll charging unit functionality including, but not limited to, the ability to communicate with an in-car entertainment system which usually includes a DNA, with devices including vehicle positioning means, with devices including computation resources, with on board means which stores vehicle authentication related data such as for example certified data source for vehicle identification number and/or vehicle registration number, with device which may serve directly or indirectly as a means for Internet communication including but not limited to communication through mobile cellular networks and/or through Wi-Fi, and/or through Dedicated Short Range Communication (DSRC)—enabling a toll charging unit functionality to communicate further with a toll charging center or a toll charging center functionality.

Communication means to communicate with a toll charging center or a toll charging center functionality indirectly, through for example communication means installed on the toll charging unit enabling the toll charging unit to communicate with connected car wireless communication means and/or enabling to communicate with in-vehicle Internet communication means, or for example, with a Smartphone Bluetooth communication means and/or, for example, with in-vehicle Dedicated Short Range Communication (DSRC) used with Intelligent Transportation Systems (ITS) for vehicle to infrastructure and possibly also vice-versa (infrastructure to vehicle).

In case of DSRC, time related positions of a vehicle for toll charging can be determined according to road side infrastructure locations rather than by in-vehicle positioning, and in such a case a GPS receiver may be used with a toll charging unit as an option, for example, to improve resolution of vehicle positioning for non-dense DSRC road side infrastructure and/or to increase limited coverage of DSRC through other communication network(s) such as cellular mobile networks.

communication means to read vehicle authentication data through for example connected car wireless communication means enabling to communicate with in-vehicle means which store vehicle authentication related data such as for example certified data source for vehicle identification number and/or vehicle registration number, or, for example, to receive vehicle identification number through on-board diagnostic connector or on-board diagnostic port in the vehicle or through a split of an access to on board diagnostic port, and which authentication data is transmitted when communicating with a toll charging center with respect to a road toll transaction.

communication means through which data related to a vehicle operation mode, entitling the vehicle with road toll privileges, is updated indirectly through, for example, connected car wireless communication means enabling to communicate with in-vehicle means which stores data related to vehicle operation mode such as, for example, certified usage of path controlled trips and/or other modes such as contribution of a vehicle to safely driving and/or to safe and efficient distance kept from other vehicles in its vicinity especially useful with automatic driving mode of autonomous vehicle, or directly, with devices in which such data is stored, and which indication of such data is transmitted when communicating with a toll charging center with respect to a road toll transaction.

An alternative to upgrading a non independent toll charging unit by complementary means may use a vehicular platform to be upgraded by toll charging vehicular unit functionality which may refer but not be limited to vehicular platform such as, for example:

an in-car entertainment system;

a GNSS tolling on-board unit applied for example with road pricing for tracks in Europe;

sensor(s) based localization of a vehicle on a road map (used for example by autonomous vehicles for positioning a vehicle on in-vehicle high resolution road map);

a driving navigation aid (DNA), including but not limited to a DNA based on a satnav or a DNA used for example with an autonomous vehicle;

a black box installed on a vehicle to track driver behavior, for example for insurance related applications;

a green box installed on a vehicle to track driver behavior;

an Advanced Driver Assistance System (ADAS) which for example may refer to ADAS based on camera(s) and/or radar(s) and/or other sensors for warning drivers and/or a control system using such sensors to support various levels of automated vehicle classification such as Level 1 up to level 5 determined by the Society of Automotive Engineers;

a GNSS based vehicle position tracking device;

a telematics unit;

a driving navigation control aid associated with an autonomous vehicle supported by a DNA which feeds a control system of an autonomous vehicle;

an in-vehicle DSRC unit; a vehicular platform constructed by more than one of the mentioned platforms (hereinafter the term vehicular platform which may refer to a vehicular device, may further be used interchangeably with a platform constructed by a plurality of vehicular devices and have the same meaning from functionality point of view).

Such vehicular devices provide platforms for an upgrade by a toll charging vehicular unit functionality to implement an application which motivates the use of path-controlled trips, for example, by free of charge road toll or by provision of discount to toll charge.

In this respect road toll might not be the only means to motivate usage of path controlled trips. For example, mass usage of autonomous vehicles on the network should create a need to apply path controlled trips on networks in order to at least prevent non desirable traffic development as a result of non-coordinated guidance, but this by itself can't guarantee high utilization of a network which suffers from high traffic load due to high demand of trips, and for which case there is a need to also dilute traffic by for example a road toll charging system, and which free of charge toll at early stages and toll discount at advanced stages may enable.

Therefore, in order to guarantee high utilization of a road network, path controlled trips usage supported by traffic dilution should be considered according to needs. In this respect it should be noted that usage of path controlled trips contribute by themselves to traffic dilution and which traffic dilution on the network increases with the increase of the share of path controlled trips in the traffic and which toll charging may further increase the dilution according to needs (if path controlled trips are not sufficient to generate desirable flow under highly traffic loaded network).

Some other vehicular platforms, which according to some demonstrative embodiments may be upgraded in order to motivate path controlled trips usage, are black boxes and/or green boxes used to evaluate the level of entitled privilege for discounts in insurance policy price for cars, which price is determined according to various parameters and which parameters may include behavior of drivers and/or the annual mileage of a vehicle.

According some embodiment, additional discount to insurance policy price may be obtained by a black box or a green box indirectly if efficient path control is used. Path controlled trips which may reduce mileage, contributes to discount privilege according to mileage parameter supported by black boxes and green boxes records.

According to some embodiment, a condition to obtain discount by a black box or green box is to contribute to traffic improvement by path control and which such a condition may motivate usage of path controlled trips.

Such an approach may serve government authorities which, for example, through one authority control on the cost of insurance prices relates to human injuries in case of car accidents may be applied, while through another authority responsibility for traffic improvement may further be applied.

In this respect, increase in usage of effective path-controlled trips may have progressive contribution to trip time reductions on the network, and hence to risk reduction as well, which may motivate promotion of path-controlled trips by government authorities and insurance companies.

However, this approach by itself can't guarantee high utilization of a network which suffers from high traffic load and for which case there is a need to dilute traffic by for example a road toll charging system and which free of charge toll at early stages, and toll discount at later stages, may motivate path controlled trips usage supported by traffic dilution according to needs. That is, road toll which should be considered sooner or later as a means to dilute traffic on dense citywide road networks, may be used at an initial stage to encourage path controlled trips by providing preferably free of charge toll to path controlled trips and when this approach becomes exhausted, or insufficient, then road toll may start to be implemented to dilute traffic in conjunction with toll discount for path controlled trips.

According to some embodiments, toll charging unit may either refer to a dedicated unit or to an upgraded vehicular platform which enables functionality of a toll charging unit, and which software and/or hardware that are used to upgrade a vehicular platform are subject to implementation decision to take benefit of software and/or hardware elements which in common can apply a said vehicular platform and by the toll charging unit functionality.

Since a toll charging vehicular unit functionality, which provides upgrade to vehicular platforms, might not be distinguished from the functionality of a standalone toll charging unit, the term toll charging unit used by descriptive embodiments of the invention may refer to both implementation possibilities although the unit in this respect might be reduced to software implementation level.

According to some embodiments, path-controlled trips, which are encouraged to be used by free of charge road toll or by toll discount, are supported during a trip by a toll charging application, preferably installed within a toll charging unit that records positions of the vehicle at an acceptable frequency, using preferably nonvolatile memory. Records of positions which may be related just to selective roads or selective parts of a network (in case that the toll charging application and data apply selective records) are used as a reference for comparison with records of positions of trips that according to path control were recommended for a trip, for example, through a DNA application. Trips which are found to be following recommended routes, according to path control path updates, and which related positions of trips were preferably transferred to the toll charging unit installed in the vehicle, for example from the DNA vehicular application, will be entitled according to the tolling policy to receive discount or not being charged by toll according to obedience to path updates.

According to an embodiment, trips which are entitled to be free of toll charge can be saved from being transmitted to a toll charging center for privacy preservation reasons and can be erased from user facilities.

According to some embodiments, encouraging usage of (obedience to) path controlled trips by entitling free of charge privacy preservation toll includes, for example, recording at an acceptable frequency positions of a vehicle during a trip, by a toll charging application installed for example on a said toll charging unit, in order to acceptably characterize a trip for a possible need to charge toll if disobedience to recommended path control trip updates was performed.

If a path-controlled trip is performed according to a DNA application, then the DNA application will preferably transfer trip positions that characterize the path controlled trip to the toll charging unit during, or after the trips ends. The toll charging unit will use a trip comparison process to compare its position records with the path-controlled position records and determine whether the trip is found to be substantially the same.

According to some embodiments, if the trips were found to be substantially the same, then, according to predetermined criteria, no charge will be assigned to such a trip under free of charge privileged toll policy (or toll discount under privileged toll policy). According to some embodiments, positions which characterize a non charged trip may be erased from the memory of a toll charging unit, that is, there is no need to keep such records in the toll charging unit for more than a certain time of period in which appeal may be considered for a mistake in toll charging.

According to some embodiments, privacy preservation of trips associated with toll charging procedure, based on in-vehicle determination of toll charge, can take benefit of a tolling related road network map to which toll charging units have access. According to some embodiments, a tolling related road network map, may include updated attributes for time dependent toll charging values assigned to roads on the map. A toll charging unit may be updated with said attributes either by access to common data on a remote server or by non-solicitated reception of updates at the vehicle.

According to some embodiments, charging values may enable on-board (in vehicle) calculation of toll charge per trip, preferably by a toll charging unit which is authorized to convert records of positions that characterize trips—into a toll charging amount, wherein the in-vehicle calculation is applied according to a said road map having attributes of charging values for passing roads or road segments, for example according to daily time intervals. According to some embodiments, when an incentivized path control is applied with path-controlled trips the charging values (e.g., said attributes) are associated with zone to zone incentivizing flat rate for network usage by path-controlled trips.

According to some embodiments, the attributes of charging values may enable to use different charge values for different hours and for different roads used with a trip. In this respect said different types of trips may refer to trips or part of trips that followed (obeyed to) assigned path updates to path-controlled trips and trips that were not using or were not following (not obeying) to path updates assigned to path-controlled trips.

According to some embodiments, the attributed network road map and respective updates are received by the toll charging unit, for example, by reading updates from a remote database server which may be part of the toll charging center, for example, directly through communication means of the toll charging unit, or, for example, indirectly e.g., through Bluetooth which communicates with a Smartphone or with an in-vehicle infotainment system which communicate with a database server.

According to some embodiments, after determination of the accumulated amount of the toll charge, by a toll charging unit, the amount will be transmitted to the toll charging center according to a predetermined procedure which identifies the car but does not have to expose trip details while applying toll charging. Such privacy preservation may support toll charging in case of applying incentivizing toll discount charges to encourage path-controlled trips and/or charging toll of non path-controlled trips, that is, including cases of charging toll without relation to charge applying discount with path controlled trips.

Path-controlled trips which are entitled for free of charge service, e.g., at certain times of a day, might not have a reason to disclose the trip related data. However, in case that path controlled trips are encouraged to be used by toll discount, due to obedience to path controlled trips, a non-conventional privacy preservation technique is required in order to prevent potential reluctance of the majority of the public to accept usage of path-controlled trips which would negatively affect the potential effectiveness of path control performance at a citywide network level. Therefore, disclosure (exposer) of trip related data by the toll charging process by transmitted data from the vehicle, which is considered to be associated with a toll charge transaction, should be avoided, and in this respect the said privacy preserving toll charging that assure the nondisclosure of trip related data is mandatory to obtain high acceptance of incentivized path controlled trips by the majority of the public.

With respect to further privacy preservation aspects, according to some embodiments, anonymous position related data are transmitted from toll charging units to a path control system. According to some embodiments, anonymous position related data are transmitted from toll charging units to a mapping means which serves a path control system. According to some embodiments, anonymous position related data are transmitted from DNA to a path control system. According to some embodiments, anonymous position related data are transmitted from DNA to a mapping means which serves a path control system. According to some embodiments anonymous position related data are received by a path control system from a driving navigation service platform or from any system which serves either said vehicular platforms or said upgraded vehicular platforms or from both systems.

Free of charge toll or toll discount, provided as incentive to encourage path-controlled trip usage, may need legal enforcement means in order to guarantee potential high path-controlled trips usage wherein non usage of path controlled trips, or disobedience to path controlled trips, should be associated with non-privileged toll charge (full charge of toll rather than toll discount or free of charge toll). According to some embodiments, a GNSS tolling system associated with car number plate identification (using Automatic Number Plate Recognition—ANRP) may be used to trigger transfer of time related location of identified vehicle from a vehicle to, for example, a toll charging center. In this respect, time related car number plate identification by ANRP may activate interaction of a toll charging center with a respective in-vehicle toll charging unit, wherein such interaction may at least determine whether a toll charging unit of the identified vehicle was active at the time the ANRP identified the car plate. If the result is that the toll charging unit was active at that time, then according to a predetermined policy no further procedure may be required. If the result is that there was no response from a toll charging unit, possibly due to absent of a toll charging unit within the identified vehicle, or due to a malfunction, then a toll charge enforcement procedure may be activated, applying a further possible procedure that fines the vehicle in case that there was no failure in the interaction with a toll charging unit for which the charged driver has no responsibility.

According to some embodiments, a GNSS tolling system associated with car number plate identification may be deployed on some of the roads, that is, not all roads on a network may be monitored by such infrastructure.

According to some embodiments, said toll enforcement, as well as path-controlled trip network usage privileged toll associated with privacy preserving toll charging functionalities described with vehicular toll charging unit, may upgrade a GNSS toll charging system to include such functionalities. According to some embodiments GNSS related positioning may be substituted by sensor localization on a map in case of, for example, autonomous vehicles. According to some embodiments, DSRC system can be used to perform interaction with a toll charging unit.

As mentioned above, privacy preserving path control, supported by privacy preserving free of charge toll or toll discount determined at the vehicle, may reduce reluctance to use path controlled trips and, as a result, high usage of path controlled trips which is expected to be developed, on the network may enable to generate high exploitation of freedom degrees on the network while applying predictive network traffic load balancing.

The main achievement of such approach is mass usage of path-controlled trips that first of all enables to map the distribution of the trips and as a result enabling to calibrate the C-DTS without a need to use non-feasibly applicable state estimation at a level of a citywide network. The second objective, which is a byproduct of an ability to apply high quality predictions by a robustly calibrated C-DTS, is a further potential to apply full control on point to point trips on a citywide level network (which is not an easy task that according to the above and the following described embodiments it may become feasible).

The data that enable to calibrate the C-DTS is updated position distribution of trips on the network of the supply model and further updating with position to destination data, associated with requests for path-controlled trips, the demand model. The source of the data may be toll charging units or a functionality of a toll charging unit which upgrades said vehicular platforms, and/or DNA, and/or a functionality of DNA integrated within a vehicular system platform such as an autonomous vehicle control platform and/or in-car entertainment system of a connected car, and/or in-dash DNA and/or a DNA applications on smart phones, and/or a Smartphone (independent of a DNA application), and/or said vehicular platforms which can be upgraded by toll charging unit functionality and which a toll changing unit is fed by trip destination originated for example with the support of a DNA and transmitted to a toll charging unit or to a toll charging unit functionality. According to some embodiments, anonymous trip related position and destination data are transmitted from toll charging units to a path control system. According to some embodiments, anonymous trip related position and destination data are transmitted from toll charging units to a mapping means which serves a path control system. According to some embodiments, anonymous trip related position and destination data are transmitted from DNA to a path control system. According to some embodiments anonymous trip related position and destination data are received by a path control system from a driving navigation service platform or from a system which serves said upgraded vehicular platforms.

With respect to the potential to apply full citywide predictive load balancing, by predictive coordination of path-controlled trips (controlled by PCCN control system), further aspects should be considered with a possibility to apply effective PCCN operation which includes operational condition aspects, operation acceptance aspects, and control technology related aspects as following elaborated.

The operational conditions related aspects refer to:

An objective to create motivation to use path-controlled trips, that is, to create conditions for potential maximization of path control performance on the network which enables to take benefit of the highest degrees of freedom to utilize the network potential in order to serve varying demand of trips on a network with the highest traffic flow.

According to some embodiments, the objective is obtained by a "carrot and stick" approach which uses toll charge discounts or free of charge toll to motivate usage of path-controlled trips.

In this respect, free of charge toll, which is provided as a privilege to motivate path controlled trips usage, may justify an objective to improve traffic flow at a first stage, before a need to dilute traffic by toll; whereas, toll discount, provided as a privilege to motivate usage of path controlled trips, may be justified for a second stage in which reducing motivation to generate non necessary trips on the network, or on parts of it, is added.

In some embodiments, free of charge toll is implemented for improving traffic as means to motivate high path control usage even though toll charging means did not exist prior to the implementation of path control.

According such embodiments, methods and system described above and hereinafter may be used to apply free of charge toll in order to motivate usage of path control trips. According to some other embodiments, methods and system described above may be used with toll discount charges to motivate path control usage.

Another complementary objective to the objective to obtain efficient usage of a road network, by high usage of path-controlled trips, is safe driving; wherein high density of usage of cooperative safe driving apparatus may generate robust safe driving at a stage when usage of autonomous vehicles will become mature.

In this respect, an approach which may shorten the time to obtain both objectives may preferably apply provision of privileges to usage of cooperative safe driving apparatus as an expansion to a system and methods which may encourage high usage of path-controlled trips. At such a stage, provision of toll related privileges may differentiate usage of safe driving apparatus, and usage of path-controlled trips.

The operation acceptance refer to:

According to some embodiments, a path control system which needs not identify vehicles served by path controlled trip, and privacy preserving toll charge which should identify vehicles served by path controlled trips, may use systems and methods as described above that hide trip related data from a charging toll center, in order to facilitate acceptance of path-controlled trips.

In this respect, privacy preserving path control (using anonymous vehicle related identity) and privacy preserving toll charge (using in-vehicle determination of privileged and non privileged tolling), may use systems and methods as described above in order to facilitate acceptance of the second stage of demand control associated with path controlled trips.

Additional acceptance aspect refers to fairness in providing path-controlled trip recommendations, which is further described with some embodiments.

Another acceptance aspect refers to a preference of saving the need for drivers to change driving navigation service platform for using path control. In this respect, further to the non-convenience associated with such a change, a conflict of interest would be raised with current services to DNA. Therefore, according to some embodiments, path control is provided as an upgrade on top of one or more available services that serve DNA applications, wherein the path control system serves the commercial navigation services to which the path control system preferably provides corrected paths to initial planned routes (planned by a driving navigation system service).

According to some embodiments, driving navigation system service that are served by a path control system may not be exposed to vehicle authentic identity and further may allow registration under anonymous identity at each request for a path controlled trip by a vehicle, enabling to prevent recurrent tracking of the vehicles under path control system service.

In some embodiments, authentication of data associated with a toll charging unit may be confirmed by, for example, a checking procedure between a toll charging center and a toll charging unit which enables the toll charging center to be aware of whether an installed toll charging unit is still effective. Installation removal may be protected by, for example, monitoring non removal of the toll charging unit by remote sampling of the toll changing unit.

According to some embodiments, authentication of a toll charging unit by a toll charging center may use vehicle identification number that can be read through on board diagnostic connector of a vehicle and be transmitted along with toll charging procedures to a toll charging center.

According to some embodiments, disconnecting of a toll charging unit from on board diagnostic connector of a vehicle may be recorded on the memory of the toll charging unit, to provide indication on the need to reconfirm authorized use of the toll charging unit by, for example, sending a message to a toll charging center, e.g., through Bluetooth communication to a mobile application on a Smartphone or to an in dash DNA application or through any of said vehicular platforms upgraded by functionality of a toll charging unit.

According to some embodiments, reconfirmation can be performed first by reading a record of mileage of a vehicle from the toll charging unit, which can be initialized with an installation of a toll charging unit by an authorized entity according the mileage of the vehicle and maintained by the toll charging unit during trips. After said reading, a comparison between the toll charging mileage record and the current mileage of the vehicle is performed and if no difference or small difference, within allowed range, is found then the toll charging unit may be re-authorized preferably without any further intervention. According to some embodiments, the comparison is made by reading car mileage into the toll charging unit through the on-board diagnostic connector, or according to other embodiments a comparison is made visually by an authorized entity.

According to some embodiments, methods which are used to satisfy an authority or an insurance company for authentication of data on a black box or a green box can be used for the authentication of data which serves a toll charging unit or a said vehicular platform upgraded by functionality of a toll charging unit.

According to some embodiments, privacy preserving checking of a bill which is related to details of trips can be applied upon privacy preserving toll charging. According to some embodiments, for a determined period of time, the toll charging unit will keep the trips and charging details stored on its memory, wherein such details can be available to be read, for example, by a Smartphone or by in-dash DNA through Bluetooth communication between the Smartphone or in-dash DNA and a toll charging unit. With such access to charging details, and possibly according to a printed version of such details, an appeal can be submitted for a non-accepted bill. According to some other embodiments, a toll charging unit functionality to a said upgraded vehicular platform enables to preserve privacy of trips records performed by toll charging unit functionality for a cost of elements which prevent remote access to trip data related to toll charging unit functionality or at least when access is not allowed by the keeper of privacy preserved trips related data.

The control technology related aspects refer to:

A system and method which preferably apply predictive path control that predictively coordinates paths of trips on a network (PCCN) to exploit freedom degrees on the network enabling to improve and preferably maximize traffic on the network, and which coordination of paths is supported by synthesis of controlled traffic predictions, preferably by C-DTS simulations performed according to planned paths associated with the coordination. These technological aspects should preferably be complemented by prior mentioned aspects which refer to operational and acceptance aspects in order to enable to maximize performance of predictive path control.

In this respect high acceptance of operational aspects, may enable to generate and exploit, by PCCN, high level degrees of freedom on the network.

High acceptance of an operation, applying predictive path control (PCCN), has a major effect on the control efficiency which is beyond the ability to achieve higher control on the traffic, and which refers to the ability to enrich traffic and trip related data which may enable more robust and effective control. In this respect the higher the percentage of path control usage the higher is the quality of predictive path control that can be obtained.

According to some embodiments, a method and a system which may be used for coordinating paths on the network should preferably have an ability to generate and maintain predictive traffic load balancing on the network by utilizing current and predicted degrees of freedom on the network. Preferably such a method and a system should apply distributed computation with path planning processes to coordinate paths associated with path-controlled trips not just due to a reason to shorten the time of the planning but further to enable planning that may support maximization of non-discriminating planning (applying controlled user optimal as further elaborated).

Such a method and a system, in order to be effective, should, as mentioned above, encourage high percentage of usage of path controlled trips on a network, wherein path recommendations should preferably be provided on a fair basis, that is, taking into consideration that sets of planned paths which are associated with discrimination in travel times among controlled trips, for the benefit of improving average trip times on the network, which may discourage potential participation in such a path control (PCCN) service.

To more concrete, non-discriminating and robust PCCN operation is applicable only under substantial full usage of path controlled trips on the network, which further may provide condition to apply substantial full control on the traffic development, however, such demand is applicable under incentivized PCCN operation which under economic constrains require regulation that encourage PCCN service usage by privileged GNSS tolling that is a natural complementary platform to enable full traffic distribution control combined effectively with demand control (enabling further predictive parking management as further elaborated).

In this respect, the prime condition to apply PCCN, from a point of view of drivers (and passengers) is an ability to guarantee that their interests will be kept, that is, to a-priori be not asking a user to compromised for its benefit for others. According to some embodiments, a path control method which enables to predictively coordinate paths while satisfying fairness in the planned paths, with the aim to improve traffic flow on the network, can be applied by a system in which preferably each of the path controlled trips is associated centrally with a computerized agent process which keeps its interest while enabling each agent to act according to common acceptable cooperative rules.

According to some embodiments, parallel computation by agent processes (hereinafter the term agent process may refer also to agent) is applied on a path control system, for example, a said path planning layer supported by a said traffic prediction layer, wherein each of the agents may according to a predetermined simplified procedure receive or have access to the same predictive path control related data which include while not being limited to:

a. Destination and time dependent position pair for one or more path-controlled trips, b. Feedbacks on potential time related traffic development effects from substantial simultaneous planning of a set of paths by a plurality of agents, which refer to time related travel times and respective traffic volume to capacity ratios, and according to some embodiments to determined prioritized relatively loaded links according to the potential traffic development, wherein relatively loaded link is determined according to its relative traffic volume to capacity ratio (V/C) while prioritized relatively loaded links refer to currently distinguished highest level loaded links that their traffic loads are mitigated under hierarchical predictive traffic load balancing, and wherein according to some embodiments priority is referred further to relative capacities of links and to potential mitigation of loads associated with such links (further elaboration in this respect is provided with the description of FIG. 3.3 which refers to the term "mitigation related relative traffic load", wherein embodiments that in general refer to relatively loaded links may refer to relatively loaded links that are determined further by their mitigation-related-relative-traffic-load level as explained by the description of FIG. 3.3).

c. Criteria to plan a path according to the feedbacks, d. Criteria to accept planned paths, e. Criteria to assign an accepted path to a path control trip, f. Schedule to maintain simultaneous, or substantially simultaneous, planning of paths by agents.

The concept of applying fairness in coordination of paths for traffic load balancing on the network, may preferably allow, under control, greedy as well as cooperative planning of paths by agents according to the stage (position to destination) of the trip and the stage of the path control (new trip or non-new trip wherein a new trip that is not associated with predicted demand may be served by allowing it to apply first a greedy search for a path if it is not complying with predicted demand).

Preferably simultaneous attempts to improve travel times by agents, according to predicted developing freedom degrees in a controlled rolling horizon, should be allowed from fairness point of view (simultaneous attempts to mitigate predicted traffic loads that are a potential cause for network traffic imbalance) which under control on acceptance level of such attempts gradual controlled user optimal may be performed iteratively applying cooperative planning of paths according to common feedback to planning processes associated with each iteration.

In this respect, a cooperative process, which is aimed at enabling a gradual mitigation of potential traffic overloads on links (which are a cause for network traffic imbalance and which negatively affect the load balance on the network due to potential traffic imbalance effects of planned path on the network), should also enable fairness in the planning of paths which from a point of view of the traffic development the gradual planning process should lead to substantial traffic load balance on the network.

Such approach is aimed at enabling to maintain predictive coordination of paths which apply both fairness and load balance on the network under coordination control processes.

Coordination control processes (referring to predictive coordination of path controlled trips) are preferably supported but not be limited to: synchronization of processes that are preferably applied by distributed computation performed by agents to plan sets of coordinated paths, traffic prediction feedbacks to evaluate effects of planned sets of paths, on-line calibration of a traffic simulation platform (C-DTS), coordination of input and output processes required with the planning of sets of paths for path-controlled trips.

According to some embodiments, planning of paths by agents may be applied by software related process or by hardware related process, or by both software and hardware shared process.

According to some embodiments, coordination control processes, under limited computation power, apply predictive load balancing that apply hierarchical mitigation of traffic loads from relatively loaded links on the road network, which relatively loaded links reflects traffic imbalance on road network. Identification of relatively loaded links is applied according to some embodiments by C-DTS traffic prediction wherein mitigation to traffic loads from such links is applied first to the most loaded links and further to less loaded links, and wherein loaded links might under traffic load mitigation to be identified as seemingly loaded links that reflects load balance for a given demand of trips (handling seemingly loaded links is explained further with the description of FIG. 3.3 which refers to relatively loaded links by determining relative traffic loads by levels of mitigation-related-relative-traffic-load).

In this respect, the predictions determine relative priority to relatively loaded links enabling gradual (hierarchical) load balancing on a network, and which such links are referred in general to relatively loaded links that may be stored as a data content of a load balancing priority layer (for ranking relatively loaded links).

Such a layer, may support gradual load balancing applied by coordination control processes, for example, as part of a path planning system layer supported by the traffic prediction layer, and may be updated by currently anticipated relatively loaded links which may have potential negative effect on the load balancing.

Relatively loaded links associated with load balancing priority layer enable to apply gradual traffic load balancing on the network by dynamic determination of relatively loaded links.

Dynamic determination of such links may further enable to concentrate path controlled tris on part of the network in order to apply traffic load balancing e.g., on high capacity links, under major traffic imbalances on the network, wherein the highest imbalanced links receive priority with said gradual traffic load balancing. In this respect prioritized relatively loaded links may relate to links that their traffic should be diverted to other links and their costs, for applying planning of paths, is assigned to virtually higher levels.

Concentration of traffic on part of the network (dilution of low capacity links) might be required under exceptional traffic conditions, while computation resources to apply coordination control in such conditions are insufficient.

Determination of virtual and natural prioritized relatively loaded links in a load balancing priority layer may enable not to lose control on traffic load balancing under real time constraints wherein traffic and demand irregularities may overload available computation resources.

Examples of causes for which prioritization of relatively loaded links should preferably be used are: exceptional demand of trips due to public events, incident(s), emergency situation that might require evacuate or dilution of traffic on a link or on a certain part of a network, and/or any other high change in the dynamics of the traffic.

According to some embodiments, indication for a need to apply dynamic concentration of traffic may be an identified reduction, or anticipated reduction, in effectiveness of the control on traffic load balance which may not afford required frequency of iterations to maintain substantial load balance on the network. In such a case, priority may be given, preferably temporarily, to coordination control processes on links having relatively high flow potential on the network by diluting part of the network links and concentrating the traffic on relatively high capacity links on the network.

According to some embodiment, an indication of inability to apply required frequency of control iterations under real time constraints may be provided by a result of evaluating updated data about the daily time related relatively loaded links on the network during recent time period of a lack to cope with load balancing (not limited to links associated with the load balancing priority layer). Preferably daily time related stored patterns of imbalanced traffic, to which off-line load balancing found a recovery control policy, is used then to support recovery from current on-line imbalanced traffic. This can be done by searching for a match with stored similar time related patterns of traffic and using associated respective recovery control policy that may comprise e.g., control steps, set of paths, which further may concentrate traffic flow on restricted part of preferred links on the network. According to some embodiments, said match with stored data may refer to a match between time related patterns of traffic volume to capacity ratios of the current (and preferably respective recent and predicted) traffic on links of the network, and time related stored data of traffic development scenarios which contain patterns of traffic volume to capacity ratios on links of the network (possibly further paths associated with relatively loaded links) associated with stored desirable concentration of traffic on the network.

A match may be performed between a single pattern or preferably between sequences of traffic patterns that represent the traffic dynamics and stored patterns associated with respective recommended concentration of traffic flow.

The stored data may be constructed by off-line simulations of coordination control processes that may prepare storage of desirable concentrations of the flow for certain patterns. The higher the resolution associated with the traffic simulation scenarios the richer is the storage, and the higher is the efficiency of such a method. In this respect, the increase in the resolution among the different scenarios of patterns may enable to find a closer match with the current pattern or a current set of patterns. As further described such a process may be applied with the support of trained deep neural network or recurrent neural networks wherein relatively instant inference of control policies may be obtained for input of imbalanced traffic conditions instead of applying search and match processes to locate required control policy to recover from traffic imbalanced conditions. The connection weights for such neural networks may be loaded from a database that contains results from training of a neural network to associate control policies with imbalance traffic conditions, for certain daily times, in order to keep the size of a neural network at an applicably acceptable level.

Such a method may and in general enables to apply predictive coordination control processes under major traffic imbalances and further deconcentrate traffic on the network after attaining load balance with the concentrated traffic.

A search for a pre-planned control policy may be applied due to, for example, identified reduction in the number, and preferably the level, of overall relatively loaded links on the network. The identification may be performed for example by tracking, along recent coordination control processes, the dynamics in the patterns of overall relatively loaded links, and determining accordingly a pre-planned control policy. In this respect, pre-planned control policies may be prepared by off-line computer simulations applying coordination control processes for different traffic and demand irregularities associated with time intervals during a day.

Construction of control policies may be associated with simulation of synthetic traffic imbalances and/or with real time identified traffic irregularities which may require off-line recovery, which may be used further to support recovery from future real time similar imbalanced traffic situations.

In this respect, the off-line construction of control policies is a sort of a learning process which may progressively include more scenarios to cover required range of traffic irregularities preferably associated with neural network related generalized inference of control policies.

Usage of neural networks in this respect is applied as a complementary approach or as substitution approach to usage of database wherein the inference phase from a trained deep neural network or a trained recurrent neural network (LSTM) may become much faster than retrieval of control policies from a storage according to match between current imbalance traffic conditions and stored imbalance traffic conditions, and may provide further generalization capability associated with inference applied by trained neural networks. According to some embodiments, a programmable platform that applies the neural networks in this respect may be applied for certain times in a day (e.g., daily hours) wherein database of stored connection weights is used to update a connected platform that applies the neural network or the recurrent neural network.

According to some embodiments, further methods are used to guarantee controllable predictive load balancing under dynamic development of traffic that may not enable to apply effective convergence towards load balance and which one of them is the mentioned method associated with dynamic increase or decrease in concentration of controlled trips on a network.

In this respect, the concentration of traffic is associated with diluting non-preferred links on the network which may result in non-obedience to paths of path-controlled trips on the load balanced part of the network due to a claim that freedom degrees on the network are not exploited.

A solution to such an issue may be associated with upgrading the incentive to use path controlled trips due to privileges, such as free of charge toll or toll discount, which is first applied for the entire network and maximize usage of path controlled trips, and further enabling to apply negative incentive associated with usage of non-preferred links on the network. In this respect free of charge toll or toll discount will not be provided on said non preferred links on the network.

According to some embodiments, said negative incentive associated with non-preferred links excludes path controlled trips that their destination is a non-preferred link.

According to some embodiments, an indication that a link is used as a destination may be a stoppage criterion according to which a trip has to stop for a minimum time interval while arriving its destination before it can be served again towards a new destination. This may be applied by tracking the trip details (preferably by in-vehicle privacy preserving privileged tolling functionalities) and determining accordingly, by for example a vehicular toll charging unit functionality whether a stoppage for a pre-determined time is fulfilled before a new service for a path-controlled trip is performed.

Concentration of traffic by diverting the traffic towards a preferred part of the network, or vice-versa under deconcentrating traffic, comprise according to some embodiments hidden process that is associated planning of paths.

In this respect, as briefly mentioned above, discouraging usage of non-preferred links is associated according to some embodiments with synthetic increase of travel time costs to non-preferred links by a value that is higher than the real travel time costs, aimed at enabling to dilute traffic on non-preferred links by path planning processes associated with coordination control process.

Under de-concentration of traffic on the network non preferred links are converted into preferred links wherein their travel time cost return to real travel time costs, preferably gradually, wherein gradual change in the cost may enable to moderate entry to such links in order to prevent potential traffic overloads during re-distribution of the traffic.

Stabilization of load balance may according to some embodiment comprise disallowance of changes in planned paths for small improvement in travel time costs, which may enable to prevent nonproductive or interfering planning of paths that may lengthen convergence to load balance that in either overloads the computation resources along convergence towards load balance, or create a need for non-justified computation resources for marginal potential benefits.

According to some embodiments, discrete travel time costs are used with such approach to create respective threshold of time dependent travel time costs for current and predicted travel time costs, according to C-DTS traffic predictions.

According to some embodiments, a complementary method to a method which prevents frequent and non-sufficiently stable changes in path assignments, by said discrete changes in travel time costs, is applied by assigning a planned alternative path to a path controlled trip under a path assignment criterion, preferably an adaptable criterion according to traffic conditions, which require that some minimum potential reduction in travel time of a trip (improvement of a path assigned to a trip) may be anticipated to be obtained by the alternative path in order to justify a modification to an assigned path associated with a path controlled trip.

In this respect, an assigning criterion for making a modification to a path according to alternative path may differ from a criterion to apply discrete levels for travel times, and/or usage of further described coordination control processes, in order to prevent too frequent path calculations.

Consideration that may have to be further taken into account with making modification to an assigned path may include, inter-alia, reaction time to a modification by human driver or by an autonomously driven vehicle, and/or human reaction to frequent changes to paths, as well as sufficient sensitivity of path assignment to generate traffic flow improvement on the network which should sufficiently satisfy both, users of coordinating path controlled trips and authorities that may be expected to be involved in such approach.

Without limitation to include more aspects, coordination control processes applying load balancing, under real time conditions, are expected to be performed daily on a continuous base (from early hours in the morning until late hours at the evening) with the aim to enable convergence towards affordable load balance for affordable part of the network under given computation resources and affordable non discriminating distribution of path controlled trips on the affordable part of the network under given traffic potential freedom degrees on the network and traffic control constraints.

Therefore, coordination of path-controlled trips, for substantial recurrent demand and traffic, may be designed to maintain load balancing without significant limitations. However, under irregularities in the traffic or in the demand, the load balancing might face instability issues and slow convergence toward load balance. Such issues may include said oscillations in path planning due to competition of agents on alternative paths and propagation of oscillations to some other or additional links on the network.

The negative effects of such issues, either with respect to transition from one traffic concentration level to another or not, may be reduced, according to some embodiments, by upgrading said methods according to which sufficient level of pre-planned controlled policies (under further generalization that deep learning may provide) may support recovery from imbalance traffic on the network.

An upgraded may comprise control policies for applying transition of traffic to a higher concentration level from a lower concentration level and vice-versa.

Such control policies may determine, inter-alia, control steps associated with transition between successive iterations and/or paths according to current and predicted zones to zone and/or link to link related position to destination pairs pf trips, as well as possibly synthetic time dependent travel time costs associate with links which enable accelerating convergence towards load balance on a respective part of a network.

In this respect, according to some embodiments, said historical synthetic time dependent travel time costs on links, may temporarily substitute real travel time costs and/or predicted travel time costs for path calculations associated with the transition towards desirable balanced traffic on the respective part of the network. This may further enable control on planning of paths that under iterative coordination control processes enable convergence towards load balance using control steps (associated with a re-planning phase that may also refer to a cycle/iteration), preferably applied with the aim to minimize the level of control steps as long as load balancing may be maintained. Such minimization may enable to minimize discrimination among trips and maintaining progressively predictive control on traffic load balancing under traffic that is characterized by non-linear time varying development. In practice the minimization is compromised for the ability to maintain predictive control on the traffic load balancing. In this respect, usage of too large control steps, at a level that is beyond the need to compromise for maintaining control on traffic load balancing under real time constraints, may negatively affect convergence towards load balance on a road network, and which control steps may be associated with the respective pre-planned control policies according to the dynamins of the load balancing and the dynamics in the traffic.

Control steps that are associated with re-planning phases of coordination control processes are aimed at moderating predictive traffic load balancing, under progressive distribution of paths of path controlled trips, by moderating the distribution wherein progressive control, by limited control steps, makes limited changes to planned paths at each re-planning phase, and wherein a plurality of iterative planning of paths for path controlled trips, by re-planning phases, are used with an attempt to progressively mitigate, with increasing resolution, current and predicted traffic loads from links that are suspected to be relatively loaded using aa planning phase that is followed by feedback on a planning from C-DTS simulation that is fed by paths comprising changed paths according to the planning. Progressive mitigation of relatively loaded links uses typically a plurality of re-planning phases while indirectly coordinating path-controlled trips, wherein, according to some embodiments, a phase of said re-planning phases comprising:

Searching for potential alternative paths to assigned paths associated with on-network and predicted path-controlled trips which are being, or predicted to be, associated with at least one relatively loaded link, wherein searches are performed independently, and wherein each search uses a shortest path algorithm applied according to predicted travel time costs on network links, i.e., according to time dependent travel time costs determined according to simulation results produced according to C-DTS associated with a verification stage of a prior re-planning phase (a stage that is further describes in relation to the currently described re-planning phase), while said searches exclude predicted relatively loaded links determined by simulation performed with C-DTS in the verification stage of said prior re-planning phase (hereinafter said searching related processes, associated with a re-planning phase, may refer to a searching stage);

accepting, for a further C-DTS verification stage (a stage that is further described), a potential alternative path that was found according to said search according to two criteria, i.e., if the travel time the pre-verified potential alternative path has gained potential travel time improvement over travel time of the assigned path associated with the respective path controlled trip and if the travel time of the potential alternative path is not exceeding an acceptance travel time limit (ATTL), wherein an ATTL is composed, according to some embodiments, of travel time related to the assigned path (associated with the path controlled trip) plus a travel time limiting threshold (control step that may refer to TTLT), determined for the current re-planning phase, and wherein the condition for said pre-verified acceptance, in current re-planning phase, is that pre-verified acceptance of respective alternative paths in prior re-planning phases, up to the recent prior re-planning phase, were found to be applicable while the verification of such paths (a stage that is further described) was failed, and wherein, according to some embodiments, at each said stage of failure, associated with a prior re-planning phase, the sum of TTLTs that were determined for prior re-planning phases are used to determine the current TTLT according to which the TTLT for a current re-planning phase is determined as the sum of prior TTLTs determined for said prior re-planning phases that their potential alternative paths were not verified by a verification stage (as stage that as mentioned above is further described), and wherein a determined TTLT for a re-planning phase, which is added to the travel time of the assigned path, is aimed at enabling a new attempt to increase the distribution of paths on the network in order to mitigate relatively loaded links (links that yet are not being sufficiently mitigated); wherein, according to some embodiments, potential alternative paths that were not verified in a re-planning phase, preferably such paths that are associated with recent prior re-planning phase, are stored for further use in a further re-planning phase as pending alternative paths, preferably said usage is performed in the subsequent re-planning phase, and wherein, according to some embodiments, the TTLT, is added preferably to the recent pending alternative (according to ATTL) and its determination (for a re-planning phase) is preferably performed independent of the absolute values of TTLTs determined for prior re-planning phases that their potential alternative paths were not verified by a verification stage (the stage that is further described), and wherein a TTLT determined for a re-planning phase is aimed at enabling an attempt to increase the distribution of paths on the network in order to mitigate relatively loaded links (links that their current and/or predicted traffic cause imbalance on the network and yet are not sufficiently being mitigated) by adding TTLT determined for a re-planning phase to recent pending alternative path that results from the recent re-planning phase (hereinafter said acceptance related processes, associated with a re-planning phase, may refer to an acceptance stage);

verifying applicability of said pre-verified accepted potential alternative paths by performing C-DTS prediction that is fed by on-network and predicted trips, comprising on-network and predicted path-controlled trips that their pre-verified potential alternative paths were accepted in the acceptance stage of the current re-planning phase, and further determining verified acceptance of a pre-verified path by using a post process that determines corrected verified travel time for pre-verified accepted potential alternative paths, according to predicted travel time produced by the C-DTS prediction, and by using a further post process that determines if a corrected travel time still maintains acceptance criteria used with said pre-verified acceptance stage, i.e., said ATTL criterion and said potential travel time improvement criterion (hereinafter said verification related processes, associated with a re-planning phase, may refer to a verification stage);

updating predicted travel times, determined by the verification stage, for a further usage by a searching stage associated with a further re-planning phase, e.g., by saving in memory (or storage) the predicted travel times, and further updating assigned paths for a further searching stage associated with a further re-planning phase, by substituting assigned paths with verified alternative paths for respective path controlled trips (as part of path update to a vehicle), wherein acceptable assignment is subject to criteria that may comprise a criterion of applicability of taking a required turn by a respective on road vehicle on time, and wherein said substitution determines the verified alternative path as a new assigned path for a further searching stage, associated with a further re-planning phase, whereas a non-acceptable assignment leaves the current assigned path without a change for a further searching stage associated with a further re-planning phase (hereinafter the updating related processes, associated with a re-planning phase, may refer to an update stage).

According to some embodiments, on-line calibration of C-DTS is performed once in a plurality of re-planning phases wherein the calibration is maintained unchanged along a plurality of re-planning phases, while actual travel times on links are dynamically changing, and wherein such on-line calibration approach is preferably used with acceptably small changes in actual travel times in which case potential noise in actual travel times are filtered out providing consistency in mitigation of relatively loaded links along a plurality of re-planning phase.

According to some embodiments, under consistent increase in mitigation of relatively loaded links, said travel time limiting threshold at each re-planning phase increases the distribution of trips on the network (applicable e.g., with correlated mitigating path-controlled trips on the network).

According to some embodiments, said relative-loaded-links, suspected to contribute to imbalanced traffic on a road network (according to C-DTS simulation of current and predicted volume to capacity ratios on links) are prioritized relatively-loaded-links determined as a subset of the highest current and predicted time related relatively-loaded-links determined according to C-DTS simulation for a predicted horizon, and wherein, under non-sufficiently effective mitigation of one or more prioritized relatively loaded links or under a failure to mitigate one or more prioritized relatively loaded links, along a plurality of re-planning phases, the priority of such links is reduced (an example of a situation of reduced priority is while a loaded link such as a bridge shows ineffective mitigation due to lack of acceptable alternative).

According to some embodiments, a time lag is associated with reference to a prior re-planning phase i.e., referring to a prior re-planning phase that lags more than one re-planning phase behind the current re-planning phase.

According to some embodiments, a plurality acceptance and verification stages, are applied subsequently to a search stage within a re-planning phase (hereinafter performed subsequent acceptance and verification stages, out of a plurality of such stages, may further refer to the term AVS and a plurality of AVS may refer to PAVS) using with each AVS a different TTLT (a TTLT may refer hereinafter and above to a control step of a re-planning phase), while the AVS that provides the highest travel time saving (e.g., by providing the minimum travel time of trips on the network according to C-DTS applied in the verification stage and/or by providing the highest number of alternative paths that mitigates relatively loaded links and/or providing the minimum travel time saving of mitigating paths associated retrospectively with the favorable TTLT) is preferably chosen as the favorable result to determine verified accepted paths for mitigation of relatively loaded links in the re-planning phase while providing further predicted travel times for further re-planning phase, whereas, the non-verified paths are preferably further determined as pending potential alternative paths that inter-alia may passively accepted under a further re-planning phase as a result of mitigation of relatively loaded links by actively and passively accepted and verified potential alternative paths (active mitigation is e.g., a result of applying mitigating alternative paths according chosen favorable AVS out of a plurality of AVS along a plurality of re-planning phases), and wherein a plurality of AVS may be performed sequentially, implemented as sub-phases of a re-planning phase, or as parallel processes implemented as a single sub-phase in a re-planning phase, or as a combination of parallel and sequential implementation wherein e.g., each branch of the parallel implementation performs a plurality of AVS performing a plurality of sub-phases of a re-planning phase while the applicability of such branches is preferably maintained under limitation in computation resources while a pure parallel implementation may not be affordable.

According to some embodiments, under implementation of said AVS related processes, according to which a plurality of AVS associated with different control steps (TTLTs) are used with a re-planning phase (in parallel and/or in serial implementation), optimization of a re-planning phase by a plurality of AVS may preferably consider that too small or too large levels of TTLTs (control steps), associated with AVS, should result with non-optimal mitigation of relatively loaded links (wherein too small levels TTLTs miss the potential freedom on the network to mitigate relatively loaded links while too large levels overloads the freedom degrees and hence may not effectively perform mitigation of relatively loaded links), therefore, optimization of a re-planning phase is applied according to some embodiments by performing a plurality of AVS used with different TTLT levels (which may refer hereinafter to TTLTs) enabling to determine the favorable result associated with a favorable AVS, out of a plurality of AVS, wherein the favorable result is determined according to e.g., the highest number of alternative paths (mitigating paths) that mitigates relatively loaded links (verified alternative paths) and/or the maximum travel time saving of mitigating paths and/or the maximum travel time saving of trips on the network, associated retrospectively with the favorable control step (TTLT), produced by a respective AVS out of the plurality of AVS (associated with different TTLTs) supported by C-DTS simulation runs performed with their varication stages.

According to some embodiments, under said implementation of a plurality of AVS, the range of values of control steps (TTLTs) used with different AVSs in a re-planning phase is determined with an attempt to trap with a range of TTLTs for said optimal mitigation of relatively loaded links while the trap range is gradually optimized by progressively concentrating on a more effective range of TTLTs along consecutive re-planning phases, and, in this respect, as long as the mitigation of relatively loaded links increases along the consecutive re-planning phases a decrease in the trap range is preferably determined around the latest favorable TTLT found in a previous re-planning phase, e.g., providing said favorable result from mitigation of relatively loaded links with respect to e.g., the TTLT that yields the highest number of mitigating paths and/or the highest aggregated travel time saving of trips associated with mitigating paths (mitigating relatively loaded links) and/or the highest aggregated travel time saving of trips on the network (which said criteria are correlated); whereas, according to some embodiments, an increase in the trap range is performed while imbalance on the network increases and/or while a reduced range of TTLTs (trap range) became too small for available computation resources.

According to some embodiments, the control step (TTLT) associated with AVS is preferably determined to have a sufficiently small value enabling acceptable minimization of potential travel time discrimination among accepted potential alternative paths; whereas, according to some embodiments, the control step (TTLT) is determined to provide a compromise between a need to preferably maintain sufficiently small level of TTLTs, which may enable said minimization of potential travel time discrimination among accepted potential alternative paths (minimization of discrimination among trips having similar position and destination pairs and being associated with the same relatively loaded links) and a need to cope with significant imbalances requiring to compromise on discrimination wherein fairness in planning paths is a prime objective while real time constraints on load balancing may allow it.

According to some embodiments, a detected increase in imbalance on the network (e.g., determined according to C-DTS associated with the favorable AVS), increases said compromise on minimization of discrimination among trips having similar conditions, and vice versa, as well as increases respective range of TTLTs associated with plurality of AVS in a re-planning phase wherein, according to some embodiments, the detection of incense or decrease in imbalance of traffic on the network is performed according to the trend in aggregated travel time of trips or according to aggregated travel time savings of trips in consecutive re-planning phases determined according to C-DTS simulated data in the verification stage of the favorable AVS associated with each re-planning phase, whereas, according to some embodiments, detection of imbalance is performed according to the trend in respective mitigation of paths associated with current and/or predicted relatively loaded links making the compromise more local related to potential correlated alternative paths associated with mitigating relatively loaded links;

According to some embodiments, a TTLT used with AVS is determined as an absolute value, or as a relative value in relation to a respective pre-verified path travel time (i.e., as percentage of pre-verified path travel time value) that was failed to be accepted in a verification stage of a prior re-planning phase (determined according to traffic prediction applied by the verification stage of the favorable AVS in a prior respective re-planning phase);

According to some embodiments, said time limiting threshold is determined as a relative value in relation to the average pre-verified paths of preferably the favorable AVS that failed to be verified in prior re-planning phase, or, according to some embodiments, as a relative value in relation to the smallest pre-verified path travel time that was failed to be verified in prior re-planning phase;

According to some embodiments, a simplified method to perform a plurality of AVS is applied by a Simplified Acceptance and Verification Stages (SAVS) using a simplified control step by a simplified TTLT (STTLT) criterion. Such a simplified method may apply re-planning phases while the relation between a re-planning phase and a prior one may not take benefit of considering control steps in relation to a prior re-planning phase or while the relation of a prior re-planning phase may have negative mitigation result. Negative results may refer to inconsistency (instability) in mitigation of relatively loaded links or to uncontrollability of mitigation under consideration of prior re-planning phases. In general, while the starting point of the mitigation is associated with early transition from acceptable balanced conditions on the network to imbalanced conditions, priority is provided to AVSs associated with TTLTs, whereas, under instability or uncontrollability of load balancing priority is provided to SAVSs associated with STTLTs.

According to such embodiments a simplified acceptance stage, applying a plurality of SAVS associated with a plurality of different STTLTs, determines different acceptance levels for pre-verified potential alternative paths that were determined by a searching stage of a re-planning phase, wherein an STTLT determines an upper-boundary for travel time savings by a potential alternative path (in comparison to the travel time of its respective assigned path, according to a respective searching stage), producing by a plurality of STTLTs, associated with a plurality of SAVS, a plurality of groups of pre-verified acceptance of potential alternative paths. In this respect, the tightest STTLT boundary (the most limiting boundary) that puts the highest limit on travel time saving on acceptance of a potential alternative path (in comparison to its respective assigned paths), produces the lowest number of potential alternative paths, whereas, the least tightening STTLT (putting the lowest STTLT boundary, allowing acceptance of pre-verified potential alternative paths having the highest allowed level of travel time savings in comparison to respective assigned paths) has the potential to produce the highest number of pre-verified potential alternative paths than the other groups (having a more tightening STTLT boundary).

According to some embodiments, a simplified verification stage that is associated with said plurality of SAVS in a re-planning phase, applies, with the support of C-DTS, verification to pre-verified potential alternative paths associated with each of said groups according to said simplified acceptance stage, wherein the verification stage determines whether the pre-verified potential alternative paths still maintain travel time saving (in comparison to the travel time of respective assigned paths) under respective boundaries determined by said STTLTs in said simplified acceptance stage. In this respect the STTLTs that has determined groups of pre-verified potential alterative paths are reused with the simplified verification stage enabling to filter out pre-verified potential alternative paths that after C-DTS simulation may not path the respective STTLTs criteria. The C_DTS is fed by on-network and predicted path-controlled trips comprising pre-verified potential alternative paths associated with one of said groups, then, according to the simulated travel time of verified potential alternative paths, said compliance is determined. According to some embodiments, the C-DTS based simulation is performed for a limited time horizon associated with a rolling horizon.

According to some embodiments, said STTLT boundaries, associate with respective said plurality of SAVS, may have tolerated boundaries in a simplified verification stage in comparison to a respective simplified acceptance stage.

According to some embodiments, said TTLT, associate with respective said plurality of AVS, may have tolerated levels in said verification stage in comparison to a respective said acceptance stage.

According to some embodiments, accept of the special handling of STTLT and SAVS in comparison to said TTLT and said AVS, all other processes described hereinafter and above, in relation to a re-planning phase, may be applicable with implementation of said plurality of SAVS. Hereinafter and above, a re-planning phase may refer to as an iteration associated with referred coordination control processes that are further referred to in described embodiments associated with traffic load balancing. According to some embodiments, under further specified description of coordination control processes, said re-planning phase may complement, or provides full or partial substitution to, relevant processes of specifically described iteration associated with coordination control processes. In this respect, common terms associated with functionalities such as the term travel time limiting threshold having according to different embodiment different variants, sus as the TTLT and the STTLT described above, may in general refer also to terms such as threshold, travel time limiting criterion and travel time limiting threshold criterion that are mentioned hereinafter and above in relation to different relation to coordination control process and/or its related processes.

According to some embodiments, as mentioned above, respective policies, enabling to guide required changes in concentration of controlled trips on the network, are inferred from e.g., a trained deep neural network or e.g., a trained recurrent neural network which associate traffic patterns with traffic concentration policies according to sampled traffic patterns from C-DTS, applied on-line with coordination control processes. Such approach is further elaborated with some further described embodiments. According to some embodiments, hierarchical load balancing is applied by gradual coordination control processes on a certain part of network links which is associated with determination of said load balancing priority layer content, using a load balancing priority layer update process, wherein the determination is applied according to traffic flow imbalance level on a network and wherein available computation power to apply load balancing affects the required level of hierarchical traffic load balancing.

A disadvantage associated with gradual (hierarchical) traffic load balancing, which is a requirement under non-sufficient computation resources to maintain load balancing, is that it slows down the convergence toward optimal traffic load balance while gaining short term benefit in improving the network traffic. In this respect, availability of sufficient computation power for load balancing which may guarantee faster and tighter convergence to network load balance should preferably be applied under applicable constraints.

However even with increased computation power it may be expected that the hierarchical load balancing would be a valuable approach to guarantee controllable load balancing. In this respect, under non-sufficient computation resources, gradual load balancing for a certain part of the network may apply prioritized relatively loaded links to be updated dynamically in a load balancing priority layer. According to some embodiments, the content of a load balancing priority layer is preferably determined according to current and predicted distribution of traffic volume to capacity ratios on links, and preferably related to time dependent ratios in acceptable forward time intervals along a finite time horizon within a rolling horizon.

In some embodiments, a finite time horizon may be divided into linear time intervals for determination of time dependent relatively loaded links and respectively associated with a load balancing priority layer. According to some other embodiments a finite time horizon may be divided into non-linear time intervals, wherein short term time intervals within the time horizon may be differentiated according to short time intervals in comparison to longer term time intervals in the time horizon, which longer term time intervals may be differentiated for the same level of confidence in prediction as the short term intervals.

According to some embodiments, differentiation among time intervals within a predicted finite time horizon is performed by a differentiation process which determines the number of the time intervals within the time horizon, and preferably the non-linearity of the differentiation as well. According to some embodiments, the differentiation process may determine the number and the non-linear differentiation of time intervals according to the dynamics of traffic in the prediction time horizon, wherein, lower dynamics may be satisfied by smaller number of time intervals in comparison to higher number which may preferably satisfy higher traffic dynamics.

Relatively loaded links, determined by the load balancing priority layer update process and updated in the load balancing priority layer for load balancing on a determined part of a network (possibly associated with concentration of controlled trips on a certain part and or type of network links), may according to some embodiments be identified dynamically according to dynamic changes in tracked predictions of traffic volume to capacity ratios on links, during coordination control processes.

Prioritized relatively loaded links in a load balancing priority layer may enable to shorten the short-term convergence rate of coordination control processes (towards sub-optimal load balance) for a cost which lengthen the convergence time toward optimal traffic load balance.

Such a compromise may be considered with coordination control processes when it is detected that the convergence towards optimal load balance is too long under real time constraints, that is, there is no ability to apply sufficient number of coordination cycles (iterations) under real time constraints to apply predictive traffic load balancing under a reasonable length of a controlled time horizon.

Convergence can be shortened by increasing the limitation on relatively loaded links to be included in a load balancing priority layer, wherein the convergence rate should preferably be gradually adapted to minimize the limit on inclusion of relatively loaded links in the load balancing priority layer under given computation resources.

According to some embodiments, the content of relatively loaded links in the load balancing priority layer is dynamic with respect to the lower limiting bound criteria to include relatively loaded links.

According to some embodiments, evaluation of a need to stop lowering the current lower bound limiting criteria may include, further to detection of minimum aggregated travel times of simulated trips, a process to identify reduction in the difference between expected load on links which were determined as relatively loaded links for the content of load balancing priority layer and links that were not included in the layer, due its lower bound criteria, but are starting to show similar link loads due to the load balancing.

Load balancing applying coordination control processes by load balancing control processes, which are aimed at distributing path-controlled trips on a network, may be categorized as model predictive control, or more concretely model predictive path control, aimed to converge towards substantial load balance on the network.

Coordination control processes, as mentioned above, preferably apply control cycles (iterations of re-planning phases) with the planning of paths for path-controlled trips. Control cycles may according to some embodiments be distinguished from iterations under temporal non-updated (on-line calibrated) C-DTS, wherein a cycle in this respect is C-DTS on-line calibration cycle and the planning and coordination process applies multiple iteration under a cycle.

The coordination control processes which are aimed at planning predictive coordinated sets of paths for said coordinating path controlled trips, preferably maintain a-priori acceptable level of non-discriminating (fair) paths for path controlled trips preferably under a limit that an alternative path to an assigned path will not be expected to be a less preferred path.

Coordination control processes are applying in this respect load balancing which uses with each iteration planning (e.g., said re-planning phases) of paths according to feedback from a C-DTS that was fed by prior planned (re-planned) paths that were limited by the prior iteration to apply a moderated change to the developed traffic on the network.

The feedback which determines time dependent traffic volumes to capacity ratios on network links, and respectively time dependent travel times, may support further the gradual coordination of path-controlled trips, wherein gradual coordination in this respect may apply said prioritized dynamic determination of highest priority relatively loaded links in a load balancing priority layer.

From a point of view of a driver or an autonomous vehicle, non-discriminating coordination control processes, under said gradual or non-gradual coordination, preferably include, as much as possible, allowance for simultaneous or substantially simultaneous independent attempts to improve travel times as a result of dynamically developing freedom degrees on the network.

Such attempts are preferably based, at first, on the potential of coordination control processes to simultaneously take benefit from developing freedom degrees on the network for path controlled trips, and then, applying an iterative processes to mitigate potential traffic overloads that might be generated by simultaneous attempts to improve travel times within a re-planning phase, that is, to mitigate potential traffic overloads from suspected relatively loaded links which diverts the traffic from load balance or leaves imbalanced traffic on the network, due to said simultaneous independent attempts to improve travel times by a re-planning phase, wherein iterative mitigation processes by re-planning phases preferably apply simultaneous gradual mitigation attempts to accelerate potential mitigation of traffic overloads on links (reduce imbalanced traffic conditions on the network).

Mitigation of traffic overloads on potential relatively loaded links is required when a failure of said attempts to improve travel times for path controlled trips, according to developing freedom degrees on the network along the controlled time horizon is detected, for example, by traffic prediction that is based on a C-DTS prediction which is fed by control paths associated with the attempts to improve travel times.

In this respect, according to some embodiments, the determination of suspected relatively loaded links may be performed under an iteration of a cycle of coordination control processes by a comparison between:

a. time dependent traffic volumes to capacity ratios on network links along the predicted time horizon, which is determined by a C-DTS based traffic prediction fed by paths which include:
    1. current and predicted assigned paths associated with path-controlled trips, which are not associated with non-mitigated pending paths. As further elaborated a non-mitigated path is actually a "non-mitigating path", from a point of view of its lack to contribute to mitigation of traffic volume overloads on a link, while may still being associated with the link under mitigation of its suspected overload, whereas, from the point of view of the path the term "non mitigated path" may refer to non-mitigated travel time cost associated with the path under said mitigation of traffic overloads;
    2. non-mitigated pending paths to relatively loaded links, which may further refer to non-mitigating paths, associated with path controlled trips providing pending potential alternative paths or with pending potential alternatives (accepted paths in a re-planning phase, before C-DTS verification, that failed to be confirmed as applicable alternative according to C-DTS based verification) which are subject to be substituted by new alternatives to current or predicted assigned paths to path controlled trips, under mitigation of traffic overloads on suspected overloaded links, and which non-mitigating pending paths (NMPP) may be generated due to too many independent simultaneous attempts to improve travel times for current and predicted assigned paths to current and predicted path controlled trips by simultaneous searches for shortest paths according to potential reduction in time dependent travel time costs (developed by freedom degrees or relatively freedom degrees on the network), and as a result of the evaluation of the effect of the simultaneous attempts on travel time costs (along the controlled time horizon associated with current cycle by a synthesis of C-DTS traffic prediction fed by current and predicted paths associated with said simultaneous attempts and further by other current and predicted paths on the network which may include but not be limited to: current and predicted paths associated with path controlled trips for which said attempts were not performed, current and predicted route choice model based trips, current and predicted non coordinating path controlled trips); such paths may became a potential cause for relatively loaded links on the network, that is, paths which failed to provide acceptable alternative to assigned paths associated with path controlled trips and determined in terms of potential mitigation as non-mitigated pending paths, and which such paths, with respect to prior mitigating iteration(s), are paths that failed to be passively mitigated (accepted as an alternative to path associated with respective path controlled trip) by prior iteration(s) of mitigation (due to active mitigation which may convert other non-mitigated pending paths to new acceptable alternatives and which such alternatives have in common with the passively non mitigated pending paths relatively loaded links) or failed to be actively mitigated by prior iteration(s) of mitigation which may convert non-mitigated pending paths to new acceptable alternatives during prior iteration(s) of mitigation;
    3. current and predicted non path-controlled trips, which are applicable to trips which have non flexible routes, and according to some embodiment if the traffic on the network include route-choice-model based trips;
    4. current and predicted non coordinating path controlled trips, which according to some embodiments are applicable with an early stage of deployment of path controlled trips in which the coordination control processes require some learning process, while path controlled trips are applied gradually, and in which case non coordinating path control trips are assigned with typical route choice model based paths according to calibrated C-DTS performed prior to the deployment of path controlled trips;

and b. reference time dependent traffic volume to capacity ratios on links of the road network along predicted time horizon, which are determined by C-DTS based traffic prediction fed by paths which include:
    a. current and predicted assigned paths associated with path controlled trips which according to some embodiments include paths that are associated with mitigated paths (note: a mitigated path is actually a "mitigating path", from a point of view of its contribution to the mitigation of traffic volume overloads on a link, while not being further associated with the link under mitigation of suspected overload, whereas, from the point of view of the path the term "mitigated path" may refer to mitigated travel time cost of the path under said mitigation of traffic overloads) up to the current iteration in current cycle; whereas according to some other embodiments, path controlled trips which were associated with NMPP and their travel costs were mitigated during the current cycle, are not included but rather assigned paths and predicted paths assigned to path controlled trips before the mitigation (of traffic overloads) in the current cycle are included;
    b. current and predicted non path-controlled trips, which is applicable to trips that have non flexible routes, and according to some embodiment to route choice model related paths if the traffic on the network includes route choice model based controlled trips;
    c. current and predicted non coordinating path controlled trips, which case is applicable according to some embodiments to an early stage of deployment of path controlled trips in which the coordination control processes require some learning process while the share of path controlled trips is applied gradually, and in which case non coordinating path control trips are assigned with typical route choice model based paths according calibrated C-DTS performed prior to the deployment of path controlled trips;

wherein, according to the comparison, links on which time dependent differences of traffic volume to capacity ratios are found to be above the reference ratios, along the prediction time horizon, may be determined as time dependent relatively loaded links.

Said mitigation of traffic overloads refer to predicted overloads that preferably should include control elements which enable to prohibit meaningful justification to raise a claim that the mitigation is a discrimination process (unfair) under controllable conditions applying predictive load balancing by the coordination control processes.

According to some embodiments, mitigation of potential relatively loaded links (i.e., predicted traffic volume overload mitigation from suspected or, still suspected, overloaded link which its predicted traffic volume load is relatively high in comparison to other links on the network as further elaborated) may be applied by gradual top-down controlled approach according to which potential relatively loaded links are gradually mitigated by making gradual changes to paths, wherein changed paths that are detected to fail improving travel times according to said simultaneous attempts to do so may become a potential cause to relatively other loaded links than the mitigated one.

According to some embodiments, mitigation of potential traffic loads for potential relatively loaded links comprise according to some embodiments regret to detected over-mitigation (reduction of in aggregated travel times due to reduction in load balance) wherein a potentially considered alternative to apply bottom-up approach, which fill traffic loads of over-mitigated links (along one or more iterations) has no clear starting point(s) for locating paths to redirect to relatively underloaded links. A said regret applies inverse mitigation to a smaller number of simultaneous attempts to improve load balance with the aim to decline the previous effect of traffic load mitigation on links and which the previous and its subsequent mitigation effect is evaluated by C-DTS based predictions fed by changed paths. It should be noted that said lack of clear starting point for locating paths to redirect to relatively underloaded links, under bottom-up approach, stands in contrast to clear starting point associated with top-down approach wherein relatively loaded links provide the starting point.

In this respect, under top-down approach associate with said regret stages to recover from over mitigation, relatively loaded links include paths that contribute to a link to become a relatively loaded link, wherein, according to some embodiments, some of the over loading paths may be redirected to reduce traffic loads on a link according to a travel time limiting criterion (referring further also to travel time limiting threshold that is further elaborated) associated with coordination control processes. Such a limiting criterion is associated with controlling iterative gradual selective acceptance of planned paths (nonselective parallel searched alternative paths to reduce overload from a relatively loaded link) by limiting the number of planned paths to be accepted at each iteration. As further elaborated, iterative coordination control processes, associated with a top down approach, maintain disclination in travel times on the network while load balancing the traffic flow on the road network on the one hand, while on the other hand minimizing potential discrimination among paths with respect to a need to minimize potential difference in travel times for different paths allocated to different trips having similar position and destination pairs.

The top-down approach, which is aimed at reducing traffic loads form a relatively loaded links, is associates with the travel time limiting criterion that is adaptive to predicted aggregative travel times on the network produced by C-DTS (applied with coordination control processes), wherein a regret applies return to prior conditions in prior iteration of mitigation of traffic loads while applying further a smaller said control step (hereinafter and above a control step may refer to said travel time limiting threshold).

Reduction in the level of a control step may be associated with adaptation of control steps to progress in traffic load balancing on the network, wherein the closer the load balancing to traffic balance conditions the smaller the control steps that should be used, and wherein said steps may be associated with more locally load balance control which means that a plurality of control steps might be used simultaneously on the network, and wherein a control step is applied according to said and further described acceptance of alternative path that were planned to be candidates to reduce traffic load(s) which refers to travel time limiting criterion/criteria (also referred to a term "threshold" with some further described embodiments).

According to some embodiments, gradual controlled mitigation of potential traffic overloads, preferably applying simultaneous mitigation attempts by re-planning paths to path-controlled trips under iterative re-planning phases associated with control steps, should preferably be adaptive to convergence rate while minimizing aggregated travel times on the network.

Convergence may be evaluated by said C-DTS traffic predictions according to controlled changes in paths that are fed to the C-DTS, wherein, a change to a path by an iteration (hereinafter and above an iteration may refer to a re-planning phase) is applied according to said control step that iteratively minimize the travel time of trips while load balancing the traffic on the network.

According to some embodiments, a top-down mitigation approach (TDMA) is associated with mitigating relatively loaded links by gradual mitigation of said prioritized relatively loaded links (PRLLs) according to which re-planning phases, associated with a plurality of AVS or a plurality of SAVS, are performed to mitigate determined PRLLs. As further elaborated, the parallel approach of implementing a plurality AVS or a plurality of SAVS (in which each of the branches of the parallel approach may comprise also sequential sub-phases as mentioned above) to mitigate PRLLs may refer according to some embodiments to further described PMBMB-IMA-MPC and PMBMB-IMA-DPCP performing with each of their batches of branches a re-planning phase (iteration in terms of PMBMB-IMA-MPC and PMBMB-IMA-DPCP) associated, according to some embodiments, with a plurality of AVS or a plurality of SAVS applying each a different control step (i.e., a different TTLT associated with AVS or a different STTLT associated with SAVS) from which the favorable AVS or the favorable SAVS is chosen to serve a further re-planning phase (iteration).

Hereinafter and above the term mitigation may refer to mitigation of one or more PRLLs that are mitigated by one or more mitigating paths and/or to one or more mitigating paths that mitigate one or more current and/or predicted PRLLs that were associated with the mitigating path before the mitigation.

TDMA associated with said re-planning phases preferably comprising, according to some embodiments, a few loops associated with mitigation and re-deamination of PRLLs wherein:

Under implementation of sub-phases associated with one or more AVS according to some embodiments, or one or more SAVS according to some other embodiments, a first loop (inner loop) in a re-planning phase applies said sub-phases with an aim to enable said optimization of the control step for mitigation of predicted PRLLs, wherein a plurality of sub-phases of a re-planning phase are performed as a combined parallel and sequential implementation, or as a sequential implementation, wherein a plurality of different control steps (affected by determined one or more TTLTs for one or more AVSs or by determined STTLTs for SAVSs according to respective embodiments), wherein according to respective embodiments AVSs or SAVSs are applied as independent processes performing a plurality of independent attempts to mitigate determined PRLLs wherein the AVS, or according to some embodiments the SAVS, that provides the favorable mitigation result is chosen to determine further predicted travel times for a subsequent re-planning phase according to the verification stage of the chosen AVS (favorable mitigating AVS), or the simplified verification stage of the chosen SAVS (favorable mitigating SAVS), and wherein, the favorable mitigating AVS, or the favorable mitigating SAVS, is determined according to respective embodiments described above while referring to the favorable mitigating AVS or the favorable SAVS according to its maximum contribution to mitigation of PRLLs and/or to its maximum contribution to travel time saving on the network. According to some embodiments said contribution is determined according to predicted travel time on links simulated by a C-DTS (fed by on network and predicted path controlled trips, comprising pre-verified alternative paths associated with an AVS (or with an SAVS according to some embodiments) that is associated with a verification stage (or with a simplified verification stage associated with SAVS), wherein the predicted travel times are used using further by a post process determining the predicted travel times of simulated pre-verified alternative paths (according to the C-DTS predicted travel times), and by a further post process that verifies acceptance of simulated alternative paths if a simulated alternative path is founds to comply with boundaries affected by TTLT or by STTLT used according to respective embodiments describing the usage of TTLTs and STTLTs in relation to complementary aspects.

According to some embodiment, said inner loop may be applied alternatively by reduced level of sequential process wherein a reduced level of a sequential process may be applied by implementing further described PMBMB-IMA-MPC and PMBMB-IMA-DPCP, and wherein the batch associated with PMBMB-IMA-MPC and PMBMB-IMA-DPCP applies sequential process of a plurality of AVS (or a plurality of SAVS) while the combined batched and branches of PMBMB-IMA-MPC and PMBMB-IMA-DPCP implement a combination of said parallel and serial AVSs (or SAVSs) and while the implementation of batches in PMBMB-IMA-MPC and PMBMB-IMA-DPCP is optional if AVSs (or SAVSs) may applicably be applied by a parallel implementation. According to some embodiments, a searching stage and the updating stage is common to the AVSs (or SAVSs) applied by PMBMB-IMA-MPC and PMBMB-IMA-DPCP.

A second loop is associated with transitions from one re-planning phase to a subsequent one, wherein the gradient of the aggregated travel time along two or more re-planning phases determines the level of the control steps (TTLT or STTLT) and the range of control steps (range of a plurality of AVS or a range of a plurality of SAVS) along consecutive re-planning phases. According to some embodiments an increase in the mitigation of PRLLs that are not yet mitigated is associated with decreasing the control step and the range of the control steps (while preferably leaving the number of control steps in a range of control steps). According to some embodiments a decrease in the mitigation of PRLLs that are not yet mitigated is associated with increasing the control step and the range of the control steps (while preferably leaving the number of control steps in a range of control steps). Said control on control steps may preferably relate to interdependent mitigating paths wherein non interrelated mitigating paths may preferably have independent control on control steps. Nonetheless, partially interrelated mitigating paths have interrelated control on control steps while the level of interrelation determines the level of interrelated control on control steps and on the range of control steps. For example, the relative interrelation may be determined according to a scale of percentage of interrelated effect of mitigation.

According to some embodiments the history of controlled steps along two or more re-planning phases guides the level of increase in the control step, for example, non-linear change in mitigation may be associated with a nonlinear change in control steps whereas nonlinear negative response of mitigation to a linear change in control steps may be associated with declination in control steps to moderate the nonlinear negative response. an exemption according to which the level of the control step is declined.

Said second loop preferably comprises, according to some embodiments, a monitoring process to determine whether there is a need to redetermine PRLLs. In this respect, detection by the monitoring process a sufficient level of mitigation of one or more PRLLs (preferably a level below exhaustive mitigation), performed e.g., by a PRLL redetermination process, cause a decrease in the lower boundary of traffic-volume to a capacity ratio (V/C) enabling an increase in the number of PRLLs for applying further attempts to mitigate traffic overloads from PRLLs. Nonetheless, with such approach the effectivity of the mitigation depends on putting efforts on mitigating traffic loads from PRLLs that have sufficient associated trips with potential alternatives. However, said potential is not known before failure of mitigation or marginal mitigation is detected by attempts to search for alternative paths. Therefore, a process that redetermines said lower boundary to increase the number of PRLL, under sufficient mitigation, or otherwise redetermines said boundary to decrease the number of PRLL, under lack to apply controllable mitigation, preferably reduces the priority of a relatively loaded links from being associated with currently determined PRLLs. In this respect, reduced level of a PRLL is not due to the V/C level of a link but rather due its low contribution to load balancing (if any potential exists). The level of reduction in priority of a relatively loaded link to be associated with PRLLs, according to its contribution to current mitigation, can't be optimized up-front, therefore, according to some embodiments, reduction in priority due to low potential contribution to load balancing may comprise frequent repetitions if the reduction in priority is applied by small levels (e.g., reducing the V/C ratio of a link artificially, in comparison to its real V/C ratio, for a determination of PRLLs according to V/C ratio). This may lead to a more effective usage of computation resources while letting the highest priority of relatively loaded links, which contribute to imbalanced traffic on a network, to be mitigated to a level that provides other such links to become prioritized under similar V/C ratio and therefore join accordingly to a common redetermined PRLLs.

Such top-down mitigation approach refers hereinafter to conservative mitigation which may be less vulnerable to instability in comparison the a non conservative top-down mitigation approach which, according to some embodiments, may require to fill gradually predicted relatively under-loaded links.

From a point of view of applicability, top-down mitigation approach has the advantage of using the detected relatively loaded links as starting points to refer to with mitigation of relatively loaded links and changing related paths to alternative paths that may load balance the network. Such starting points may create new starting points, under hierarchical traffic load balancing.

The top-down approach is associated with a converging process that identifies convergence according to travel time limiting criterion/criteria (as further described) which may include identified convergence to minimum aggregated travel times of simulated trips in controlled time horizon.

When an iteration of top-down mitigation fails to improve travel time by an alternative path to an assigned path (of a path controlled trip), due to e.g., simultaneous attempt to improve travel times, such a failed path is saved wherein some of such paths may be replaced by a search for another acceptable alternative along a plurality of iterations, whereas some of them may eventually become passively acceptable alternatives to improve travel time along a plurality of iterations.

With said top-down mitigation approach, coordination control processes are applied to coordinate paths into a rolling predicted horizon with the aim to improve network traffic flow load balance on the network while gradually maximizing the flow on the controlled part of the network.

According to some embodiments, such coordination control related processes may preferably be applied in a centralized control system, in which each of the path controlled trips is preferably associated with a computerized agent which maintains its interest, wherein a plurality of agents associated with a plurality of calculation of paths for a path-controlled trip may serve path controlled trips with an objective to shorten travel times to destinations, and wherein each agent related process is informed by a common feedback about potential (simulation predicted) effects of simultaneous or substantial simultaneous attempts to improve travel time on the network in order to mitigate potential overloads.

The said feedback is preferably applied by simulation of a C-DTS traffic prediction which C-DTS is fed inter-alia by control related paths that apply potentially simultaneous attempts to improve travel times for path controlled trips which process may be a part of simultaneous attempts to mitigate potential predicted traffic overloads from relatively loaded links.

Hereinafter and above the term simultaneous, associated with for example calculation of paths (i.e., search for shortest path according to time related travel time costs) or with attempts to improve travel times or with search for paths, may refer either to simultaneous or substantial simultaneous calculation of paths or to attempts to improve travel times or to search for paths.

As mentioned briefly above uncertainty associated with the number of the acceptable simultaneous processes, motivated by individual interests, cause uncertainty in the effect of the traffic on the network, and under lack of efficient control said uncertainty may cause instability in convergence towards load balance (under condition of high usage of path controlled trips on the network).

It is worth noting that instability in planning of paths may not mandatorily cause instability in traffic development since assignment of non-stable paths might in some cases be resolved eventually on the network, without a need for special coordination during the traffic development.

However, at high level of usage of path-controlled trips and significant length of a controlled rolling horizon, such a possibility becomes more rare and coordination becomes mandatory.

In this respect, minimization or even prevention of unstable assignment of paths (which doesn't imply minimization in iterative planning of paths) may reduce or even prevent nonproductive communication traffic loads (associated with a centralized control on assigned paths) and further negative effects on human perception of non-stable guidance (e.g., drivers and passengers who might be, or are, aware of an instability of assigned paths).

With respect to potential instability in planning of paths, under allowance of simultaneous attempts to improve travel time of assigned paths and simultaneous reaction to mitigation of potential negative effects of said simultaneous attempt, the least worse case may result with some oscillations in assignments of paths whereas a worse case is dispersion of the instability on the network which prevents control on convergence towards load balance.

Therefore, according to some embodiments, said coordination of paths should preferably apply a method which predictively (proactively) mitigates potential instability (oscillations as well as propagation and/or dispersion of instabilities) and which method may enable to coordinate path controlled trips applying a sort of controlled user-optimal approach (i.e., preferably allowing simultaneous attempts to improve travel times and then mitigating potential overloads) and which method is further crucial to cope with a need to apply load balancing based on fairness for path controlled trips.

According to some embodiments, such predictive coordination, which might be limited by the potential rate to mitigate potential overloads on suspected relatively loaded links on a large network—due to the number and/or the level of the relative loads and/or due to the level of instability—under given computation resources, may apply gradual (hierarchical) coordination control processes as mentioned before. In this respect, potential relatively loaded links are identified according to controllable traffic prediction by C-DTS, and then such links may be updated in a load balancing priority layer (in a common database which is available, for example, to be accessed by said agents) providing prioritized feedback to path planning agents that accordingly apply distributed planning of paths which under the travel time limiting criterion apply convergence towards load balance under gradual (hierarchical) coordination applied by coordination control processes.

With respect to gradual coordination, which may contribute to an ability to cope with instability by such approach, is introduced with the following described method which may be associated with some embodiments. In this respect, instability in the relatively loaded links is handled, according to some embodiments, as part of gradual (hierarchical coordination control processes, by applying mitigation of traffic loads for prioritized relatively loaded links while forcing non-discriminating distribution of oscillating paths on the network, and, further freezing temporarily the distribution for a certain time which may enable to prevent further interference to mitigation of traffic loads on prioritized relatively loaded links. At the end of the freeze time, frozen paths are gradually released to search for alternative paths enabling refinements to the forced distribution under more converged traffic conditions towards load balance. The release may be applied gradually during the mitigation of traffic loads by the mitigating control processes.

In this respect, it should be taken into account that a strategy to obtain convergence towards high quality of load balance might take longer time than a strategy to obtain temporarily a lower level (sub-optimal) load balance by a shorter time convergence.

It worth noting that predicted instability in assignment of paths may not mandatorily be a cause instability in traffic development since instability in assignment of paths might eventually be settled without a need for special coordination in some cases during the traffic development, however, such a phenomena generates noise to the mitigation of traffic loads from relatively loaded links.

Links which may be determined as relatively loaded links (RLL) may be determined according to a comparison of the current traffic load to capacity ratios on network link with past trend of the traffic load to capacity ratios on the network.

This could be a reasonable approach under conditions that the load balancing processes are applied from early hours in the morning, in which free flow is expected on the network, and that the processes are sufficiently effective to maintain load balancing under real time constraints.

An ideal load balance may be a stage in which no attempt to improve travel time may be obtained while in reality this might not be the case due to continuous dynamic changes in predicted freedom degrees on the network which are affected by non-fully predictive demand and traffic development.

Hereinafter and above, reference to freedom degrees on the network refer further to predicted freedom degrees with respect to time dependent predicted demand and time dependent predicted traffic. In this respect coordination control processes apply predictive control processes as part of predictive load balancing control processes by predictive path control (PCCN control).

According to some embodiments, iterative process of coordination control processes mitigates relatively loaded links (mitigation of relatively loaded links refers herein after to mitigation of traffic load on a relatively loaded link) may but not be limited to further be associated with above and further described relevant processes.

According to some embodiments, processes, rules and access to data, associated with an iteration applying coordination control processes, for example, under said top-down mitigation, provide a skeleton for possible modifications or expansions to such processes, according to but not limited to relevant embodiments described hereinafter and above, and which such iteration may but not be limited to include according to some embodiments additional, all, or part of the following processes, rules and data, as long as the objective, under acceptable constraints, is to improve load balance of traffic on a road network.

An iteration associated with top-down mitigation is further associated with coordination control processes, wherein, according to some embodiments, the iteration applies said re-planning phase, or any alternative method that may fulfil its functionality to gradually distribute path controlled trips on the network to maintain predictive traffic load balancing on a city related road network Expansions or modifications to the described re-planning phase may further include but not be limited to comprise one or more of the following related embodiments:

According to some embodiments, on-line calibration of a C-DTS simulator, which may be applicably based on sufficient level of usage of incentivized path controlled trips enabling reliable traffic predictions without a need to simulate non path-controlled trips, is applied preferably periodically according to position and destination updates from path-controlled trips. A period of time, according to some embodiments may have fixed or varying time duration and may considered to be a part of coordination control processes and which said varying time duration may depend on the level of the dynamics in balance and imbalance in the traffic wherein the higher the dynamics of imbalance or instability the shorter is the period of time.

According to some embodiments, transition from one iteration to another (e.g., transition from one re-planning phase to a subsequent one), may be associated with a search for a path to be assigned to a new trip entry into the network, or a new predicted entry into the network, or a search for an alternative path to an assigned path which is not associated with relatively loaded links (or prioritized relatively loaded links in case that gradual coordination is applied according to the content of a load balancing priority layer), wherein such searches are performed according to some embodiments by shortest path search algorithm according to time dependent travel time costs while relatively loaded links (or prioritized relatively loaded links associated with the content of a load balancing priority layer in case that gradual coordination is applied) are excluded from the search with an exception that if the destination link is a relatively loaded link then such a link is not excluded. Said planning of paths applied by coordination control processes for predicted entries of controlled trips (generated according to demand model and prediction model associated with the C-DTS) are according to some embodiments used to assign paths to new entries of trips. Such assignments are applied under a constraint that the origins and the destinations of new entries are close enough to a time related predicted counterpart applicable origin to destination locations used with the predicted demand.

According to some embodiments, if highly applicable counterpart predicted trip is not found for a new entry then the gap may be bridges by guiding the trip to a close enough counterpart origin of predicted trip and if the gap is highly inapplicable then a time related travel time based shortest path is applied with assignment of a path to a new entry of path controlled trip.

Said re-planning associated with an iteration of coordination control processes applies with a potentially of iterations top-down mitigation of relative loaded links that tends to lead to traffic load balancing on at least part of a city road network.

Expansions to said coordination control processes may further comprise:

1. According to some embodiments, determination of instability in planning of paths along a plurality of iterations is applied according to recent historical records of paths associated with predicted relatively loaded links, wherein oscillations in paths indicate on instability
2. According to some embodiments, an expansion may further comprise prevention of said detected instability by forcing non-discriminating distribution of respective NMPP which are a cause for the instability, for example, a simple case may refer to oscillation between two alternative path associated with a plurality of paths with the same destination wherein the forced distributed applies substantially equal travel times between the alternatives, and which such paths may further be frozen for a certain time interval in order to prohibit further interference to the convergence of coordination control processes.

3. According to some embodiments, an expansion may further comprise a search for a path which may include personal preferences that put constraints on a shortest path search, wherein constraints may relate to, for example, behavior and preferences of drivers which may further include according to some embodiments a tradeoff between reaction to personal constraints and coordination of paths for most efficient traffic flow. In this respect, the network traffic flow might but not necessarily be reduced while personal considerations are taken into account. For example, hesitancy level of a driver may be taken into account as a personal constraint by choosing a path for a trip which minimizes, or possibly excludes, roads and intersections with assigned path to which hesitancy behavior may either affect negatively the travel time on the network or make the driving non sufficiently safe.
4. According to some embodiments, an expansion may further comprise associating safety related constraints on planning of paths, which a need for such constraints may be detected by an in vehicle process that tracks behavior of drivers, for example a black box which serves insurers that may determine hesitance or aggressive level of a driver, and/or any other exceptional driving behavior indication. Such detected conditions may put constraint on planning paths by a path control system wherein, for example, detection of hesitance level of driving behavior will put constraint on the planning to use diluted road network which minimizes, or excludes, with planning of paths non traffic-light-controlled intersections. Detection of hesitance in driving may be performed by a black box which may, for example, serve insurers to determine entitlement for discount in the price of an insurance policy.
5. According to some embodiments, an expansion may further comprise constraints on path assignments which may but not be limited to further include: estimated time to enter the network, avoiding non privileged road toll, preference to highways etc.
6. According to some embodiments, an expansion may further comprise an application of a driving navigation service which supports planning of pre-scheduled destinations trip and which service may further enable dynamic changes in the destinations of the trip, before and during a trip, which should preferably update a path control system by trip related destinations in order to enable multi destination path control. In turn, the path control system may enable updates to said service about changes in estimated time of arrival to destinations through, for example, server to server communication which updates by a path control system the service application estimated times of arrivals to destinations. This may enable the service application to update accordingly the driver, and preferably also participants in a prescheduled trip, with estimated time of arrivals to destinations.
7. According to some embodiments, an expansion may further comprise, under conditions in which traffic evacuation or traffic dilution is required from a certain part of a network, determination of destinations to be assigned to a vehicle before a search for paths is applied. In this respect, coordination control processes, which should maintain fairness by assigning non-discriminating paths to vehicles, are expanded to support evacuation or dilution towards common destinations which are preferably located farther than effective destinations on the network in order to enable to apply efficient, non-discriminating and flexible evacuation or dilution of vehicles towards a plurality of effective destinations (potential multi effective destinations per said common farther destination) according the developing dynamics in the evacuated or the diluted part of the network. In this respect, according to some embodiments, an expansion may further comprise expanded coordination control processes which assign fictitious destinations to vehicles on a fictitiously expanded road map. Fictitious expansion to a map (beyond the part of a real network which should be evacuated) is applied in a case when it may facilitate efficiency and fairness in the assignment of paths during the evacuation or the dilution. According to some embodiments, fictitious links are planned and assigned on a fictitious expanded part of the road map enabling expanded coordination control processes to guide vehicles towards fictitious destinations through effective potential exits associated with the real part of a network to be evacuated or diluted.
8. According to some embodiments, an expansion may further comprise fictitious destinations which may preferably be dynamically distributed around the evacuated or diluted angles enabling to assign dynamic fictitious destinations to vehicles according to dynamic development of the flow on the evacuated or diluted part of the network.
9. According to some embodiments, an expansion may further comprise a dynamic assignment of a fictitious destination for a vehicle may be applied by an agent associated with calculation of paths for the vehicle according to increase or decrease in the traffic flow towards a fictitious destination. In this respect, two or more of the above described iterations of coordination control processes are applied in parallel, wherein each iteration is applied with different fictitious destination. The plurality of results may be evaluated by controlled traffic predictions, using synthesis of different C-DTS simulations fed by different result of paths according to different fictitious destinations. According to the shortest estimated time result, a decision process may determine the preferred fictitious destination to be assigned for a vehicle with further evacuation or dilution of traffic. The smaller the difference between adjacent fictitious destination, applied by said iterations, the higher is the efficiency associated with controlling dynamically assignments of fictitious destinations.
10. According to some embodiments, an expansion may further comprise different fictitious destinations which are predetermined as adjacent destinations according to which changes to fictitious destinations are applied.
11. According to some embodiments, an expansion may further comprise a first choice to assign a fictitious destination which is the fictitious shortest straight line towards a fictitious destination while preferably fictitious destination are more densely determined with respect to more dense exits from the evacuated or diluted part of the network.
12. According to some embodiments, an expansion may further comprise acceptable exits on a roads map from the evacuated or diluted part of the network which may expand the part of the map of the evacuated or diluted part of the network by straight links towards fictitious destinations, which fictitious links are assigned with fictitious capacities that may not change priorities of said exits. In this respect adaptation of capacities and lengths of fictitious links towards fictitious destinations may preferably be assigned dynamically according to developed flows on the evacuated or diluted part of the network. According to such embodiments, fairness in assignments of paths may be maintained by the tendency of dynamic convergence associated inherently with iterations of coordination control processes. In this respect, tendency towards fair assignments of routes refers to non-discriminating convergence in terms of travel time for the same trip conditions at the time of assignment of paths. For example, dynamic assignment of paths to vehicles, having substantially the same position to destination pairs, will be maintained according to current coordination control iteration by using traffic predictions respectively with finite time horizon of a rolling time horizon.

13. According to some embodiments, an expansion may further comprise trips that are, or might have been considered, to be assigned with paths, according to coordination control processes, and are not yet within a part of a network that should be evacuated or diluted, and which paths are or might have been assigned with paths which pass through the part of a network before evacuation or dilution is required, may be diverted from evacuated or diluted part of the network according to a method which uses fictitious time dependent travel time on the evacuated or diluted part of the network. According to such embodiments, predicted time dependent travel times on the part of the network that should be evacuated or diluted, may artificially be adapted to prevent or dilute entries of non-authorized vehicles to the evacuated or diluted part of the network. In this respect, travel times on links that are related to a part of a network under evacuation may be changed artificially to high travel time costs that prevent assignment of paths by coordination control processes to non-authorized vehicles, outside the evacuated part of the network, to enter the evacuated part of the network. In case which refers to dilution of a part of a network, the travel time costs of links on such part of the network may be adapted artificially to an allowable level of traffic entry to the diluted part of the network. In order to have control on the allowable level, the time costs should be adapted dynamically according to developed alternatives on the network and according to the dynamic freedom degrees on the network for allowed entries to the diluted part of the network.

14. According to some embodiments, an expansion may further comprise a diluted part of the network which may refer to a part of the network to which evacuated vehicles are guided, and which part of the diluted network includes the destinations of the evacuated vehicles. According to some embodiments, the evacuated and the diluted parts of the network are divided into sectors, possibly overlapped sectors, enabling the evacuated traffic to be distributed within the evacuated and the diluted parts of the network and to shorten the evacuation time under said fairness constraint. C-DTS based simulation of traffic prediction for a finite time horizon may preferably be long enough to enable evaluation of the potential evacuation result, and which weights to time intervals within the time horizon may preferably be used with confidence level in predictions associated with forward time intervals. (the term simulation used hereinafter and above refer to computer simulation).

15. According to some embodiments, an expansion may further comprise a path control system which may be expanded to support traffic lights control system, wherein predicted traffic, which is a result of a traffic load balancing performed by a path control system according to a given traffic light timing plan, is transmitted to a traffic light optimization system and accordingly the traffic light optimization system optimizes the timing of the traffic lights timing plan. In turn, the updated traffic lights timing plan is transmitted back to the path control system to further perform load balancing by the path control system according to the updated traffic lights timing plan. Such an interaction between a path control system and a traffic lights optimization system may be performed periodically. In respect, too frequent interactions may cause instability in the coordination control processes and in the traffic lights control, while moderate interactions may enable convergence to optimal network flow. Empirical trial and error process may enable to adapt the frequency of the interactions according to different levels of dynamics in the traffic.

16. According to some embodiments, an expansion may further comprise processes associated with agents which are preferably performed in parallel (substantially at the same time), wherein a path associated with a trip is associated with a respective agent. In this respect, a path associated with a trip is associated with an agent which under time sharing an agent may serve a plurality of trips.

17. According to some embodiments, an expansion may further comprise a system which provides driving navigation service, and which is served by a path control system, updates the demand model with time related entry to a coordination-controlled region in case that a trip is started to be served outside of the controlled region. In case that the vehicle has an origin in the served region or should (preferably) just pass through the served region, while the destination is outside the served region, then a position that relates to destination is transmitted to the path control system enabling the path control system to decide on preferred exit from served region by a path controlled trip. Transmitted destination should preferably be associated with time dependent arrival position to the served region which may refer to time dependent position related information for a delayed entry of a trip to the part of the network which is served by predictive path control. A delayed entry of a trip to a served region by path control may refer not only to a trip which departs from a position which is outside of a region which is served by a path control system and which anticipated to enter a region which is served by path control at an anticipated time but also to a pre-scheduled trip which may depart from a position within the served region.

18. According to some embodiments, an expansion may further comprise determination of minimum travel time to be gained with acceptance of planned paths according to the threshold (travel time limiting criterion) to wherein the minimum gain is related to the level of an ability to apply traffic load balancing under control, i.e., an ability to not loss control on load balancing.

The following is associated with a description of state estimation and calibration with respect to a possibility to provide remedies to issues associated with on-line C-DTS traffic predictions while small part of the traffic should be modeled and in which case there is a need to calibrate under real time constraints the C-DTS for and by the models associated with the C-DTS simulator.

With such approach, physical phenomena and human related behavior of non controlled trips are modeled by a C-DTS enabling some level of realistic predictions to evaluate the potential effect of a control trips in a finite time horizon associated with a rolling horizon. Under model predictive control approach applying predictive coordination control processes, the partial model based C-DTS should be calibrated according traffic related information (preferably flow related data) by joint/dual state estimation with respect to the C-DTS demand state vector (hidden variables) and parameters of the models (hereinafter and above the term predictive coordination control processes refer to the term coordination control processes and which both may be used interchangeably). Typical division is made between the process (causation) model of a state estimation method applied by the zone to zone demand model of a C-DTS, and a measurement model of a state estimation method applied by the supply model of a C-DTS.

As mentioned above, such on-line calibration should preferably be avoided by applying effective incentives to motivate sufficient usage of path control trips to avoid simulation of non-path controlled trips while the worst case is to apply calibration under non-sufficient usage of path controlled trips on the network. The issue that raises by considering non marginal percentage of non path-controlled trips is the need to simulate none path controlled trips which in turn raise the following issues:

a) A need to estimate a high dimension demand state vector, in case of a city-wide networks, which makes the potential quality of state estimation to be a very serious issue (to say the least). In his respect, the issue is a twofold issue wherein the first issue refers to the need for huge computation power to cope with estimation which is associated with a nonlinear time varying supply model and the second issue is the very limited potential accuracy that may be achieved from such estimation while the supply model is further a stochastic model. This issue is further elaborated hereinafter.

b) A need for a route choice model, which is part of a supply model, and which is an incomplete model having stochastic aspects which for real time application is barely applicably even under recurrent traffic is biased (or biased and noisy according some models), while under non-recurrent traffic (irregularities on the network) is inapplicable (due to lack of robust models for irregular traffic), c) A need for high coefficient variations associated with high dimension demand state vector (zone to zone demand pairs), wherein a diluted dimension increases the size of zones and as a result the resolution of traffic simulations (reducing accuracy of the simulation to a non-acceptable level).

d) A need for state estimation to cope with a time varying nonlinear supply model which is inapplicable with a high dimension (high resolution a C-DTS simulator). In this respect, the non-linearity of the supply model is a dynamic which puts a limit on a possibility to decrease the state time interval in order to reduce coefficient variations associated with the zone to zone demand state vector.

e) A need for high cost infrastructure to attain high quality flow related field measurements, at high coverage on a city wide network.

f) A need to cope with lack of covariance elements (required with variance-covariance matrix) for the estimation of the state vector and further lack of covariance elements required with joint estimation of demand state vector and supply model parameters, g) A need to cope with a constraint to limit the load balancing to a restricted part of a city network, in order to reduce the dimension of C-DTS calibration, which raises a non-linear and noisy issue with respect to traffic predictions for entry links to the restricted part of the network (which issue is problematic to cope with by statistical models not mentioning lack of sampled data on relatively small links).

h) A practical need for decomposition of the C-DTS network in order to apply distributed on-line calibration raises not just a non-linear demand prediction issue on the borders of decomposed parts of the network, but also an issue of convergence of iterative process associated with distributed calibration required to cope with interrelated effects among state estimations applied for different parts of the decomposed network.

i) A need to cope with lack of real time zone to zone demand data, under non massive usage of path controlled trips.

Some academic approaches to apply state estimation DTA that simulates city related traffic are not able to cope with the mentioned issues, if the relative share of path-controlled trips on the network is not very high. Examples of known methods which have considered to be able to cope with some of the mentioned issues are not generic solutions and may refer to:

1) Combination of off line and on line state estimation such as LimKF, which presents an approach for reducing the on line computation power by pre-prepared off-line data, may not enable to cope with dynamic derivatives expected in typical urban traffic (actually LimKF implements a sort of steady-state Kaman Filter which may not be applicable for time varying derivatives associated with a non linear system).

2) Combination of SPSA with EKF may not guarantee acceptable number of converging iterations for high dimension state vector estimation (while leaving the route choice model issue open).

Therefore it may be critical to address the above mentioned issues by a more generic and robust approach, wherein the most attractive approach in this respect is to encourage the use of path controlled trips to a level that may enable on-line calibration of a C-DTS be independent of a need to simulate non path controlled trips by incentivizing usage of path controlled trips effectively, enabled e.g., by privileged GNNS tolling that entitles usage of path controlled trips with free of charge toll or toll discount.

Up to this point ongoing coordination of paths were considered, wherein predictive traffic load balancing should maintain recovery from deviations of the traffic from load balance. This included the assumption that the predictive load balancing starts from early morning hours and the traffic load balancing is applied with moderate increase in the traffic on a citywide network during rush hours.

However, in early stages, when predictive load balancing is first launched, there is a need to be more careful with on-gong load balancing that lacks history under real time operation. In this respect, according to some embodiments, deploying coordination control processes, to control coordination of path control trips, is preferably associated with a gradual increase in the percentage of path controlled trips while the rest of the trips should also be controlled in order to save a need to apply inapplicable on-line calibration of C-DTS (a need to avoid simulation of non path-controlled trips. In order to cope with such an issue, trips that are not supported with coordinating path controlled trips are controlled according to paths determined by off-line calibrated route choice model for different daily hours while trips that use such paths are entitled to privileged tolling.

In this respect, during gradual increase in the usage of said coordinating path controlled trips, the percentage of non-coordinating path controlled trips may preferably be guided according to paths that substantially reflect route choice behavior model, preferably, as mentioned above, are pre-planned under calibration of DTA route choice model and should further be recalibrated under some significant increase in the usage of coordinating path controlled trips.

This may enable to calibrate gradually off-line simulated control steps and further control parameters of C-DTS models under real time predictive load balancing operation and which approach may be applied with the support of off-line simulation of predictive traffic load balancing.

Such a solution may start, according to some embodiments, with free of charge road-tolling (in case that tolling is not applied) and further may, according to a need, be expanded to apply discounted tolling to incentivize usage of path controlled trips enabling to further optimize the ratio between traffic demand and freedom degrees on a network. A relatively low-cost tolling solution that may effectively serve incentivized usage of path-controlled trips is privileged GNSS tolling entitling usage of path controlled trips with free of charge toll or toll discount.

In this respect, privileged GNSS tolling, associated with free of charge toll or toll discount incentive to encourage usage of path controlled trips (according to obedience to path updates) may create a vehicular platform that, for example, under marginal upgrade to a GNSS tolling platform, may enable to apply effectively predictive path control based on predictive demand and predictive traffic development associated with path control (PCCN path control on path controlled trips).

In this respect, authentic position to destination data, associated with incentivized requests for path controlled trips under said privileged GNSS tolling that preferably applies zone to zone free of charge tolling or flat rate discounted tolling for path controlled trips, possibly associated with differential zone to zone tolling to optimize traffic flow on the network, may contribute to more predictive demand, more predictive planning and coordination of routes (paths).

In order to make the incentivized path controlled trips widely applicable, the navigation related data (requests for path controlled trips and path updates) are applied preferably anonymously; and which further optimization of the traffic development on the network may preferably incentivize requests for prescheduled trips in order to make the demand prediction more robust for a longer predicted horizon associated with predictive rolling horizon. Prior knowledge about exceptional demand may further enable more reliable demand predictions.

According to some embodiments, demand which is based on classified vehicles may further be used to predict demand based on the current and historical mix of classes of vehicles with respect to zone to zone demand pairs. That is, enabling fusion of multi time series analysis applied according to one or more classes, for a zone to zone demand pairs, while providing relative weight to each time series analysis.

Acceptance of such approach may not be avoidable if robust non discriminating and most efficient predictive path control is considered.

However, such approach may guarantee high acceptance if the path control trips may be incentivized under robust privacy preservation of trip details, i.e., under conditions wherein a full guarantee that trip details will not be exposed although the entitlement for incentive is dependent on trip details. Such a demand for privacy preservation requires an innovative solution.

In essence, the ability to apply acceptable incentivized path controlled trips by potential users is by applying anonymous path controlled trip using trip identity which identifies no trip user or vehicle associated with a trip or the owner of the vehicle while determining by in-vehicle apparatus the incentive according to the obedience of the trip to path updates planned by a path control system (PCCN control system), using

- in-vehicle position tracking as reference to detect obedience level of the trip to path updates associated with the path that should be developed by the path updates,
- data that determines incentivized and non-incentivized network usage charge for obedience and disobedience respectively, and transmitting by non-anonymous identity the network usage charge without exposing trip details.

According to some embodiments, the method comprising:

a. Receiving by in-vehicle toll charging unit functionality data associated with time related varying positions of a path which should be developed according to dynamic updates according to which an in-vehicle driving navigation aid guides a driver or an autonomous driven vehicle according to the dynamic path updates,
b. Tracking and storing by in-vehicle toll charging unit functionality positions along a trip by said in-vehicle unit functionality,
c. Comparing by said in-vehicle unit functionality said tracked time related positions by in-vehicle toll charging unit functionality with time related positions associated with said path that should be developed according to updates to the driving navigation aid,
d. Determining by said in-vehicle unit functionality, according to a level of a match, privilege related toll charging value which may refer to confirmed free of charge toll or privileged toll, wherein the determined privileged toll charging value for matches is sensitive neither to the number of updates to paths nor to the number of vehicles that are entitled to said privilege.
e. Transmitting by said in-vehicle unit functionality by an IP address associated with the in-vehicle unit functionality a message which is characterized by being vehicle identifying and not trip identifying toll charging related data message, wherein the IP address differs from an IP address that is associated with the in-vehicle unit functionality while in-vehicle positioning and/or destination related data is transmitted preferably anonymously.
f. Transmitting by said in-vehicle unit functionality, using an IP address associated with the in-vehicle unit functionality, vehicle positioning and/or destination related data, preferably anonymously, wherein the IP address differs from an IP address that is associated with the in-vehicle unit functionality while in-vehicle unit functionality transmits a message which is characterized by being vehicle identifying and not trip identifying toll charging related data message.

According to some embodiments said in-vehicle unit functionality apparatus apply the said method and which apparatus comprises:

a. Mobile internet transceiver,
b. GNSS positioning receiver, or sensor-based localization associated with autonomous vehicles, c. Processor and memory, d. Communication apparatus to communicate with an in-vehicle driving navigation aid.

According to some embodiments, a method associated with functionality of an in-vehicle toll changing unit—includes predetermined procedure to perform privileged tolling transaction with a toll charging center, while non exposing trip details, the method comprising:

a. Receiving by in-vehicle apparatus an update to a path associated with a trip that contributes to traffic development planned according to C-DTS based model predictive control on at least part of a road network, and accordingly transiting by in-vehicle apparatus trip related positions to update the C-DTS, wherein updated positions and path updates are associated with a same vehicle anonymous identity, b. Tracking by in-vehicle apparatus varying position of the vehicle and accordingly comparing tracked positions with positions expected to be developed on the road network according to updated path c. Determining by the in-vehicle apparatus network-usage related value according to data that determine network usage related value for potential matches and mismatches in said comparison, comprising determination of privileged network usage related value according to matches in said comparison, wherein the determined privileged network usage related value for matches is sensitive neither to the number of updates to paths nor to the number of vehicles that are entitled to said privilege, d. Transmitting by the in-vehicle apparatus network-usage related value using communication that include no common data with anonymous and non-anonymous communication enabling to interrelate received anonymous and non-anonymous messages.

According to some embodiments said in-vehicle unit functionality apparatus apply the said method and which apparatus comprises:

a. Mobile internet transceiver, b. GNSS positioning receiver, preferably associated with the support of map matching, or sensor-based localization associated with autonomous vehicles, c. Processor and memory, d. Communication apparatus to communicate with an in-vehicle driving navigation aid.

According to some embodiments, a method associated with functionality of an in-vehicle toll changing unit—includes predetermined procedure to perform tolling transaction with a toll charging center, while non exposing trip details, the method comprising:

a. Tracking and storing positions along a trip by in-vehicle unit functionality, b. Determining by said in-vehicle unit functionality toll charging data, c. Transmitting by said in-vehicle unit functionality using an IP address associated with the in-vehicle unit functionality a message which is characterized by being vehicle identifying and not trip identifying toll charging related data message.

According to some embodiments said in-vehicle unit functionality apparatus apply the said method and which apparatus comprises:

a. Mobile internet transceiver, b. GNSS positioning receiver, or sensor-based localization associated with autonomous vehicles, c. Processor and memory, According to some embodiments, storing trip detail at the vehicle e.g., in a toll charging unit (comprising e.g., path, day time and date according to in-vehicle tracked position and path that should have to be developed according path updates from a path control system) might not be sufficient to be used with an appeal for a toll charge associated with a trip.

In this respect, according to some embodiments, verification to in-vehicle stored trip related data that should be exposed with an appeal (either by remote or non-remote access to the in-vehicle storage) is preferably applied with further processes that enable verification of an appeal related data under said privacy preserving incentivized usage of path controlled trips, wherein the constraints to apply an acceptable appeal compel that:

vehicle identifying path records will be allowed to be stored solely at the vehicle, in order to guarantee privacy preservation of trip details to which stored records an access may not be allowed without permission of e.g., a person or an entity that owns the vehicle, an appeal for a charged trip will not be acceptable if it cannot be verified by a third-party record the bill of the charged trip and the time related trip records at the vehicle will be the only data sources that may trigger an inquiry of an appeal, handling an appeal, which is associated with exposure of vehicle related identity associated with trip details, will not enable to expose details of further trips of the identified vehicle, and wherein, under said constraints, the method that may enable verification of data that is associated with the appeal, which refers to in-vehicle data records, comprises:

Determining for a predetermined period of time a unique path verification characteristic (PVC) for a path controlled trip, e,g., by a unique number at the end of an anonymous path control session associated with a path control trip, wherein the PVC is preferably determined according to some embodiment by the path control system that may apply for example serial numbers to path control trips whereas according to some other embodiments the PVC is determined at the vehicle (e.g., by a toll charging unit which may choose e.g., a number from a pool of numbers updated e.g., by the path control system on a server), Coordinating the determined PVC between the path control system and the vehicle associated with the path-controlled trip, wherein transmission and reception of a PVC use preferably anonymous identity of the vehicle (non vehicle related identifying message), Storing for a predetermined period of time the coordinated PVC at the path control center and at the vehicle (e.g., in the toll charging unit), comprising storing at the path control system PVC related path details associated with time related path that should have had developed according to path updates of the path control system, jointly with the PVC, and storing at the vehicle (preferably in the toll charging unit functionality) PVC related path details associated with time related path that was tracked in the vehicle, jointly with the PVC, and preferably further the path that should have has developed according to path updated of the path control system, Transmitting from the vehicle, preferably by the in-vehicle toll charging unit functionality, trip related PVC associated with respective trip related details for which an appeal is submitted due to a subspecies charge, wherein the transmission comprise PVC associated with the in-vehicle tracked path details and preferably also respective stored path that should have had developed according to path updates of the path control system, preferably comprising with the path details time and date that are associated with the trip, and wherein the transmission is associated with non-anonymous identity of the vehicle (e.g., vehicle related identifying message), Receiving by the toll charging center said transmission from the vehicle and further comparable PVC related trip details from a path control system, possibly the reception from the path control system is applied according to a request from the toll charging center to the path control system by referring to a PVC that was transmitted by the in-vehicle toll charging unit functionality to the toll charging center, alternatively, according to some embodiment, a common database that serves the path control system and the toll charging center, with respect to storage of PVC related trip details, is used by the toll charging center to retrieve PVC related trip details updated by the path control system according to PVC received from a vehicle (rather than a further alternative of using two databases at the path control system and at the toll charging center), Comparing, preferably by the toll charging center, the PVC related trip details determined by the path control system with PVC related trip details received from the in-vehicle toll charging unit functionality, preferably the comparison comprises a comparison between applied path and path that should have had developed according to the determination of the path control system and a comparison of the paths that should have had developed according to the determination of the path control system and the path that should have had developed according to the in-vehicle received path updates which path is determined at the vehicle, e.g., by a DTA at the vehicle which is further transferred to the toll charging unit, Reporting, preferably be the toll charging center, on the found matches and mismatches, preferably with relation to the charge associated with the appeal.

According to some embodiments, said toll charging center is a toll charging system applied by servers and may be associated with a path control system applied by servers as well, possibly the joint system may comprise said path control layers and usage condition layer wherein the usage condition layer applies the functionality of said toll charging center.

According to some embodiments, comparison of trips is applied by time related stamps of positions that are associated with compared paths. A Global Navigation Satellite System receiver, such as a GPS receiver, can be used as a common time related positioning wherein the accuracy of the positioning may be supported by map matching associated at the vehicle with a DNA application which may support further the toll charging unit tracked positions. According to some embodiments, synchronization can be made between a DNA application and a toll charging unit, by using a common positioning means such as a GPS receiver installed in a toll charging unit and map matching associated with a DNA application, enabling to guarantee positioning based on the toll charging unit if it is the data source for positioning.

According to some embodiments, free of charge toll or toll discount which encourages usage of path controlled trips, applied by methods described with some embodiments, may further support road-book database updates, and which methods to improve updates includes inter-alia data related to traffic lights and signposts along roads and in intersections and their positions, and which such processed data is transmitted autonomously from vehicles enabling further updating in-vehicle maps according to the road book to support in-vehicle localizations on road maps according to in-vehicle sensor measurements.

In this respect, improved updates to a road book refers to updating changes in a road-book database by fusion of data which is generated by sensors of multiple vehicles. Sensors in this respect may but not be limited to include RADAR and/or Camera and/or Laser scanner to measure distance and space angle of an object in the vicinity of the vehicle. Said object may but not be limited to include road-book databases elements, such as traffic lights and signposts, vehicles and/or passengers.

According to some embodiment a central process applies the fusion according to said updates of new road-book database elements generated by vehicles.

According to some embodiments, methods that can be used for said fusion may include weighted average, such as can be applied by weighted least square based methods.

According to some embodiments, GNSS RTK based positioning of vehicles are used to locate some road book elements which can be used further as a reference for positioning of other elements to be updated in a road-book database.

According to some embodiments, the method of updating a new fixed element in a road-book database by a plurality of vehicles may be expanded to enable cooperative positioning of moving vehicles, wherein errors in measurement are expected to increase due to the motion of measuring source and the measured targets which makes the positioning worse in comparison to positioning a fixed object such as a signpost.

In general, a path control system may but not be limited to include a non-transitory machine-readable storage medium to store logic, which may be used, for example, to perform one or more operations and/or at least part of the functionality of one or more elements of described figures, and/or to perform one or more operations and/or functionalities, as described above. The phrase "non-transitory machine-readable medium" is directed to include all computer-readable media, with the sole exception being a transitory propagating signal.

In some embodiments, a path control system may include one or more types of computer-readable storage media capable of storing data, including volatile memory, non-volatile memory, removable or non-removable memory, erasable or non-erasable memory, writeable or re-writeable memory, and the like. For example, machine-readable storage medium may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, a path control system may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, a path control system may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, Python, assembly language, machine code, and the like. Functions, operations, components and/or features described herein with reference to one or more embodiments, may be combined with, or may be utilized in combination with, one or more other functions, operations, components and/or features described herein with reference to one or more other embodiments, or vice versa.

FIG. 2 schematically illustrates a product of manufacture 200, in accordance with some demonstrative embodiments. Product 200 may include one or more tangible computer-readable non-transitory storage media 202, which may include computer-executable instructions, e.g., implemented by logic 204, operable to, when executed by at least one computer processor, enable the at least one computer processor to implement one or more operations at one or more apparatuses and/or systems, to cause to perform one or more operations, and/or to perform, trigger and/or implement one or more operations, communications and/or functionalities described herein with reference to any of the figures, and/or one or more operations described herein. The phrase "non-transitory machine-readable medium" is directed to include all computer-readable media, with the sole exception being a transitory propagating signal. In some demonstrative embodiments, product 200 and/or storage media 202 may include one or more types of computer-readable storage media capable of storing data, including volatile memory, non-volatile memory, removable or non-removable memory, erasable or non-erasable memory, writeable or re-writeable memory, and the like. For example, machine-readable storage media 202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection. In some demonstrative embodiments, logic 204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like. In some demonstrative embodiments, logic 204 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Up to this point, privacy preservation of trip details, under incentivized and anonymous navigation that is crucial to the applicability of incentivized PCCN, included the assumption that e.g., two separated entities are associated with the operation wherein the toll charging is handled by an operator that operates an upgraded GNSS tolling system, to support incentivized PCCN, while the PCCN operation is applied by another entity (e.g., an authorized private entity). Under such mitigating assumptions it might be sufficient to consider that the anonymous PCCN operation and the non-anonymous charging operations will not exchange data in order to associate trip details with a charged ID. Moreover, it might be further assumed that lack of direct information to associate trip details with charged ID, centrally, might be acceptable.

In this respect, an example of such a weak approach may comprise a method to generate conditions enabling to apply predictive traffic load balancing on a road network, the method comprising:

transmitting from a vehicle its position and destination to get served as a incentivized path-controlled trip by a navigation control system, and receiving a path for a path-controlled trip, wherein transmission of said position and destination and reception of said path use anonymous vehicle IP addressing, and wherein incentivized path controlled-trips are entitled with privileged network usage of free of charge toll or toll discount for obedience to the navigation control system applying, through path controlled trips, predictive traffic-load-balancing on at least a regional part of a city road network;

receiving at the vehicle path updates from the navigation control system and transmitting from the vehicle position updates to the navigation control system, wherein reception of the path updates and transmission of the position updates use anonymous vehicle IP addressing;

determining, under in-vehicle control, one or more charging amounts related to the vehicle's network-usage, comprising:

tracking positions of the vehicle and determining matches and mismatches of tracked positions with positions that could acceptably be developed by the vehicle according to received path updates; and determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be substantially independent of modeling non path-controlled trips; and transmitting from the vehicle charging related data, associating a charging related ID with at least one charging amount related to the vehicle's network-usage, according to a charging procedure allowed to expose a non-anonymous ID with charged network usage associated with a path-controlled trip.

However, such approach may considered to be weak from the point of view of a user of incentivized PCCN (i.e., a user of a path-controlled trip) that may have lack of control on potential indirect association of centrally received ID, associated with monetary charging amount that is determined according to the level of the obedience to PCCN central navigation guidance, with user uncontrolled central construction of monetary charging amount for anonymous trip determined also according to the level of obedience of an anonymous path controlled trip at a center (e.g., at a PCCN system). In order to prevent such a possibly, robustly, there is a need to increase the level of ambiguity in a possibility to associate indirectly received ID with centralized trip details through received and centrally determined charging amounts, though there is some ambiguity in associating indirectly ID with trip information while there is no synchronization between the transmission of ID with the end of the trip and while more than one path controlled trips may be associated with transmission of the same amount.

In this respect, under non-sufficient said ambiguity, although a centralized construction of trip details may potentially be performed centrally for an anonymous controlled trip according to its position updates (transmitted from a vehicle and may not enable direct association with ID associated with charging related information that is non-anonymously transmitted from a vehicle) said indirect association of received ID with trip information might be applicable at the center which central process is not under the control of users of a charged path controlled trips. Nonetheless, it worth noting that said weak method may attain sufficient ambiguity if the ID, associated with a charging amount, is transmitted through a different communication medium such as local WiFi communication while the navigation uses a different communication medium such as cellular mobile internet.

To make the issue more clear, a indirect association of ID with trip related information, which may be performed centrally, through constructed charging information determined for anonymous controlled trips at a center may comprise:

Determining, e.g., at a navigation center, charging information for anonymously guided path-controlled trips, which may replicate charging information determined at a vehicle for the path controlled trip and transmitted by the vehicle to the navigation center, wherein the charging information replicated the charging information constructed at the vehicle which e.g., reflects the level of obedience and disobedience to the path that is used by path controlled trips in comparison to the path that should have been developed according to anonymous path updates transmitted to the vehicle and according to position updates received from the vehicle, using further data that determines potential charging amount for disobedience and obedience to determine charging information (e.g., as described above), Searching, e.g., at the navigation center, for a match between charging information determined at the center for anonymous path controlled rips and charging information received at the center non-anonymously, and determining accordingly relation between received IDs, associated with the same charging information as the charging information constructed at the center according to anonymous position updates, and anonymous trip details of different trips associated with charging information, wherein, said central process may be e.g., associated with storing on-line anonymously controlled trip related data to construct off line its related charging information data and further matching related processes.

As mentioned above, such indirect association of ID with trip details is not guaranteed under said conditions wherein the determination and transmission of monetary charging information is controlled by a vehicle that is associated with a path controlled trip. In this respect it may be assumed that transmitted monetary charging information) from a vehicle, which may refer to network usage charging information (hereinafter NUCRI), is not associated with trip related time stamp to help associating centrally ID with trip details, however, it is not clear if the transmission might not be timely closed to e.g., the end of a trip which may reduce the ambiguity in a trial to associate indirectly ID with trip information centrally. This might be an issue while e.g., the anonymous navigation and the non-anonymous tolling use a common communication medium such as cellular mobile communication network.

Such an issue might hold although in a case when non-common communication mediums are used with the anonymous and the non-anonymous communication wherein the anonymous communication that may expected to use a mobile cellular communication network while the non-anonymous communication use local communication (e.g., Wi-Fi) which though increases the potential ambiguity but might not be fully robust under non sufficiently potential random and long delay between the anonymous and the non-anonymous communication under a need to transmit a single NUCRI for a path controlled trip.

Therefore, from a point of view of a potential path-controlled trip user, such potential insufficient ambiguity that may not assure full trustworthy in privacy preservation of trip details, which negatively affect the potential generation of citywide massive usage of path-controlled trips, a required widely acceptable incentivized PCCN usage might not be guaranteed.

Some embodiments, described hereinafter, enable to overcome said lack of high trustworthy in previously described privacy preservation of trip details, under anonymous navigation and non-anonymous charging of a path-controlled trip according to obedience to the anonymous navigation, while further enabling to provide more trustworthy in handling charged path controlled trips to both, the user of a path controlled trip and the charging entity.

In this respect, different embodiments referring to different levels of implementation and robustness, associated with in-vehicle processes and centralized processes, enable to resolve the described issue of privacy and further decline the dependency on full in-vehicle control on the determination of charging amounts.

The commonality in such embodiments is the objective of maintaining non-anonymous transmission of charging related information while loosening the relation between the transmission of NUCRI and the determined network usage charging related value or values (hereinafter NUCRV) which refer to a charging amount or to charging amounts. Furthermore, enabling to non-mandatorily determining the NUCRV at the vehicle or at least not exclusively applying the determination at the vehicle which may facilitate trustworthy at the charging entity by facilitating verification of NUCRI in relation to trustworthy determination of NUCRV.

Such embodiments expand the privacy preservation of trip details while maintaining network usage charging information (NUCRI) transmission associated with a charging related identification (ID), and data associated with NUCRV, wherein the NUCRI is transmitted from a vehicle to a charging center applied e.g., with said usage condition layer, and wherein the NUCRI according to some embodiments may not mandatorily be determined at a vehicle as further elaborated.

In this respect, a transmitted NUCRI creates at the receiving side non-marginal ambiguity about the relation between the NUCRI and a concrete NUCRV, wherein according to some embodiments such non-marginal ambiguity is associated with e.g., controllable non-deterministic and non-marginal delayed transmission of NUCRI (with reference to the trip time of a charged path controlled trip) associated with a NUCRV which according to some embodiments may expand said non-marginal ambiguity with said possible usage of different communication mediums for anonymous and non-anonymous communication that already may expected to create non-deterministic delays.

As further described in more details, NUCRI may further or independently be associated non-deterministically with a portion of a charging amount per trip according to a respective NUCRV or with a plurality of cumulative amounts related to a plurality of trips according to a respective NUCRV.

Before entering into more detailed description of privacy preservation, applied under said incentivized anonymous path-controlled rips, some aspects associated with determination of NUCRV are clarified hereinafter.

According to some embodiments, a strait forward approach may consider flat rate charging of network usage on the network, e.g., no differentiation in prices of road usage is used to affect traffic distribution (unlike the approach used with traditional concepts associated with city GNSS Tolling), enabling the control on path controlled trips to load balance the traffic on a network without a need to involve human decision making associated with differed costs for passing different roads.

In this respect, there might be an exception wherein e.g., privately owned, or privately operated, roads that are associated with a city road network, in which case, according to some embodiments, load balancing takes into account update of users associated with allowance and disallowance of usage by path controlled trips to use such roads (under which case PCCN network traffic load balancing is performed). Such constraints may be handled by coordinating control processes naturally by the distributed planning of paths in which an agent of a path-controlled trip takes into consideration such a constraint with planning of path if requested by a user of a controlled trip.

According to some embodiments, a NUCRV per anonymous path controlled trip is determined centrally for obedience and for disobedience according tracked positions of a path controlled trip an according to the path updates that are transmitted to the vehicle associated with the anonymous path controlled trip, wherein privileged tolling, e.g., free of charge toll or toll discount, using e.g., the above mentioned process to determine NUCRV under the control of a vehicle i.e., tracking positions of the vehicle and determining matches and mismatches of tracked positions with positions that could acceptably be developed by the vehicle according to received path updates; and determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be substantially independent of modeling non path-controlled trips.

According to some embodiments, privileged tolling, e.g., discounted toll, is determined equally for zone to zone trips under zone to zone tolling, whereas, according to some embodiments, under non zone-to-zone tolling, flat rate network usage is considered.

According to some embodiments, non-privileged tolling, associated with partial disobedience of a path-controlled trip to path updates of a trip, is determined according to the time and/or distance used by a vehicle associated with a path-controlled trip on the network.

According to some embodiments, partial passed distance of a path controlled trip, in which e.g., disobedience and/or obedience were determined according to tracked obedience and disobedience along the path of a path controlled trip, is used to determine NUCRV, wherein according to some embodiments the portion that may refer to a relative to the proportion between the obedience and the disobedience.

According to some embodiments, under traffic load balancing which is motivated by minimizing travel times on the network, the traffic distribution associated with traffic load balancing which may introduce some level of discrimination to paths of path-controlled trips that have similar position to destination pairs and which such discrimination is compensated. In this respect, according to some embodiments the higher the relative length of an assigned path to a controlled trip e.g., relative to distance shortest path, the lower the cost that is charged for disobedience. According to some embodiments, such approach affects further privileged tolling wherein the higher the length of a path from e.g., distance related shortest path, the lower the cost that should be charged for obedience (i.e., higher privilege is associated with obedience under discounted toll privilege).

Getting back to privacy preservation of trip details while introducing ambiguity in potential attempt to associate a NUCRV, transmitted from a vehicle through NUCRI, and NUVRV determined e.g., at a navigation center, there are a few methods that may enable to resolve (or at least alleviate) the issue as following described with some embodiments. In this respect the objective is to introduce sufficient ambiguity an attempt to use match between centrally determined NUCRV and NUCRV received from a vehicle in order to associate received ID with trip details as e.g., described above.

According to some different embodiments, there are different methods to resolve such an issue, as described hereinafter, wherein such methods may further be used to support robust verification of in-vehicle determined NUCRV for trustful privacy preservation of trip details under anonymous navigation.

However, before elaborating such methods, a seemingly simple approach to preserve privacy will first be introduced and assessed as a potential alternative to embodiments aimed at introducing sufficient level of said ambiguity in an attempt to indirectly decipher relation between ID and trip details.

Said seemingly simple but not appealing approach, as further elaborated, may refer to applying payment according to in-vehicle determined NUCRV by in-vehicle repaid credit i.e., using no personal ID with transmission of NUCRI for in-vehicle determined NUCRV.

Such approach introduces a few issues, e.g., there is no way for the charging entity to return to the original entity associated with the charged ID, and vice-versa. An implication of such an issue is the lack of address to send receipt to a charged entity which will prevent from the charging and the original charged entities to communicate on interrogation on a suspected charged trip.

In this respect, the client IP address is a temporally assigned address and become usefulness if not saved centrally in the respective vehicle with time stamp of the used client IP address. Nevertheless, saved data may at most serve the charged entity and not the charging entity. In this respect, potential non paid charges associated with empty or non-sufficient charged credit may not be interrogated by the charging entity. On the other hand, if such process is associated with alerts to the potential charged entity (e.g., potential disclosure of the charged ID) is puts a burden of keeping non fully safe charged wallet in the vehicle. An alternative of using a removable gift card like credit card it makes the solution costly and the process to be burdening.

Thus, with the above describe methods, a highly trustworthy and potentially acceptable privacy preservation may not be acceptable especially by charged entities if there is an existing alternative that is not associated with said issues.

This brings the above-mentioned approach, of introducing ambiguity in an attempt to indirectly decipher relation between ID and trip details by introducing ambiguity in an attempt to associate ID related NUCRI (transmitted by NUCRV from a vehicle) with centrally determined NUCRV for anonymous path controlled trips.

According to some embodiments, in this respect, i.e., to prevent said potential indirect association of ID with trip details centrally, a delay of transmitting a determined NUCRV by a NUCRI from a vehicle is introduced, which delay is determined randomly at the vehicle (e.g., by a respective process in an in-vehicle toll charging unit), enabling to increase said ambiguity in potential central association of received NUCRV based NUCRI with centrally determined NUCRV wherein the random delay should be configured to be acceptable by the charging entity while at the same time be able to maintain acceptable trustworthy with respect to the charged entities.

In this respect, according to some embodiments, said random delay may be determined according to a compromise between acceptable time period in which the charging process is delayed and the need to attain acceptable ambiguity that may be considered to enable prevention of potential association of centrally determined NUCRV with a centrally received NUCRV associated with NUCRI.

With such approach e.g., a personal ID or a car related direct or indirect charging ID may become at least more acceptable with transmission of NUCRI.

Although according to some embodiments controlling said random delay is an option, high acceptability by users of path-controlled trips might require long time delays to attain sufficient said ambiguity especially in places and/or times in which the traffic is not dense enough (enabling increase in said ambiguity).

In this respect, some further methods suggest additional or alternative processes enabling to increase said potential ambiguity or in other words enabling to decrease said potential association of non-anonymously received NUCRVs (through received NUCRIs) with centrally determined NUCRV for anonymous path controlled through a potential search for a match between received and centrally determined NUCRVs enabling to associate a charging related ID (referring e.g., either to direct charged ID or to indirect charged ID such as vehicle registration ID to which a potential charged ID is associated centrally) with trip details that may potentially be associated with a centrally determined NUCRV.

In this respect, according to some embodiments, a method to decrease said potential indirect association of charging related ID with trip details is to divide at the vehicle (e.g., by a respective process in an in-vehicle toll charging unit) a determined charging amount per trip into a number of values associated with a plurality of NUCRV, preferably the division is performed at the vehicle randomly (e.g., by a respective process in an in-vehicle toll charging unit), and transmitting from the vehicle at different times a NUCRI associated with one or more (but not all) of the plurality of NUCRVs wherein the transmission time of NUCRIs in this respect is randomly determined at a vehicle (e.g., by an in-vehicle toll charging unit).

According to some embodiments a plurality of NUCRV determined for one or more path controlled trips are jointly transmitted as a single value or a more than one value, fully or partially per charging value per trip, with one or more transmissions of NUCRI, wherein, according to some embodiments, a plurality of partial values of NUCRV are determined for different trips at a vehicle (preferably randomly), and/or one or more of full NUCRV determined for different trips at a vehicle, and wherein such NUCRVs are transmitted at random times with respective NUCRIs (wherein the determination of NUCRVs and respective NUCRIs and said random division and random times are determined at the vehicle by a respective process e.g., associated with an in-vehicle toll charging unit), and wherein, according to some embodiments, summed charging values associated with said determined or potentially determined NUCRVs are sum is transmitted, possibly after a redivision, with a NUCRI at a randomized time determined at the vehicle, wherein said determinations are performed e.g., by a respective process in an in-vehicle toll charging unit.

Hereinafter and above, if not specified otherwise, determination of a NUCRV and/or a NUCRI and related processes associated with NUCRV and/or with NUCRI are performed at a vehicle e.g., by a toll charging unit associated with the respective vehicle, wherein the processes may consider to provide, according to some embodiment, an upgrade to the following described method to generate conditions enabling to apply predictive traffic load balancing on a road network, the method comprising:

a. transmitting from a vehicle its position and destination to get served as a incentivized path-controlled trip by a navigation control system, and receiving a path for a path-controlled trip, wherein transmission of said position and destination and reception of said path use anonymous vehicle IP addressing, and wherein incentivized path controlled-trips are entitled with privileged network usage of free of charge toll or toll discount for obedience to the navigation control system applying, through path controlled trips, predictive traffic-load-balancing on at least a regional part of a city road network;

b. receiving at the vehicle path updates from the navigation control system and transmitting from the vehicle position updates to the navigation control system, wherein reception of the path updates and transmission of the position updates use anonymous vehicle IP addressing;

c. determining, under in-vehicle control, one or more charging amounts related to the vehicle's network-usage, comprising:

tracking positions of the vehicle and determining matches and mismatches of tracked positions with positions that could acceptably be developed by the vehicle according to received path updates; and determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be substantially independent of modeling non path-controlled trips; and d. transmitting from the vehicle charging related data, associating a charging related ID with at least one charging amount related to the vehicle's network-usage, according to a charging procedure allowed to expose a non-anonymous ID with charged network usage associated with a path-controlled trip.

According to some embodiments, said in vehicle control uses a remote server to calculate charging related amounts while not exposing said non-anonymous ID.

According to some embodiments the remote server is associated directly or indirectly with the navigation center that determines anonymously charging related amount, preferably without a request from the vehicle (i.e., without said in-vehicle control), and transmits to the vehicle, according to its anonymous IP address, the charging amount that further is associated at the vehicle with a NUCRV for further transmission of a NUCRI, wherein the determination NUCRVs an NUCRIs, described above and hereinafter with different embodiments, may be applicable according to some embodiments.

According to some embodiments, an authentication of transmitted charging amount, determined at a center to the vehicle, with respect to a path-controlled trip, is associated e.g., with storing the anonymous IP address used with the communication at the vehicle (e.g., at an in-vehicle toll changing unit) and at the center (e.g., at a server storage associated with a navigation center), wherein an authentication data may support further interrogation associated with a charging suspected by the charging entity or the charged entity or by both of them.

According to some embodiments, determined NUCRV per trips and determined NUCRI per transmission are stored at an in-vehicle apparatus (e.g., in an in-vehicle toll charging unit) wherein randomization associated with the division and the transmission times is applied according to some embodiments under a predetermined procedure.

With such embodiments temporal debits of payments of charging related values may be allowed by the charging entity in order to increase said ambiguity to associate at a center (e.g., a server at the navigation center) said received NUCRVs through NUCRIs with centrally determined NUCRVs. According to some less preferred embodiments, credits may further be allowed with such approach.

According to some embodiments, a method to increase said ambiguity is performed under association of quantized network usage charging values wherein small differences between similarly charged trips might be associated with the same transmitted charging amount per trip.

The above described methods that generate ambiguity between received NUCRV (through NUCRI) at a center and centrally determined NUCRV may be referred hereinafter to Methods To Determine and Transmit NUCRV and NUCRI abbreviated as MTDAT-NUCRV-NUCRI.

Such methods should neither associate with a transmitted NUCRI trip related information (at least not sufficient information enabling a non-acceptable match with centrally determined trip information) with the message content nor any other data in the message content or in the communication control that may enable to associate anonymous communication with non-anonymous communication, wherein anonymous communication is performed with controlling path controlled trips (associated with anonymous path updates transmitted to a vehicle and respective transmitted position updates from the vehicle), and wherein non-anonymous communication is performed with a charging process according to charged ID related NUCRI.

In more general terms, a transmission associated with charging related data and related transmissions associated with position updates from the vehicle include no common information enabling unique association of charging related data with related positions of a path controlled trip, and wherein, subject to usage of common mobile communication medium to transmit from the vehicle non anonymous charging related data and related transmissions of position updates anonymously.

In this respect, according to some embodiments, subject to handling anonymous and non-anonymous transmissions while using active IP addressing for both off them through a common communication medium, anonymous vehicle IP address used with transmission of position updates and IP address used with transmission of non-anonymous charging related data are configured to use different independent vehicle IP addresses (client IP addresses).

According to some embodiment, disabling association between anonymous and non-anonymous communication is limited to a level wherein acceptable level of ambiguity is maintained to prevent indirect potential match between centrally determined trip information for anonymous trip and ID associated with a vehicle that performed or performs the trip, and wherein communication control data associated with the anonymous and non-anonymous communication e.g., client IP addresses associated with the same path-controlled trip under Internet communication protocol, should not be the same or deterministically interrelated whether a common communication medium or different communication mediums are used.

According to some embodiments, secured communication is applied with the non-anonymous communication.

According to some embodiments, MTDAT-NUCRV-NUCRI is associated with remote NUCRV determination, wherein centralized determination of NUCRV is applied for anonymously controlled path-controlled trip in order to either enabling further verification of in-vehicle determination of NUCRV or substituting in-vehicle determination of NUCRV.

According to some embodiments, central NUCRV determination is performed as an expansion of the control on a path controlled trip, using centrally determined anonymous path updates and the respective anonymously received position updates (associated with e.g., a common client IP address that serves anonymous communication) wherein, under substitution of in-vehicle determination of NUCRV by central determination, the centrally determined NUCRV is further transmitted to the vehicle e.g., through the anonymous communication associated with transmission of path updates to the respective path controlled trip associated with a vehicle. According to some embodiments, the transmitted NUCRV is stored centrally and at the vehicle (e.g., in an in-vehicle toll charging unit storage that received the NUCRI directly or indirectly).

According to some embodiments, centrally determined NUCRV per trip that is transmitted to a respective vehicle associated with the trip is not substituting in-vehicle determination of NUCRV per rip but rather used at the vehicle to validate centrally determined NUCRV. In this respect, received NUCRV per trip and determined NUCRV at the vehicle are stored at the vehicle wherein according to some embodiments, a difference between the received value and the in-vehicle value is found by an in-vehicle process than the lower value is associated with said one or more transmitted NUCRI. According to some embodiments a found difference is used with potential interrogation of charging process by the charging entity. Hereinafter and above the terms centrally and central in relation to processes associated directly or indirectly with privacy preservation of trips may refer to processes applied, but not limited to be applied, with one or more servers associated with any of the described layers and in particularly with the usage condition layer, and/or with one or more dedicated servers, and/or with servers associated with a dedicated charging center.

As briefly mentioned above, according to some embodiments, central determination of a NUCRV is applied without special request from a vehicle whereas, according to some other embodiments, transmission of determined NUCRV to the respective vehicle, associated with a path-controlled trip, is applied according to a request from a vehicle.

According to some less preferred embodiments, a dedicated server is used to determine charging amount anonymously, according to vehicle request, to determine further at a vehicle a respective NUCRV or NUCRVs and respective NUCRI or NUCRIs according to MTDAT-NUCRV-NUCRI, wherein time related trip details (constructed by in-vehicle apparatus according to in-vehicle positioning aid such as GNSS receiver supported preferably by map matching and further by path updates if the server is not updated with such data centrally) are transmitted anonymously to the dedicated server to determine accordingly charging amount for full or part of trip information (e.g., time related positions or time related segments of a path controlled trip) and path updates, determined e.g., at the vehicle (e.g., by an in-vehicle toll charging unit), or obedience and disobedience related information (e.g., time related positions or time related segments associated with obedience and disobedience).

As a result, NUCRV is determined at the server and transmitted anonymously (through anonymous client IP addressing associated with a vehicle) to the requesting vehicle, wherein anonymity in this respect compels prevention of common information to be associated with messages and/or communication control data with anonymous and non-anonymous communication, disabling in this respect to associate non-anonymous NUCRV (transmitted through NUCRI charging related communication) with the anonymous communication associated with determination of NUCRV which is crucial when a NUCRV transmitted through a NUCRI is directly related to the remotely determined charging information.

According to some embodiments, potential interrogation of a charged NUCRV, transmitted through one or more NUCRIs, is enabled by in-vehicle pre-processes (applied e.g., with a described toll charging unit) that stores, in an in-vehicle nonvolatile storage, time related history of one or more determined NUCRV in relation to one or more transmitted NUCRI, wherein, according to some embodiments, data that were used to determine a NUCRV by in-vehicle processes are also stored e.g., with the respective NUCRI or NUCRIs. Said history is recorded e.g., by an expanded process to control processes associated with path-controlled trips, According to some embodiments, such data may enable to support potential interrogation of e.g., appeal for suspicious charged NUCRI claimed by a charged entity, or e.g., suspicions non-charged NUCRV claimed by the charging entity.

According to some embodiments, interrogation of in-vehicle stored history is verified by comparison with respective centrally stored history of determination of NUCRV for anonymously controlled path-controlled trips and further by history of received ID related NUCRI transmitted from vehicles. According to such embodiments, cross-referencing of in-vehicle stored data is performed with corresponding centralized related stored data. According to such embodiments, central and in-vehicle stored history per path-controlled trip may include one or more of the following data:

- trip time related NUCRV stored centrally (e.g., at a navigation center) for anonymous path-controlled trips and trip time related NUCRV stored at vehicles for their path-controlled trips (e.g., at an in-vehicle toll charging unit),
- time related transmitted NUCRIs from a vehicle, and received centrally, stored at respective vehicles according to their transmitted NUCRIs and at a center (e.g., at a navigation center) for respective path controlled trips associated with anonymous ID,
- data determining the relation between one or more transmitted NUCRIs and one or more respective NUCRVs, stored at a vehicle (e.g., at an in-vehicle toll charging unit)
- data used to determine time and network related NUCRV, stored at the vehicle (e.g., at an in-vehicle toll charging unit),
- data used to determine a NUCRI, stored at the vehicle (e.g., at an in-vehicle toll charging unit)
- time related path updates (determined centrally and received at a vehicle), stored at the vehicle (e.g., at an in-vehicle toll charging unit) and centrally
- time related positions data (determined at the vehicle and received at the center), stored at the vehicle and centrally (e.g., at a navigation center), Such data may enable searching for a match between centralized and in vehicle stored history related records and verifying matched copies in vehicle related storage and storage at a center for path-controlled trips.

According to some embodiments, said stored data at the vehicle and centrally are associated further with client IP address(es), used with the vehicle anonymous communication, enabling to strengthen the verification level.

According to some embodiments, the charged entity (e.g., the owner of a charged vehicle) may have access to vehicle related stored history (preferably through secures communication) to learn about charging related details enabling to submit an appeal for a suspicious charging amount (e.g., according a receipt), wherein said details may be used to further search for a match with centrally stored corresponding data e.g., by the charged entity and/or by the charging entity.

According to some embodiments, the charging entity may also apply interrogation to validate that a vehicle missed no charges associated with controlled trips. In this respect, occasional interrogation may be performed by the charging entity, preferably applied for a limited time interval that may relate to one or more samples of stored NUCRI and/or one or more NUCRV. According to some embodiments, a less conservative interrogation may refer further to more details related to a NUCRV in relation to trip details.

According to some embodiments centralized records are performed with the Usage Condition Layer that may be directly or indirectly associated with updates on transmitted path updates to vehicles and on updates on received anonymous positions from vehicles wherein both are associated with a common anonymous client IP address per trip known to the center (e.g., a navigation center).

According to some embodiments, a search for a match between in-vehicle stored data, in relation to one or more trips, and comparable centrally stored data in relation to anonymously controlled trips, may be performed centrally e.g., for interrogation of an appeal submitted by charged entity possibly remotely (with respect to a vehicle) under legal access to in-vehicle storage or at the vicinity of the vehicle (through local communication with the vehicle) for interrogation originated by a charging entity or by a charged entity.

According to some embodiments charged fines associated with non-authorized usage of a potentially controlled trip is further recorded centrally and at the vehicle, enabling interrogation of a match according respective stored records associated with stored charged fine, at a vehicle and at a center, with possible access to records of position related charged fine (e.g., for non-usage of path controlled trip or for unauthorized usage of a parking place reserved for another path controlled trip).

According to some embodiments two different communication mediums are used separately with anonymous and non-anonymous communication while according to some other embodiments a common communication medium is used for anonymous and non-anonymous communication e.g., cellular mobile communication network. In case that a mobile cellular communication medium is used then different vehicle related client IP addresses, and preferably also different SIM profiles, are used with anonymous and non-anonymous communication enabling to maintain e.g., privately owned SIM for navigation and e.g., publicly owned SIM for charging related values.

Toll charging center, which receives charging related value from a vehicle, may refer to said usage condition layer that may be applied as a system layer in a navigation system that serves path controlled trips anonymously, wherein, i.e., the used term toll charging center and the used term usage condition layer, may be used in this respect interchangeably.

According to some embodiments, informative receipts for one or more charged NUCRI are enabled with a compromise on privacy preservation of trip at some level. According to such embodiments, transmission of one or more NUCRI is associated with transmission of limited trip related information e.g., trip destination zone and/or trip origin zone, wherein further associated time stamp with the transmission from the vehicle may refer to a non-accurate time interval e.g., by using a period of time in a day. Increasing the time period increases said ambiguity to centrally associate a received ID, transmitted with a NUCRI, with centrally stored trip information through one or more received NUCRVs, associated with one or more NUCRIs, and centrally stored NUCRVs.

According to such embodiments, wherein some level of trip related information is transmitted with ID related information, the potential contribution of MTDAT-NUCRV-NUCRI to preserve privacy preservation is reduced.

According to some embodiment, another level of ambiguity is applied under exposure of said zone related trip associated with the vehicle e.g., a day or a portion of a day in which the trip has been performed, wherein a single NUCRI is preferably transmitted for a trip that has been made during such a period of time while elaborating e.g., said daily zone related trips.

According to some embodiments, methods that are described above and may relate to methods described hereinafter are aimed at enabling inter-alia trustful charging of incentivized anonymous navigation according to their relative obedience to path updates while protecting the privacy of anonymous navigation from an attempt to associate centrally trip details with received ID associated charging process entitling privileged network usage for obedience level to the anonymous navigation, wherein the anonymous navigation transmits anonymous path updates to vehicles and respectively receives anonymous position updates from the vehicles and wherein the parameters of the method and the incentives may be adapted to maintain trustful charging for a sufficiently high number of trips on a road network; wherein trustful charging should inter-alia ambiguate attempt to associate centrally received ID, associated with a transmitted network usage related charging value from a vehicle, with trip details that may be constructed centrally according to anonymous position updates from the vehicle (enabling to construct actual path development), by determining centrally a charging value (network usage related charging amount according to obedience level to path updated) for anonymously guided trips—enabling the center to match a centrally determined charging values with ID related received charging values from vehicles and further to associate centrally, according to matched, received charged IDs with anonymous trip details; and wherein the method to ambiguate such potential association may comprise:

1. Transmitting from a vehicle network usage charging value, wherein the charging value is determined according to obedience and disobedience level to path updates, transmitted to an anonymously navigated vehicle (anonymity of a vehicle refers to anonymous client IP address associated with a vehicle in relation to communicates between the navigation system and the navigated vehicle wherein the IP address of the vehicle is allocated randomly by an internet service provider and is unknown to the navigation system), and wherein the determined charging value is transmitted from the vehicle in association a charged ID, and wherein the transmission is performed with one or more processes that introduce ambiguity in associating centrally said received charging ID with trip details through a match between centrally determined charging value related to anonymous rip details and said received charging related value related to charged ID.

According to some embodiments, said ambiguity is applied in relation to a method aimed at generating conditions enabling to apply predictive traffic load balancing on a road network, the method comprising:

transmitting from a vehicle its position and destination to get served as a incentivized path-controlled trip by a navigation control system, and receiving a path for a path-controlled trip, wherein transmission of said position and destination and reception of said path use anonymous vehicle IP addressing, and wherein incentivized path controlled-trips are entitled with privileged network usage of free of charge toll or toll discount for obedience to the navigation control system applying, through path controlled trips, predictive traffic-load-balancing on at least a regional part of a city road network;

receiving at the vehicle path updates from the navigation control system and transmitting from the vehicle position updates to the navigation control system, wherein reception of the path updates and transmission of the position updates use anonymous vehicle IP addressing;

determining, under the navigation system control, one or more charging amounts related to the vehicle's network-usage, comprising:

tracking positions of the vehicle according to said received position updates and determining matches and mismatches of tracked positions with positions that could acceptably be developed by the vehicle according to received path updates; and determining at least one charging amount related to network-usage for one or more matches according to data determining privileged network usage cost, and a charging amount related to network-usage for one or more determined mismatches according to data determining non-privileged network usage cost, wherein privilege in network usage is configured to enable simulation-based traffic predictions, associated with model predictive control supporting planning of paths for said predictive traffic load balancing, to be substantially independent of modeling non path-controlled trips; and transmitting from the navigation system to the vehicle the at least one determined charging amount related to the network usage and receiving at the vehicle the charging amount, using said vehicle anonymous IP addressing and determining accordingly charging related data and; and determining at the vehicle at least one charging data according to the received charging amount and transmitting charging related data from the vehicle, wherein the transmission is associated with a charging related ID, according to a charging procedure allowed to expose a non-anonymous ID with charging related amount, and wherein the determination of charging related data associated with the transmission of the data are comprising an increase in ambiguity to associate centrally, according to said anonymous determination of charging related amount by a navigation system, the relation between a centrally received charging ID with trip related information constructed by the navigation center—using at least one process of the following processes:

delaying randomly transmission of charging related amount fully or partially;

dividing randomly a determined charging amount per trip into a plurality of smaller charging related values, and transmitting one or more, but not all, said smaller charging related values in randomly transmitted times;

combining charging amount per trip, or said smaller charging related values per trip, with one or more charging amounts or said smaller charging related values of a charging amount associated with one or more trips, and transmitting one or more of the combined values as a charging related value or as divided parts of it in a randomly determined times;

transmitting charging related values from vehicles in one or more predetermined limited time intervals, concentrating the transmissions from different trips that were performed in a wider time interval into a smaller common time interval wherein the transmission in the smaller time interval is associated with random time determination;

randomizing at a limited level a charging related amount or a charging related value with the determination of a charging amount or a charging related value;

quantizing at a limited level a charging related amount or charging related value with the determination of a charging related amount or a charging related value;

using with anonymous navigation wide coverage mobile communication network while using further local short-range communication, having non full overlapping coverage on the road network, with transmission of a charging amount or a charging related value;

storing at the vehicle charging related amounts or charging related values associated with time related trips respectively with transmitted charging related amounts or charging related values from the vehicle and with relation to one or more stored time-related client IP addresses used with anonymous communication associated with the vehicle;

storing at a server a received charging related amount charging value from a vehicle and related charging ID;

storing at a server determined trip-time related charging related values or values respectively with client IP addresses that were used with communication associated with anonymous path updates and position updates related to navigated trips.

Hereinafter the term charging related value may refer to the term charging related amount wherein a charging related value may refer to a full or a portion of a charging related amount that may refer according to some embodiments to a full path-controlled trip (origin to destination of a trip). Furthermore, reference to central process(es) may relate e.g., to a navigation system server process(es) whereas reference to vehicle process(es) may relate e.g., to an in-vehicle toll charging unit process(es).

2. A method according to 1, wherein, according to some embodiments, verification of an in-vehicle stored trip-time-related charging-related-value, associated with a trip, comprises matching such a value with a respective centrally stored trip-time-related charging-related-amount(s) by searching for a match between centrally stored trip-time-related charging-related-amount(s)

determined centrally for an anonymous trips, and said in-vehicle stored trip-time-related charging-related-value(s) for which verification is searched.

3. A method according to 2 wherein, according to some embodiments, one or more client IP addresses, used to transmit path updates and to receive position updates in relation to an anonymously navigated trip, are stored in relation to stored charging-related-amount(s) determined at the center for time related trips, and respectively also at the vehicle, wherein a stored client IP address is used further to strengthen said matching.
4. A method according to 1, wherein, according to some embodiments, verification of an in-vehicle stored charging related value comprises a search for a match between an in-vehicle charging related value, transmitted from a vehicle and stored at the vehicle, and centrally received charging related values.
5. A method according to 4, wherein, according to some embodiments, a transmitted charging related value from a vehicle is associated further with a time stamp received and saved at a center, and respectively saved at the vehicle in relation to the saved charging value, wherein said stored time stamps are further used with strengthening the match associated with verifying an in-vehicle charging related value.
6. A method according to 2 and 4, wherein, according to some embodiments, the verification is initiated by a charged entity referring to a suspected charge performed in relation to a certain time or time period, and wherein the input for a search for a match is transmitted charging related data from the vehicle that is stored at the vehicle.
7. A method according to 6, wherein, according to some embodiments, the verification requires a further match between information stored at the vehicle and information stored at a center in relation to transmitted charging related data from a vehicle, wherein information relates to either or both of the following information types:

time related charging interaction between the center and the vehicle, stored at the center and at the vehicle, trip related details stored in relation to a time related charging data at the center and at the vehicle.

8. A method according to 2-7, wherein, according to some embodiments, a verification starts with a search for a match between trip related details stored at the center and trip related details stored at the vehicle, with reference to a common client IP address associated with a vehicle stored at a center and at the vehicle in relation to a path controlled trip.
9. A method according to 2-8, wherein, according to some embodiments, in-vehicle data associated with one or more verification steps is performed by remote access to in vehicle data, according to legal allowance, wherein such data is associated with the charged ID at a vehicle and wherein the access is limited to a limited copy which may expose allowable information to be verified.
10. A method according to 1-8, wherein, according to some embodiments, potentially charged entities have anonymous access to centrally stored data through an anonymous client IP address, enabling them to verify a potential mismatch with their in vehicle stored data, through a search engine enabling to search for mismatch between partial stored data at the vehicle and respective stored data at the center, preferably in relation to submission of an appeal for a suspected charged amount.
11. A method according to 1, wherein, according to some embodiments, determination of a charging value is performed according to privileged charging prices associated with obedience level of a guided trip to path updates and according to non-privileged charging prices associated with disobedience of a guided trip to path updates
12. A method according to 11, wherein, according to some embodiments, the determination of the charging related amount per a full or partial path-controlled trip is performed at the vehicle in addition to centralized determination of such amount(s).
13. A method according to 11, wherein, according to some embodiments, the determination of the charging value is performed partially at the center and transmitted to a respective vehicle using anonymous communication.
14. A method according to 11, wherein, according to some embodiments, the level of privilege, associated with privileged in charging a path-controlled trip, is increased proportionally with the increase in the length of the path associated with the trip.
15. A method according to 14, wherein, according to some embodiments, the reference for determining increase in the length is the distance of the path calculated for the trip according to its origin and destination.
16. A method according to 11 and 14, wherein, according to some embodiments, a privileged charging value is determined according to prices associated with zone to zone network usage by a trip.
17. A method according to 1, 11 and 14, wherein, according to some embodiments, the information transmitted with a charging related value, associated with a charging ID, refers to a single trip and associated further with at least one time related zone used by the trip.
18. A method according to 17, wherein, according to some embodiments, informed time associated with transmitted charging related value refers to a time period which exceeds the actual travel time of the trip.
19. A method according to 18, wherein, according to some embodiments, the time interval may refer to more than one partially overlapping predetermined periodical time intervals.
20. A method according to 1, wherein the charging ID is a non-personal ID
21. A method according to 20, wherein, according to some embodiments, the non-personal ID is a prepaid credit related ID
22. A method according to 2-10, wherein, according to some embodiments, a verification is initiated by the charging entity that may have access to in-vehicle stored data and wherein, according to some embodiments, the search is applied for a time interval in which one or more trips might have been performed.
23. A method according to 22, wherein, according to some embodiments, the access is coordinated with the charged entity permission.
24. A method according to 1, wherein, according to some embodiments, the path updates and the position updates are associated with anonymous communication identified by one or more client IP addresses charged along a trip.
25. A method according to 1 and 24, wherein, according to some embodiments, the non-anonymous communication associated with a charging process is performed with vehicle related client IP address that is randomly related to the anonymously used client IP address while using a common communication medium with anonymous and non-anonymous communication.

26. A method according to 25, wherein, according to some embodiments, ownership of a SIM associated with anonymous vehicle communication is different from the ownership associated with a SIM associated with non-anonymous communication.

27. A method according to 1, wherein, according to some embodiments, the central system apparatus is a PCCN system applied by e.g., system configurations illustrated in FIG. 1*a*-FIG. 1*h* and wherein the center associated with central charging related processes is supported by the user-condition-layer 224 in FIG. 1*a*-FIG. 1*h*.

28. A method according to 1, wherein, according to some embodiments, the trips are path-controlled trips, aimed at load balancing traffic on a road network, and wherein charging values determined according to obedience to path updates are associated with incentive aimed at generating co-usage of path-controlled trips, enabling position updates from the vehicles, associated with the rips, to calibrate dynamic traffic simulator that performs traffic predictions at a level that makes the simulator to be virtually independent on a route choice model and on state demand estimation (calibration is made according to updated positions of trips rather than according to traffic information supported by a route choice model under state estimation).

29. A method according to 28, wherein, according to some embodiments, the incentive to a path controlled trip to comply with path updated is the privileged level associated with network usage according to path updates, wherein, under toll discount the discount level provides the incentive whereas, under free of charge toll, the level of charged toll for network usage provides the incentive.

30. A method according to 1, wherein, according to some embodiments, parameters of the method that may control the level of said ambiguity are adapted to maintain acceptable level of trustful charging by the charged entity while, according to some embodiments, the incentive is adjusted to maintain high usage of navigation that enables the traffic prediction simulator associated with the planning to be independent of a need to use a route choice model.

31. A method according to 1 and/or 30, wherein, according to some embodiments, at a time when there is no sufficient number of vehicles on the network to be incentivized, e.g., in early hours of a day, acceptable level of ambiguity may be attai8ned (wherein said ambiguity refers to ambiguity in a result from a central attempt to associate centrally received ID, associated with a charging related value, with centrally determined trip details, according to a match between centrally determined charging value associated with trip information and respective received charging value associated with charged ID) by postponing transmission of a charging related value to a time and/or a day when sufficient number of vehicles are expected to be on the road network enabling to guarantee acceptable conditions to apply acceptable level of ambiguity.

Up to this point, previously described embodiments refer mainly to traffic flow improvement on a network under predictive controlled navigation associated with incentivizing usage of predictively coordinated navigation, preferably by privileged GNSS tolling, wherein the incentivized predictively controlled navigation applies automated cooperative navigation under model predictive control approach.

However, the described embodiments lack a few essential abilities to cope with optimal and robust large-scale system implementation of a citywide predictively controlled navigation. In this respect issues associated with lack of essential abilities refer to:

Lack of ability to determine fully predictively the size of a control step of an inherently applied stochastic coordination control processes, applied with iterative coordination control processes that minimizes discriminating coordination of paths associated with predictive controlled navigation, unable to guarantee convergence level towards traffic load balancing under real time constraints, that is, the effectiveness of the convergence depends on the level of the exploitation of affordable number of iterations under real time constraints which under non-optimal control steps might not be exploited.

In this respect, the above described embodiments introduce an iterative predictively coordinated navigation according to which coordinating path-controlled trips are controlled with the support of iterative coordination control processes, wherein the coordination control processes apply iterative model predictive control approach aimed at converging the traffic development towards load balance.

However, one of the issues associated with such approach is that, under each iteration, changed paths which were accepted as potential alternatives to assigned paths (planned independently in parallel applying controlled user optimal approach) affect the network flow in a way that is non-fully predictable to which further ambiguity is added by nonlinear reaction of the network to change in paths. As a result, according to above described embodiments, a control step at each iteration might be too high or too low and hence the iterative process, under real time constrains, might not converge to a attainable level of load balance under non-significant imbalance conditions and which case is expected to become worse under significant imbalance conditions that may cause loss of control.

In other words, lack of ability to apply effectively sufficient number of iterations, as a result of a limited predictability of required level of control steps (associated with said threshold that determines at each iteration the potential effect of changed paths on network flow), cause at the best case loss in the potential exploitation of a road network and at the worst case loss of control.

In this respect, further embodiments describe a method enabling to determine effective control steps which may enable to reduce the number of iterations and hence enabling to exploit a higher level affordable number of iterations under real time constraints while applying multi-branch and multi-batch with on-line model predictive control under potential guidance of off-line effective learning processes and further under support of beyond rolling horizon related processes.

Lack of effective support to on-line load balancing by off-line load balancing based on off-line pre-prepared control data enabling according to above described embodiments the on-line load balancing to recover from loss of control, e.g., under local traffic irregularities, wherein according to above described embodiments a large pre-prepared database of stored control sequences are used to support recovery from significant imbalance that coordination control processes may not cope with under real time constraints.

In this respect, said stored data is determined off-line according to above described embodiments using simulated scenarios that lack a method to generate effective control policies to reduce the number of iterations associated with coordination control processes, and further put limit on the affordable number of pre-prepared scenarios that may be applicable for recovery.

The former requires a mew non describe method in order to generate effective control policies whereas the latter puts a limit on attainable resolution to determine and use control policies associated with traffic imbalance scenarios, wherein the higher the higher is the off-line effort to determine a pre-prepared database the slower is the on-line search time for a control policy and the higher is cost of database which in practice limits the resolution of applicable stored scenarios.

As a result, limited, ineffective and costly off-line learning process, aimed at enabling according to above described embodiments to support online recovery of coordination control processes from loss of control on significant imbalanced traffic, require improvement by new innovative methods described with embodiments associated with off-line multi-branch and multi-batch model predictive control and deep learning related processes.

Lack of ability to cope effectively with large networks, wherein coordination control processes, applying predictively coordinated navigation for citywide networks, are practically limited to use controlled rolling horizon. The limit on a predicted horizon is a result of a need to apply sufficient number of iterations enabling convergence towards traffic load balance while under real time constraints simulation of traffic prediction for large networks consumes time that if would it not be limited it would make the number of iterations inapplicable for affordable scalability of computation required to apply citywide traffic load balancing.

The issue associated with such a limit is the inapplicability of coordination control processes to coordinate trips while some of the paths have destinations located beyond the predicted horizon.

In this respect, the above described embodiments elaborate no concreate method to cope with a need to apply coordination of paths while a portion of the coordinated paths have destination beyond the predicted horizon. To be more clear, the issue refers to a need to determine with coordination control processes preferred exits from a predicted horizon for paths that their destinations are located beyond the predicted horizon while preferred exits are dynamically depending on the coordination process in relation to destinations of trips beyond the predicted horizon.

This introduces an issue wherein the preferred exit per trip from a predicted horizon should be known a priory in order to enable coordination while it should be actually dynamic as it is a result of the coordination control processes. Therefore, the above described embodiments deal with no practical aspects required with scalable solution that may enable to cope with traffic load balancing for small up to large citywide networks.

To be more concreate, the above described embodiments elaborates coordination control processes that may enable to cope with a need to handle the trend of traffic flow development under load balancing while pointing on the need to use top down load balancing approach under no or negligible effect of limited predicted horizon (e.g., sufficiently long predicted horizon that covers most of the predicted traffic that may meaningfully affect the current controlled traffic).

With further described embodiments, beyond predicted horizon related off-line processes in conjunction with on-line processes, which use the off-line processes, are applied to enable effective rolling horizon bounded on-line coordination of paths.

Lack of ability to cope with large scalable control system, wherein under modular solution for small up to large cities the proportion between required distribution for traffic prediction and the distribution of the planning and coordination of paths is changing and facilitation of the scalability of the system should be by supported by mutually independent distribution.

With further described embodiments scalable modular control system configuration is introduced enabling facilitation of the scalability of the system should be by supported by mutually independent distribution, Lack of a method enabling to cope with full rotework exploitation by optimization of traffic demand and network supply capability, leaving non exploited freedom degrees on a network while the demand is not adapted to fill the freedom degrees that the traffic load balancing leaved by e.g., coordination control processes.

In this respect, the above described embodiments is agnostic to the tolling policy associated with the entry of a controlled trip to the network which under non-discriminating planning and coordination of paths and under non discriminating tolling the tolling policy invites flat rate of tolling on the network and at the entries to the network. However, the agnosticism of the privileged predictive coordinating navigation to the policy of the tolling, before a trip starts to be controlled, enables the coordination to be adaptive to any policy in this respect. Therefore, the under non flat rate tolling, applied with the entry of a controlled trip to the network, freedom degrees on the network that may be utilized at a higher level. In this respect, for example, discount to specific zone to zone trips may be applied according to position to destination, associated with requests for controlled trips, wherein the above described embodiment may support by being adaptive to changes in the demand.

With further described embodiments zone to zone tolling is introduced enabling the coordination control processes to exploit further freedom degrees on the network.

The following described embodiments introduce solutions to the above-mentioned issues.

Previously described methods, which enable to generate said stored thresholds associated with store traffic patterns (preferably a sequence of traffic development patterns), are based on historical off line simulation that proved to improve traffic imbalances on a network, use said stored data to improve real time traffic load balancing for similar traffic patterns by shortening coordination control processes.

However, such methods have some deficiencies. In this respect, previously described methods require to prepare a large database for verity of network traffic patterns each associated with a control related sequence (said thresholds). The stored traffic patterns are used under significant real time deviation from load balance wherein similar traffic pattern is searched in the stored data. and if a similar pattern is found than its associated stored control sequence (e.g., said thresholds) is used to shorten the time required to improve traffic load balance by feeding the control sequence to coordination control processes used with real time load balancing.

However, usage of a large database is costly and search in a large database is time consuming which might not be affordable under real time constraints. In this respect, retrieval of data from the data base may be associated with finding a match between a current real time traffic pattern and respective stored patterns in order to determine required sets of control steps (e.g., thresholds) for real time coordination control processes.

Furthermore, determination and usage of a sequence of control steps by a single loop of model predictive control, applied with coordination control processes, in comparison to a parallel approach, may be limited to cope with real time load balancing for variety of imbalanced traffic conditions.

These issues, are suggested to be alleviated by the further described methods.

According to some embodiments, the objective of further described methods is to enable to cope with a need to shorten the time required to reduce predicted traffic imbalances by predictive traffic load balancing, wherein such methods might be critical under significant deviation of the traffic from balanced traffic and may be helpful to obtain more balanced traffic for any other imbalanced traffic conditions.

This objective may be attained by a combination of few methods that comprise parallel control policies associated with parallel model predictive control branches (e.g., coordination control processes) wherein each branch applies batches of iterations and wherein each subsequent batch reduces the range of search for a preferred control policy according to preferred result of a rougher range applied by a previous batch.

A further improvement associates learning methods with off line and on line implementation of said parallel model predictive control in order to enable further shortening the process of improving traffic load balance. In this respect, the off line model predictive control applies simulation of load balancing for real time sampled imbalanced traffic conditions (or simulated imbalanced traffic), wherein variety of such simulations generate association between imbalanced traffic conditions, before the off line load balancing, and respective control policies determined as preferred policies by the off line parallel model predictive control. This applies a first stage of a learning process.

A second stage may preferably use deep learning that associates by a training process variety of said imbalanced traffic patterns with respective control policies enabling to attain two objectives which the first is saving a need to use said database for said stored traffic patterns associated with control policies, and which the second one is to attain generalization with the inference of control policies according to imbalance traffic patterns, that is, rather than using said search for control policy through search for traffic patterns in a database, while not obtaining preferred policies for similar but non-stored patterns, the generalization enables to obtain policies for non-trained traffic patterns.

In this respect, according to some embodiments, the objective of the learning process is to attain according to historical off line load balancing rapid entrance of real time predictive load balancing into more predictive balanced traffic conditions, wherein the real time predictive load balancing refines the historical predictive load balancing starting from more predictive balanced traffic conditions.

According to some embodiments, real time predictive load balancing is improved by applying parallel multi model load balancing wherein different model refer to usage of a plurality of control policies. An example of for a plurality of real time control policies is a plurality of sequences of control steps (e.g., travel time limiting criteria that may refer to said thresholds associated with coordination control processes) applied with parallel iterative model predictive control wherein, according to some embodiments, each branch in the parallel iterative model predictive control applying for example said coordination control processes.

In this respect, 3 in FIG. 3.1 illustrates schematically a two batches of Parallel Multi-Branch Multi-Batch Iterative Multi-Agent Model-Predictive-Control (PMBMB-IMA-MPC), wherein multi branch approach, illustrated with 3 in the figure, enables to apply coordination control processes under different scenarios associated with different travel time limiting criteria, wherein a travel time limiting criterion applies a control step for an iteration of said coordination control processes by said threshold (i.e., a travel time limiting threshold e.g., TTLT or STTLT or just said threshold in this context) associated with said coordination control processes. In this respect, the multi-branch approach is used with multiple batches wherein each batch enable to increase the resolution of a search for a more optimal control step(s) by selecting the control step(s) used with the preferred scenario (applied by multiple branches) that attained the highest convergence towards load balancing coordination of paths. For example, under usage of high to low range of control steps, associated with a sequence of batches, each new batch use a smaller range of control steps enabling to improve gradually a search for a more optimal range. Such approach may be adaptive to changes in the trend of the convergence, wherein the range of control steps may increase with reduction in the level of convergence and vice versa while letting the coordination to use multi model search for convergence.

According to some embodiments traffic predictions in a batch of PMBMB-IMA-MPC applied by C-DTS is a moving rolling horizon that take into account the motion of the vehicles during iterative mitigation of loads from relatively loaded links. In this respect two successive iterations have different distribution of trips on the network for non-frozen (not the same) predicted horizon. According to some other embodiments, the distribution of trips under a batch of PMBMB-IMA-MPC is frozen (static) wherein the distribution is updated to the motion of the vehicles at the transition from one batch to another one. The latter embodiments apply discretized motion of a rolling horizon while the former although is a discretized rolling horizon it is a closer to continuous rolling horizon under the limit that a minimum discretization is left due to the time it takes to apply an iteration (planning of paths and traffic prediction).

Such multi-branch approach applies parallel iterative model predictive control with each branch, wherein an iteration is illustrated by “2” in FIG. 3.1 and wherein an iteration is actually applied by a model predictive control loop illustrated in FIG. 3.1 by “1”.

The control module “c” and DTS, which are illustrated with “1”, “2” and “3” in FIG. 3.1, apply control iteration under limited size of control step, signed as “c” in the figure, under a need to be able to correct non-fully predictable response to control input(s) that are aimed at enabling planning of paths, under nonlinear response of DTS to a control step and under stochastic nature of the control, by gradual convergence towards traffic load balance. In this respect, The term DTS refers actually to a Controllable Dynamic Traffic Simulator (C-DTS) that according to different embodiments may apply DTA at different levels of implemented models (associated with demand, supply and in some cases include also route choice model under some off-line processes such as for example described with described embodiments) wherein the term "controllable" refers inter-alia to controlled paths that feed the C-DTS in order to evaluate predicted effect of planned paths on traffic development associated with a road network, e.g., time related travel times and volume to capacity ratios on network links in a predicted time horizon.

The module "c" is a planning and control functionality that plans paths for controlled trips by a parallel planning approach under iterative process, wherein the planning is associated with agents that plan paths independently under parallel process, and wherein the control part of "c" applies selective acceptance to planned paths which made a change to previously planned paths (applied according to previous C-DTS traffic prediction). The selective acceptance of paths is applied under each iteration by, e.g., said travel time limiting criteria associated with said coordination control processes, enabling gradual controllable convergence of traffic load balancing.

With such approach, the non-predictable level of the effect of planned paths on the network that is evaluated by a C-DTS prediction phase (in the iterative process) increases with the increase in the level of control steps (i.e., the level of said accepted paths that affect a change on predicted traffic development and which non-predicted level in traffic development is proportional to potential conflict associated with accepted paths planned independently by multi agent planning phase of the iterative re-planning process and is further proportional to the non-linear reaction of the supply model to changes in paths associated with a controllable dynamic traffic simulator [C-DTS in FIG. 3.1]).

Up to this point the approach of PMBMB-IMA-MPC was described in context of expansion of coordination control processes by multi branch and multi batch processes, wherein an iteration of a branch related batch of PMBMB-IMA-MPC is an iteration described with embodiments associated with coordination control processes applying model predictive control approach (closed loop).

FIG. 3.1 associated roughly the coordination control processes with coordination control processes by a control element (c) and traffic prediction element.

However, FIG. 3.2 illustrates a data flow diagram (that can be seen as a block diagram that connects process elements) of the loop illustrated by 1 in FIG. 3.1, which applies an iterations of a branch related batch of PMBMB-IMA-MPC of, for example, the above described coordination control processes which are aimed at supporting predictive coordination of controlled trips on a network and which provide a core a core building block for a branch related batch PMBMB-IMA-MPC. FIG. 3.2 should be considered as a recommended approach to combine the various functionalities in the Figure but not a mandatory approach. i.e., it is just an example to integrate the illustrated functionalities that are described with respective embodiments while each functionality may be applied individually to support any of the describe functionalities with respective embodiment and/or with relevant non-describe functionalities.

FIG. 3.2 may be seen as an elaboration of the interiors of the loop illustrated by 1 in FIG. 3.1, i.e. it elaborates two elements comprising the traffic prediction processes applied by C-DTS in FIG. 3.1 and the control processes associated with planning and coordination of paths applied by Control (C) in FIG. 3.1.

The control process elements in FIG. 3.2 comprises process elements 1, 2, 3, 4, 5 and 6, wherein process element 1 and process element 2 in FIG. 3.2 refers to processes associated with planning and coordination of paths which are elaborated with the above described coordination control processes, and wherein the planning of paths is part of the described coordination control processes. The planning of paths, as well as the following referred complementary coordination related process element 2 in FIG. 3.2, comprising jointly with process 3 in the figure are the process elements that their core functionalities were described with coordination control processes, wherein further exaptation of these process elements and further new process elements, which support process element 1 and process element 2, are introduced with the following description of FIG. 3.2. In this respect the expanded process element 2 and the expanded process element 3 are further elaborated while described expansion to process 1 is introduced by further description of its supporting process elements 4,5 and 6 in FIG. 3.2.

Process element 2 in FIG. 3.2 applies control steps associated with coordination control processes, which control steps refer to travel time limiting criteria that support gradual mitigation of imbalanced traffic on a network by controlling the acceptance level of planned paths at each iteration of the coordination control processes. In this respect, in comparison to the above described coordination control processes, which refer to applicability of a single travel time limiting criterion (using the term "threshold" for such criterion), further embodiments consider a plurality of such criteria enabling coordination control processes to apply a plurality of traffic load mitigation for different links, or group of links, according control steps that may be adapted to the level of required mitigation rates. In this respect, relatively higher level of traffic load mitigation requires relatively higher control steps (less tight travel time limiting criterion under further constrains associated with the effect of such mitigation on the absorbing links).

The objective of a travel time limiting criterion is to selectively accept changed paths associated with planning of paths that may have no limitation on greedy planning of alternative paths with respect to the aim to try to improve travel time for assigned paths to trips (process element 1 in FIG. 3.2). In this respect a travel time criterion (process element 2 in FIG. 3.2) convers a UO planning approach (applied by process element 1 in FIG. 3.2) to a controlled UO approach, enabling to substantially maintain fairness with planning that may converge towards load balance. As mentioned above, a plurality of travel time limiting criteria enable to apply different control steps for different parts (link(s)) on the network in relation to required rate to apply imbalanced traffic mitigation associated with controlled traffic predictions that may predict overloaded links on the network according to planned paths.

Such travel time limiting criteria introduce control steps enabling to apply substantial non-discriminating and controllable iterative coordination of paths. The issue that is resolved by such approach is the ability to maintain on the one hand non-discriminating coordination of paths, which UO approach inherently provides, and on the other hand to avoid the disorder in traffic that a UO approach applies massive parallel greedy planning of paths (associated with non-marginal length of controlled rolling horizon).

In this respect, it should be highlighted that predictive UO approach (applying reactive planning to predicted effect of planning of paths) may not enable to apply predictive coordination of paths, and therefore, while there is no way to avoid UO approach to provide a key to acceptable solution which maintains non discriminating coordination, the time limiting criteria enable the UO approach to limit the effect of UO based planned paths to a level that minimize potential disorder on traffic development (which is critical to enable controllable load balancing under non-marginal usage of controlled trips on a network) and enables to apply conversable proactive coordination of paths by a controlled UO approach.

Without usage of process element 2 in FIG. 3.2, the mentioned predictive UO approach applies model predictive control loop which is actually a non-converging reactive predictive control approach. In this respect, re-planning of paths under reactive predictive control is based just on predicted traffic development information (produced by controlled DTS according to previous re-planning phase) that lacks coordination associated with converging control element and to which, as mentioned above, process element 2 in the figure provides the key control element enabling to apply controllable UO approach.

In practice, reactive predictive control, which applies iteratively predictive UO according C-DTS and lacks said key control element, is not applicable to cope with citywide predictive traffic load balancing, wherein the longer the predicted horizon associated with reactive predictive control, and the higher is the percentage of controlled trips, the higher is the traffic disorder that such approach creates on a road network.

In this respect, the travel time limiting criterion/criteria enable to convert a non-conversable reactive predictive control to a conversable proactive predictive control for proactive coordination of paths, while maintaining nondiscrimination in predictive planning of paths under significant predicted (controlled) rolling horizon.

As mentioned above, this objective is attainable with process element 2 in FIG. 3.2, which apply control steps that limit the effect of parallel re-planning of paths (applied by a reactively predicted UO approach) by accepting a portion of planned paths and evaluating the effect with C-DTS predictions at each iteration, enabling iterative controlled distribution of paths on the network.

Process element 3 in FIG. 3.2 supports process element 1 in the figure by enabling process 1 to apply hierarchical traffic load balancing which is introduced with the above described coordination control processes. With a hierarchical traffic load balancing, predictive load balancing associates priority to relatively loaded links according to which mitigation of traffic loads from prioritized relatively loaded links applies gradual alleviation of traffic loads starting with the highest priority relatively loaded links and gradually referring to lower prioritized links.

In this respect, process element 3 in FIG. 3.2 determines according to some embodiments prioritized relatively loaded links by evaluating the volume to capacity ratios, preferably with relation the potential capacities of links, so as the relatively loaded links will be ranked according to priorities wherein the higher the potential capacity and the higher volume to capacity ratio the higher is the priority to be associated with hierarchical traffic load balancing, and wherein the aim of the hierarchical mitigation is to support controllable level of coordination control processes which is somewhat more greedy with respect to an objective to obtain high mitigation of imbalanced traffic in shorter time.

However, the above described embodiments, which introduce the hierarchical load balancing, lack an ability to take into account effectively the potential mutual effects among mitigated relatively loaded links which issue increases with the reduction in the level of imbalanced traffic. Lack of such an ability negatively affects the effectiveness of predictive coordination, wherein two or more relatively loaded links, which their over-loads are mitigated at the same time, while their mitigation may negatively affect each other, may lengthen the convergence time associated with mitigation of imbalanced traffic.

To be more concrete, the lower the level of mutual effect the higher is the number of relatively loaded links that can be mitigated in parallel more rapidly, while the higher the load balance on the network the higher is the number of mutually potential effected links under load balancing.

To alleviate such an issue, there is a possibility at the extreme case, in which mutual effects are associated with oscillations in planned paths, to apply according to some embodiments forced distribution of paths temporarily. A prime process to said forced distribution is associated according to some embodiments with applying dilution in mitigated loaded links by increasing the resolution of the priority levels associated with relatively loaded links which may reduce further the number of paths associated with forced distribution.

Such a process cope at a certain level with relaxation of oscillations, however, with such approach the forced distribution might be too early as some or even major part of the oscillations can be decayed along a non-affordable number of iterations which may reduce or even eliminate said oscillations and as a result to minimize forced distribution of paths under the planning process element 1.

In order to cope with such issue there is a need to first detect non-sufficiently controllable mitigation of traffic imbalances, which is associated with mutually related links and which seems to lengthen the mitigation convergence, and which process element 5 in FIG. 3.2 may, for example, help to detect and transfer the indication to process element 3 in the figure. In this respect non stable changes in paths associated with slow mitigation of traffic loads from relatively loaded links (e.g., according to V/C on respective links) may indicate on links that are interfered by said mitigation of imbalances.

Reaction to indication on mutual interference among prioritized relatively loaded links may be applied by process element 3 as illustrated in FIG. 3.3 by a simplifies hierarchical example of said mitigation of imbalances. In this respect, FIG. 3.3 illustrate two stage related prioritization of relatively loaded links wherein two-dimensional representation is used (network links are illustrated on a single axis) wherein:

- The links (horizontal) axis in the figure comprise links that the mitigation of their traffic loads potentially affects loads of other links at a level and range that is proportional to their relative traffic loads, wherein nearby links according to the example in the figure are mutually affected by mitigation of traffic loads on interrelated links,
- The traffic load (vertical) axis in the figure refers primarily to V/C values on links, preferably with relation to links that have similar absolute traffic capacity according to predetermined selection criterion enabling to prioritize high capacity loaded links before referring to V/C related priority criterion for relatively loaded links.

According to some embodiments, the traffic load (vertical) axis is virtually referring to mitigation related relative traffic load axis, which provides higher priority level to relatively loaded links having higher potential mitigation of traffic loads as further elaborated with an example that refers to link "c" in FIG. 3.3. In this respect, relatively loaded links, which their priority is related to their relative level of V/C, preferably with further relation to their relative level of traffic capacity, might not be able to solely prioritized relatively loaded links while some of the links that seem to be relatively loaded might not be relevant to be referred to prioritized or sufficiently prioritized according said criteria. For example, high V/C might reflect lack of alternatives, or lack of sufficient alternatives, for paths to mitigate traffic loads from such links and hence their priority with relation to imbalance mitigation is lower in comparison to their traffic load level. Handling priority for such links is further elaborated with reference to link "c" in the figure.

Step 1 in the figure refers to priority level threshold that determines (distinguishes) current prioritized relatively loaded links, wherein the three potentially highest prioritized relatively loaded links in the figure have no interrelated mitigation dependency under step 1, and wherein the priority under this step is applied primarily according to V/C, preferably reflecting traffic capacity criterion that distinguished links according similarity associated with their capacities.

Step 2 distinguishes further prioritized relatively loaded links which according to the figure is associated further with two of the partially mitigated relatively loaded links, under step 1, and with additional relatively loaded links which according to the figure have mutually related ranges of effected links under mitigation of traffic loads from prioritized links.

Link "c", which under step 1 in the figure is considered to be a prioritized relatively loaded link, according to said priority criteria (relative V/C and relative capacity), is found according to the mitigation under step 1 in the figure to have be less low potential alternatives for planned paths that use the link. In this respect, according to such embodiments the mitigation related relative traffic load level of the link (associated with vertical axis in the figure) is reduced before applying step 2, wherein the reduced level of mitigation related relative traffic load level on link "c" provides no priority to link "c" under step 2. In this respect it should be noted that relatively loaded links on the network, are primarily determined according to C-DTS predicted level of volume to capacity ratios (preferably with relation to links having similar level of capacity), and therefore their mitigation related relative traffic load is identified under mitigation of imbalance in traffic. However, since their mitigation related relative loaded traffic level might be changed along mitigation of traffic imbalances the reduction in their level of mitigation related relative traffic load is applied moderately in order to re-evaluate their potential mitigation related priority. The mitigation related priority may for example be relatively low, under given zone to zone demand distribution (trips related demand) wherein a link might seem to become relatively loaded according to C-DTS traffic prediction, however, such a link may actually reflect the result of load balancing under demand which makes such a link to be non-relatively loaded link with respect to potential mitigation of traffic loads from such a link. An extreme case is a link [bridge] between two road networks to which there are no alternatives for paths that comprise such links, whereas a less extreme case is a link to which there are some alternatives but the level of changed paths under mitigation of loads from such a link is relatively low and therefore it should preferably have a lower priority with respect to mitigation of traffic load from such links. In FIG. 3.3 link "c" is such a link.

Link "d", according to the figure, became more loaded under step 2 wherein, under step 2, it becomes a prioritized relatively loaded link due to the increase in the V/C value under mitigation of imbalances applied under step 1.

In general, the transition from step 1 to step 2 is associated with increases in traffic load balance on the one hand while on the other hand the mutual dependence of links under mitigation increases respectively (es described e.g., in the figure). The mutual dependence of links under mitigation of imbalanced traffic is expected to slow down the mitigation on the network which under real time constrains it is crucial to alleviate such slowdowns. According to some embodiments, one strategy to cope with the issue is to decrease the level of steps (using finer discretization for prioritized relatively loaded links) which may enable to decrease the number of prioritized relatively loaded links and to increase control on the mitigation of simultaneous mitigated relatively loaded links.

According to some embodiment the discretization level of step can be applied non linearly wherein with higher traffic imbalanced traffic the steps are higher than with lower imbalanced traffic on the network.

However, such a strategy may have partial effect on increasing the effectiveness of imbalance mitigation since the issue of mutual interaction among traffic load mitigated links will raise again under some lower level of imbalance in the traffic flow.

According to some embodiments, a strategy to reduce mutual interrelated effects among mitigated relatively loaded links, which is expected to increase with the decrease in imbalanced traffic on the network (as for example is illustrated under step 2 in FIG. 3.3) and which slows down the mitigation of imbalanced traffic due to mutual interference among mitigated traffic loads on interrelated prioritized relatively loaded links, is diluting mitigation of traffic loads by alternately mitigating groups of links that each of them have relatively low (or no) interrelated links with respect to mitigation of their traffic loads.

In this respect, mutually interfering mitigated relatively loaded links are diluted in a manner according to which mitigation is temporarily suspended for some of the links while mitigation is applied to other non-suspended relatively loaded links, wherein said mitigation to the non-suspended relatively loaded links is preferably stopped after a limited level of mitigation (or mitigation time) while mitigation to the temporarily suspended links is activated, preferably also for a limited level of mitigation (or time mitigation).

Such alternating mitigation makes imbalance mitigation process to become somewhat less smooth (and further somewhat less non-discriminating with respect to the planning of paths), however, as long as the reduction in the level of said smoothness is applicably acceptable such approach shortens the time to obtain significant improvement in imbalanced traffic which is crucial for on-line load balancing applied under real time constraints.

FIG. 3.3 illustrates two groups of links that are candidates to be used with said alternating mitigation under step 2, wherein the links that are signed by "a" in the figure, and links that are signed by "b", may refer to two alternating mitigated groups of prioritized relatively loaded links, and wherein, as illustrated further in the figure, even after said group related dilution some level of potential mutual mitigation interference between mitigated relatively loaded links were still left according to the figure.

In this respect, mitigation which contains some level of potential mutual interference, may according to some embodiments apply further reduction in mutual interference, if it is more effective, by determining more than two cyclic alternating mitigating groups of relatively loaded links enabling further said group related dilution.

Another strategy to reduce said mutual interference may comprise according to some embodiments a process that limits the range of affected links, by a mitigated relatively loaded link (see in FIG. 3.3 limited mitigation ranges), which has an indirect cost of putting a boundary on the freedom degrees to search for alternatives under said imbalance mitigation. Therefore, such approach should be left for use under lack of more effective options.

In general, the described methods associated with process element 3 in FIG. 3.2 increases the potential independent parallel traffic flow imbalance mitigation on the network.

Process element 4 in FIG. 3.2 provides support to the planning process (process element 1 in the figure) enabling the planning process to take into account link costs that are not related just to predicted travel times on links, produced by a C-DTS, but further taking into account non-occupied capacities levels associated with links by the planning of enabling to rank the attractiveness of links that may absorb traffic loads while mitigating traffic loads from relatively loaded links.

In this respect, priority may be given, for example, to links that have relatively higher level of non-occupied capacities, among links that have comparable V/C ratio, wherein under search for alternative paths such a consideration may provide priority to links that have relatively higher capacity, in general.

With such approach, according to some embodiments, search for alternative paths, under e.g., above mentioned traffic load mitigation from relatively loaded links, may take into account not just a need to shorten travel time with a search for alternative paths but further higher confidence in the potential mitigation results from the search, i.e., taking further into account the side-effects associated with mitigating traffic loads from a relatively loaded link under parallel search for alternative paths (applied by planning of paths). In this respect, for short term significant improvement in traffic flow that have some cost in lengthening the time to attain ideal traffic load balancing, mitigation process that may be associated with a change to a plurality of paths should preferably be absorbed by links that have in the short term relatively higher non occupied capacities wherein the higher the non-occupied capacities of the potential absorbing links the higher is the absorption potential and the more effective can be the mitigation process.

For example, while the travel time on a single lane link and on a multilane link might have comparable travel timed due to e.g., the similar V/C, the non-occupied capacity of such links is different i.e., the multi lane link has higher absolute non-occupied capacity and hence has higher said absorption potential.

Therefore, according to some embodiments, cost of links that are used with said search for alternative paths under e.g., said traffic load mitigation as part of traffic load balancing (e.g., by coordination control processes applied e.g., by PMBMB-IMA-MPC), may not be based just on travel times (e.g., anticipated time dependent travel times which means travel time to pass links at a time of arrival to the links) but further two factors:

- anticipated travel times to pass links according to C-DTS traffic prediction, and
- non-occupied capacity of the link, preferably with further relation to absolute non-occupied capacities, which depend on the number of lanes and may further be associated with the length of links and possibly also with the distribution of the traffic on links that affects said absorption levels (e.g., a queue at the end of a link increases the absorption level at the entry of the link), wherein the higher the non-occupied capacity of a link (especially at the entry to a link) the higher the priority that should be given to the link.

In this respect, for example, a cost of a link may refer to a basic cost associated with anticipated travel time to pass a link e.g., at the time a vehicle arrives to the link, while the other factor may decrease the attractiveness (cost) of the link if the non-occupies capacity is relatively high, wherein, as mentioned above, relative non occupied capacity may refer inter-alia to the number of lanes.

An example for a simplified determination of cost for a link may use reference cost for non-prioritized relative non-occupied capacity, wherein in case that a single lane link is referred to non-prioritized relative non-occupied link then a two lane link that has the same length and the same anticipated travel times as the single lane link, may have relatively higher non occupied capacity and hence should have a relatively higher priority (e.g., lower cost) with respect to search for an alternative path under mitigation of imbalanced traffic flow. In this respect, provision of priority to non-occupied capacity for a case in which two alternative links that have the same travel time cost and the same length while one has a single lane and the other has two lanes, is associated, for example, with providing priority of ⅔ to the two lane link and ⅓ to the single lane link for traffic load mitigation.

Conversion of the ⅓ and ⅔ distribution to cost under different travel time costs among links is a more complex issue while there is a need to take also further factors, e.g., distribution of traffic on links and preferably a further factor associated with the control stage. In this respect, according to some embodiments, the size of said control steps is taken into account wherein the higher the size of control steps the higher is the need for said absorption potential and hence the higher is the priority that should preferably be given to higher levels of non-occupied capacities on links. Nevertheless, under continuous traffic load balancing on the network the prioritization of capacities is less critical issue while under significant deviation of traffic from load balance the on-line traffic load balancing is associated with off-line learning processes, introduced above and further elaborated with respect to usage of deep earning, which the learning processes may have sufficient time to optimize cost related to non-occupied capacities.

In this respect, factorization to travel time costs according to relative non-occupied levels on links may contribute to higher convergence rate of imbalanced traffic mitigation. For example, under significant imbalance in traffic loads on the network, wherein high level of control steps are applied, and wherein such steps may anticipated to cause attempts to mitigate significant traffic loads from one or more relatively loaded links, and wherein such mitigation has high potential to increase traffic loads on other links, it is valuable to prepare conditions for high said potential absorption. Therefore, according to some embodiments, links with high capacities and relatively high non occupied capacities, which have higher potential to absorb mitigated traffic load from relatively loaded links, may be associated under usage of high control step with higher priority, e.g., reduction in their costs, in order to enable more effective short term load balancing (sorter convergence rate towards sub-optimal load balance).

In this respect, relative priority that is given to non-occupied capacity may be adaptive according to some embodiments to the anticipated effect of a control step, wherein adaptiveness may according to some embodiments be associated with a nonlinear factor to adjust costs of links having non-occupied capacity. Non-linearity may relate to the distribution of non-occupied capacities among links in order to accelerate convergence of mitigation of traffic loads from relatively loaded links using less iterations.

In this respect, for example, the higher the load balance on the network the lower are the control steps levels and as a result the lower is the need for increasing discrimination among non-occupied capacities associated with links (applying factor of one to natural link costs).

According to some embodiments, traffic load balancing effectiveness may take benefit of acceptable level of random noise is used with link costs to affect different effect of potential similar planning for similar trips, enabling distribution of paths to be more effective by obtaining less congested distribution of path while further enabling to reduce the number of iterations that should be applied by iterative coordination control processes wherein randomness, which is associated with single trip or a group of trips, should have acceptable effect on discrimination among planned paths (under the aim to maintain non-discriminating paths). Such a process may be associated with process element 1 in FIG. 3.2, wherein it is mentioned in context of process element 4 in order to complement aspects associated with controllability of traffic load balancing as the further process, which should preferably be associated with process element 5 associated with FIG. 3.2, wherein controllability of traffic load balancing may be associated with determination of minimum travel time to be gained with acceptance of planned paths, according to travel time limiting criterion, wherein the minimum gain is related to the level of an ability to apply traffic load balancing under control, i.e., an ability of not losing control on load balancing for marginal benefit under improvement of traffic load balance.

Process element 6 in FIG. 3.2 is aimed at enabling to support scalability of the planning and coordination of paths associated with coordination control processes, which apply iterative Model Predictive Control (MPC) to predictively balance traffic loads on the network, and which according to some embodiments an iteration of coordination control process is associated with an iteration in a batch of a branch of PMBMB-IMA-MPC.

The issue that process element 6 should cope with refers to a need to apply a scalable solution for coordination of paths wherein as increase in the size of a network cause:

- an increase in the number of vehicles on an increased size of a citywide network, which increases the computation complexity linearly,
- an increase in the size of the network, which increases the complexity of the search for paths non linearly
- an increase in the number of iterations that may prevent an ability to cope with coordination of paths, even for a medium size of a city, due to non-acceptably applicable required computation power.

Under such conditions, there are two remedies that may alleviate the scalability issue, which may comprise according to some embodiments:

- bounding the planning of paths to search for paths in relevant part of the network associated with zone to zone trips, enabling to decline the planning time associated with coordination control processes iteration, which are actually predictive coordination control processes (PCCP),
- bounding further the planning of paths to a predicted horizon, under controlled rolling horizon to which boundary the coordination of paths will be restricted as well, enabling to reduce the number of iterations associated with the coordination.

In this respect, although the direct effect on computation complexity refers to distributed search for paths, and hence on effectiveness of PCCP to perform under real time constraints, a further effect on computation complexity is associated with the iterations that are associated with re-planning of paths.

For example, effective time sharing between the planning phase and the prediction phase is required to further increase utilization of computation power associated with distribution of the planning of paths part and the traffic prediction part of the control system.

When considering this issue with a need to cope with a large citywide network, compromises should be taken into consideration, wherein, as mentioned above, reduction in potential loss in effective coordination of paths is associated with introducing boundaries with the planning of paths.

However, according to above described embodiments, coordination of paths introduces no network space boundaries on planning of paths which is a favorable approach as long as it is affordable, that is, as long as the size of network is small enough to maintain applicable computation resources.

To make the point clearer, with the above described embodiments, boundaries on dynamic planning of paths consider travel time limiting criteria that limit the effect of planned paths to a level that enables to apply converging traffic load balancing under non discriminating planning of paths while reducing traffic loads from relatively loaded links, by using coordination control processes with no limit on the distance of trips from their destinations and with no consideration of flow related direction.

The above described iteration of coordination control processes (PCCP) are applied by further elaborated Dynamic Planning and Coordination of Paths (DPCP), wherein the DPCP is associated further with process element 6 in FIG. 3.2, and wherein the DPCP actually apply bounded iterative MPC approach using control steps (applied by process element 2 in FIG. 3.2 and determined by process element 5 in the figure), and wherein DPCP may comprise all the processes associated with the control related processes elements in FIG. 3.2 comprising process elements 1, 2, 3, 4, 5 and 6.

However, with some of the following described embodiments which relates to DPCP are focusing on process element 6 in FIG. 3.2, which determine boundaries for the planning process element in the figure. In this respect the PCCP associated with DPCP is mentioned at a level that is agnostic to the effect the other control process elements supporting the process element 1 and the process element 2 in the figure.

Before entering into elaboration of embodiments associated with process element 6 in FIG. 3.2 it worth to introduce in some more details the issue associated with a need to apply limited predicted horizon with DPCP. In this respect, beside the increased computation complexity associated with planning of paths under increased size of a citywide network, the complexity of applying traffic predictions in a relatively short time by C-DTS is not just an issue of more computation power but further an issue associated with network decomposition which should cope with synchronization issues under distributed and sensitive parallel processing. Therefore, an iteration of DPCP becomes quite limited which compels a need to apply limited controlled rolling horizon with the traffic load balancing on a citywide road network.

With such approach, the longer the rolling horizon the higher is the number of iterations that may be applied under time constraints associated with applicable computation power and, as a result, the higher is the level of traffic load balancing that may be attained.

However, as mentioned above, even though it may hypothetically be assumed that the accuracy of DPCP prediction phase is applicably for any horizon length, which in practice is not the case, the length of the horizon should be limited under iterative DPCP process in order to enable sufficient number of iterations to coordinate paths under time and computation complexity constraints.

In this respect, the larger the road network the higher the issue associated with an ability to increase respectively the length of the rolling horizon, while putting a limit on the rolling horizon is not a favorable choice but a compromise enabling to maintain controllable coordination of paths.

According to some embodiments, described hereinafter, such a compromise may be moderated while taking into account, inter-alia, that the DPCP under increase in the size of a road network may mainly be affected by a rolling horizon which reduces the dependence of DPCP on the size of the road network.

This refers to a typical average length of trips that are loosely dependent on the size of the network and, therefore, if the length of a rolling horizon is related to the length of average trips on the network, to which some further marginal length may be added (beyond said average length), the effectiveness of using similar controlled rolling horizon for different sizes of citywide networks may be similar while applying a controlled rolling horizon that is loosely dependent on the size of a network.

Adding to the rolling boundary zone to zone related boundaries to be associated with the planning of paths, enables to further reduce the complexity associated with the planning.

In this respect it worth noting that limiting the network space for searching new or alternative paths is crucial to enable applicable solution under increased size of a network on which the travel time costs are dynamic, dominated by dynamic change of costs under iterative coordination of paths, wherein the alternative is heuristics related path finding (e.g., D* light while not mentioning inapplicability of A*) which is not applicable due to the high dynamic changes in travel time costs on links under the coordination of paths.

Up to this point it might seem that a strategy to apply zone to zone and rolling horizon boundaries may reduce drastically network spaces to search for new or alternative paths and hence the scalability issue associated with the planning and coordination of paths.

However, there are several issues that should be considered and resolved with such a strategy in order to make it applicable.

The first issue refers to the seeming inapplicability of applying a rolling horizon which is not associated with final destinations of trips beyond a predicted horizon, wherein the exit from predicted horizon for such trips should be planed according to the final destination for which there is lack of control and dynamic information in order to enable determination of exit from a predicted horizon.

The second issue refers to effectiveness of zone to zone boundaries wherein planning of paths for a certain zone to zone flow there can't be isolated from other planning associated with other flow directions. This issue is highlighted in FIG. 3.4*a* in which the trips are potentially related to traffic flow under simplified zone to zone boundaries AB, DI, JI, EI, FI, GB, FB, CB CF, CI, EB, JB, and DB.

The illustration in FIG. 3.4*a*, is a simplified example issue which might seemingly become more complicated while the illustrated rectangles are substituted by more effective boundaries associated with different overlapping zone to zone trip flows as further described with some embodiments.

Nevertheless, the directivity of the load balancing, i.e., bounding the coordination control processes to zone to zone related flow, as further elaborated, has no bounding effect on the trigger to apply proactive coordination control processes under DPCP which are the relatively loaded links, preferably prioritized relatively loaded links.

According to some embodiments, said issues that are associated with applying bound to the planning and coordinating paths (e.g., by iterative DPCP), under limited coverage of the predicted horizon, are introduced and further resolved, or at least alleviated, by a following described Traffic Load Balancing Processes (OLTLBP), which support the determination of zone to zone boundaries and further the and Beyond Horizon Planning Support Processes (BHPSP) that support determination of exits of trip paths from a limited predicted horizon when trip destinations are located beyond predicted horizon, and which processes and their related complementary processes support process element 6 in FIG. 3.2.

The first referred issue is associated with more than one mode of BHPSP which take into account different traffic conditions that utilize information beyond predicted horizon in order to support determination of exits from a predicted horizon.

As further elaborated, under substantial absent of traffic irregularities (marginal imbalances on the network), the BHPSP use network related information, beyond predicted horizon, determined according to off-line traffic load balancing applied by OLTLBP that produces:

- daily time related travel times on network links for load balanced network, according to daily time related zone to zone demand of trips (to be used by the BHPSP and further by on-line DPCP), and
- zone to zone boundaries, to be used further by on-line DPCP, wherein the boundaries are produced by a post process to the OLTLBP, and as part of it, using the coordinated paths produced by the OLTLBP to determine zone to zone boundaries according to the distribution of zone to zone paths.

The BHPSP, which is a post process to the OLTLBP, guides the DPCP to determine exits from predicted horizon boundaries, the information produced by OLTLBP reflects substantial traffic load balance under recurrent demand and regular traffic. In this respect the BHPSP may refer further to BHPSP under regularity (i.e., BHPSP-UR).

As further elaborated, under traffic irregularities (typically locally), expected development of traffic beyond the predicted horizon may not count on off-line pre-prepared time related traffic information beyond predictive horizon, or at least not fully count on such data.

Therefore, according to some embodiments, data of daily travel time on network links that are produced by OLTLBP and used by BHPSP-UR as pre-prepared traffic prediction related data for beyond horizon planning as further described, may preferably not be used for beyond horizon planning supporting process under irregularities (BHPSP-UI).

Both, BHPSP-UR and BHPSP-UI are used to maintain as much a possible proactive DPCP which applies predictive load balancing in a predicted horizon, using iterative planning of paths (control) phase and traffic prediction phase under converging criteria toward load balance while applying e.g., the above described coordination control processes. Reactive DPCP, on the other hand, although applies said iterative planning of paths (control) phase and traffic prediction phase as well, however, since it may not count on convergence towards load balance, it may be used according to some embodiment to support or substitute proactive DPCP under traffic irregularities (reactive DPCP applies predictive user optimal while proactive DPCP applies controlled user optimal associated with predictive coordination of paths).

If not otherwise specified, the term DPCP refers hereinafter to both proactive and reactive DPCPs under which on-network trips (current trips), and predicted zone to zone demand for controlled trips (predicted trips), are predictively controlled.

In this respect, according to some embodiments, under different levels of local traffic irregularities different weights are provided proactive and reactive DPCPs, wherein under regular traffic proactive DPCP is used, whereas, under local traffic irregularities, reactive DPCP may be applied partially while the local weight of proactive DPCP is reduced. The level of the reduction of the weight of proactive DPCP depends of the level of the irregularities that prevents gradual iterative convergence towards load balancing. Such approach is further elaborated with further described embodiments.

In this respect it should be noted that combined reactive and proactive DPCP, according to respective weights, affects according to some embodiments the usage of predicted horizon wherein the predicted horizon is virtually divided into near and far parts, and wherein the near part is handled by proactive planning of paths (proactive DPCP) and the far part by reactive planning (reactive DPCP). Nevertheless, as long as the applicability of proactive DPCP provides advantage over reactive DPCP the predictive horizon for the proactive DPCP will not shrink.

In this respect, both processes BHPSP-UR and BHPSP-UI are aimed at facilitating systematic scalable planning and coordination of paths for predictive traffic load balancing applied with proactive DPCP on small up to large road networks, while facilitating the need to handle dynamic exits from traffic prediction horizon for planning paths by on-line DPCP.

The BHPSP-UR and BHPSP-UI, which supports the beyond horizon aspects for planning and coordinating paths by proactive DPCP, may be applied as on line processes while BHPSP-UR is preferably applied as an off-line process (which relies on off-line pre-prepared travel times applied by OLTLBP).

Before entering into detailed description of embodiments associated with the predicted horizon boundary and the resolved issue of determining exits from a predicted horizon, the determination of zone to zone boundaries are first introduced.

As mentioned above, the OLTLBP applies off-line traffic load balancing which further comprise according to some embodiments a post process that determines further zone to zone boundaries for on-line DPCP, based on OLTLBP zone to zone distribution of paths (to which possibly interconnecting links and paths among the distributed paths are added). Preferably, some further links are added to the zone to zone paths distribution related boundaries, according to some embodiments, enabling to cover further network space in order to support further on-line traffic load balancing under deviations of the traffic from the off-line OLTLBP load balance traffic.

The additional links that increases the network space, associated with zone to zone boundaries, may be added by an off-line process (e.g., OLTLBP) or by an on-line process (e.g., a reactive or proactive DPCP sub process), wherein the advantage of on line process is its ability to add relevant links according to local irregularities in order to provide further freedom degreed to balance traffic under concrete level of traffic irregularities that can be used with on-line DPCP.

As mentioned above, zone to zone boundaries, which bound the reactive and proactive on-line DPCPs, are complemented by prediction horizon boundary (applied by DPCP) that further bounds the planning phase of proactive and reactive DPCPs as further mentioned above.

For convenience, and due to implementation convenience, the predicted horizon may preferably be determined by prediction time horizon that subsequently determines distance horizon (relative to positions of vehicles) affected by current and developed traffic conditions, wherein according to some embodiments prediction time may vary with traffic conditions on the network, e.g., detected transition from high traffic density to a lower density can be associated, for example, with effective increase in prediction time horizon. It worth noting that while the term traffic prediction that is used here and along the patent application the prediction is a result of demand and traffic conditions which is produced as traffic prediction from a dynamic traffic simulator comprising demand and the supply models (used jointly as a model of the model predictive control applied with the described predictive load balancing).

Such bounded traffic predictions are used on-line by DPCP and should preferably be used earlier by off-line by OLTLBP in order to produce traffic load balancing that complies with on-line load balancing under proactive on-line DPCP. Hereinafter, if not otherwise specified, the term DPCP weather it relates to proactive or reactive DPCP refers to on-line DPCP.

The processes that determine the boundaries for DPCP, which include zone to zone flow related boundaries and predicted horizon related boundaries, refer hereinafter to Bounded Paths Planning Support Processes (BPPSSP).

In this respect, the BPPSSP may refer to any direct and indirect processes associated with affecting the determination of boundaries for the planning phase of DPCP, which according to some embodiment may comprise said on-line and off-line processes wherein off-line processes may comprise, inter-alia, calibration of a C-DTS as an off-line preplanning process (OLPPP) to the off-line traffic load balancing processes (OLTLBP).

The following elaborates the determination of zone to zone related boundaries which, in conjunction with traffic prediction rolling horizon related boundary, are used to bound the planning of paths phase of a DPCP iteration.

According to some embodiments, boundaries to apply planning phase of a DPCP iteration (bounded by predicted horizon and by zone to zone boundaries) are determined by the support of OLPPP and OLTLBP, wherein the OLPPP applies off-line calibration of a dynamic traffic simulator, and wherein the traffic load balancing is applied further by the OLTLBP on the calibrated dynamic traffic simulator. The OLTLBP is a gradual load balancing process that, according to some embodiments, increases gradually the simulated share of predictively coordinated trips (navigated trips) on the network while decreasing the share of non-controlled trips that use paths according to calibrated route choice model. Under such a process, the route choice model should preferably be recalibrated several times for each non marginal increase in the share of load balanced attained by the controlled trips.

After each stage of recalibration, and initial calibration, zone to zone boundaries to zone to zone boundaries are re-determined for planning of paths, e.g., by proactive off-line DPCP (without beyond predicted horizon information usage, at an early stage and with beyond predicted horizon information at an advanced stage which information is further elaborated), under OLTLBP, wherein calibrated route choice model may provide according to some embodiment a base to determine zone to zone boundaries for planning paths under said OLTLBP.

The coordinating planned paths, produced by the final OLTLBP phase, provide a base to further determine daily time related zone to zone boundaries, e.g., by a post process associated with the OLTLBP, enabling to support determination of dynamic exits of paths from predicted horizon to be used by DPCP. The support processes comprise the BHPSP-UR and BHPSP-UI.

The issue that BHPSP-UR and BHPSP-UI should resolve, or at least alleviate, is associated with a need to apply traffic prediction horizon boundary wherein the final destinations of some (or whole) of controlled trips may not be covered by the predicted horizon. In such a case, which is expected to be a typical situation with DPCP that applies citywide traffic load balancing, trips with non-covered destinations in the predicted horizon introduce an issue to the planning and coordination of paths wherein there is a need to a-priory know the location of the destination of each trip in order to enable coordination.

Lack of location of destination of a trip within the prediction horizon may not enable to refer to a known (stable) destination which makes any coordination of paths inapplicable under conventional direct approach. This includes the above described coordination control process that enables to cope with fairness in the planning and coordination of paths.

The issue that a solution should cope with in this respect is a question of how to handle the exits from the predicted horizons for trips that their destinations are located beyond the predicted horizon, while there is a lack of real time related traffic information and lack of applicable computation power to handle coordination up to final destinations of all controlled trips (trips that are on the network and trips that are predicted to enter the network and should be controlled (coordinated in advance) jointly with controlled trips on the network).

Such an issue, which refers to a need to determine exits from a predicted horizon, introduces a challenge in which there is a mutual dependence among exits from a predicted horizon and final destinations and as a result the exits from a predicted horizon and final destinations may not be applicably used as destinations. This may lead to a question of whether there is a way to determine stable virtual destinations for trips that are close enough to the predicted horizon and may further reflect the location of final destinations.

Beyond the question of how to resolve such issue, it should be clarified that such a virtual destination should reflect on the one hand a respective destination for a trip and travel time to the destination which is a derivative of network space (links) that connects potential exits from prediction horizon with the respective a destination located beyond the predicted horizon, while not adding computation complexity that might be an issue for real time solution associated with a citywide road network.

To be more concrete, such a solution should disconnect the dependence of the coordination on exits from the predicted horizon, as being destinations for coordination of controlled trips, while virtually increasing the predicted horizon to cover the final destinations without a need to increase the predicted time horizon to a level that should actually cover all final destinations of controlled trips (current and predicted trips).

However, even though one may find a way to determine such virtual destinations there would still be left an issue of lack of updated travel times to locations beyond a predicted horizon and therefore it seems infeasible to apply reliably coordination of paths while taking into account destinations beyond the predicted horizon. Nevertheless, under mitigating conditions of:

- continuous maintenance of predictive load balance from early hours in the morning, and
- non-significant irregularities in recurrent demand of trips and in the traffic flow, and
- non-significant deviation of the traffic flow on the network from flow that an off-line load balancing produced, for example, by applying said coordination control processes which preferably associated with boundaries to apply real time coordination under recurrent demand and regular traffic flow, it may be applicable, according to some embodiments, to refer to some extent to time related travel times on the network beyond predicted horizon that were produced by such said off-line traffic load balancing as means to differentiate exits from predicted horizon (although the potentially predicted travel times according to the current DPCP may not fully match the off-line travel time).

In this respect, proactive DPCP which applies coordination control processes that coordinate paths within a predicted horizon boundary, according to dynamic updates of the time related travel times, may take benefit of daily time related travel times that were determined off-line by e.g., OLTLBP.

This opens an ability to determine according to some embodiments daily time related travel time costs to destinations beyond exits from a predicted horizon which further provide an ability to plan and coordinate path within predicted horizon boundary while the travel times beyond the predicted horizon are under said mitigating conditions, are reflecting load balance which the current DPCP should aim for.

In this respect, exit costs towards destinations are not expected to reflect on-line travel times on exits but rather to be used as travel times that may enable on-line DPCP to differentiate exits from predicted horizon by referring to beyond horizon virtual destinations that are determined through beyond horizon time related travel time costs that may be associated with destination links as further elaborated.

With such approach, the coordination of paths may refer to virtual destinations without a need to determine a-priori exits from prediction horizon, while e.g., maintaining further usage of above described coordination control processes that enable to apply substantial fair distribution of trips that use virtual destination beyond predicted horizon using dynamic exits toward destinations (under on-line DPCP).

However, considering to take advantage from travel time beyond predicted horizon, using off-line pre-determined time dependent travel times, introduces two real time related issues:

- computation complexity associated with determining dynamically travel time costs between said exits and destinations beyond predicted horizon, which is a non-marginal computation consuming issue for a large network,
- potential mismatch between the off-line load balancing and on-line load balancing, wherein the higher the mismatch the lower is the contribution of the off-line predetermined travel time costs which at a certain level of mismatch the contribution of the off-line travel times to differentiate exits under DPCP may become counterproductive.

Considering said computation complexity issue (applicable under sufficient said load balancing related match), pre-prepared virtual destinations are determined according to some embodiments by a combination of off-line and on-line processes wherein the off-line process determines daily time related link to link paths, using shortest path search according to off-line predetermined time related travel times associated with result from off-line load balancing (applied e.g., by OLTLBP), and accordingly determines time related travel time cost of the path (according to time related travel time costs associated with links of paths).

Said time related costs of paths may considered as representing time relate travel time cost of virtual links which under on-line DPCP may determine said virtual destinations. Determination of said time related paths and their time related travel time costs is applied according to some embodiments by post processes to said load balancing associated e.g., a post process of OLTLBP. The determined daily time related link to link travel time costs are stored in order to be used further by on-line DPCP to further determine virtual links for said exits from predicted horizon directly, and indirectly virtual destinations, wherein, under on-line DPCP, respective off-line predetermined time related link to link travel time costs are retrieved from the storage to determine virtual links on potential exits for each trip that its destination is beyond predicted horizon according to a match between the potential exits from the predicted horizon and final destination link of the trip and the respective link to link stored time related travel time costs.

In this respect, determination of time related travel time costs by off-line search for shortest path according to time related travel time costs, may be applicable when the traffic under online load balancing is not significantly deviated from traffic attained by off-line load balancing.

The described combination of on-line and offline processes to handle beyond horizon information with predictive coordination of paths enable saving of computation time under on-line DPCP.

However, if there is a significant deviation (typically locally) then further processes are added to support the reduced level of coordination. In this respect, the above described approach, which refers to dynamic proactive coordination of paths, would be supported to some extent by reactive coordination of paths and BHPSP-UI and in some situation further with BHPSP-UR, as further elaborated.

The term proactive DPCP refers by default to DPCP mentioned above and hereinafter, if not specified otherwise, i.e., proactive DPCP comprise the above-mentioned coordination control processes which apply predictive coordination of paths under zone to zone and predicted horizon boundaries. In this respect proactive DPCP is the prime choice to be used iteratively for planning and coordination of paths.

Such proactive DPCP applies iterative MPC which according to some further embodiments is applied with each iteration of a branch related batch of PMBMB-IMA-MPC.

The following description elaborates the aspects associated with applying BHPSP-UR and BHPSP-UI to support proactive DPCP under said boundaries with respect to usage of said pre-prepared time related link to link travel times for controlled trips that their destinations are beyond predicted horizon. In this respect, and as mentioned above, BHPSP-UR and BHPSP-UI, which according to some embodiments their online processes are associated with process element 6 in FIG. 3.2, enable proactive DPCP to cope with a need to choose dynamically an exit out of a plurality of exits from a predictive horizon, to which the DPCP is bounded, by determining virtual destinations that reflect final destinations that saves the need to apply coordination beyond predicted horizon.

In the following a method associated with BHPSP-UR is described, wherein the method may enable to alleviate the issue associated with a need to virtually enable dynamic selection of exits from a predicted horizon while applying coordination of paths within the boundary of the predicted horizon i.e., enabling the exits to not be used as destinations.

In this respect, BHPSP-UR, determine according to some embodiments said virtual destinations to guide the bounded coordination under predicted horizon to choose dynamically an exit from the boundary, wherein the horizon boundary is associated with a plurality of optional exits that should be chosen dynamically under iterative coordination of paths by proactive DPCP.

According to some embodiments, a pre-process to apply BHPSP-UR is determination of said link to link time related travel time costs a simulated traffic load balanced network in order to enable BHPSP-UR to determine accordingly time related travel times from exits predicted horizon to a destinations on the network, associated with the coordination applied by on-line DPCP, as part of determination of time related travel time costs for virtual links that indirectly determine virtual destinations.

In this respect, time related travel times costs, associated with said link to link paths, are according to some embodiments refer to travel time associated with the arrival of a vehicle to a link, wherein each link is associated with a plurality of travel time costs to arrive to other links on the network e.g., stored as a vector per link preferably with respect to link to link time related travel time costs that are bounded by zone to zone boundaries.

According to some embodiments, determination of such time related link to link travel times is applied by an OLTLBP post process after determination of said link to link shortest paths, which paths were determined after producing said time related travel times that reflects load balanced network applied according to some embodiments by said OLTLBP under recurrent traffic and demand conditions. According to some embodiments, the resolution of the time related travel times, which are stored e.g., in a said vector per link, might according to some embodiments have lower resolution than the resolution used with on-line time related travel times produced under DPCP traffic predictions.

According to some embodiments, the off-line predetermination of travel time costs is associated with iterative load balancing, wherein each iteration uses previous boundaries enabling to determine boundaries that may effectively be used by proactive DPCP on-line to differentiate between said potential exits associated with predicted horizon boundary. The term differentiation, in this respect, is associated with a need to provide priority to a preferred exit associated with a preferred path for a trip over other potential exits, under an iteration of a coordination process, wherein a preferred exit that is chosen, due to its relative contribution to reduce travel time to a destination of a trip, is not necessarily reflecting accurate ravel time to destination according to current DPCP process.

In this respect, potential mismatch between the conditions according to which the OLTLBP was applied and the current conditions cause a mismatch between travel time costs associated with an exit determined according to OLTLBP and the potential on-line time related travel time costs development. Therefore, as mentioned above, the term differentiation highlights the need to enable differentiation among exits, according to travel time cost from an exit to a destination of a controlled trip located beyond horizon, in order to guide planning of paths for trips while enabling to consider a pass through an admissibly preferred exit. An admissibly preferred exit from prediction horizon boundary is not expected to guarantee that the costs associated with exits are accurate, as mentioned above, however, to a large extent it may serve admissible guidance for planning paths under coordination of paths during which exits may be changes, especially under irregularities wherein BHPSP-UI is further used as further described.

In this respect, travel time costs to arrive to destinations from each exit to a destination that is associated with a trip, under bounded DPCP, may be determined according to some embodiments by said link to link time related travel time costs which may be associated with potential exits to destination links, preferably the off line determination of link to link time related travel times are link to link related stored travel time costs, applied for example by said OLTLBP, wherein the association of link to link related stored time related travel time costs with exits links from predicted horizon to destination link is applied by BHPSP-UR on-line for DPCP, and wherein such travel time costs may represent virtual links that with reference to a certain trip determine a trip related virtual destination that is common to respective trip related virtual links. It should be noted that the relation of said time related travel time costs per exit per trip to virtual links is an abstracted description wherein a virtual destination represents a real destination based on travel time cost beyond the predicted horizon while BHPSP-UR are not referring directly to the virtual destination.

In summary, BHPSP-UR comprises:

receiving exits from predicted horizon, determined by DPCP traffic prediction phase, receiving destination of trips associated with predicted horizon (including predicted new time related entries of trip to the network within the predicted time horizon according to demand model), determining (at iteration that changed the length of predicted horizon) for each trip associated with exit from predicted horizon to a destination beyond predicted horizon time related travel time costs to its destination according to respective stored link to link time related travel time costs, wherein according to some embodiments link to link time related travel time costs are determined by search for shortest paths according to daily time related travel times on links produced by OLTLBP wherein a post process to the OLTLBP prepares accordingly database of link to link time related travel time costs based on the daily time related travel times produced by OLTLBP for links associated with link to link path, and wherein according to some other embodiments link to link time related travel time costs are determined by averaging time related travel time costs of paths that are associated with simulated trips between link pairs according to daily time related travel times costs produced by OLTLBP for links wherein OLTLBP prepares database of link to link time related travel time costs for said average costs of link to link paths based on the daily time related travel times produced by OLTLBP for links associated with link to link path, updating time related ravel time costs from exits of predicted horizon to destinations of controlled trips for proactive DPCP associated with the current predicted horizon.

The proactive DPCP uses said costs on the said exits, with reference to said virtual destinations associated with each trip, as if the costs represent virtual links to each of the trip destinations (without a need to refer to the location of destinations). In this respect potential (and even typical) mismatch of the online traffic load balancing from off-line traffic load balancing may refer not just to off-line related (guiding) time related travel time costs but may further refer to a bias in the number of on-line paths on the boundary of the predicted horizon from the paths which produced off-line the travel time costs. However, a bias in the paths has low local weight in comparison to the weight of the travel time costs which are reflecting non local related costs and as long as the off-line related (guiding) ravel time costs are not reducing the effectiveness of the coordination of paths, under on-line DPCP that may apply required number of iterations to coordinate path under real time constraints on the motion of a rolling horizon, then the above described proactive DPCP may be maintained.

According to some embodiments, time related paths that are planned according to time dependent travel time costs on links by proactive DPCP, which applies iterative re-planning of paths for example by said coordination control processes within said boundaries, preferably associated with non-heuristic based search for shortest path (e.g., Dijkstra) applied according to predicted time dependent travel time costs on links. According to such embodiments, travel time costs on link that are timely considered with respect to the expected arrival time of a trip under predicted travel time cost generated by a dynamic traffic simulator, wherein under the planning of paths potential interrelated effects among parallel search for paths for different trips is not taken into account by proactive DPCP while at the end of the planning the effective search is limited by the coordination control processes, using one or more travel time limiting criteria which may refer to mentioned thresholds, enabling limited interrelated effect of said parallel greedy search that is further analyzed by traffic prediction that in turn may increase or decrease the potential effect on the network.

The applicability of said predictive traffic load balancing, applying bounded proactive DPCP, may take benefit of a few mitigating circumstances wherein the first is the ability to maintain load balancing from early morning in which the load balancing is affected by gradual entries of controlled trips to the network, along the day, for which the predictive load balancing prepares conditions by predictively considering entries of controlled trips and associating such trips with the coordinated planning of paths. The predicted new trips are generated by on-line dynamic traffic computer simulation according to predicted zone to zone demand of trips.

In this respect a new controlled trip entry may be assigned with pre-planned path in case its position is close enough to the time related origin of a predicted virtual trip to which load balancing path was planned. The match between the time related origins may be increased by guiding first a new trip to a time related position associated with synthesized origin of predicted time related virtual trip before associating a respective preplanned path with a new trip.

According to some embodiments, said match-increasing process might not be crucial to be applied, under substantial load balance on the network, since the freedom degrees that the pre-planned paths generates on the network may enable to apply, with new trips, greedy shortest path according to predicted time dependent cost of travel time on links which the load balancing may handle further their non perfect planned paths.

However, when the effectiveness of the proactive DPCP is reduced due to said lack of ability to maintain effectively the coordination of paths (detected e.g., by slow traffic imbalance mitigation convergence), the following methods, described with further embodiments, are used, wherein the preferred method, according to some embodiments, is to add reactive DPCP to the proactive before applying (locally) reactive DPCP in predictive horizon or the following describe limited proactive DPCP.

In this respect, the following the BHPSP-UI is described with respect to its contribution to apply according to some embodiments an approach of combined proactive and reactive DPCP.

Under irregularities in traffic on the network, typically locally, the applicability of traffic information, determined by the OLTLBP for beyond predicted horizon support to proactive DPCP, is gradually reduced and may not be used effectively as mentioned above.

In such a case, according to some embodiments, it might be favorable to still take benefit of the time dependent travel times produced by the OLTLBP by reducing the length of the predicted horizon (shorter rolling horizon).

According to some embodiments the declination in the predicted horizon is associated with entering DPCP that substitutes the proactive DPCP in the space between the predicted horizon of the shrunken rolling horizon of the proactive DPCP and the pre-shrunken predicted horizon of the proactive DPCP. Preferably updates of time related travel time costs on the predicted horizon (length rather than time horizon) is applied according to average time costs of paths produced by the reactive DPCP towards said virtual destination beyond predicted horizon per trip to which paths, before averaging, time related travel time costs of virtual links are added. Such approach is applicable if for each update of the exits of the proactive DPCP there are further left time to apply effective number of iterations by proactive DPCP.

When the latter approach becomes ineffective then the following strategies are applied, wherein:

according to some embodiments limited proactive DPCP is the applied strategy which is further described, according to some embodiments reactive DPCP is the applied strategy for which approach the rolling horizon is shortened or lengthen depending on the level of irregularities (i.e., the higher the irregularity the shooter is the rolling horizon).

According to some embodiments, the choice to apply reactive DPCP or limited proactive DPCP is a situation related choice, for example, to bypass a blockage on a link it would be valuable to first apply limited proactive DPCP.

In this respect, under traffic irregularities, limited proactive DPCP introduces a new type of directionality towards destination zone for a new limited proactive DPCP approach.

With limited proactive DPCP, a Target Predicted Horizon (TPH) and Auxiliary Predicted Horizon (APH) are applied in conjunction with a temporal common destination for zone to zone controlled trips on APH, wherein a temporal common destination (or a plurality of nearby destinations that may further relate to said common temporal destination) is determined as a position on the APH.

A common temporal destination is applied to guide the distribution of paths by said limited proactive DPCP towards a farther destination zone (associated with zone to zone boundaries), wherein coordination of paths is applied by the limited DPCP towards such temporal destination e.g., by planning and coordinating paths using said coordination control process with the common temporal destination applied as a predictive trendline towards final destination zone associated with respective zone to zone bounded controlled trips.

In this respect, exits on the TPH are dynamically associated with trips, indirectly, while the planning and the coordination of paths is applied directly towards temporal destinations associated with zone to zone bounded limited proactive DPCP.

This enables distribution of paths that may backup loss of effectiveness of proactive DPCP up to TPH while being associated with reactive DPCP from TPH up to APH. In this respect, exits from the virtual TPH are used dynamically by limited proactive DPCP e.g., using said coordination control processes towards a common temporal destination, while applying point to point (location of trip to common destination) planning of paths per trip.

Usage of a determined temporal destination on the APH enables to load balance bounded part of the network by virtual TPH and zone to zone boundaries, applying virtually coordination under dynamic virtual exits from TPH. Such a process preferably ignores coordination applied by limited proactive DPCP between TPH and APH and associated with a controlled rolling horizon. With such approach the farther the APH from the virtual TPH the higher is the contribution of the APH to limited DPCP bounded by the virtual TPH while such approach is limited to a predicted horizon length that should allow sufficient number of iterations to be applied as well. Therefore, a balance between the length of the predicted horizon and the number of iterations should preferably applied in order to make both the prediction and the number of iterations most effective to improve traffic flow.

FIG. 3.4*b* schematically illustrates a network that is divided into 10 zones for which zoned to zone boundaries associated with DPCP are illustrated with respect to trips that are traveling from zone A to zone B. Such boundaries, under additional predicted horizons, are illustrated by 1,2 and 3 in FIG. 3.4*b*, which each such a boundary will refer hereinafter to Rolling Horizon Dynamic Planning Boundary (RHDPB). Such illustration refers to simplified zone-to-zone flow related boundaries which are based on rectangles that bounds a part of the network for iteration/or iterations of DPCP.

In this respect the constraint on the DPCP by said rectangles is to apply for example load balancing by proactive DPCP (that may be associated with reactive DPCP) within respective RHDPB associated with said traffic predicted horizon boundary in the zone to zone related flow direction towards zone B. Such rolling horizon related boundary may refer hereinafter to Rolling Horizon Boundary (RHB) of the RHDPB.

As mentioned above, zone to zone related boundaries are not limited to direction related coordination of paths and therefore zone to zone related trips are not distinguishable from other zone to zone overlapping related trips with respect to mitigation of traffic loads from relatively loaded links under coordination of paths when e.g., proactive DPCP applies said coordination control processes for applicable dynamic rolling horizon under boundaries associated with zone to zone trips.

Under no significant traffic irregularities traffic conditions, dynamic exits associated with a RHDPB are illustrated in FIG. 3.4*b* by e.g., vii, viii and ix.

Under traffic irregularities dynamic exits are determined within RHDPBs under division of a RBH of the RHDPB to TPH and APH.

Under traffic irregularities, common temporal destination (or said nearby destinations) is determined on the RHB associated with a RHDPB enabling on the one hand to distribute the controlled trips among the exits determined by the TPH and on the other hand providing heuristic related direction to further progress on the DPCP with further iterations associated with for example with 1 to 2 to 3 in FIG. 3.4*b*.

According to some embodiments, RHB are associated with DPCP boundaries up to the time when the rolling horizon covers final destinations of controlled trips, or coming close to final destinations, in which case final destinations are used.

With some embodiments, optimization of the RHDPBs takes into consideration that the balance between the number of DPCP iterations and the length of the predicted horizon should produce the highest traffic load balance applied by proactive DPCP, wherein non-sufficient number of iterations under real time constraints would degrade the effectiveness of predictive traffic load balance.

According to some embodiments, the RHDPBs are determined by a time rolling horizon wherein the distance coverage of RHB is a result of the traffic conditions and, therefore, the horizon coverage may refer to the farthest potential travel of vehicles, wherein according to some embodiments some safe margin is added to said coverage.

Division of a network into 10 zones by FIG. 3.4*b* is a used as a demonstrative example and is not related to any optimal division (used for illustration purposes).

Process element 5 in FIG. 3.2 is a control process functionality that controls parameters of the planning of paths (process element 1 in the figure) and the control steps (process element 2 in the figure). In this respect, change in the control step by process element 5 may be associated with control on the convergence rate of the coordination which according to some embodiments is supported by tracking aggregated travel time(s) of paths which according to some embodiments processed by the C-DTS and possibly further, according to some embodiments, by tracking the accepted planned paths that are applied by process element 1 and accepted by process element 2 and detecting unstable paths.

The latter may contribute to locating paths that are associated with difficulties to coordinate paths (e.g., cause above described oscillations), enabling according to said detection to force distribution on non-stable paths as mentioned with handling oscillations planned paths through mode of operation of planning paths which process element 5 may apply by controlling process element 1.

Further functionality of process element 5 is, according to some embodiments, is associated with the control on the size of control steps (applied by process element 2 in the figure) associated inter-alia with determination of a effective range of control steps to be associated with a new batch of branches of PMBMB-IMA-MPC. The control step according to which said range is determined is received by process element 5 through data element 10. A further data element that enters process 5 through data element 10 is control policies produced by the support of off-line learning processes as described above, and further elaborated with improved methods to infare on-line the off-line preferred pre-planned policies traffic irregularities.

In this respect, and under ongoing adjustment of the control parameters, process element 5 may coordinate control parameters associated with process elements 2, 3,4 and 6 by providing relative weights to affect process element 1. In this respect there is also direct effect on, for example, process 4 which receives control steps from process element 5 to determine relatively higher priority to relatively high non-occupied capacities of links in order to improve the convergence rate for some level of sub-optimal convergence cost.

A further control element that could have been handled through process element 5, according to some embodiment, is feeding a combined off-line pre-planned said control policy, associated further with control steps of sets of paths as further described, wherein according to FIG. 3.2 the sets of paths are entered directly to C-DTS through data element 11 in the figure.

According to some embodiments, process element 5 in FIG. 3.2 comprise determination of minimum travel time to be gained with acceptance of planned paths by controlling process element 2 wherein the minimum gain is related to the level of an ability to apply traffic load balancing under control, i.e., an ability to not loss control on load balancing according to the stability in planned paths.

According to some embodiments, FIG. 3.2 is associated further with one or more of the following processes:

According to some embodiments, said closed loop illustrated in FIG. 3.2 is associated with greedy re-planning of paths, applied (with process element 1) by agents of trips independently (in parallel) according to costs that are based on time dependent predicted costs of travel time on links which are associated further with differentiating priorities based on non-occupied capacities on links and which differentiation is associated further level of nonlinear differentiation with linear increase in control steps.

According some embodiments, selected (accepted) planned paths applied according to one or more travel time limiting criteria, by process element 2, are fed to a C-DTS traffic prediction simulator.

According to some embodiments a travel time limiting criterion may be associated with one or more links on the road network.

According to some embodiments, a stage of re-planning of paths, applied by an iteration of said closed loop (e.g., iteration of coordination control processes or any other coordination method with similar objectives), is aimed at performing reduction in traffic imbalance on at least part of a road network wherein the method comprising:

a. Searching by coordination control processes for potential alternative paths to current and predicted pending alternative paths comprising at least one updated relatively loaded link associated with path controlled trips, wherein a search for an alternative is performed independently of other such searches by path planning aimed at shortening travel time according to time dependent costs of travel times on links that are synthesized by a C-DTS prediction and fed by paths comprising pending alternative paths and potential alternative paths accepted in a prior acceptance stage, while excluding with the search said predicted relatively loaded links, b. Accepting by coordination control processes search result of a potential alternative path subject to a travel time limiting criterion aimed at contributing to traffic imbalance mitigation on the network, According to some embodiments, pending alternative paths for which alternatives are searched comprise alternative paths that failed to be accepted as potential alternatives for assigned paths, to current and predicted trips, according to respective travel time limiting criterion associated with respective prior search for alternatives and wherein under further stages of imbalance reduction, applied by an iteration of said closed loop, such paths may further serve as pending alternative paths that may become passively accepted due to acceptance of other potential alternative paths or actively substituted by an accepted potential alternative.

According to some embodiments, a travel time limiting criterion limits the travel time to destination of an accepted path subject to a longer travel time that is associated with the path in comparison to anticipated travel time associated with search for its respective non-accepted alternative in prior imbalance reduction stage, but not longer than a certain travel time limit.

According to some embodiments, the limit on travel time limiting criterion is reduced under limited computation resources to apply C-DTS traffic predictions enabling sufficient number of re-planning stages to reduce traffic imbalance under real time constraints.

According to some embodiments, a limit on travel time limiting criterion is limited to avoid loss of control on convergence toward traffic load balance.

According to some embodiments, travel time limiting criterion is limited to avoid non-marginal discrimination among trips that their paths are changed in a re-planning stage under a common travel time limiting criterion.

According to some embodiments, the limit of a travel time limiting criterion is increased from one stage of imbalance reduction to another under increase in predictive load balance on the network in predicted time horizon.

According to some embodiments, a travel time limiting criterion is adaptively determined in perspective of multiple prior stages of imbalance reduction.

According to some embodiments, a failure of acceptance determines a pending potential alternative path to become a potential alternative to an assigned path is subject to acceptance of one or more other potential alternative paths in a further imbalance reduction stage that make the path to be accepted under reduction in traffic imbalance and in the limit on the travel time limiting criterion.

According to some embodiments, a failure of acceptance determines further a pending potential alternative path as a temporary potential alternative that may be converted to an accepted alternative under a further imbalance reduction phase (e.g., said iteration).

According to some embodiments, search for alternatives comprising further search for alternative to new current and predicted assigned paths having yet no pending alterative paths.

According to some embodiments, synthesized C-DTS prediction is fed further by paths comprising current and predicted paths determined according to a calibrated route choice model.

According to some embodiments, synthesized C-DTS prediction is fed further by paths comprising current and predicted predetermined fixed paths on the road network.

According to some embodiments, determination of relatively loaded links is associated with distinguishing criterion by distinguishing relatively loaded links according to their volume to capacity ratios, wherein the trend of the mitigation, preferably evaluated locally along a plurality of iterations, determines respective required increase or decrease in said criterion.

According to some embodiments, the determination of relatively loaded links is associated with correlation criterion that limits the number of relatively loaded links according to mutual dependence among mitigated links, wherein the trend of the mitigation, preferably evaluated locally along a plurality of iterations, determines respective required increase or decrease in said criterion.

According to some embodiments, the determination of relatively loaded links is associated with quantization (discretization) levels of volume to capacity ratios, wherein the trend of the mitigation, preferably evaluated locally along a plurality of iterations, determines respective required increase or decrease in said quantization (discretization) levels of volume to capacity ratios, and wherein the higher the mutual dependence among mitigated links the higher is the quantization (discretization) levels.

As further elaborated the scalability issue, associated with aspects that are resolved by described embodiments related to FIG. 3.2, are not limited just to the algorithmic aspects and in this respect FIG. 3.6, is associated with system configuration that enables to distribute the planning and the control processes independently of the distribution of the traffic related prediction applied by C-DTS. Such aspects are further described with embodiments that refers to FIG. 3.6. However, before entering to such aspects and respective solutions the following embodiments introduces multilayer process enabling to improve on-line DPCP by learning processes under the support of deep learning related methods.

Up to this point the DPCP, which is illustrated in FIG. 3.2 and described above, applies iterations associated with each branch of PMBMB-IMA-MPC. The MPC part of the term PMBMB-IMA-MPC is actually the DPCP which according to some of the above described embodiments may refer to proactive DPCP, applied typically under non major irregular traffic, or to reactive DPCP and limited proactive DPCP under more meaningful traffic irregularities. In this respect, the term PMBMB-IMA-MPC may refer to an alternative term which is PMBMB-IMA-DPCP where it is applicable.

PMBMB-IMA-DPCP under proactive DPCP applies most of the time moderate corrections to paths enabled due to mitigation conditions wherein the load balancing starts from early morning hours and the main task is to maintain the load balance under moderate changes in the demand. The potential usage of reactive DPCP and limited DPCP is a compromise that should preferably be left to a stage where a more potentially effective approach may enable to recover from traffic irregularities while enabling to maintain usage of proactive DPCP without a need to apply reactive DPCP or limited proactive DPCP.

In this respect, the prime choice to cope with irregularities while enabling to further apply proactive DPCP is to use learning related approach to recover from traffic imbalance that may be a result of traffic or demand related traffic irregularities.

Such approach was introduced with some of the above described embodiments that suggest to apply off line learning processes which prepare control policies enabling to recover from traffic irregularities while being used with on-line load balancing under traffic conditions that are similar to the learned conditions for which an off-line load balancing has found respective control policy. With such approach stored scenarios and their respective pre-planned control policies are produced to enable trust region for further on-line PMBMB-IMA-DPCP that may refine on-line the results of off-line pre-prepared control policy.

In this respect, tight convergence to load balance by an off-line pre-prepared control-policies is not productive neither for on-line load balancing nor by off-line load balancing. The reason for that is lack of ability to generate applicably an extremely huge data base to cover all the possible traffic irregularities and enabling rapid access to required control policies under real time constraints.

Nevertheless, the above suggested approach lacks abilities to apply effectively said learning support approach wherein the deficiencies of the above-mentioned learning approach are associated with:

- a need to maintain anyhow a huge database associated with a huge stored number of traffic scenarios and respective control policies (even though trust regions approach is applied),
- slow access to the content of the database and non-continuous (discretized) control policy results,
- lack of ability to determine effective control policies based on minimum iterations such as the PMBMB-IMA-DPCP may produce,
- lack of flexibility to use more advanced and enriched control policies such a DPCP may apply.

The following described embodiments are aimed at improving the above learning-based approach by applying a multi-layer architecture to apply learning processes associated with PMBMB-IMA-DPCP wherein the PMBMB-IMA-DPCP enables under proactive on-line and off-line DPCP to produce more effective control policies. Further improvements comprise alleviation of the issues associated with a need to apply huge databased that suffer from slow access to required control policies and usage of sets of pre-planned paths as control policy in addition or as substitution to the control steps related control policy. With respect to the control policies, which are based on control steps, the usage of control steps with further supporting parameters associated with process elements 3,4,5 and 6 in FIG. 3.2 may improve the off-line pre-prepared control policies under proactive DPCP applied further with PMBMB-IMA-DPCP.

"3" in the FIG. 3.1, illustrate schematically the PMBMB-IMA-MPC (PMBMB-IMA-DPCP) (FIG. 3.5*a* and in FIG. 3.5*b* illustrates further the PMBMB-IMA-MPC in Layer 1 in context of other learning related layers that are further elaborated), wherein, in addition to different control steps applied by each branch of PMBMB-IMA-MPC, a sequence of control steps is evaluated, after a plurality of iterations, in order to decide on the transition between successive batches (iteration in this respect may refer to multi-branch DPCP iteration associated with described embodiments for the illustration in FIG. 3.2).

According to some embodiments, usage of batches enables to construct control policies with the aim to mitigate traffic imbalance while shortening the number of iterations that might otherwise be required. In this respect, improvement in load balance may be measured by the trend in aggregated travel times on all or on part of links of the network along a plurality of iterations associated with a batch.

According to some embodiments, said part of links refers to links that their traffic loads were affected by a batch, wherein identification of the effect is applied according to dynamic traffic simulator predictions associated with the latest iteration of a batch.

According to some embodiments, the outputs from a batch that is associated with parallel branches of PMBMB-IMA-MPC enables to decide on a further more restricted range of control steps to be applied with a subsequent batches (associated with parallel branches), wherein a branch, or branches, which obtains the highest convergence level toward load balance, enable to determine the preferred subsequent range of control steps to continue with (a subsequent batch associated with parallel branches).

According to some embodiments, in order to refine convergence towards load balance, said range of control steps that are associated with a subsequent batch, is reduced, in comparison to the previous parallel batches, to a range that preferably surrounds the average or weighted average of control steps that relate to the latest iteration of preferred chosen branches in recent batch.

According to some embodiments, said range of steps may be determined according to a single or according to a plurality preferred branches that are associated with said preferred chosen branches of the latest branch.

According to some embodiments, one or more of said batches, applied under on line PMBMB-IMA-MPC, are guided by control policy under multi-layer learning approach, enabling to recover from loss of control on traffic load balance. The multilayer approach is following describes with reference to FIGS. 3.5*a* and 3.5*b*.

Layer-1 in FIGS. 3.5*a* and 3.5*b* applies on-line PMBMB-IMA-MPC that maintains predictive traffic load balancing according to some embodiments (hereinafter, and where applicable above, the term PMBMB-IMA-MPC may refer to PMBMB-IMA-DPCP that applies proactive DPCP which may comprise all, or part of, applicable process elements associated with proactive DPCP which may refer to proactive DPCP mode applied according to, for example, FIG. 3.2—wherein in general PMBMB-IMA-DPCP may refer to PMBMB-IMA-MPC approach and vice versa in this respect).

3 in FIG. 3.1 illustrate said on-line PMBMB-IMA-MPC wherein FIG. 3.2 illustrates DPCP enabling to apply proactive DPCP which its integration in Layer-1 enables to apply PMBMB-IMA-DPCP. In this respect, under non-significant deviations from traffic load balance, the PMBMB-IMA-DPCP applies load balancing aimed at controlling assigned paths to controlled trips, e.g., assigned paths associated with path-controlled trips, and under significant deviation from load balance it is supported by learning processes associated with Layer-2 and Layer-3 that are illustrated in FIGS. 3.5*a* and 3.5*b*.

In this respect, as further elaborated with the description of Layer-2 and Layer-3, the on line PMBMB-IMA-DPCP applied by Layer-1 is guided according to learned policies produced by off-line PMBMB-IMA-DPCP under Layer-2 which layer further trains deep neural networks of recurrent neural networks in Layer-3 that according to a need guides Layer-1 with off-line learned control policies.

Layer-2, illustrated in FIG. 3.5*a* and FIG. 3.5*b*, constructs by off-line processes control policies for potential imbalanced traffic developments that further used by Layer 3 to guide on line traffic load balancing by Layer 1. Layer 2 may be divided according to some embodiments, into sampling (on-line or off-line) sublayers and learning (off-line) sublayers, wherein the sampling sublayer takes on-line imbalanced traffic condition samples from on-line simulated traffic that is either developed under model predictive control applied on-line by layer-1 or under synthetic simulated scenarios (applied e.g., by Layer-2) with the aim to enrich learned controlled policies that may support Layer-1, and wherein said samples are transferred to the off-line learning sublayer of Layer-2. According to some embodiments, a sample includes data that enables the off-line leaning sublayer of Layer-2 to continue, e.g., on-line PMBMB-IMA-DPCP process applied by Layer-1 by off-line PMBMB-IMA-DPCP (under non real-time constraints), applying further iterations to improve off-line the load balance. The aimed result of offline learning of control policies is to enable to acceleration of on-line load balancing applied by Layer-1 under similar imbalanced traffic conditions to which said learning processes found effective control policies, In this respect the off line load balancing learning process may provide to the on line load balancing a starting point (trust region) that may enable Layer-1 to improve the time efficiency associated with construction of control policy by concentrating on improvement a starting point (reasonable trust region).

According to some embodiments, the sampling sublayer of Layer-2 preferably analyzes if there is a meaningful deviation from load balance and accordingly transfers said data to the off-line learning sublayer of Layer-2 applying PMBMB-IMA-DPCP that continuous the PMBMB-IMA-DPCP applied by layer-1 without the real time constraints to which Layer-1 is bounded.

Said analysis may include detection of convergence conditions associated with imbalanced traffic mitigation under Layer-1 by tracking the on-line load balancing and under detection difficulties to improve traffic load balance by the Layer-1 the recent traffic development is transferred as a sample to the learning off-line sub-layer of Layer-2 for searching a control policy under non real time constraints.

The output of an off-line learning sublayer of Layer-2 comprises the initial imbalanced traffic conditions for which a policy was constructed (preferably sampled traffic development), and respective control policy that found to be effective to be used to guide Layer-1. The found control policy should preferably not be associated with tight load balance since Layer-1 that may use it may have similar imbalanced conditions to the imbalanced conditions for which a learned policy was constructed offline. The support of Layer-2 to make Layer-1 more effective is performed according to some embodiments through Layer-3 that is further described.

As mentioned above, the off-line load balancing applied by Layer-2 is not limited to the number of iterations to which the on-line load balancing is limited and therefore it may perform search for efficient control policies under methods and computation power that may not be affordable with on line load balancing.

Control policies produced by Layer-2 may refer to two types of policies wherein one of them is based on preplanned set of paths and the other on the above-mentioned control steps.

As mentioned above, the off-line traffic load balancing process applied by Layer-2 construct said control policies with the aim to guide Layer-1 to enter a trust region which on-line traffic load balancing may further refine (further optimize).

In this respect, the off-line pre-prepared control policies, which refers to preplanned sets of paths, are aimed at entering the simulated traffic into a less imbalance conditions which, as mentioned above, is a trust region that is further used by on-line PMBMB-IMA-DPCP in Layer-1 to refine the load balance. With such approach the on-line PMBMB-IMA-DPCP has no need to use iterations in order to enter a trust region (as a process to further refine traffic load balancing). In such a case, the preplanned set of paths are fed directly to the control entry of a C-DTS (or substitute the planned paths in the control part of the PMBMB-IMA-DPCP.

According to some embodiments, mismatch between current position distribution of vehicles, which their paths are to be modified by said preplanned set of paths, and respective distribution of position associated with preplanned paths (inferred to be most suitable to enter the current traffic into a trust region according to sufficient similarity between current traffic conditions and traffic conditions that the preplanned set of paths had improved), may be resolved by assigning the preplanned paths associated with respective past positions to the closest current positions of current simulated vehicles (by Layer 1).

According to some embodiments, the off line load balancing, applied by PMBMB-IMA-DPCP under off-line learning sub layer of Layer 2, may differ from the PMBMB-IMA-DPCP applied on-line, wherein the off line PMBMB-IMA-DPCP may apply also iterations that require no motion of position distribution (at least for a while, while planning control policies associate with set of paths), that is, re-planned paths are assigned to simulated vehicles to apply simulated traffic while the initial position distribution is maintained along a plurality of iterations.

According to some embodiment, said preservation of distribution of simulated vehicles along a plurality of iterations is applied by resetting the distribution of the vehicles, after simulation of traffic prediction, to the starting point before the traffic prediction is applied.

According to such embodiment the objective of the iterations is to refine paths for trips while taking an advantage that there is no need, under off line iterative planning of paths by Layer 2, to change the distribution of simulated vehicles on the road network to apply load balancing i.e., in comparison to iterations of on-line PMBMB-IMA-DPCP applied with Layer 1 under real time constraint wherein progress of the positions of vehicles is mandatory to reflect real time traffic development.

Layer-3, illustrated in in FIG. 3.5*a* and FIG. 3.5*b*, is aimed to guide Layer 1 that applies on-line PMBMB-IMA-DPCP to enter said trust region under difficulty of Layer-1 to on-line mitigate imbalanced traffic. In this respect, the guidance of Layer-3 enables the PMBMB-IMA-DPCP of Layer 1 to apply on-line load balancing refinements from better starting point (trust region), wherein the guidance may be triggered by Layer-1 or by Layer-3 according to detection of difficulty of Layer-1 to mitigate imbalanced traffic (due to insufficient number of iterations under real time constraints).

Under the situation wherein the trigger is applied by Layer-3, Layer-3 comprises on-line and off-line sublayers wherein the off line sub-layer receives the imbalanced traffic conditions and respective recovery control policy from the off-line learning sub-layer associated with Layer 2, and accordingly prepares the data to be used to guide the PMBMB-IMA-DPCP of Layer 1 to enter said trust regions (according to need). In this respect, the closer the similarity between the current traffic conditions and the traffic conditions associated with control policy produced by Layer-2, the higher is the potential that the on-line PMBMB-IMA-DPCP of Layer 1 will converge into a higher level of traffic load balance. Furthermore, the higher the enrichment of preplanned control policies by the off-line PMBMB-IMA-DPCP of Layer 2 the higher is the potential to guarantee on-line convergence towards acceptable level of load balance by on-line PMBMB-IMA-DPCP of Layer 1.

In order to support the on-line PMBMB-IMA-DPCP of Layer 1, the on-line sublayer of Layer 3 samples traffic conditions from the supply model of the preferred C-DTS associated with the on-line PMBMB-IMA-DPCP of Layer 1 (the minimum imbalanced traffic development conditions obtained by a branch Layer 1), and feeds the sampled traffic conditions to on-line inference servers enabling to determine a suitable control policy to guide the PMBMB-IMA-DPCP of Layer 1 to enter into more balanced traffic conditions (a trust region).

As mentioned before, both, the off-line and the on-line sublayers of Layer 3 are configured to guide Layer-1 by control policies enabling to recover from imbalanced traffic conditions in a shorter time than it would otherwise be required if Layer-1 should have to cope with load balancing without said guidance under real-time constraint.

As further mentioned above, the off-line sublayer of Layer-3 receives from Layer-2 the sampled traffic conditions and respective control policies and feeds such data to a device that functions as control policy inference functionality applied for example by a policy inference server.

According to some embodiments, the inference device is comprised of a server or a cluster of severs that stores traffic conditions and respective control policies received from Layer 2, whereas according to some other embodiments the inference device is comprised of a deep learning functionality associated with one or more deep learning inference servers that may for example apply deep neural network functionality based on, for example, CPUs and/or GPUs and/or FPGA and/or ASIC.

Both inference approaches are configured to infer preplanned control policies for traffic conditions sampled from Layer-1 in order to further shorten the time of load balancing applied by Layer 1.

According to embodiments that apply inference by a database approach, there are variety of available methods to extract stored control policies associated with stored traffic conditions according to a match with current traffic conditions.

According to embodiments that apply inference using deep learning there is a need to train one or more neural network in order to apply relation between control policy and traffic conditions, using for example supervised learning methods. A plurality of neural networks may be applied by dividing the training into multiple less-deep networks that may facilitate the training for a cost of managing distributed deep neural networks. The deepness of a plurality of neural networks may be reduced training different neural networks for different ranges of partially correlated traffic conditions (imbalanced conditions) for respective control policies determined by Layer 2.

Such a process may be considered as a sort of trust region guiding policy based on limited guarantee that further convergence to the highest attainable load balance may be achieved by Layer 1, however, even though insufficient preplanned control policy were learned by Layer-2 the generalization ability of a trained neural network might bridge some of the gap.

According to some embodiments, trained neural network inference phase, applied by Layer 3, may use methods to improve the inferred output by said generalization and further by methods that support continuous control (applied e.g., under reinforcement learning). In this respect, discrete probabilistic weights associated with a plurality of inferred control policies are used with weighted average to determine a determined control policy, wherein under a further process, estimation of the probability distribution of the inferred policies may provide more valuable weights than uniform weights.

A further possibility to implement inference of multiple control policies, having different probability weights, is to associate such inferred control policies with multiple branches of PMBMB-IMA-DPCP that may support batch related multi-branch refinement of predictive traffic load balancing.

In summary, the methods of the on-line sublayer of Layer-3 supports Layer-1 by control policies that enters the on-line PMBMB-IMA-DPCP, applied be layer 1, into a trust region, preferably starting from the branch of the on-line PMBMB-IMA-DPCP that attained the least worse imbalance conditions.

Guiding control policies comprise, according to some embodiments, control steps for one or more branches of PMBMB-IMA-DPCP that accordingly applies on-line gradual load balancing, whereas, according to some other embodiments, guiding control policies comprise sets of planned paths that are fed to Layer-1. Both types of guiding policies are aimed at shortening the load balancing period of time applied by Layer-1. In this respect, said control steps may refer to a sequence of travel time limiting criteria (e.g., said thresholds) which are used to gradually mitigate traffic load imbalances by the above described top-down mitigation approach.

According to some embodiments the guiding control policy associated with set of planned paths applies direct control (saving the need for control step iterations to enter gradually into a trust region).

Said set of control paths or control steps, associated with a control policies generated by off-line sublayer of Layer-2, and according to some embodiments are used to train one or more neural networks under the off-line sublayer of Layer-3, are inferred by the on-line sublayer of Layer-3 according to sampled traffic conditions from Layer-1.

A control policy, if it is comprised of preplanned control steps then it is fed to one or more branched of the path planning acceptance control process of Layer 1, as described for example in FIG. 3.5*a*, and if it is comprised of preplanned set of paths then it is fed to one or more of the branches of the controllable dynamic traffic simulators (C-DTS applied e.g., by a relevant part of DTA models that are applicable to relevant embodiments) associated with Layer-1 as described for example in FIG. 3.5*b*. If the control policy is applied according to control steps than it is fed according to some embodiments to one branch and the other branches are associated with steps in a range close to the fed control policy. Feeding inferred control steps to all the branches according to FIG. 3.5*a* is optional, enabling to stretch the values of the control steps to a range of control steps by off-line learned values around the values associated with the control policy, wherein according to such embodiment a plurality of branches are initiated with a range of learned control policies while the subsequent batch is applied according to the least worse imbalance results from the multi branch process of PMBMB-IMA-DPCP. In case that the control policy is a set of paths then multi branch process is applied according to some embodiments as illustrated in FIG. 3.5*b*.

According to such embodiments, Layer-1 performs, after applying the off line learned control policy, applies further load balancing refinements that is limited by real time constraint.

According to some embodiments PMBMB-IMA-DPCP associated with Layer-1 and with off-line sublayer of Layer-2 use method illustrated in FIGS. 3.1 and 3.2 wherein the Controllable Dynamic Traffic Simulator (C-DTS). Preferably, the calibration of C-DTS may not be associated with estimation based methods to non-controlled trips (i.e., estimation of demand state vector and parameters of route choice model for non-controlled trips) based on the possibility to generate substantial full usage of incentivized path controlled trips on a road network under control of on line PMBMB-IMA-DPCP associated with Layer 1 supported by Layer 2 and Layer 3.

In this respect, robust (said non-estimation based) calibration of C-DTS which is mainly associated with link level calibration (e.g., motion according density, local capacity calibration according to obstacles such as on-lane parking or lane related incident in multilane link), and which is not dependent on route choice model and respective demand model, is crucial to apply reliable model-based traffic prediction as feedback to the re-planning of paths in order to generate coordinating path-controlled trips on a road network.

Said sampled traffic conditions (preferably dynamic of traffic conditions comprised of a sequence of a few samples), according to which control policies are inferred under on line sublayer of Layer 3, may according to some embodiments refer to relatively loaded links and further may refer also to different combinations of relatively loaded links associated with different levels of relative traffic loads on different parts of the network.

Said control steps associated with a control policy may, according to some embodiments, refer to a single, or to a plurality of, said travel time limiting criteria produced by the off line sublayer of Layer 2.

Said preplanned set of paths associated with control a control policy that are produced by the off line learning sublayer of Layer-2, saves a need to apply iterative process under Layer 1 in order to enter said trust region which a control policy that is based on control steps requires.

As mentioned above, FIG. 3.5*a* illustrates schematically the said layers with respect to a method that applies control policies based on control steps (e.g., above mentioned thresholds) which affect the level of a travel time limiting criterion, whereas FIG. 3.5*b* illustrates schematically the said layers with respect to a method that applies control policies by preplanned paths.

In this respect, according to FIG. 3.5*a*, control step policies from Layer-3 are entered to the control "c" in Layer-1 which is associated with the path planning of the PMBMB-IMA-DPCP, whereas according to FIG. 3.5*b* the control policy is associated with control paths and is entered to the path control entry of C-DTS in Layer-1. Since FIGS. 3.5*a* and 3.5*b* describe iteration related control (rather than model predictive control loop) there are plurality of input and output interfaces between Layer 1 and Layer-2 and between Layer-1 and Layer-3 which are virtual interfaces. In this respect, under physical implementation of a loop based iterative process there is a need for a single input and output interface. Moreover, under the approach illustrated in FIG. 3.5*a* and FIG. 3.5*b* there is no need to interact between Layer-1 and Layer-2 and between Layer-1 and Layer-3 at each iteration and the figures illustrate enabled interaction according to a need rather than mandatory interactions.

According to some embodiments, the on-line model predictive control applied with Layer-1 and/or with the off-line learning sublayer of Layer-2 comprises a process to minimize the number of iterations associated with e.g., the above mentioned iterative top-down mitigation approach, applying mitigation of traffic overloads for relatively loaded links which gradually reduce network imbalances by coordination control processes.

In this respect, the method illustrated in FIG. 3.5*a* is aimed at resolving an issue associated with the level of the effect of a control step on a change in traffic balance of the network, that is, relatively large changes have an advantage to be used when the imbalance is high whereas, when the imbalance is low, relatively lower changes have an advantage. However, since the initial control step that should preferably be used with on line and with off line load balancing are not sufficiently predictable, as well as the adaptation of further steps, a parallel search should preferably be used with PMBMB-IMA-DPCP applying a range of control steps (possibly with a range of changes in the control steps applied with parallel branches) that may enable to generate a space of control through which a preferred policy is chosen at the end of each batch of iterations. The preferred use of batches enables to filter out noisy load balancing and stick to the average trend with respect to the ability to choose a preferred policy in the generated control space (parallel control space). Under off line load balancing, associated with the off line learning sublayer of Layer-2, choosing a preferred control policy, which is based on control steps, enables to shorten the number of iterations that may be used to guide Layer-1 with respect to an aim to shorten traffic imbalance improvements under Layer-1.

In comparison to FIG. 3.5*a*, FIG. 3.5*b* schematically illustrates usage of control policy that applies preplanned set of path, as a control policy, which saves the need to apply iterative process to enter a trust region, however, according to such a method such saving might lead to a need to spend more iteration to refine load balance by on line load balancing in comparison to refinements applies by a control policy based on control steps (further to entry to a trust region the region).

According to some embodiments, a parallel model predictive control associated with Layer-1 (as well as with the off-line learning sublayer of Layer-2) is applied using a plurality of sequences of control steps to apply gradual load balancing with iterations of plurality of a range of control steps, wherein the trend of the load balancing is tracked and accordingly a favorable convergence toward load balance by a batch of iterations may be chosen to be used with a further batch of iterations, and wherein said further batch of iterations are applied with a narrower range of control steps. This may be applied by a sequence of a plurality of batches of iterations with parallel (multiple) model predictive control processes.

To be more concrete, FIG. 3.5*a* and FIG. 3.5*b*, illustrate the concept of guided PMBMB-IMA-DPCP, wherein planning of paths that is applied by Layer-1 applies parallel search for preferred control policy that enable convergence toward load balance (indicated, e.g., by reduction in aggregated travel times on the network according to traffic predictions) using a range of travel time limiting criteria under iterative model predictive control. In this respect an iterative planning of paths and traffic prediction steps, under "batch n" or "batch n+1" that apply sequences of iterations, comprises with each re-planning iteration a control step, "c", and traffic prediction applied by Controllable Dynamic Traffic Simulator, "C-DTS". The illustration of the iterative process by a sequence of control steps is applied in practice as a closed loop (applying the iterative process as illustrated by FIG. 3.1) wherein the interface associated with said closed loop with Layer-2 and Layer-3 is applied by a single interface between Layer-1 and Layer-2 as well as between Layer-1 and Layer-3 (rather than the plurality of interfaces illustrated in FIG. 3.5*a* and FIG. 3.5*b*).

FIG. 3.2 illustrates schematically a said closed loop associated according to some embodiments with Control (C) and C-DTS. The model predictive control associated with Layer-1 may be associated further with the off-line learning sublayer of Layer-2.

According to some embodiments, said closed loop in FIG. 3.2 is associated with greedy path re-planning applied by agents of trips in a control center, according to time dependent costs of predicted travel time predictions on links, wherein selected paths to be fed to a further traffic prediction (for a further iteration) is subject to one or more travel time limiting criteria. According to some embodiments a travel time limiting criterion may be associated with one or more links on the road network.

A learning method, associated with supervised learning that supports said closed loop, raises an issue when a partially observable state space (discretized dynamic traffic conditions) and respective control policies, generated by Layer-2, are used to train neural network by supervised learning, wherein the issue might be a need for an applicable size of a trainable deep level applied by Layer-3. In this respect, according to some embodiments, a distributed neural network could be applied rather than a single neural network for a cost of reduced generalization level that may be attained by a single neural network. Such a distributed configuration may refer to a distribution of the partial observable state space among a plurality of neural networks that each may be trained separately. According to such embodiments, correlated states may be associated with training of two networks in order to improve generalization. With such embodiments, the inference stage is applied by feeding in parallel a plurality of trained neural networks that may at least refer to neural networks that has been trained according to common states.

According to some embodiments levels of control steps refer to above said thresholds, wherein, for example, said stored predictive control data which may be expanded to include recommended sets of thresholds according to acceptable match between current patterns of traffic and stored patterns of traffic that are associated with set or sets of thresholds, are used to train said deep neural network in order to save the need for handling large database associated with retrieval of control policies according to a said match.

According to some embodiments, said samples of traffic condition are C-DTS sampled traffic conditions referring to a plurality of time related sampled traffic conditions enabling to reflect dynamic traffic conditions under on-line traffic load balancing applied by Layer-1, wherein such dynamic conditions are used by Layer-2 and Layer-3 (as described above) enabling to determine guiding control policies associated with sampled dynamic traffic conditions.

According to some embodiments, samples of traffic condition that are produced by on line sampling sublayer of Layer-2 and on-line sublayer of Layer 3, refers to traffic conditions on relatively loaded links. Traffic condition samples are preferably associated also with position to destination pairs of trips with respect to the sampled network link. Relatively loaded links according to some embodiments refer to links that are assumed to be relatively loaded, according to their relative volume to capacity ratios, which under mitigation of predicted imbalanced traffic conditions may considered to be relatively loaded while might further be found as non-relatively loaded links according to the reaction to mitigation process i.e., an assumed overload may be found as being actually a non-overload under the simulated demand and supply models.

According to some embodiments, said term of neural network is not restricted to a certain configuration, e.g., deep neural networks may according to some embodiments be associated with deep and non-deep neural networks (e.g., wide and deep learning associated with TensorFlow library for machine learning) and in general may be associated with any relevant structure of deep learning related networks. According to different embodiments a trained deep-neural-network or a recurrent neural network relates control-policies to traffic condition samples.

According to some embodiments correlation between said samples may be reduced in order to enable inter-alia high utilization of a trained neural network. Reduction of correlated traffic condition samples may according to some embodiments apply dimension reduction method with acceptable loss of control effectiveness (enabling the guided on-line model predictive control to be acceptably effective based on said loss associated with the inference of control policies from a trained neural network).

Up to this point, scalability issue associated with path planning for coordinating trips on citywide networks was referred above, under some described embodiments, with respect to algorithmic aspects (enabling to maintain sufficient number of iterations required with iterative coordination control applied, for example, by PMBMB-IMA-DPCP under applicable computation resources).

In this respect, the scalability issue, as further elaborated, has no just algorithmic aspects and it should also be associated modular system scalability solution enabling to reduce system implementation complexity. The need to reduce implementation complexity is further described with the introduction of complexity aspects associated with implementation of a branch of PMBMB-IMA-MPC to which some of the following described embodiments provide an alleviating solution by modular system configuration enabling scalability from small up to large cities.

The objective is to facilitate implementation of DPCP which applies iterative MPC approach under e.g., PMBMB-IMA-MPC (preferably PMBMB-IMA-DPCP version), and is associated with iterations that each of them comprises two main functionalities—traffic prediction bounded by rolling horizon (applied by on-line calibrated C-DTS) and planning and coordination of paths (applying the control processes).

The main trigger to the need to cope with modular scalability is the limited level of distribution applied by the traffic prediction functionality per iteration which should be applied for effective predicted horizon for large cities under real time constraints.

In this respect, the larger the city the higher is the penalization required with running different parts of the network under synchronized transition of vehicles from one part on the network to another part. In terms of dynamic traffic simulation, a solution to such a requirement is associated with network decomposition which could become an increasing modular scalability issue as the network size increases.

Network decomposition, which enables distribution of the traffic simulator, refers mainly to distributed computation of the supply model of a dynamic traffic simulator while enabling to run synchronously multiple parts of the network in parallel with the aim to shorten run time of simulated predictions and further to apply more iterations under real time constraints.

Another aspect associated with modular scalability of a branch of PMBMB-IMA-MPC (e.g., DPCP illustrated by FIG. 3.2) is the interface between modular implementation of the traffic prediction functionality and the control processes, wherein the control, although is naturally associated with parallel planning of path, may not refer to different parts of the network as the process of planning of paths may not be restricted to parts of a decomposed network.

In this respect, modular scalability should refer to both modular scalability of a dynamic traffic simulator to apply traffic prediction, under decomposed road network (distributed), and transparency of the modular prediction to the modular planning of paths. In other words, modular scalability of a branch of PMBMB-IMA-MPC (e.g., DPCP illustrated by FIG. 3.2) refers not just to each functionality, i.e., said traffic prediction and said planning and coordination, but further to transparent interaction, that is, enabling that a change in one functionality will not affect the other functionality.

According to some embodiments, such transparency should cope with data transfer of traffic predictions (e.g., travel times and V/C on links and further DPCP related data described with reference to FIG. 3.2) from the prediction functionality to the planning and coordination functionality, and vice versa, wherein modular change in each functionality is handled according to such embodiments by an interface process that makes modular changes in one functionality to be transparent to the other, i.e., any change in the modularity in one functionality would not require that the other functionality will be sensitive to it under said interface that is further described.

From the planning and the coordination point of view of the, under distributed computation applied with the dynamic traffic simulator and under the support of the interface functionalities, the planning and coordination of paths may become modularly scalable independent of the level of network decomposition and independent of the level of distribution of processes associated with the planning and coordination of paths (i.e., number of controlled trips to which planning of paths associates agents).

Such a scalable approach enables to establish a core modular system platform that can be modularly scaled to apply a system solution for different sizes of road networks.

In this respect, FIG. 3.6 illustrates schematically a core system configuration to apply consistent system enabling to facilitate said scalability.

To be more concrete FIG. 3.6 illustrates schematically a platform to apply according to some embodiment iterations of DPCP associated with a branch (under a batch) of PMBMB-IMA-DPCP.

In order to facilitate the description of FIG. 3.6, the following description provides first a brief cross reference between the system illustrated in FIG. 3.6 and FIG. 3.2. In this respect:

- The Controllable Dynamic Traffic Simulator (C-DTS), illustrated in FIG. 3.2, is illustrated in FIG. 3.6 by process elements 19, 20, 21 and 28. The distributed part of the C-DTS, which is the supply model, refers to process elements 19,20, and 21. Such top level illustrated distribution is aimed at enabling to cope with a need to shorten traffic predictions for a large networks under real time constraints. Process element 28 in FIG. 3.6 applied the demand prediction model of the C-DTS producing time related zone to zone demand prediction for trips,
- The control element, illustrated in FIG. 3.2, applying planning of paths process element 1 in FIG. 3.2 whereas the control processes on process elements 2,3,4,5,6 in FIG. 3.2 is illustrated by 22, 23, and 24 in FIG. 3.6. In this respect, process element 22 in FIG. 3.6 is associated with process elements 2,3,4,5,6 in FIG. 3.2 whereas process elements 23 and 24 in FIG. 3.6 are associated with process element 1 in FIG. 3.2.

Process elements 25 and 27 in FIG. 3.6 are said interface process elements enabling said transparent scalability between the control and the prediction functionalities while such process elements as well as process element 26 in FIG. 3.6, which applies management processes, are not illustrated in FIG. 3.2.

In comparison to a common C-DTS, FIG. 3.6 illustrates schematically an expanded C-DTS (comprised of 19 or 20 or 21 and a demand model 28) enabling to support more rapid traffic predictions required under real time constraints, under which predictions the C-DTS preferably use no route choice model under effective incentives that encourage wide (preferably full) usage of controlled trips.

Note: if not otherwise specified, the numbers used hereinafter are numbers that are associated with FIG. 3.6.

In this respect, the traffic predictions are applied, for example, by process elements such as 19,20 and 21 wherein the process element of Composition of Traffic Prediction, 25, makes the control platform comprising process elements 22, 23,24 to be insensitive to the level of network decomposition, that is, an integrated traffic prediction picture (predicted travel times and predicted V/C on network links, etc.) is provided to the control platform 22, 23,24 by 25.

In this respect it worth highlighting that simulated traffic is associated with traffic predictions if it is not otherwise specified in referred embodiments, hereinafter and above, and therefore any reference to travel times and to V/C associated with links on the network, which are produced by dynamic traffic simulator, refer to traffic related predictions even if not specified explicitly.

Further element that enables the network decomposition to be insensitive to the distributed paths planning and coordination control platform (process elements 22, 23,24) is the element of Paths Distribution 27. This process related element manages the interface between the control platform (process elements 22, 23,24) and the core traffic prediction platform (process elements 19,20,21) by receiving predicted positions of the vehicles from the core traffic prediction platform (process elements 19,20,21) and transferring the positions to respective agents (or at least to respective modules) in the control platform (process elements 22,23, 24) for a phase of planning paths, enabling the planning to take into account the predicted positions of trips at the time when the planning process phase comes to an end (under process elements 22, 23,24) so as changes in the planned paths would not refer to inapplicable positions of trips under a subsequent traffic prediction that should evaluate the effect of new planned paths on the network, that is, planning of paths, according to such embodiment, becomes insensitive to the progress in the positions of vehicles during the process of planning of paths.

The control (planning and coordination of paths) platform (process elements 22,23 and 24) applies planning and coordination of paths that according to some embodiments implements said DPCP.

The additional Input Output Navigation Data Management, process element 26 in FIG. 3.6, manages the interface between controlled (navigated) vehicles and said model predictive control applied by said control platform modules and the core traffic prediction platform.

Further description of the data flow among said platforms and processing elements are provided with the following explanation with reference to numbers in FIG. 3.6.

3 in the figure serves inter-alia reception of data associated with requests from a vehicle for being served as a controlled (navigated) trip wherein the data is associated with position to destination (PD) pairs, as well as reception of updates of time related dynamic positions of vehicles associated with controlled trips (navigated vehicles), which data is received by the Input Output Navigation Data Management process element 26. Further data that may be received by 26 through 3, according to some embodiments, may comprise time related paths and respective time related positions updates that are transmitted from non-navigated vehicles, such as busses, in order to update the supply model (process elements 19,20,21) with non-navigated traffic load through 7.

4 in the figure refers to data flow of PD pairs, received with requests for controlled trips by 26 through 3 and transferred to the planning and coordination platform (process elements 22,23,24) from 26 through 4, wherein the planning and coordination platform (process elements 22,23,24) plans accordingly new paths as part of maintenance of dynamic predictive planning and coordination of paths aimed at improving load balancing applied, for example, with said branch of iterative model predictive control that according to some embodiments apply coordination control processes which are described above and further described with the description of FIG. 3.2 and, according to some further embodiments, apply e.g., DPCP, under respective BPPSSP and off-line data, described with processes referring to FIG. 3.5*a*, FIG. 3.5*b* and FIG. 3.4*b*.

10 in the figure refers to data flow of predicted positions of simulated vehicles that are transferred from the paths distribution process element, 27, to the planning and coordination platform (process elements 22,23,24), enabling the planning and coordination platform (process elements 22,23,24) to plan paths while being updated of predictive position of vehicles without a need to be aware of the distribution level of the supply model (prediction platform 19,20,21) that determines said predictive positions of vehicles based on estimate of time that it would take to accomplish the planning and coordination of paths (e.g., according to past respective run time of a planning and coordination phase). In this respect, the path distribution process element maintains transparent interface between planned path by process elements 22,23,24 and the supply model platform (process elements 19,20,21). Such a method prevents non applicable changes to paths that should further feed simulation of controlled traffic predictions while under real time constraints there is a need to take into account progress in positions of vehicles during the planning and coordination phase (succeeded by a new traffic prediction phase according to the planning and coordination). The predicted positions are constructed by simulation of the supply model platform (process elements 19,20,21) according to recent planned paths, wherein the current positions of the trips on the network used by the supply model are calibrated according to updated positions received through 7 and whereas capacities on links are calibrated according to changes in positions associated with the position updates, and wherein the predicted positions on the network used by process elements 19,20,21 are provided to the planning agents and coordination processes (process elements 22,23,24) through 27 that receives the predicted positions through 1. According to some embodiments, wherein said DPCP planning and coordination of paths, is applied under respective BPPSSP and off-line data, the boundaries are used with such a method enable to shorten the time period of a planning and coordination phase due to the dynamic planning and coordination of paths applied within network related boundaries, and as a result more iterations may be applied with the iterative DPCP.

7 in the figure refers to data flow of time related position updates received by 26 from vehicles (controlled vehicles and non-controlled vehicles) through 3, and are used to calibrate the positions of the vehicles in the supply model platform (process elements 19,20,21) by adjusting the positions of the vehicles to reflect the current distribution of the vehicles. The updated positions enable to adjust initial conditions in the C-DTS for prediction of traffic development and, as a result, further said prediction of positions of vehicles, wherein calibration of the supply model further comprise calibration of local capacities on links (due to traffic interferences or incidents) according to short term history of position updates that are indicative of local velocities and positions of vehicles that might be associated with reaction to obstacles on links.

2 in the figure refers to data flow of planned paths produced by the planning and coordination platform (process elements 22,23,24) and transferred to 27 wherein distribution of paths, which are fed to the supply model platform (process elements 19,20,21), is applied through 9 with accordance to reference to the predicted positions of vehicles. Said distribution of paths may according to some embodiments be applied by 27 and according to some other embodiment be applied through a common memory that serves both 27 and the supply model modules (process elements 19,20,21). Such data transfer may according to some embodiment be applicable for any of the data transfers in FIG. 3.6.

12 in the figure refers to data flow of traffic predictions comprised of predicted time dependent traffic flows (e.g., V/C on links) and predicted time dependent travel times on links (preferably comprising further Network Load Balancing Gradients, Horizon-Exits/Position-destination pairs, Demand Stochastic Level, changed paths, non-occupied capacities/links) produced by the supply model platform modules (process elements 19,20,21) and fed to 25 through 12, wherein 25 composes the distributed data to a complete network picture associated with the simulated traffic prediction, and wherein the composed data is distributed to agents of the planning and coordination platform (process elements 22,23,24) through 11. The distribution of the traffic predictions to the agents from 25 is applied with respect to agents that serve respective vehicles which according to some embodiments their dynamic planning and coordination of paths is bounded by said BPPSSP and off-line data.

6 in the figure refers to data flow comprising potential assigned paths to trips that according the planning and coordination platform (process elements 22,23,24) are ready to be distributed as path updates through Input Output Navigation Data Management process element (26), using output 5, wherein according to some embodiments 26 may further check the current positions of respective vehicles, before updated paths are to be transmitted, in order to assign paths to vehicles under safe and applicable, i.e., assignment that is both applicable to the position of the vehicle and enables reasonable reaction time to apply a turn or a lane change.

13 in the figure refers to data flow of updates of (Position to Destination) PD pairs originated with requests for controlled trips and which are received by 26 through 3, and further transferred to demand model 28 which applies demand predictions according to historical demand updates (PD pairs associated with requests from vehicles to be navigated as controlled trips).

8 in the figure refers to data flow of predicted time related Origin to Destination (OD) pairs, preferably applied under highly incentivized controlled trips enabling to fully refer in with demand predictions to time related prediction of zone to zone point to point navigated trips. Fixed paths, such as buses, are prescheduled trips which may further be handled by 28 according to external input 15. Prescheduled and estimated demand are transferred from 28 to the supply model platform (process elements 19,20,21) through 8.

14 in the figure refers to data flow of updates associated inter-alia with traffic light signal timing updates, fixed and variable signals updates, as well as with network conditions and structure updates, which are received by the supply model platform (process elements 19,20,21), wherein according to some embodiments each module of the supply model selects the respective data that is relevant to the module, and wherein according to some embodiments the distribution is applied by a communication server that receives the data and further transfers the data to the supply model modules (process elements 19,210,21). According to some embodiments, the data flow on 14 is bidirectional enabling to provide traffic prediction data to a traffic light control system.

15 in the figure refers to data flow of initial historical setup of origin to destination (OD) pairs as well as to fixed paths (e.g., buses) received by 28, during the launch time of a predictive controlled navigation solution, in order to establish initial prediction of OD pairs for the supply model platform (process elements 19,20,21). According to some embodiments 15 comprises further setup of paths that reflects a calibrated C-DTS route choice model. According to such embodiments predictive navigation is launched gradually wherein non coordinated vehicles are assigned with paths determined by path of a calibrated route choice model associated with a C-DTS platform (e.g., calibration applied by OLPPP). With such approach load balancing optimization based on coordinated trips is gradually developed with the gradual increase in the share of predictive traffic load balancing controlled trips (i.e., coordinating path controlled trips).

16 in the figure refers to data flow of samples of traffic conditions that are used by said Layer-2 to produce respective control policies which are further transferred to Layer-3 to support Layer-1.

17 in the figure refers to data flow of control policy that is applicable when said control policy is based on said set of preplanned paths (comprising related control parameters to control planning of paths under DPCP) that are received from Layer 3 and are fed to the supply model.

18 in the figure refers to data flow of control policy (comprising related control parameters to control planning of paths under DPCP) that is applicable when said control policy is based on control steps that are received from said Layer 3.

29 in the figure refers to control steps related policy (comprising related control parameters to control planning of paths under DPCP) associated with transition from one batch to another wherein the control steps cover a range to be applied by branches of PMBMB-IMA-MPC applying with each branch e.g., DPCP.

30 in the figure refers to control related data produced by process elements 3,4,5 and 6 illustrated in FIG. 3.2 to control the planning of paths process elements 22,23, 24 under DPCP (PMBMB-IMA-DPCP) wherein process element 24 comprises, in addition to process element such as 22 or 24, the process elements 3,4,5 and 6 illustrated in FIG. 3.2 that controls the planning of paths.

31 in the figure refers to control on the predicted horizon by process element 22 (embedded with process element 6 illustrated in FIG. 3.2) through 27 which in turn controls the predicted horizon applied by process elements 19,20,21, wherein under increase in traffic irregularities the rolling horizon is shortened, and vice versa while traffic irregularities are decreasing.

32 in the figure refers to optional update of the level of the demand stochasticity to optionally further support the control on the rolling horizon. The quality of the demand prediction may be improved by encouraging executable requests for prescheduled trips. Prescheduled trips enable to reduce the stochastic level of statistic related predictions associated with demand model end as a result enabling to increase reliability and the effective length of the rolling horizon (subject to further ability to maintain sufficient number of iterations associated with traffic load balancing under real time constraints). The reason that such update is optional is that the effect of stochastic demand is sensed by the coordination of paths that may control the predicted horizon length by process element 22 through process element 27. Encouragement of prescheduled trips may be applied according to some embodiments by entitling such trips with priority in reservation of parking places, wherein the ability to apply reservation may count on effective incentives to use controlled trips, providing further ability to worn and fine non-authorized usage of reserved parking. Requests for prescheduled trips received at 5 update the demand prediction process element 28 by 26 through 13.

"Sync" in the figure refers to timing related messages including vehicle exchanged positions from one supply model module to another one.

Data flow illustrated in FIG. 3.6 (and in other figures that are associated with data transfer between/among process elements) may according to some embodiments relate to data transfers through a common memory.

Up to this point the described embodiments were associated with improvements to predictive traffic load balancing with the support of off-line processes. However, the potential exploitation of a road network with respect to maximization of the network traffic flow depends not just on traffic load balancing but further on the ability to control the demand distribution so that the traffic load balancing may maximize the flow on the network under applicable optimal demand distribution.

In this respect, predictive traffic load balancing enables exploitation of road network capacity and its topology under given distribution of demand, however, the load balancing may not contribute to full exploitation of the road network under freedom degrees that that demand distribution may enable but the demand control does not apply.

With above described embodiments, network traffic load balancing is presented as being agnostic to the demand control while taking it as a prime condition to which the load balancing apply flow maximization.

However, full exploitation of network capacity and topology, which depends on control of both the demand distribution and the traffic load balancing, was not taken into consideration, i.e., the point that the effectiveness of predictive traffic load balancing is primarily depends on the demand distribution, while the traffic load balancing should only be adaptive to any change in demand distribution, was not highlighted.

In order to enable full exploitation of the road network capacity and topology, which means maximization of traffic flow on a network, zone to zone demand control distribution should be applied. In this respect, discrimination in toll pricing among zone to zone trips should be applied, enabling to control the demand distribution in a manner that may optimize generation and exploitation of freedom degrees on the network, or at least aiming to come close to such objective, under applicable control on zone to zone demand distribution. Applicability constraint may relate to lack of potential encouragement of demand for a certain zone to zone demand and/or to lack of alternative for the demand under discouragement of certain zone to zone demand, wherein under both situations there is a lack of ability to control demand distribution. Another constraint, in this respect, may be hesitance of authorities to apply potentially unacceptable level of discrimination in zone to zone network usage pricing.

Before elaborating further the optimization concept for zone to zone demand distribution, which depends on the ability to apply adaptive traffic load balancing predictively, it is worth noting that under some embodiments it may be assumed that the optimization of demand distribution is according to some embodiments associated with prevention of tricky usage of zone to zone pricing by applying a zone to zone trip by using e.g., one or more intermediate zone to zone trips in order to reduce tolling costs.

In this respect, according to some embodiments, a toll charging unit functionality that applies said in-vehicle tracking of trips, under said privileged GNSS Tolling, is associated further with a process that checks if a new request for controlled trip is conducted before a minimum time delay from an end of a controlled trip (associated with a previous request) and, accordingly, if minimum elapsed time was not detected then a the new request for a controlled trip will not be served e.g., according to a procedure associated with communication between the DNA and the toll charging unit functionality that prevents transmission of a new request for a controlled trip.

According to some embodiments, said procedure activates further a message (through e.g., the navigation application) informing that there is a need for a stoppage in the current zone for a certain time before a new request may be served. The effectiveness of such approach is dependent on required stoppage time.

As mentioned above, lack of control on zone to zone distribution prevents an ability to maximize exploitation of a road network, that is, an ability to generate and further exploit by predictive traffic load balancing the highest applicable level of freedom degrees on the network is prevented under lack of control on applicable zone to zone demand distribution.

In this respect, according to some embodiments, applicable optimization of zone to zone demand distribution is associated with two phases comprising off-line planning of the distribution and on-line conduction of the planning phase.

The execution of the zone to zone planning, under incentivized coordinating controlled trips that apply predictive traffic load balancing, is associated with adjustment of zone to zone tolling discounts associated with said privileged tolling to obtain the planned zone to zone demand distribution. In this respect, a discount is associated with certain zone to zone tolling for network usage by a zone to zone related controlled trip, wherein a decrease in zone to zone price to encourage a certain zone to zone demand may be associated further with an increase in non-privileged tolling in order to maintain discouragement to disobedience to path updates provided to controlled trips.

In this respect, reduction in zone to zone privileged tolling without increasing non-privileged tolling (non-privileged network usage price) may cause insufficient difference between privileged tolling (privileged network usage price) and non-privileged tolling, and which non sufficient difference should preferably be increased.

According to some embodiments, if said difference is expected (or detected) to becomes too low then the difference is maintained e.g., by increasing respectively the non-privileged tolling value with a decrease in privileged tolling value. According to some embodiments, the maintained difference is applied according to some embodiments for an increase or a decrease in privileged tolling if otherwise the difference is not effective.

In this respect zone to zoned pricing associated with zone to zone demand control related embodiments, described above and hereinafter, refer according to some embodiments to said privileged zone to zone tolling (network usage price for zone to zone controlled trip under obedience to path updates).

According to some embodiments, execution of off-line planned time related zone to zone demand distribution by network usage pricing, under on-line operation of predictively controlled navigation that are aimed at attaining predictive traffic load balancing, is dynamically adjusted according feedback on demand distribution from executed anonymous requests for controlled trips enabling to detect and accordingly adjust on-line zone to zone demand distribution (before trips ending) until applicable off-line planned time related demand distribution is attained.

Time related planning of demand distribution, which may enable to applicable optimization of network flow under predictive distribution of paths that applies predictive traffic load balancing, may be attained according to some embodiments by off-line planning that is used further to execute the planning by respective zone to zone privileged network usage tolling by adjusting accordingly zone to zone prices to comply with planned distribution (using e.g., hourly related zone to zone tolling).

The off-line planning of the zone to zone distribution is aimed according to some embodiment at enabling traffic flow maximization under predictive traffic load balancing, using time related zone to zone recurrent demand, e.g., hourly demand, wherein off-line zone to zone demand distribution planning is associated with interaction between optimization of the demand distribution and simulation of traffic load balancing that react to changes in the demand distribution under demand distribution optimization. In this respect a prime need for gradual optimization of the demand is the need for feedback that the predictive load balancing provides for each change in the demand distribution.

In this respect, under an objective to improve (or to maximize) network traffic flow, off-line planning of zone to zone demand distribution is applied to obtain required zone to zone demand distribution by an iterative process. For example, demand optimization may use SPSA iterations that affect the zone to zone demand distribution and receives at each iteration feedback from (nested) iterative coordination of trips applied by predictive traffic load balancing (for a change in the demand).

Such approach applies nested iterative optimization, i.e., gradual changes to demand distribution should be associated with re-coordination of paths that should become adapted to the change in the demand distribution. Convergence to required distribution is measured according to some embodiments by measuring aggregative simulated flow on the network, wherein the highest attainable flow represents optimal flow. Alternatively, simulated travel times on the network can be used as feedback wherein the minimum aggregative travel times of trips on the network may represents optimal flow.

According to some embodiments, zone to zone Value of Travel Time Saving (VTTS) which is determined according economic criteria is used with the objective function to optimize zone to zone demand distribution (rather than network flow optimization) wherein the objective is to provide priority to zone pairs that may generate higher VTTS. Further priority may be applied according to type of trips wherein, according to some embodiments, vehicles that generate higher economic value are to ve entitled for lower zone to zone tolling in order to comply with respective planned demand.

With such embodiment the search for optimal distribution under said off-line simulations is based on maximizing aggregated VTTS, or in other words maximizing economic value on the network, rather than for example minimizing aggregated travel times without consideration of intra zone to zone priorities.

According to some embodiments, said on-line adjustment of zone to zone related network-usage pricing, associated with maximization of VTTS and possibly other economic related values, or minimization of travel times (maximization of network flow), makes the execution of planned zone to zone pricing somewhat evolutionary with respect to a need to moderate changes in the pricing under trial and error process (with respect to said gradual adjustment of pricing to obtain required time related network related demand distribution).

According to some embodiments, the off-line optimization of zone to zone demand distribution and respective on-line adjustment of zone to zone pricing is applied periodically, According to some embodiments, zone to zone tolling which is applied according to zone to zone related positions to destination associated with a request for e.g., path-controlled trip is associated with said privacy preserving privileged tolling, associated with entitling privileged tolling according to obedience level to path updates associated with predictive controlled trips (wherein the path updates are applied anonymously and the toll charging is applied non anonymously), comprise with its respective in-vehicle charging unit functionality a further process of determination of zone to zone privileged network usage tolling by associating first the request for a controlled trip to a respective zone to zone pair (which can be comprised of the same zone) according to position and destination of the request for a controlled trip.

According to some embodiments, the data associated with determination of in-vehicle privileged tolling refers directly or indirectly to the zone to zone determined controlled trip, wherein an in-vehicle process determines accordingly respective privileged tolling for obedience to path updates received by the controlled trip.

According to some embodiment indirect determination of privileged tolling is based on pre-determination of non-privileged zone to zone tolling according to data that determines non privileged zone to zone tolling, wherein an in-vehicle process that determines first nonprivileged tolling according to data associated with determination of potential non-privileged tolling and respective obedience to path updates, with relation to position and destination pair of a requested trip, and, based on determined non privileged zone to zone tolling, a further in-vehicle process determines the privilege zone to zone tolling (e.g., factorizing the determined non-privileged tolling by a predetermined value).

Said data, according to which privileged and non-privileged tolling are determined, are stored according to some embodiments in an in-vehicle storage (e.g., toll charging unit functionality storage).

According to some embodiments said requests for controlled trips may comprise prescheduled requests for trips wherein a request refers to time related origin and destination pairs that can be associated with zone to zone related tolling.

According to some embodiments, operation associated with controlled trip (e.g., said path controlled trips) may start to be applied under non discriminating zone to zone tolling, e.g., equal zone to zone prices (i.e., free of charge tolling or network flat rate toll discount privilege) for path-controlled trips, wherein a process, associated with the control, tracks zone to zone demand according to anonymous request for controlled trips and build accordingly database of time related zone to zone demand e.g., time related zone to zone recurrent demand.

An effective change to zone to zone pricing that either introduce discrimination among zone to zone pairs, or makes an effective change to a discriminated zone to zone pricing, would affect both the demand and on the coordination of paths, that is, the distribution of paths depends on the demand and accordingly the traffic load balancing is adapted to changes in the demand.

The following description refers to zone to zone tolling as an integrated part in a method that supports anonymously automated cooperative navigation (path-controlled trips) on a road network.

In this respect, according to embodiments, said in-vehicle toll charging unit (or any variant of such applied unit) provides a platform for zone to zone tolling, wherein the method comprising:

a. receiving at the vehicle, preferably by in-vehicle toll charging unit, position and destination of a trip associated with a request for a path-controlled trip,
b. determining at the vehicle, preferably by in-vehicle toll charging unit, zone to zone related trip according to said received position and destination and according to map of zones, wherein the position and destinations are translated to zone pairs associated with the map of zones according to a match between the position and the destination and the zones associated with the map, c. determining at the vehicle, preferably by in-vehicle toll charging unit, matches and mismatches between tracked positions of the trip and positions that should reflect the updated path, d. determining at the vehicle, preferably by in-vehicle toll charging unit, time related privileged zone to zone toll charging value for matches, according to zone to zone toll pricing associated with matches (preferably according to respective in-vehicle match related data associated with in-vehicle memory) and, non-privileged time related toll charging value for mismatches, according to toll pricing associated with mismatches (preferably according to respective in-vehicle mismatch related data associated with in-vehicle memory).

e. transmitting from the vehicle at least one determined toll charging value that may reflect the charging value for a trip associated for example with charged value for match and charged value for mismatch.

Road network usage associated with a charging value is determined preferably according updated data received at a vehicle, for example, by a download process from a server, or for example by pushing such data to a memory associated with a vehicle by a server. According to some embodiments the memory is associated with a toll charging unit.

According to some embodiments, said determination of road network usage pricing that relates to zone to zone trip is applied by data that is planned offline and, accordingly, vehicles are updated with such data enabling them to determine trip related privileged and non-privileged tolling associated with said matches (privileged tolling) and mismatches (nonprivileged tolling), wherein a privilege according to some embodiments entitles toll discount for obedience to a path that is expected to be developed according to recommended path updates (associated with said match).

According to some embodiments, data that determines road network usage pricing for obedience and for disobedience is associated, for example, with daily time related zone to zone tolling prices that become applicable with concrete trip origin and destination pairs associated e.g., with a departure time of trips.

According to some embodiments, a position to destination pair associated with a trip, which is determined, for example, with a request for a path-controlled trip, is according to some embodiments received by a vehicular toll charging unit. Such a toll charging unit has according to some embodiment access to data that determine road network usage related value, associated with privileged tolling and non-privileged tolling. According to some embodiments, the data is stored at the vehicle wherein according to some embodiment such data is updated through Internet communication. In this respect, zone to zone toll pricing is associated with daily time intervals. According to such embodiments, different prices may be assigned to different pairs of zones.

According to some embodiments the procedure to apply said network usage pricing comprises user defined preference, for example, to enable or disable acceptance of path (associated with a path-controlled trip) that may include private tolled road/roads.

According to some embodiments, privileged tolling for different pairs of zone to zone related trips is adjusted to apply said off-line planned demand distribution for certain time intervals such as a daily hours. According to some embodiments, the off line zone to zone distribution planning may include determination of sizes of said zones. According to some embodiments, off-line optimization of the demand distribution is applied with more than one constraint wherein one of the constraints is, for example, to maximize flow under different sizes of zones, wherein a change to the size of one or more zones may further affect the number of zones associated with a road network.

The following summarizes some main aspects associated with zone to zone related tolling from a vehicle related position. In this respect, according to some embodiments, a method that supports anonymously automated cooperative navigation on a road network, comprises:

a. receiving at a vehicle one or more updates to a path planned by a predictive control system, and transmitting from the vehicle, position updates of the vehicle, wherein communications associated with position and path updates are anonymous, b. determining at the vehicle at least one network-usage related value according to a comparison between a path complying with said path updates and an actual development of a controlled trip related path, according to tracked positions of the vehicle, wherein determination of the network-usage related value comprises usage of data configured to determine a potential network-usage related value for a potential match (obedience to path updated) and a potential network-usage related value for a potential mismatch (disobedience to path updates), wherein road network usage related value is dependent on zone related position and zone related destination of a requested path for a trip.

c. transmitting from the vehicle the network-usage related value.

According to some embodiments, the network-usage related value is a road network charging related value (tolling value), wherein the network-usage related value associated with a potential match is a discount in charged toll comprising a potential discount for zone to zone related trip (privileged tolling).

According to some embodiments the method comprise transmission of network-usage related value from the vehicle is non-anonymous with relation to identity associated directly or indirectly to the vehicle with respect to the vehicle trip information.

According to some embodiments, non-anonymous and anonymous communication is applied with different SIM profiles associated with a vehicle.

The following summarizes some main aspects associated with zone to zone related tolling from a control center point of view. In this respect, according to some embodiments, the method associated with the reception one or more path updates by a vehicle is associated further with transmission of path updates from a system that are dependent on model predictive control approach preferably comprising one or more process elements of said DPCP, wherein the method comprising:

a. receiving position and destination updates associated with anonymous identities of vehicles that use controlled trips;

b. calibrating the distribution of vehicles on the network of a supply model associated with dynamic traffic simulator applying traffic predictions for coordination control processes (which may be expanded to support C-DTS of DPCP) according to received position updates, c. calibrating further link capacities associated with the network of said supply model according to relative dynamics of updated positions on the network (e.g., detecting obstacles that block usage of a lane of a link for a certain length that changes local capacities), d. re-planning of paths according to calibrated C-DTS time related travel time prediction, using said coordination control processes that may be expanded by one or more process elements of DPCP that supports coordination control processes, e. transmitting path updates to said vehicles according to their anonymous identities, e. determining privileged zone to zone network usage value according to detection of difference between detected demand level and preplanned demand, wherein a need for reduction in detected demand is associated with increase in zone to zone pricing and vice versa in case of a need to reduce zone to zone demand and, accordingly, if the difference between the privileged and non-privileged values is assumed to be insufficient to encourage obedience to path updates then the non-privileged value is increased, and wherein the non-privileged value may refer to zone to zone trips.

The following summarizes a comprehensive approach of predictively-controlled cooperative-navigation enabling to increase utilization of road infrastructure by predictively controlled coordination of controlled trips associated with central predictive control on paths that applies predictive traffic load balancing on at least part of a citywide road network (PCCN) which its usage is incentivized by zone to zone demand control, wherein the traffic load balancing in adaptive to zone to zone demand, and wherein predictive coordination of paths enables scalable predictively-controlled cooperative-navigation for varying size of citywide road networks under regular and irregular traffic conditions.

In this respect, said more comprehensive approach of predictively-controlled cooperative-navigation comprises:

1. A method, according to some embodiments, wherein utilization of road network capacity and topology, associated e.g., with at least a portion of a city wide or a metropolitan wide road network, is applied by a scalable PCCN based predictive traffic load balancing, wherein an iteration of traffic load balancing comprises:
   a. predicting traffic development on a road network in a predicted time horizon by an on-line calibrated Controllable Dynamic Traffic Simulator (C-DTS), wherein the prediction is performed according to input from a previous iteration in which re-planned paths is performs, and wherein the traffic prediction determines primarily time related travel times on links in time intervals associated with the predicted horizon boundary
   b. determining costs of links that may refer to time related travel time and to time related level of non-occupied capacities on links, wherein lower travel time cost and higher non occupation provides higher priority to a link with a search for an alternative preferred path
   c. determining cost of virtual links beyond the horizon of C-DTS prediction for trip that their destinations are beyond C-DTS predicted horizon, wherein virtual links connect potential exits of each trip from predicted horizon to its destination, and wherein costs virtual links are determined according to pre-prepared link to link cost that reflects substantial load balanced network, and wherein the pre-prepared costs are associated with time related travel time costs and preferably further time related average non-occupancy level associated with said link to link costs,
   d. re-planning of paths for trips according to time related costs produced by the C-DTS prediction and associated post processing, wherein planning of paths according to C-DTS prediction is bounded by said traffic development prediction up to current predicted horizon boundary and further bounded by zone to zone boundaries, wherein
      i. predicted horizon boundary is applicably relative to positions of trips
      ii. zone to zone boundaries are primarily determined under to zone to zone distribution of paths on the network as a results of off-line predictive traffic load balancing and are further expanded according to demand under on-line traffic irregularities,
      iii. zone to zone related boundaries are associated under substantial load balance on the network with zone pairs associated with the origin to destination pairs of a trips,
      iv. according to some embodiments zone to zone related boundaries are associated under traffic irregularities with bypassing zone to zone pairs enabling to bypass zones that were associate originally with a zone to zone trip (according to a request for a controlled trip),
   e. accepting modified paths produced by said re-planning, for further traffic development prediction of C-DTS to be used with further re-planning of paths, wherein acceptance is subject to a control step (a travel time limiting criterion) aimed at enabling gradual iterative traffic imbalance mitigation on the network,
   f. transmitting to respective vehicles accepted path updates under a condition that a path update is applicable from a position point of view of a trip or from safe driving point of view according to a required turn to be performed by a trip and if acceptance was found to be inapplicable the currently assigned path is returned to the re-planning process.
2. A method, possibly applied according to method 1 and/or according to other relevant methods, wherein, according to some embodiments, adjustment of zone to zone demand comprising:
   a. tracking by a server potential consistent mismatch between current time related zone to zone demand from pre-planned time related zone to zone demand by a comparison between current demand distribution and preplanned off-line time related zone to zone demand distribution, wherein the off-line demand distribution is based on off-line demand planning that generates freedom degrees to increase traffic flow under traffic load balancing,
   b. adjusting by a server application zone to zone demand prices, according to detected mismatch between preplanned off-line time related zone to zone demand distribution and current demand distribution, wherein current zone to zone demand that is higher than the pre-planned demand is associated with increase in privileged zone to zone network usage pricing (applied with obedience to updated paths) and wherein zone to zone demand that is lower than pre-planned demand is associated with increase in the privileged zone to zone network usage pricing,
3. A method, possibly applied according to method 2 and/or according to other relevant methods, wherein, according to some embodiments, update to non-privileged network usage values to discourage non usage of controlled trips under said zone to zone demand pricing comprising:

a. determining non-privileged network usage values for zone to zone trips to maintain discouragement of disobedience to path updates, according to detected level of disobedience to updates of paths (while the difference between privileged network usage value and non-privileged network usage value becomes too small), wherein an increase in non-privileged network usage pricing is expected to decrease disobedience level to updates of paths.

b. updating said non-privileged network usage values, according to some embodiment, in a server from which vehicles download such data (e.g., by said toll charging units) to determine in vehicle network usage charging for zone to zone trips associated with determined obedience and disobedience to updated paths.

4. A method, possibly applied according to method 1 and/or according to other relevant methods, wherein, according to some embodiments, a plurality of moderated re-planning stages enables further predictive coordination of trips on at least part of a road network that its traffic is non-linearly affected by a re-planning stage.

5. A method, possibly applied according to method 1 and/or according to other relevant methods, wherein, according to some embodiments the obedience is encouraged by increasing non-privileged charged toll (globally or personally) wherein privileged tolling is preferably global and is neither sensitive to number of updates to a path nor to the number of vehicles.

6. A method, possibly applied according to method 5 and/or according to other relevant methods, wherein, according to some embodiments, vehicles determine a zone to zone network usage charging related value according to received data which determine potential privileged and non-privileged zone to zone network usage charging related values, and according to obedience and disobedience to updated path.

7. A method, possibly applied according to method 1 and/or according to other one or more relevant methods, wherein, according to some embodiments, the potential privileged network usage is adjusted to a level that encourages obedience to updated path, and accordingly said reception of position and destination updates from vehicles, which makes a need for C-DTS demand estimation associated with route choice model parameters to be virtually redundant with on-line C-DTS calibration.

8. A method, possibly applied according to method 1 and/or according to other relevant methods, wherein, according to some embodiments, on-line C-DTS calibration is applied by state estimation comprising estimation of demand state vector wherein aggregated demand from each road network zone to other network zones is an element in the state vector and wherein quasi-dynamic split of exits from a zone is determined based on historical and statistical predictions.

9. A method, possibly applied according to method 7 and/or according to other relevant methods, wherein, according to some embodiments, queue mapping is associated with determination of field measurements for C-DTS on-line calibration and wherein the queue length is estimated according to positions updates received from vehicles wherein the farthest position of a vehicle in a queue, in a number of cycles of exits from the queue, is indicative on the length of the queue and wherein the number of cycles required to estimate the length according to the farthest position is determined according to average percentage of probe vehicles in the queue that is a result of C-DTS prediction.

10. A method, possibly applied according to method 1 and/or according to other relevant methods, wherein, according to some embodiments, a transmission of a path update, comprising short term effect on driver, is performed subject to anticipated ability of a driver to respond safely to the updated path.

11. A method, possibly applied according to method 1 and/or according to other relevant methods, wherein, according to some embodiments, updated paths of trips related to positions of vehicles, which are fed to apply C-DTS predictions, comprise further fixed paths on the network and wherein under on-line C-DTS calibration received time related positions are updated in the C-DTS.

12. A method, possibly applied according to method 1 and/or according to other relevant methods, wherein, according to some embodiments, obedience to updated paths predictively improves traffic load balance on at least part of a road network.

13. A method, possibly applied according to method 1 and/or according to other relevant methods, wherein according to some embodiments, the transmission of updates associated with assignment of paths to vehicles and reception of destinations and positions from vehicles comprising transmissions and receptions according to anonymous identities of vehicles.

14. A method, possibly applied according to method 1 and/or according to other relevant methods, wherein, according to some embodiments, under early stages of activation of cooperative navigation, said re-planning is limited to a certain percentage of trips on the network wherein the rest of the controlled trips are assigned with paths according to a route choice model.

15. A method, possibly applied according to method 13 and/or according to other relevant methods, wherein, according to some embodiments, substantial optimization of the re-planning triggers reduction in the share of trips that are assigned with paths according to route choice model whereas the share of trips that are assigned with paths according to re-planning is increased respectively.

16. A method, possibly applied according to method 1 and/or according to other relevant methods, wherein, according to some embodiments, a phase of re-planning of paths is aimed at reducing traffic imbalance, the method comprising:

performing the above described searching stage of said re-planning phase associated with the above described plurality of AVS, or the above described plurality of SAVS, and possibly further described embodiment that may be relevant to the re-planning phase in relation to said top down mitigation of prioritized relatively loaded links and prioritization of relatively loaded links, comprising at least a single AVS or SAVS performing:

an above described acceptance stage of a re-planning phase, either by the above described simplified acceptance stage or by the above described non-simplified acceptance stage, and an above described verification stage of a re-planning phase, either by the above described simplified verification stage or by the above described non-simplified verification stage;

performing an updating stage of above described re-planning phase, either as a result of a simplified verification stage or as a result of a non-simplified verification stage;

wherein, under embodiments according to which a plurality of AVS or a plurality of SAVS are performed with a re-planning phase, a process to determine the favorable AVS or the favorable SAVS is further performed according to the above described AVS or according to the above describes SAVS.

17. A method, possibly applied according to method 16 and/or according to other relevant methods, wherein, according to some embodiments, a re-planning stage is associated with one or more AVS or with one or more SAVS by a sequential sub-phases of a re-planning phase, or according to some embodiments, associated with a plurality of AVS or SAVS, by a parallel process according to which a branch of the parallel process applies a functionality of a sub-phase in said sequential process performing sub-phases, or by a combination of aid parallel and sequential processes wherein according to some processes the combined method is applied with said PMBMB-IMA-MPC and/or PMBMB-IMA-DPCP.

18. A method, possibly applied according to method 16 and/or according to other relevant methods, wherein, according to some embodiments, pending alternative paths for which alternatives are searched comprise alternative paths that failed to be accepted as potential alternatives for assigned paths, to current and predicted trips, according to respective travel time limiting threshold criterion associated with respective prior search for alternatives and wherein under further stages of imbalance reduction such paths may further serve as pending alternative paths that may become passively accepted due to acceptance of other potential alternative paths or actively substituted by an accepted potential alternative.

19. A method, possibly applied according to method 16 and/or according to other relevant methods, wherein, according to some embodiments, the travel time limiting threshold criterion limits the travel time to destination of an accepted path subject to a longer travel time that is associated with the path in comparison to anticipated travel time associated with search for its respective non accepted alternative in prior imbalance reduction stage, but not longer than a certain travel time limit.

20. A method, possibly applied according to method 19 and/or according to other relevant methods, wherein, according to some embodiments, the limit on travel time limiting threshold criterion is reduced under limited computation resources to apply C-DTS traffic predictions enabling sufficient number of re-planning stages to reduce traffic imbalance under real time constraints.

21. A method, possibly applied according to method 20 and/or according to other relevant methods, wherein, according to some embodiments, a limit on travel time limiting threshold criterion is limited to avoid loss of control on convergence toward traffic load balance.

22. A method, possibly applied according to method 19 and/or according to other relevant methods, wherein, according to some embodiments, travel time limiting threshold criterion is limited to avoid non-marginal discrimination among trips that their paths are changed in a re-planning stage under a common travel time limiting threshold criterion.

23. A method, possibly applied according to method 19 and/or according to other relevant methods, wherein, according to some embodiments, the limit of a travel time limiting threshold criterion is increased from one stage of imbalance reduction to another under increase in predictive load balance on the network in predicted time horizon.

24. A method, possibly applied according method 19 and/or according to other relevant methods, wherein, according to some embodiments, a travel time limiting threshold criterion is adaptively determined in perspective of multiple prior stages of imbalance reduction.

25. A method, possibly applied according to method 16 and/or according to other relevant methods, wherein, according to some embodiments, a failure of acceptance determines a pending potential alternative path to become a potential alternative to an assigned path subject to acceptance of one or more other potential alternative paths in a further imbalance reduction stage that make the path to be accepted under reduction in traffic imbalance and in the limit on the travel time limiting threshold criterion.

26. A method, possibly applied according to method 25 and/or according to other relevant methods, wherein, according to some embodiments, a failure of acceptance determines further a pending potential alternative path as a temporary potential alternative that may be converted to an accepted alternative under a further imbalance reduction phase.

27. A method, possibly applied according to method 16 and/or according to other relevant methods, wherein, according to some embodiments, search for alternatives comprising further search for alternative to new current and predicted assigned paths having yet no pending alterative paths.

28. A method, possibly applied according to method 16 and/or according to other relevant methods, wherein, according to some embodiments, synthesized C-DTS prediction is fed further by paths comprising current and predicted paths determined according to a route choice model.

29. A method, possibly applied according to method 16 and/or according to other relevant methods, wherein, according to some embodiments, synthesized C-DTS prediction is fed further by paths comprising current and predicted predetermined fixed paths on the road network.

30. A method, possibly applied according to method 16 and/or according to other relevant methods, wherein, according to some embodiments, the C-DTS simulator comprising motion model of autonomous vehicles on roads comprising interactions of autonomous vehicles with other vehicles on roads.

31. A method, possibly applied according to method 16 and 19 and/or according to other relevant methods, wherein, according to some embodiments, under loss of control on convergence toward traffic load balance, stored travel time limiting criteria associated with stored traffic patterns that converge to acceptable reduction in traffic load balance, determine travel time criteria for one or more re-planning stages wherein stored travel time limiting criteria are retrieved according to a closest match between current traffic patterns and stored traffic patterns with which travel time limiting criteria are associated. Such a method may be substituted by a trained deep neural network or a trained recurrent neural network to save a need to store traffic patterns and respective then in order to compare current traffic patterns with stored patterns that are associated with stored travel time limiting criteria and/or with other control policies, and wherein travel time limiting criteria are chosen according to a closest match between current traffic patterns and traffic patterns with which learned travel time limiting criteria are associated.

32. A method, possibly according to method 31 and/or according to other relevant methods, wherein, according to some embodiments, under a change in concentration of traffic load balancing on a road network, such under increase or decrease of the load balanced part of the road network, travel time limiting criteria and or other control policies associated with imbalanced traffic patterns enabling to reduce the imbalance to acceptable traffic load balance or acceptable traffic imbalance, such policies determine further planning wherein under usage of travel time criteria policy re-planning by one or more control stages may be applied.

33. A method, possibly applied according to method 16 and/or according to other relevant methods, wherein, according to some embodiments, a re-planning stage may be associated with a plurality of travel time limiting criteria that may differ for different combinations and levels of relatively loaded links associated with different paths of trips.

34. A method, possibly applied according to method 16 and/or according to other relevant methods, wherein, according to some embodiments, said searches for alternative paths that are performed independently one of the other are applied by a plurality of agents associated with trips.

35. A method, possibly applied according to method 16 and/or according to other relevant methods, wherein, according to some embodiments, predictive reduction of a potential traffic load from an identified relatively loaded link, under at least one re-planning stage, is associated with prevention from affecting such a link by further re-planning stages for a limited time.

36. A method, possibly applied according to method 16 and/or according to other relevant methods, wherein according to some embodiments, predictive reduction of a potential traffic load from an identified relatively loaded link, under at least one re-planning stage, is associated with prevention from paths associated with the link to remain being associated with the link for a limited time.

37. A method, possibly applied according to method 16 and/or according to other relevant methods, wherein, according to some embodiments, tendency of traffic imbalance reduction is detected according to reduction in aggregated travel times of paths according to C-DTS predictions of two or more imbalance reduction stages.

38. A method, possibly applied according to method 37 and/or according to other relevant methods, wherein, according to some embodiments, convergence to predictive traffic load balance is determined by detecting a tendency that indicates on minimal reduction in aggregated travel times on the road network.

39. A method, possibly applied according to method 38 and/or according to other relevant methods, wherein, according to some embodiments, imbalance reduction tends to converge toward relatively non-discriminating load balance enabling distribution of new trips with comparable position to destination to experience comparable travel times on the network even though their assigned paths are different.

40. A method, possibly applied according to method 16 and/or according to other relevant methods, wherein, according to some embodiments, under evacuation of vehicles from a region on the network towards multiple exits of the region border is applied by assigning a common destination for a plurality of exits on the broader of the region enabling to maintain evacuation under tendency to apply relatively non-discriminating evacuation.

41. A method, possibly applied according to method 40 and/or according to other relevant methods, wherein, according to some embodiments, the destination is a virtual destination associated with virtual links to a plurality of exits from the region enabling more flexible evacuation through multiple exits.

42. A method, possibly applied according to method 16 and/or according to other relevant methods, wherein, according to some embodiments, relatively loaded links are determined according to results of volume to capacity ratios from synthesis of C-DTS prediction fed by paths comprising accepted pending alternative paths wherein according to the prediction relatively loaded links comprising paths that are failed to improve travel time due to independent path planning that have a potential to cause traffic imbalance.

43. A method, possibly applied according to method 16 and/or according to other relevant methods, wherein, according to some embodiments, the relatively loaded links are prioritized relatively loaded links that limits the number of relatively loaded links under computation resources constraints and wherein such limit compromises on direct convergence to predictive load balance, by convergence to a sub-optimum or by convergence associated with a sequence of transitions from one sub-optimum to a more optimal one, enabling controllable gradual convergence that shortens the time to improve traffic imbalance in a shorter time for a cost of lengthening the time to further improve the load balance.

44. A method, possibly applied according to method 2 and/or according to other relevant methods, wherein the off-line pre-prepared distribution of zone to zone demand is applied with at least one final traffic load balancing stage that imitates on-line traffic load balancing associated with rolling horizon and zone to zone boundaries for planning paths under time related recurrent zone to zone demand and regular traffic (with no traffic irregularities), wherein prior stages of traffic load balancing may prepare conditions to the at least final stage by less and/or no bounded traffic load balancing.

45. A method, possibly applied according to method 3 and/or according to other relevant methods, wherein the difference between zone to zone privileged network usage value and zone to zone non-privileged network usage value is maintained while zone to zone privileged usage network value is decreased.

46. A method, possibly applied according to method 1 and/or according to other relevant methods, wherein the time related travel time costs of virtual links are determined according to off-line pre-prepared link to link travel times that reflects average travel times of paths associated with simulated trips that under traffic load balance used transition between respective links associated under current on-line traffic load balancing with exit links from predicted horizon to destination link of a trip that its path is bounded by current predicted horizon.

47. A method, possibly applied according to method 1 and/or according to other relevant methods, wherein the descried process elements of DPSP are associated with the planning and coordination of paths.
48. A method, possibly applied according to method 1 and/or according to other relevant methods, wherein on-line traffic load balancing is applied by multi branch of multi batch associated with a plurality of iterations that apply predictive traffic load balancing, by said iterations comprising traffic prediction, re-planning and acceptance processes, wherein a transition from one batch to another is associated with narrowing the range of said acceptance (control steps) associated with a plurality of branches—allowing multi branch predictive traffic load balancing to search for preferred branch to be used with a further multibranch predictive traffic load balancing batch.
49. A method, possibly applied according to method 48 and/or according to other relevant methods, wherein pre-planned control policies are fed to a plurality of iterations of multibranch predictive traffic load balancing, under detection of insufficient iteration to apply on-line load balancing, wherein inference phase from a trained artificial neural network is used to produce control policy according to sampled traffic development from the C-DTS supply model, and wherein the artificial neural network is trained by multi branch multi batch coordination control processes according to samples of traffic conditions from C-DTS.
50. A method, possibly applied according to method 49 and/or according to other relevant methods, wherein a control policy comprises a set of control steps associated with travel time limiting criteria that are fed to the acceptance process of each of the iterations,
51. A method, possibly applied according to method 49 and/or according to other relevant methods, wherein a control policy comprises a set of pre-planned paths that are fed to supply models of respective C-DTSs and an update of a range of control steps for the acceptance stage in the multibranch predictive traffic load balancing.
52. A method, possibly applied according to method 2 and/or according to other relevant methods, wherein off-line planning of zone to zone demand distribution is an iterative process, wherein an iteration of the planning of zone to zone demand distribution comprises reaction of predictive simulation of traffic load balancing to each change in zone to zone demand distribution, and wherein a change to the demand distribution is performed by Simultaneous Perturbation Stochastic Approximation (SPSA) based on feedback of aggregated travel times produced by the reaction of simulated predictive traffic load balancing to a perturbation.
53. A method, possibly applied according to method 52 and/or according to other relevant methods, wherein on-line adjustment of privileged network usage pricing for zone to zone trips, to comply with off-line planned distribution of zone to zone demand, is independent of a preplanned path under predictive traffic load balancing that dynamically updates paths.
54. A method, possibly applied according to method 1 and/or according to other relevant methods, wherein planning of paths is applied according to costs of links that further to their time related travel time costs their relative non-occupied capacities affects their costs, wherein a link that have travel time cost similar to travel time costs of another link, while its absolute non-occupied capacities, e.g., due to difference in the lanes, is higher, will be associated with lower cost that the other link that have lower level of non-occupied capacity.
55. A method, possibly applied according to methods 1 and 54 and/or according to other relevant methods, wherein further to time related travel time costs on links the volume to capacity ratios on links and their number of lanes, wherein relatively higher number of lanes for the same volume to capacity ratio reflects relatively higher non occupied capacity.
56. A method, possibly applied according to methods 1 and 54 and/or according to other relevant methods, wherein the C-DTS produce further to time related travel time costs on links the time related non occupied capacity levels on links, and wherein accordingly and according to time related travel time costs the costs of links is determined for search for a shortest path according to said cost.
57. A method, possibly applied according to method 1 and/or according to other relevant methods, wherein an iteration of predictive traffic load balancing is applied with one or more additional process elements of DPCP iterations up to applying DPCP.
58. A method, possibly applied according to method 57 and/or according to other relevant methods, wherein the applied level of DPCP is associated with PMBMB-IMA-DPCP, enabling to search for effective control policy by a plurality of tentatively used control policies (branches) and refining the search by transition from course search to more refined search by transition from one batch to another wherein the transition is based on choosing the most effective branch associated the most effective detected policy at the end of a batch.
59. A method, possibly applied according to method 58 and/or according to other relevant methods, wherein the PMBMB-IMA-DPCP is supervised by off-line learned control policies and wherein the off-line learning is applied by simulation of PMBMB-IMA-DPCP for imbalanced traffic on the network according to which control policies are stored with supporting parameters that may apply process elements of DPCP under PMBMB-IMA-DPCP.
60. A method, possibly applied according to method 59 and/or according to other relevant methods, wherein the relation between control policies associated with their said DPCP related parameters and imbalanced traffic conditions is associated with training a deep neural network or a recurrent neural network.
61. A method, possibly applied according to method 60 and/or according to other relevant methods, wherein reduced deepness of a trained deep neural network or a recurrent neural network is applied by dividing the imbalanced traffic conditions to sub-groups while feeding respective imbalanced conditions to different deep neural networks or recurrent neural network associated with said subgroups, possibly with some overlap.
62. A method, possibly applied according to method 2 and 46 and/or according to other relevant methods, wherein preparation of zone to zone boundaries comprises:
    a. preparing by off-line predictive traffic load balancing, preferably by PMBMB-IMA-DPCP, coordinated paths that leads traffic development toward load balanced traffic on a road network—for daily typical recurrent zone to zone demand—preferably the traffic load balancing is associated with at least one final stage that applies PMBMB-IMA-DPCP bounded with zone to zone and predicted horizon boundaries that may expected to be further used on-line by traffic load balancing, b. determining by an off-line process zone to zone boundaries on the network for on-line load balancing, wherein determination of the boundaries is applied initially according to the distribution of paths which led to said off-line traffic load balance on the network, and wherein zone to zone boundaries are preferably determined to cover a part of the network in which said off-line planned zone to zone paths were developed preferably with some margin to support deviations in demand and in traffic from regular conditions under on-line traffic load balancing.

63. A method, possibly applied according to method 62 and/or according to other relevant methods, wherein under on-line traffic load balancing adds a links to the zone to zone boundaries according to traffic conditions and concreate predicted horizon boundary.

64. A method, possibly applied according to method 1 and/or according to other relevant methods, wherein link to link travel time costs are determined by average travel time costs of the off-line determined paths, preferably paths that their destinations are associated with link to destination link (enabling to support with more authentic link to link travel time costs—differentiation of exits from a predicted horizon under rolling horizon bounded planning and coordination of paths).

65. A method, possibly applied according to method 1 and 64 and/or according to other relevant methods, wherein travel time costs to destination beyond predicted horizon are determined for respective trips on exits from the predicted horizon by said virtual links, and wherein the travel time costs are initially based on travel time cost determined off-line by said link to link travel time costs.

66. A method, possibly applied according to method 1 and/or according to other relevant methods, wherein detection of increase in traffic irregularities is associated with a decrease in the forward time interval of predicted rolling horizon applied by the C-DTS.

67. A method, possibly applied according to method 66 and/or according to other relevant methods, wherein reduction in the predicted horizon enables no effective coordination of paths, then proactive coordination of paths, associated with method 1, is substituted to reactive DPCP.

68. A method, possibly applied according to method 1 and/or according to other relevant methods, wherein under traffic irregularities in which reactive DPCP and limited proactive DPCP approaches are applied, instead of proactive DPCP associated with method 1, the more effective approach is chosen to control paths of controlled trips.

69. A method, possibly applied according to method 67 and/or according to other relevant methods, wherein i. as long as the reactive planning and coordination of paths may take benefit of said virtual destinations beyond predicted horizon then, reactive DPCP updated the virtual links in a farther part of a predicted horizon wherein proactive DPCP is applied in the nearest part of the predicted horizon, ii. wherein the proactive DPCP in "i" loss effectiveness then sole reactive DPCP is applied in a predicted horizon.

Up to this point, aspects of improving citywide traffic flow were described in relation to predictive traffic load balancing and to zone to zone demand optimization associated with predictive traffic load balancing. However, the potential improvement from such methods are expected to be progressively affected by non-effective search for parking places in cities due to shortage in empty parking places. Such a phenomena has three negative effects:

degradation in the efficiency obtained by PCCN with respect to arrival time to destinations, degradation in local traffic flows in regions where there are trips that are searching for non-occupied (empty) parking places, reduced effectiveness of predictive arrival time to destinations which have direct and indirect negative economic effect in working hours.

According to some embodiments, alleviation of such an issue may be associated not just with creation of more parking places, but further with predictive management of parking places.

In this respect, predictive reservation of parking places and association of demand control with potential reservation of parking places may enable predictive management of parking places under operation conditions comprising:

predictive load balancing that provides predictive arrival time to destinations, incentivized path-controlled rips that generates substantially full usage of path-controlled trips, and under further abilities:

to reserve parking places for path-controlled trips, to estimate potential reservation of parking places that may serve requests for path-controlled trip at, or up to, the arrival time of path-controlled trips to the vicinity of their trip related destinations, or at a time no later than acceptable time after arrival to the vicinity to the destination, to estimate arrival time to the vicinity of destinations of a path-controlled trip, to guide path-controlled trips to reserved parking places, to affect the network usage cost depending on the ability to reserve parking places at the arrival time of path-controlled trips to the vicinity of their destinations, wherein:

incentivizing path controlled trips by free of charge toll for network usage (e.g., zone to zone network usage) is associated with conditions that the controlled trips obey to path updated and further may have a reserved parking place they may expected to arrive to the vicinity of their destinations (e.g., reservation is predictively applicable above minimum predetermined probability), incentivizing path-controlled trips by discounted tolling for network usage (e.g., zone to zone network usage) is associated with conditions that the controlled trips obey to path updated and further may have a reserved parking place they may expected to arrive to the vicinity of their destinations (e.g., reservation is predictively applicable above minimum predetermined probability), To put the above described aspect in context of dependencies, it may be highlighted that the prime condition to apply predictive management of parking places is an ability to apply effective incentive to use path-controlled trips which enables substantial full usage of path-controlled trips that in turn enables:

to generate conditions to apply productive traffic load balancing that may enable to predict arrival time to destinations to map time and region related usage of parking places which may support prediction of time related emptiness of a parking place according to historical time usage of parking places in different regions and possibly by further according to predictive departure times associated with prescheduled trips.

to apply toll charges that may discourage network usage under disobedience to path updates and under lack of reasonable ability to reserve parking place at predicted arrival time to the vicinity of a destination by upgrading the tolling capability of privileged GNSS tolling.

Such approach, requires in practice regulation to guarantee that vehicles on the road network will be equipped with a toll charging unit functionality, preferably connected to a DNA as describe with some embodiments, wherein the regulation should refer at least to part of a network in which predictive traffic load balancing is applied (under PCCN).

Human interface that may facilitate said reservation of a parking place, preferably comprises according to some embodiments an ability to warn non-authorized drivers, or non-authorized autonomous driven vehicles, from using a reserved parking place (if there is a trial to do so), wherein the warning is preferably associated with elaboration of potential fine for using by a non-authorized vehicle a reserved parking place.

According to some embodiments, the DNA may be used to warn a driver, or automatically alert an autonomously driven vehicle, under the control of an upgraded in-vehicle toll charging unit associated with additional respective software application.

Such application may preferably be able to charge fine if a non-authorized occupancy of a reserved parking-place takes place and further be able to support toll charging from trips that are served by path control trip service while having no confirmation for potential reservation of a parking place (associated with estimated arrival time to a requested destination).

With such approach, predictive negative effect of non-available parking places may be controlled comprising:

routine maintenance of interfering traffic alleviation at the vicinity of trip destinations.

pre-planned alleviation of interfering traffic at the vicinity of trip destinations by associating pre-planned zone to zone distribution according to zone to zone pricing that takes into account the effect of predictive parking management on the demand (optimization associated with demand distribution affected by privileged tolling that refers to obedience to path updated under confirmation to reserve parking place at the vicinity of destinations).

In this respect, the ability to reserve parking places, in conjunction with an ability to estimate time related potential of empty parking places in the vicinity of destinations, may further enable to handle warning to drivers, or alerting autonomous driving vehicles, about potential loss of privilege associated with network usage by a path controlled trip when it is anticipated that a trip may not have a reserved parking place at the estimated arrival time of a trip to its destination.

Such approach may be supported by a query to a driver, at the time of request for a path control service, to determine whether there is a privately reserved parking place at the end of the trip or there is a need to reserve a parking place to the trip (by e.g., the PCCN control system).

According to some embodiments, a response to a request to reserve a parking place may be associated with confirmation associated with reasonable probability to apply reservation with respect to predicted arrival time or with recommendation to postpone the departure time to a time when reasonable probability to reserve a parking place is applicable. According to some embodiment the message may comprise time and distance related recommendations, wherein as farther the distance of a potential reservation of a parking place from a the requested destination the reservation may possibly become more applicable, and wherein acceptance of a farther located parking place might not require to postpone a trip to a time when a parking place reservation may expected to be applicable.

The following describes an example to reduce traffic interference to predictive traffic load balancing associated with predictive control on nonproductive search for parking places by path-controlled trips.

1. A method of controlling parking reservation related network usage charging, associated with a path-controlled trip, comprising:

a. transmitting from a vehicle a request for a path-controlled service, comprising with the transmission location and destination for a controlled trip wherein the transmission is associated with anonymous identity associated with the trip, b. receiving at the vehicle a message, associated with said anonymous identity, wherein the massage is associated with potential parking reservation related alternatives for one or more cost related types of parking places, comprising either:

i. to accept an applicable parking distance from the requested destination for associated with no loss in network usage privilege, ii. to accept a postponed departure, due to lack of anticipated empty parking places at the vicinity of the destination.

iii. to accept a certain privilege loss in network usage cost while applying a path controlled trip under non confirmed potential reservation of a parking place, c. transmitting from the vehicle, according to said anonymous identity, the selected choice according to 2, d. receiving at the vehicle, according to said anonymous identity, confirmation of selected choice in "c" and accordingly updating an in-vehicle toll charging unit with the chosen mode of operation wherein:

i. under acceptance of the destination of parking (preferably associated with cost of a parking place), an in-vehicle toll charging unit functionality is updated with a requirement to leave the network usage cost with no change to the default privileged network usage tolling, ii. under non acceptance of any offered destination of parking (under non-postponed trip), or under lack of confirmation for parking reservation (due to lack of anticipated availability of a parking place in required distance from the requested destination), an in-vehicle toll charging unit functionality is updated with a requirement to worsening the network usage privilege, preferably the worsening level is proportional to the probability to the inability to reserve time related parking place in acceptable vicinity of the trip destination, iii. under non acceptance of the destination associated with a postponed trip an in-vehicle toll charging unit functionality is updated with recommended postponed departure of the trip to be associated with a prescheduled path-controlled trip.

2. A method possibly applied according to method 1 determining by in-vehicle toll charging unit functionality network usage cost according to said chosen mode of network usage and obedience level to path updates,
3. A method possibly applied according to method 2, wherein the determined charging value is transmitted from the vehicle, by non-anonymous identity,
4. A method possibly applied according to method 2, wherein the charging value is associated with said zone to zone charging related value.
5. A method possibly applied according to method 1, wherein the applicable distance of parking from requested destination is estimated according to constructed data base of time related historical usage of parking places that determines typical time related potential to reserve parking places in relevant parts of the controlled network
6. a method possibly applied according to method 5, wherein mapping of time and regional related usage of parking places is applied according to further data associated with parking time of path-controlled trips and according to typical time related time usage of parking places (applicably under substantial full usage of path controlled trips on a controlled network).
7. A method possibly applied according to method 6, wherein the mapping of time usage of parking places is associated with a request for a prescheduled path-controlled trip, and wherein requests for prescheduled trips are encouraged by incentive associated e.g., with priority in allocation closer parking place to destinations in preferably the priority is proportional to the history of performed prescheduled trips by the requester.
8. A method possibly applied according to method 1, wherein a said update associated with confirmation and lack of confirmation to reserve a parking place affects respectively the toll charge value under obedience of a path-controlled trip to path updates.
9. A method possibly applied according to method 1, wherein the toll charging unit determines at least a single network-usage related value according to a comparison between a path complying with said path updates and an actual development of a controlled trip related path, according to tracked positions of the vehicle, wherein determination of the network-usage related value comprises usage of data configured to determine a potential network-usage related value for a potential match (obedience to path updated) and a potential network-usage related value for a potential mismatch (disobedience to path updates), wherein road network usage related value is dependent on zone related position and zone related destination of a requested path for a trip subject, and wherein under said match the privileged zone to zone network usage is worsen if the toll charging unit is updated that the trip is performed under no pre-confirmation to reserve parking place to the trip.
10. A method possibly applied according to method 9, wherein network-usage related cost is associated with a potential match is associated with a discount in zone to zone related charged toll (privileged tolling).
11. A method possibly applied according to method 1, wherein the functionality of an in-vehicle toll changing unit comprises predetermined procedure to perform privileged tolling transaction with a toll charging center, while exposing no trip details, the method comprising:
    a. Receiving by said in-vehicle toll charging unit functionality data associated with time related path, which should be developed according to dynamic updates, according to which the in-vehicle toll charging unit functionality determines the time related varying positions of a path which should be developed according to said path updates,
    b. Tracking positions along a trip by said in-vehicle toll charging unit functionality,
    c. Comparing by said in-vehicle unit functionality said tracked time related with time related positions associated with path that should be developed according to path updates,
    d. Determining by said in-vehicle toll charging unit functionality, privilege related network usage cost which
        i. according to some embodiments the cost refers to privileged tolling associated with confirmed potential to reserve trip wily obedience to path updates entitles free of charge toll
        ii. according to some embodiment the cost refers to privileged tolling associated with confirmed potential to reserve trip wily obedience to path updates entitles discount in charged toll
    e. Determining by said in-vehicle unit functionality reduction in the determined privileged, if the in-vehicle unit functionality was updated of lack of confirmation for planned parking place reservation (e.g., due to probability below a predetermine threshold to reserve a parking place), wherein the reduction in the level of privilege is preferably proportional to the probability to the lack of ability to reserve a parking place for the control trip.
    f. Transmitting by said in-vehicle toll charging unit functionality toll charging value by vehicle identifying (non-anonymous) related message wherein the message includes no common data and no common communication related data that is associated with non-vehicle related identifying (anonymous) messages which may enable to associate vehicle related identifying message with non-vehicle relate identifying message by reception of such messages.
12. An apparatus associated with in-vehicle unit functionality comprising:
    a. Mobile internet transceiver,
    b. GNSS positioning receiver, preferably supported by map matching, and/or sensor-based localization associated with autonomous vehicles,
    c. Processor and memory,
    d. Communication apparatus to communicate with an in-vehicle driving navigation aid.
13. A method possibly applied according to method 11, wherein path updated are planned and assigned by a PCCN control system.
15. A method possibly applied according to method 13, wherein a PCCN control system applies DPCP.

According to some embodiments, said incentivized (said privileged) path controlled trips, which may generate substantial full usage of path-controlled trips on a citywide road network, may under said substantial full usage of path controlled trips to support prevention of malicious attacks on an anonymous PCCN control system operation. In this respect, anonymous updates of positions that are transmitted to a path control system (PCCN control system) from path controlled trips, which in return being updated anonymously by path control system updates, may enable the path control system to identify whether movement of a certain path controlled trip on a road (according to time related position updates) complies with movements of other time related position updates (position updates received anonymously by other path control trips) in the vicinity of said certain trip and, accordingly, identifying whether the said certain trip movement may be considered as being acceptably complying with the traffic on the road or not. According to some embodiments, a detection of incompliance will remove said certain trip from the service (operation) of the path control center. Such a method may enable to prevent malicious attacks on predictive distribution of path-controlled trips on the network.

Further pre-prevention of malicious access to the service may be applied, by pre-filtering potential malicious requests for path controlled trips, may be associated with handling varying IP addresses with path control access servers (applying client oriented IP address allocation), while transmitting to a toll charging units the IP addresses through a different communication means (e.g., by SMS) according to installed procedure (optionally in coordination with the in-vehicle DNA application).

According to some embodiments the above described re-planning phase may adopt or use in substitution relevant part or parts of the following processes associated with the following described iteration of mitigation of relatively loaded links, wherein such an iteration comprising:

A. Access to initial conditions related data, which according to some embodiments an iteration starts with receiving, or having access to, such data and which a previous iteration ends with by producing relevant updates to such data for usage by a subsequent iteration, and which said initial conditions related data may but not be limited to comprise:
   1. according to some embodiments on-network and predicted assigned paths associated with path controlled trips comprising pending alternative paths that are failed to be accepted as assigned paths while still are associated with assigned paths and might be updated in the recent prior iteration; according to some embodiments, with respect to further determination of relatively loaded links, on-network and predicted paths which were assigned to on-network and predicted path controlled trips and their non mitigated pending alternative paths were mitigated in the recent iteration;
   2. according to some embodiments non-mitigated pending paths (associated with non-mitigated assigned paths) which may refer to NMPP, associated with path controlled trips, providing to such trips pending potential alternative paths to their assigned paths, which alternatives may be substituted by new alternatives for assigned paths associated with on-network or with predicted path-controlled trips, according to mitigation prosses, and which NMPP may be generated at the initialization of a cycle of coordination control processes—as a result of independent simultaneous search attempts to improve travel times to assigned paths for on-network and predicted path controlled trips by performing shortest paths algorithm according to time dependent travel time costs on network links (which are dynamically changing), wherein such paths became NMPP rather than an acceptable alternative due to failure to comply with a goal to improve travel time of an assigned path under a controlled limit to increase a further described level of the distribution of paths on the network, and wherein such alternatives may passively accepted during further mitigation processes due to further mitigation of relatively loaded links by alternatives that may comply with said requirement of with a goal to improve travel time of an assigned path under a controlled limit to increase a further described level of the distribution of paths on the network;
   3. according to some embodiments on-network and predicted paths assigned to non path-controlled trips such as trips having non flexible routes and trips that have modeled paths according to e.g., s route choice model;
   4. according to some embodiments on-network and predicted path assigned to non coordinating-path-rips, which according to some embodiments are applicable with an early stage of deployment of path controlled trips in which the coordination control processes require some learning process, while path controlled trips are applied gradually, and in which case non coordinating path control trips are assigned by paths that are determined according to typical route choice model as a result of off-line calibrated C-DTS performed;
   5. according to some embodiments data and decision criteria used and/or produced and/or modified by one or more prior iterations of coordination control processes and which are subject to be used and/or modified by the current iteration, including but not limited to a threshold related acceptance criterion to accept new alternative paths to path controlled trips and which threshold is adapted along iterations to mitigate traffic load on relatively loaded links.

B. Determination of relatively loaded links by evaluating potential time-dependent effect of mitigated and non-mitigated pending paths, updated by the previous iteration, on the volume to capacity ratios of network links along the currently mitigated traffic imbalance in predicted time horizon, by feeding an on line calibrated C-DTS based traffic prediction simulator with part of the received paths referred to "A" wherein the fed paths are not including assigned paths associated with path controlled trips with which NMPP are associated while including instead the NMPP associated with a pending alternative to path controlled trips, and according to synthesis of C-DTS traffic prediction for the currently mitigated traffic imbalance in predicted time horizon—determining time dependent relatively loaded links by a comparison between:
   1. time dependent traffic volumes to capacity ratios on network links along the currently mitigated traffic imbalance in predicted time horizon, which is determined by the synthesis of C-DTS traffic prediction fed by said paths (as said above in "B", i.e., with reference to "A" assigned paths associated with path controlled trips are not included while their respective non mitigated pending paths which were considered as alternative are included), and
   2. reference time dependent traffic volume to capacity ratios on links which are determined by synthesis of C-DTS traffic prediction fed by paths which with respect to coordinating path controlled trips include assigned paths (which according to some embodiments include mitigated paths, which were assigned to path controlled trips as alternatives up to the current iteration of the current cycle, whereas according to some other embodiments includes no mitigated paths assigned to path controlled trips in the current cycle) and exclude NMPP associated with assigned paths, wherein, according to the comparison, links on which time dependent differences of traffic volume to capacity ratios are found to be above the reference ratios, along the prediction time horizon, mainly due to non mitigated pending paths, may be determined as time dependent relatively loaded links. According to some embodiments, the determination of time dependence for relatively loaded links is performed for time intervals which may be longer than the time intervals that differentiate the time horizon for which the current cycle is performed if it is required to maintain more stable mitigation of traffic imbalances on the network.

C. Determination and update of prioritized load balancing priority layer, subject to a case in which there is a need for gradual coordination control, that is, when the coordination control processes maintain load balancing preferably under non major deviation from load balance, which may or may not require further concentration of traffic on part of the network. In this respect, according to some embodiments, the determination of prioritized relatively loaded links in a load balancing priority layer is performed according to the potential convergence of the imbalanced traffic mitigation under real time constraints, that is, slow trend in the reduction of aggregated travel times or increase in the aggregated ravel times may enable to reduce the number of the relatively loaded links in the load balancing priority layer by providing priority to higher level of relatively loaded links.

D. Mitigation of traffic loads on relatively loaded links by:

1. searching for new alternative paths to yet non-mitigated pending alternative paths, preferably by substantially simultaneous search processes, wherein, according to some embodiments, time dependent travel times that are associated with a search are determined by synthesis of C-DTS based traffic prediction fed by said paths according to "A" while NMPP up to the current iteration are excluded (not fed), and wherein the search with respect to links excludes from the controlled network said relatively loaded links determined by "B" if the link is not a destination link, whereas, if gradual coordination is applied then the search excludes prioritized relatively loaded links determined by "C" if the link is not a destination link. According to some embodiment, if new alternative paths are not accepted by the current iteration according to further determined acceptance procedure they are ignored with further iterations of the mitigation of imbalanced traffic on the network, that is, the reference to search for new alternative paths in a subsequent iteration are said yet not mitigated pending alternative paths. According to less conservative embodiments the new alternative paths are not ignored and used as a reference for acceptance procedure by the subsequent iteration and are substituting said NMPP in "A". According to some embodiments, exclusion of relatively loaded links refers to exclusion of the first link associated with a non-mitigated path or links which are associated with travel times (associated with the non-mitigated path) along part of the prediction time horizon. According to some embodiments, said searches for paths are preferably performed substantially simultaneously by agents, wherein according to available computation power for real time related performance, an agent is associated with a search for one or more new alternative paths, and wherein a search is performed by calculating a shortest or a substantially shortest path according to said time dependent travel times, and wherein in this respect, and hereinafter and above described embodiments, the term search or the term path calculation for a path refer, if not otherwise specified, to applying a shortest path algorithm known in the art including, wherein the costs are time dependent travel times on network links in predicted time horizon intervals.

2. Determining a threshold related acceptance criterion to accept new alternative paths as a substitution to assigned path controlled trips, wherein the threshold is adaptively determined in order to enable controllable mitigation of traffic overload on relatively loaded link by the current iteration in perspective of one or more prior iterations; and wherein, according to prior mitigation rate of traffic loads, preferably during a plurality of iterations, the threshold in previous iteration is modified to enable further higher increase or lower increase or no change in the mitigation, or to return to prior conditions of prior iterations to decrease overreaction to mitigation performed by the previous iteration which may negatively affect the mitigation convergence; and wherein the criterion to choose the required trend in the mitigation (increase or decrease) relates to the functionality of the threshold to limit mitigation of non-deterministic number of NMPP which may preferably prevent as much as possible non acceptable discrimination in assignment of paths as well as non linear or at least significant non linear effects of the mitigation on the network, in order to enable fairness and controllable convergence along a plurality of iterations. In this respect the threshold should preferably be dynamically adapted along a plurality of iterations in order to allow on the one hand predictable convergence and on the other hand rapid convergence. According to some embodiments, in order to avoid solely real time adaptation of the threshold, which might not be sufficiently effective for non substantially recurrent traffic developments, predetermined sets of thresholds may be prepared and stored for different scenarios in order to support coarse reference to real time refined adaptation. In this respect, real time adaptation of the threshold is supported by, for example, said stored predictive control data which may be expanded to include recommended sets of thresholds according to acceptable match between current patterns of traffic and stored patterns of traffic associated with set or sets of thresholds, enabling to retrieve according to said match desirable coarse set or sets of thresholds which may be refined in real time. According to some embodiments, a dynamically determined threshold is preferably related to distinguishable part of the traffic on the network, and wherein a distinguishable part of the traffic has, on the one hand, high interrelated interaction on the network within the horizon of traffic predictions associated with coordination control processes and, on the other hand, sufficiently low interaction with other one or more distinguishable parts of the traffic. Examples of low or non interrelated interaction between two parts of traffic on a network is opposite traffic flows such as north to south flow interaction with south to north flow, or even east to west flow interaction with south to north flow. This may further be expanded to parallel flows in the same direction having low or no interaction within the prediction time horizon, and to any other separate flows having low or no potential interaction within the prediction time horizon.

3. Accepting new alternative paths or pending alternative paths according to a predetermined acceptance procedure which may but not be limited to a threshold which enables to put a limit on acceptance of said new alternative paths, according to search results from "D.1"; that is, if the potential improvement in travel time of the new alternative, which according to the predetermined procedure should be less than the potential improvement that was assumed to be gained by a search for the alternative path to an assigned path and which failed to provide improvement due to simultaneous attempts and became a non mitigated pending path (determined in "A.2" or according to some embodiment in "D.3"), a threshold puts a limit on the maximum accepted reduction in potential travel time improvement in comparison to the potential travel time improvement that was assumed to be gained by the search for a path which became a non mitigated pending path (at the time before it was found to fail to provide an alternative to an assigned path due to said substantially simultaneous search processes); wherein the assumed travel time difference according to the threshold is preferably a marginal value (as mentioned in "D.2) in order to enable acceptable mitigation during a plurality of iterations. Such approach contributes to both objectives: efficiency associated with coordination control processes and fairness. In this respect, the efficiency objective is obtained by providing relatively lower priority to changes to NMPP (alternative paths failed to be accepted) which according to the search in "E.1" were assumed to have high travel time potential savings, while due to simultaneous attempt to improve travel times the alternative paths failed to improve travel times and are left to be non-mitigated pending paths which are subject to potential mitigation along further iterations, either directly as a result of accepting new alternative paths or indirectly as a result of accepting new alternatives to other related non mitigated pending paths with respect to common non mitigated relatively loaded links. The complementary objective, which is fairness, enabling further to obtain controllable convergence along a plurality of iterations of mitigations (due to no or minor nonlinear effects on synthesis of C-DTS traffic predictions), are obtained by enabling marginal differences in travel times to be applied with a new alternative path according to, that is, acceptance of a new alternative, under an iteration, is associated preferably with marginal changes with respect to travel time improvements which were assumed to be gained with the search for paths that became NMPP (the potential travel time improvements of the non-mitigated alternative paths were found to be fictitious improvements and therefore such paths became non mitigated pending paths). According to some embodiments the difference in travel time may be based on absolute values and according to some other embodiments the difference in travel time may be based on a relative values. The term threshold is a mitigation related acceptance criterion for potential alternative paths, which may refer hereinafter to "travel time limiting criterion";

E. Assignment of accepted paths, that is, accepting new alternative paths or pending paths, to be applied as path controlled trips is performed according to assignment acceptance criteria which may have to take into account that making a modification to an assigned path should preferably avoid, inter-alia, too short reaction time to a modification by human driver or by an autonomously driven vehicle, and/or too frequent changes to assigned paths which from human perception point of view negatively affect the confidence in path control trips, and which too frequent changes to assigned paths further produce nonproductive usage of communication resources. Assignment acceptance criteria may, for example, include:
   1. a condition that the path preferably complies with acceptable frequency of changes to an assigned path to a path-controlled trip, to prevent non-productive communication loads and negative effect on human perception which may be interpreted as non-stable control, and/or
   2. a condition that the accepted path according to the threshold, contributes to travel time improvement in comparison to the travel time of the current assigned path which is preferably evaluated by synthesis of C-DTS traffic prediction fed by respective paths according to the mitigation processes which were performed up to the current iterations.

F. Updating results from the iteration to provide initial conditions for the subsequent iteration and which data related to initial conditions are determined for example in "A".

What is claimed is:

1. A method of predictively controlling load balance of traffic on at least a part of an urban road network by managing trip paths through dynamic control on a distribution of trips on the road network by a navigation control system implementing closed loop iterative planning of paths that utilizes multi-model multiagent predictive control based on position to destination requests and position updates from trips, the method comprises performing at least one planning iteration comprising:

a. searching for alternative paths that shorten the travel time for trips based on:
   time-dependent travel times on road network links, determined for a controlled horizon by Dynamic Traffic simulation (DTS) in an earlier planning iteration,
   updated positions of on-network trips, and positions of trips predicted to enter the network within the controlled horizon, in relation to their destinations, and
   predetermined link to link travel times to determine travel time from a potential controlled horizon exit to potential destinations beyond controlled horizons,
   wherein the searching for alternative paths excludes prioritized relatively-loaded links in the controlled horizon, wherein priority of a relatively-loaded link, which is initially prioritized based on its volume-to-capacity ratio relative to other links, is decreased based on a potential mitigation of traffic load from the link relative to other loaded links, wherein the prioritized relatively-loaded links are limited to include prioritized relatively loaded links that allow to enhance planning convergence based on at least one trend in traffic parameters including aggregate travel times;

b. determining multiple planning models for acceptance of planned alternative paths, by determining different travel time limiting thresholds for different planning models, wherein different travel time limiting thresholds limit acceptance of planned alternative paths at different levels, wherein determining the different travel time limiting thresholds comprises:

determining a bounding range for the travel time limiting thresholds, wherein the bounding range is subject to a change from the bounding range determined for an earlier planning iteration, wherein a change relates to the planning convergence, measurable by at least one trend in traffic parameters including aggregate travel times determined based on a trend in time-dependent travel times on links in the controlled horizon utilized by earlier planning iterations, with narrowing of the bounding range in relation to improvement in the planning convergence, and determining multiple travel time limiting thresholds within the bounding range, wherein the multiple travel time limiting thresholds are distributed across the range;

c. accepting with planning models alternative paths that do not exceed their travel time limiting threshold;

d. determining, for the planning models, time-dependent travel times and volume-to-capacity ratios for links within their controlled horizon, wherein a determination is based on traffic simulation performed by an on-line calibrated DTS, fed by the alternative paths accepted by the planning model and by unchanged paths, wherein calibration of the on-line calibrated DTS is based on the position updates from trips and the positions of trip predicted to enter the network in the controlled horizon;

e. determining for the planning model their contribution to traffic load balance indicated by convergence of the planning of paths and measurable by at least one traffic parameters including aggregate travel times determined for the planning models, wherein the aggregate travel times is based on time dependent travel times; and f. comparing the different planning models to determine a favorable model based on traffic parameters including lowest aggregate travel times, and determining the time-dependent travel times on links resulting from the favorable planning model for use by one or more further planning iterations.

2. The method of claim 1, wherein the at least one planning iteration uses at least one of:

updated positions of on-network trips and of trips predicted to be on the network within the controlled horizon, determined in an earlier planning iteration by DTS calibrated by position updates from vehicles related to the trips, time-dependent travel time and volume-to-capacity ratios on road network links, determined for a controlled horizon by Dynamic Traffic simulation (DTS) in an earlier planning iteration, time period related travel time on links for use beyond the controlled horizon based on link-to-link travel time costs including time related historical data, travel-time limiting threshold used by the chosen planning model of the previous multi-model planning iteration, and the bounding range used to determine multiple travel-time limiting thresholds for the planning models, load balance trend indicator determinable based on traffic parameters including a plurality of aggregate travel times of trips determined for earlier iterations, or raw data outcomes from earlier planning iterations, converted internally or externally of the planning iteration into valuable data, comprising:

changes in volume to capacity ratios among links whereby prioritized relatively loaded links are determined, and time dependent travel times on links within the controlled horizon, whereby aggregate travel time of trips is determined and can be used to indicate on change in traffic load balancing throughout a plurality of planning iteration, which alternatively can be indicated by the change aggregate traffic flow on network links based on time dependent traffic flows that the DTS can generate for links within the controlled horizon.

3. The method of claim 1, wherein the multi-model planning iteration incorporates at least one planning iteration associated with at least one planning model, before performing processes 'f', and wherein the at least one planning iteration comprising:

searching for alternative paths that shortens the travel time for trips based on:

time-dependent travel times on road network links, determined for a controlled horizon by Dynamic Traffic simulation (DTS) in an earlier planning iteration, updated positions of on-network trips, and positions of trips predicted to enter the network within the controlled horizon, in relation to their destinations, and predetermined link to link travel times to determine travel time from a potential a controlled horizon exit to potential destinations beyond controlled horizons, wherein the search for alternative paths excludes prioritized relatively loaded links in the controlled horizon;

determining travel time limiting threshold, in relation to the travel time limiting threshold associated with its previous respective planning model iteration, wherein:

the travel time limiting threshold associated with the previous planning iteration is changed in relation to the change in traffic load balance measurable by at least one trend in at least one traffic parameter, including aggregate travel times of trip paths in relation to one or more aggregate travel time of trip paths determined for previous planning iterations, and wherein the limit of travel time limiting threshold, associated with the at least one respective previous planning model iteration, is increased in relation to the improvement in traffic load balance measurable by at least one trend in at least one traffic parameter including the reduction in the aggregate travel time of the trips;

accepting with the planning iteration alternative paths that do not exceed the travel time limiting threshold; and determining time-dependent travel times on links in the controlled horizon based on traffic simulation performed by DTS, fed by the accepted alternative paths and by unchanged paths.

4. The method of claim 3, wherein the at least one planning iteration uses at least one of:

updated positions of on-network trips and of trips predicted to be on the network within the controlled horizon, determined in an earlier planning iteration by DTS calibrated by position updates from vehicles related to the trips, time-dependent travel time and volume-to-capacity ratios on road network links, determined for a controlled horizon by Dynamic Traffic simulation (DTS) in an earlier planning iteration, time period related travel time on links for use beyond the controlled horizon based on link-to-link travel time costs including time related historical data, travel-time limiting threshold used by the previous planning iteration of the planning model, load balance trend indicator determinable based on at least one trend in traffic parameter including a trend in relation to aggregate travel times of trips determined for an earlier iteration, and raw data outcomes from earlier planning iterations, converted internally or externally of the planning iteration into valuable data, comprising:

time dependent travel times on links within the controlled horizon, whereby aggregate travel time of trips is determined and can be used to indicate on change in traffic load balancing throughout a plurality of planning iteration, which alternatively can be indicated by the change aggregate traffic flow on network links based on time dependent traffic flows that the DTS can generate for links within the controlled horizon.

5. The method of claim 1, wherein, the iterative planning repeats iterative processes 'a' to 'f', each repetition is performed throughout a limited time interval that enables to maintain required dynamic control, and, at the end of each time interval the navigation system transmits accepted alternative paths to navigated vehicles associated with respective trips.

6. The method of claim 1, wherein the search for an alternative path implements a non-heuristic based shortest path algorithm including time dependent Dijkstra shortest path algorithm.

7. The method of claim 1, wherein the on-line calibration of the DTS is performed for the said planning iteration based on position updates from trips for the current planning iterations and for at least one more subsequent iteration.

8. The method of claim 1, wherein, under increase in imbalance traffic, indicative by no or too small convergence rate of the iterative planning and measurable by the trend in traffic parameters including aggregate travel time of trips throughout recent planning iterations, the range of travel time limiting thresholds is adjusted to increase the allowable travel time saving by alternative paths, wherein the increase is performed based on trends in traffic parameters including the increase in aggregate travel time of trips in relation to earlier planning iterations.

9. The method of claim 1, wherein, under the ability to make smaller changes in each planning iteration, due to decrease in imbalanced traffic measurable by trends in traffic parameters including the decrease in aggregate travel time of trips in relation to earlier planning iterations, the range of the travel time limiting threshold is decreased to enable enhance in fairness by planning of paths in a planning iteration.

10. The method of claim 1, wherein the cost of links used in the search for alternative paths incorporates determination of non-occupied capacities of links, wherein the determination of the cost of a link, in terms of time dependent travel time, becomes higher relative to its time-dependent travel time cost when its non-occupied capacity is lower compared to a link having comparable time dependent travel time with a higher non-occupied capacity, leading to reduction in the number of planning iterations for decreasing imbalanced traffic.

11. The method of claim 1, wherein the travel time cost of trips from each potential exit from the controlled time horizon to destination links is based on shortest path according to historical travel time costs of links in a relevant daily time-interval.

12. The method of claim 11, wherein the historical travel time costs are corrected throughout the iterative planning based on predictions made according to changes in position updates received from trips.

13. The method of claim 1, wherein, trends in aggregate travel times are inversely substitutable by aggregate flows trends and, in such a case, the time dependent travel times used to determine aggregate travel times are substituted by time dependent flows.

14. The method of claim 1, wherein the acceptance of alternative paths is further limited by accepting alternative paths that their travel time savings are also higher than a minimum improvement to travel time saving.

15. The method of claim 1, wherein the controlled time horizon is determined based on the traffic imbalance level, where a relatively high traffic imbalance shortens the horizon with the increase in the imbalance indicated by trends in traffic parameters including the increase in the aggregate travel time of trips in relation to earlier planning iterations.

16. The method of claim 1, wherein the multi-model planning is implemented under methods enabling anonymous navigation and a privacy preserving tolling system, comprising:

receiving at the navigated vehicle a path from the navigation control system for a path-controlled trip, wherein transmission of said position and destination and reception of said path use anonymous vehicle IP addressing, and wherein the path-controlled trip is entitled to privileged network usage for obedience to the navigation control system, the privileged network usage comprising at least one of a free of charge toll or a reduced toll;

receiving at the navigated vehicle path updates from the navigation control system and transmitting from the vehicle position updates to the navigation control system, wherein reception of the path updates and transmission of the position updates use the anonymous vehicle IP addressing;

determining at the vehicle one or more in-vehicle-controlled determination of charge amount that represents the vehicle's network-usage by:

tracking positions of the vehicle and determining matches and mismatches of tracked positions with positions that could acceptably be developed by the vehicle according to received path updates; and determining at least one match-related charge amount related to network-usage for one or more matches according to data determining privileged network usage cost, and at least one mismatch-related charge amount related to network-usage for one or more determined mismatches according to data determining non-privileged network usage cost, wherein the privilege in network usage is configured to enable mass use of navigated vehicles, controlled by the iterative multi-model predictive control, under which the mass use facilitates on-line DTS calibration, based on position updates of trips, allows substantial independence of modeling route choices for non-controlled trips;

determining at the vehicle charging related data based on the one or more in-vehicle-controlled charge amounts wherein the determination of the charging related data includes determining the charging related data based on a comparison between an in-vehicle-controlled charge amount and the corresponding position-update-based charge amount received at the vehicle; and transmitting the charging related data from the vehicle, wherein transmission of the charging related data is associated with a charging related ID, and is according to a charging procedure that allows to expose a non-anonymous ID with the charging related data, wherein the transmission of the charging related data and the transmission and reception of anonymous vehicle data use client IP addressing that randomly relates a client IP address used with anonymous vehicle data communication and client IP address used with charging related data communication.

17. The method of claim 16, wherein determining the charging related data includes determining the charging related data based on a detected difference between the determined in-vehicle-controlled charge amount and the corresponding position-update-based charge amount received at the vehicle, and using the lower amount as the charge amount.

18. The method of claim 17 comprising storing at the vehicle a position-update-based charge amount received at the vehicle in relation to time relate anonymous IP addressing used with the reception of position-update-based charge amount, and the corresponding in-vehicle-controlled charge amount determined at the vehicle.

19. The method of claim 1, wherein the multi-model planning is implemented under methods enabling anonymous navigation and a privacy preserving tolling system, comprising:

receiving at the navigated vehicle a path from the navigation control system for a path-controlled trip, wherein transmission of said position and destination and reception of said path use anonymous vehicle IP addressing, and wherein the path-controlled trip is entitled to privileged network usage for obedience to the navigation control system, the privileged network usage comprising at least one of a free of charge toll or a reduced toll;

receiving at the vehicle path updates from the navigation control system and transmitting from the vehicle position updates to the navigation control system, wherein reception of the path updates and transmission of the position updates use the anonymous vehicle IP addressing;

determining at central server associated with the centralized navigation system one or more in-vehicle-controlled charge amounts related to the vehicle's network-usage by:

tracking positions of the vehicle and determining matches and mismatches of tracked positions with positions that could acceptably be developed by the vehicle according to received path updates; and determining at least one match-related charge amount related to network-usage for one or more matches according to data determining privileged network usage cost, and at least one mismatch-related charge amount related to network-usage for one or more determined mismatches according to data determining non-privileged network usage cost, wherein the privilege in network usage is configured to enable mass use of navigated vehicles, controlled by the iterative multi-model predictive control, under which the mass use facilitates on-line DTS calibration, based on position updates of trips, allows substantial independence of modeling route choices for non-controlled trips; and transmitting the charging related data from the vehicle, wherein transmission of the charging related data is associated with a charging related ID, and is according to a charging procedure that allows to expose a non-anonymous ID with the charging related data, wherein the transmission of the charging related data and the transmission and reception of anonymous vehicle data use client IP addressing that randomly relates a client IP address used with anonymous vehicle data communication and client IP address used with charging related data communication.

20. The method of claim 1, wherein the multi-model planning is implemented under methods enabling anonymous navigation and a privacy preserving tolling system, comprising:

receiving at the navigated vehicle a path from the navigation control system for a path-controlled trip, wherein transmission of said position and destination and reception of said path use anonymous vehicle IP addressing, and wherein the path-controlled trip is entitled to privileged network usage for obedience to the navigation control system, the privileged network usage comprising at least one of a free of charge toll or a reduced toll;

receiving at the navigated vehicle path updates from the navigation control system and transmitting from the vehicle position updates to the navigation control system, wherein reception of the path updates and transmission of the position updates use the anonymous vehicle IP addressing;

determining at the vehicle one or more in-vehicle-controlled charge amounts related to the vehicle's network-usage by:

tracking positions of the vehicle and determining matches and mismatches of tracked positions with positions that could acceptably be developed by the vehicle according to received path updates; and determining at least one match-related charge amount related to network-usage for one or more matches according to data determining privileged network usage cost, and at least one mismatch-related charge amount related to network-usage for one or more determined mismatches according to data determining non-privileged network usage cost, wherein the privilege in network usage is configured to enable mass use of navigated vehicles, controlled by the iterative multi-model predictive control, under which the mass use facilitates on-line DTS calibration, based on position updates of trips, allows substantial independence of modeling route choices for non-controlled trips;

determining at the vehicle charging related data based on the one or more in-vehicle-controlled charge amounts wherein the determination of the charging related data includes determining the charging related data based on a comparison between an in-vehicle-controlled charge amount and the corresponding position-update-based charge amount received at the vehicle; and transmitting the charging related data from the vehicle, wherein transmission of the charging related data is associated with a charging related ID, and is according to a charging procedure that allows to expose a non-anonymous ID with the charging related data, wherein the transmission of the charging related data and the transmission and reception of anonymous vehicle data use client IP addressing that randomly relates a client IP address used with anonymous vehicle data communication and client IP address used with charging related data communication.

* * * * *